(12) United States Patent
Kulkarni et al.

(10) Patent No.: US 10,504,126 B2
(45) Date of Patent: Dec. 10, 2019

(54) SYSTEM AND METHOD OF OBTAINING MERCHANT SALES INFORMATION FOR MARKETING OR SALES TEAMS

(71) Applicant: TRUAXIS, LLC, Redwood City, CA (US)

(72) Inventors: Nilesh Vijay Kulkarni, Saratoga, CA (US); Samir Kothari, Menlo Park, CA (US); John Michael Thornton, Palo Alto, CA (US)

(73) Assignee: Truaxis, LLC, Redwood City, CA (US)

( * ) Notice: Subject to any disclaimer, the term of this patent is extended or adjusted under 35 U.S.C. 154(b) by 602 days.

(21) Appl. No.: 13/904,624

(22) Filed: May 29, 2013

(65) Prior Publication Data

US 2013/0325548 A1 Dec. 5, 2013

Related U.S. Application Data

(63) Continuation-in-part of application No. 13/247,657, filed on Sep. 28, 2011, and a continuation-in-part of
(Continued)

(51) Int. Cl.
*G06Q 30/02* (2012.01)
*H04M 15/00* (2006.01)

(52) U.S. Cl.
CPC ........ *G06Q 30/0201* (2013.01); *H04M 15/00* (2013.01); *H04M 15/44* (2013.01);
(Continued)

(58) Field of Classification Search
None
See application file for complete search history.

(56) References Cited

U.S. PATENT DOCUMENTS

| 4,965,763 A | 10/1990 | Zamora |
| 5,027,388 A | 6/1991 | Bradshaw et al. |

(Continued)

FOREIGN PATENT DOCUMENTS

| DE | 10055682 A1 | 5/2002 |
| EP | 2034712 A1 | 3/2009 |

(Continued)

OTHER PUBLICATIONS

"Answers to FAQs", Verizon Wireless, http://support.vzw.com/faqs/Account%20Management!faq_billing.html, Feb. 11, 2008, 5 Pages.
(Continued)

*Primary Examiner* — Leland Marcus
(74) *Attorney, Agent, or Firm* — Michael Best & Friedrich LLP

(57) ABSTRACT

Disclosed herein is a method of obtaining merchant sales information for marketing or sales teams. Including accessing transaction data from one or more financial institutions and extracting metadata associated with the transaction data in accordance with at least one rule. The metadata is then analyzed to identify transaction data associated with one or more merchants. The transaction data associated with the one or more merchants is provided to the marketing or sales teams.

21 Claims, 85 Drawing Sheets

Related U.S. Application Data application No. 13/180,511, filed on Jul. 11, 2011, now abandoned, and a continuation-in-part of application No. 13/082,591, filed on Apr. 8, 2011, now Pat. No. 8,600,857, and a continuation-in-part of application No. 12/501,572, filed on Jul. 13, 2009, now abandoned.

(60) Provisional application No. 61/783,477, filed on Mar. 14, 2013, provisional application No. 61/652,662, filed on May 29, 2012, provisional application No. 61/427,138, filed on Dec. 24, 2010, provisional application No. 61/388,680, filed on Oct. 1, 2010, provisional application No. 61/114,120, filed on Jan. 21, 2009.

(52) U.S. Cl.
CPC ......... *H04M 15/58* (2013.01); *H04M 15/745* (2013.01); *H04M 15/80* (2013.01); *H04M 15/805* (2013.01); *H04M 15/8011* (2013.01); *H04M 15/8044* (2013.01); *H04M 15/8083* (2013.01); *H04M 15/83* (2013.01); *H04M 15/84* (2013.01); *H04M 15/85* (2013.01); *H04M 15/851* (2013.01); *H04M 2215/0104* (2013.01); *H04M 2215/0108* (2013.01); *H04M 2215/018* (2013.01); *H04M 2215/0184* (2013.01); *H04M 2215/0188* (2013.01); *H04M 2215/74* (2013.01); *H04M 2215/745* (2013.01); *H04M 2215/7407* (2013.01); *H04M 2215/7457* (2013.01); *H04M 2215/81* (2013.01); *H04M 2215/815* (2013.01); *H04M 2215/8129* (2013.01)

(56) References Cited

U.S. PATENT DOCUMENTS

| | | | |
|---|---|---|---|
| 5,155,763 A * | 10/1992 | Bigus | G06N 3/105 379/111 |
| 5,159,625 A | 10/1992 | Zicker | |
| 5,187,787 A | 2/1993 | Skeen et al. | |
| 5,257,369 A | 10/1993 | Skeen et al. | |
| 5,339,392 A | 8/1994 | Risberg et al. | |
| 5,384,449 A | 1/1995 | Peirce | |
| 5,513,102 A | 4/1996 | Auriemma | |
| 5,657,072 A | 8/1997 | Aristides et al. | |
| 5,659,601 A | 8/1997 | Cheslog | |
| 5,680,607 A | 10/1997 | Brueckheimer | |
| 5,761,650 A | 6/1998 | Munsil et al. | |
| 5,774,870 A | 6/1998 | Storey | |
| 5,794,207 A | 8/1998 | Walker | |
| 5,832,457 A | 11/1998 | O'brien et al. | |
| 5,905,246 A | 5/1999 | Fajkowski | |
| 5,915,214 A | 6/1999 | Reece et al. | |
| 5,945,653 A | 8/1999 | Walker et al. | |
| 6,018,718 A | 1/2000 | Walker et al. | |
| 6,021,415 A | 2/2000 | Cannon et al. | |
| 6,049,599 A | 4/2000 | McCausland et al. | |
| 6,070,149 A | 5/2000 | Tavor et al. | |
| 6,070,150 A | 5/2000 | Remington et al. | |
| 6,085,169 A | 7/2000 | Walker et al. | |
| 6,101,181 A | 8/2000 | Passint et al. | |
| 6,125,173 A | 9/2000 | Jagadish et al. | |
| 6,282,520 B1 | 8/2001 | Schirripa | |
| 6,285,991 B1 | 9/2001 | Powar | |
| 6,327,573 B1 | 12/2001 | Walker et al. | |
| 6,327,574 B1 | 12/2001 | Kramer et al. | |
| 6,332,126 B1 | 12/2001 | Peirce et al. | |
| 6,351,735 B1 | 2/2002 | Deaton et al. | |
| 6,356,878 B1 | 3/2002 | Walker et al. | |
| 6,398,646 B1 | 6/2002 | Wei et al. | |
| 6,430,558 B1 | 8/2002 | Delano | |
| 6,466,919 B1 | 10/2002 | Walker et al. | |
| 6,493,685 B1 | 12/2002 | Ensel et al. | |
| 6,510,418 B1 | 1/2003 | Case et al. | |
| 6,571,279 B1 | 5/2003 | Herz et al. | |
| 6,587,995 B1 | 7/2003 | Duboc et al. | |
| 6,601,761 B1 | 8/2003 | Katis | |
| 6,631,007 B1 | 10/2003 | Buis et al. | |
| 6,631,185 B1 | 10/2003 | Fleming, III | |
| 6,697,998 B1 | 2/2004 | Damerau et al. | |
| 6,710,815 B1 | 3/2004 | Billmaier et al. | |
| 6,763,226 B1 | 7/2004 | McZeal, Jr. | |
| 6,785,592 B1 | 8/2004 | Smith et al. | |
| 6,792,422 B1 | 9/2004 | Stride et al. | |
| D501,281 S | 1/2005 | Kole | |
| 6,839,682 B1 | 1/2005 | Blume et al. | |
| D501,957 S | 2/2005 | Jagger | |
| 6,848,542 B2 | 2/2005 | Gailey et al. | |
| 6,885,997 B1 | 4/2005 | Roberts | |
| 6,898,762 B2 | 5/2005 | Ellis et al. | |
| 6,904,336 B2 | 6/2005 | Raines et al. | |
| 6,915,254 B1 | 7/2005 | Heinze et al. | |
| 6,920,611 B1 | 7/2005 | Spaeth et al. | |
| 6,932,268 B1 | 8/2005 | McCoy et al. | |
| 6,970,871 B1 | 11/2005 | Rayburn | |
| 6,990,635 B2 | 1/2006 | Kurapati et al. | |
| 7,021,531 B2 | 4/2006 | Myttenaere | |
| 7,039,221 B1 | 5/2006 | Tumey et al. | |
| 7,039,600 B1 | 5/2006 | Meek et al. | |
| 7,043,457 B1 | 5/2006 | Hansen | |
| 7,051,925 B2 | 5/2006 | Schwarz | |
| 7,072,858 B1 | 7/2006 | Litzow et al. | |
| 7,072,864 B2 | 7/2006 | Brake, Jr. et al. | |
| 7,085,731 B1 | 8/2006 | Powell et al. | |
| 7,086,586 B1 | 8/2006 | Sullivan | |
| 7,130,828 B2 | 10/2006 | Phillips et al. | |
| 7,130,901 B2 | 10/2006 | Roach | |
| 7,136,467 B2 | 11/2006 | Brockman et al. | |
| 7,165,049 B2 | 1/2007 | Slater | |
| 7,180,887 B1 | 2/2007 | Schwaderer et al. | |
| 7,187,947 B1 | 3/2007 | White et al. | |
| 7,195,157 B2 * | 3/2007 | Swartz | G06K 17/00 235/383 |
| 7,213,256 B1 | 5/2007 | Kikinis et al. | |
| 7,227,475 B1 | 6/2007 | Provenzano et al. | |
| 7,254,367 B2 | 8/2007 | Helden et al. | |
| 7,283,803 B2 | 10/2007 | Karaoguz et al. | |
| 7,343,317 B2 | 3/2008 | Jokinen et al. | |
| 7,343,334 B1 | 3/2008 | Yorulmaz, et al. | |
| 7,349,557 B2 * | 3/2008 | Tibor | G06K 9/00006 382/115 |
| 7,366,493 B2 | 4/2008 | Marsh et al. | |
| 7,386,487 B2 | 6/2008 | Leggett et al. | |
| 7,389,355 B2 | 6/2008 | Brown et al. | |
| 7,392,224 B2 | 6/2008 | Bauer et al. | |
| 7,398,253 B1 * | 7/2008 | Pinnell | G06Q 20/04 705/40 |
| 7,430,531 B1 | 9/2008 | Snyder | |
| 7,455,226 B1 | 11/2008 | Hammond et al. | |
| 7,467,106 B1 | 12/2008 | Levine et al. | |
| 7,482,925 B2 | 1/2009 | Hammad et al. | |
| 7,486,944 B2 | 2/2009 | Carpenter et al. | |
| 7,505,924 B1 | 3/2009 | Whitehead | |
| 7,512,558 B1 | 3/2009 | Elad et al. | |
| 7,512,626 B2 | 3/2009 | Chitgupakar et al. | |
| 7,516,103 B1 | 4/2009 | Peitrucha, Jr. et al. | |
| 7,640,200 B2 | 12/2009 | Gardner et al. | |
| 7,644,019 B2 | 1/2010 | Woda et al. | |
| 7,647,252 B2 | 1/2010 | Rampell et al. | |
| D611,200 S | 3/2010 | Packard | |
| 7,680,899 B1 | 3/2010 | Barnes et al. | |
| 7,698,170 B1 | 4/2010 | Darr et al. | |
| 7,702,543 B2 | 4/2010 | Mackay et al. | |
| 7,702,575 B1 | 4/2010 | Lofton et al. | |
| 7,707,059 B2 | 4/2010 | Reed et al. | |
| 7,707,090 B2 | 4/2010 | Snyder | |
| 7,711,606 B2 | 5/2010 | Snyder | |
| 7,720,720 B1 | 5/2010 | Sharma et al. | |
| 7,742,966 B2 | 6/2010 | Erlanger | |
| 7,752,077 B2 | 7/2010 | Holden et al. | |

(56) References Cited

U.S. PATENT DOCUMENTS

| | | |
|---|---|---|
| 7,760,861 B1 | 7/2010 | Croak et al. |
| 7,778,907 B1 | 8/2010 | Haskins et al. |
| 7,797,453 B2 | 9/2010 | Meijer et al. |
| 7,801,783 B2 | 9/2010 | Kende et al. |
| 7,827,086 B1 | 11/2010 | Ellenberg et al. |
| 7,848,940 B1 | 12/2010 | Harniman et al. |
| 7,857,212 B1 | 12/2010 | Matthews |
| 7,870,021 B2 | 1/2011 | Mankoff |
| 7,870,025 B2 | 1/2011 | English |
| 7,885,870 B2 | 2/2011 | Nam et al. |
| 7,890,089 B1 | 2/2011 | Fujisaki |
| 7,904,327 B2 | 3/2011 | Phelan et al. |
| 7,904,332 B1 | 3/2011 | Merkley, Jr. et al. |
| 7,904,354 B2 | 3/2011 | Pepe et al. |
| 7,904,358 B2 | 3/2011 | Brittingham et al. |
| 7,930,204 B1 | 4/2011 | Sharma et al. |
| 7,933,895 B2 | 4/2011 | Amjadi |
| 7,941,353 B2 | 5/2011 | King et al. |
| 7,986,935 B1 | 7/2011 | D'Souza et al. |
| 7,996,310 B1 | 8/2011 | Edwards et al. |
| 8,005,726 B1 | 8/2011 | Bao |
| 8,033,456 B2 | 10/2011 | Drummond et al. |
| 8,069,407 B1 | 11/2011 | Armandpour et al. |
| 8,108,406 B2 | 1/2012 | Kenedy et al. |
| 8,112,287 B1 | 2/2012 | Paul et al. |
| 8,156,045 B2 | 4/2012 | Rebenack et al. |
| 8,160,938 B2 | 4/2012 | Allen et al. |
| 8,160,957 B2 | 4/2012 | Egnatios et al. |
| 8,177,121 B2 | 5/2012 | Zimmerman et al. |
| 8,185,417 B1 | 5/2012 | Brown et al. |
| 8,195,507 B2 | 6/2012 | Postrel |
| 8,209,198 B2 | 6/2012 | Harkensee et al. |
| 8,249,961 B1 | 8/2012 | Hopkins |
| 8,265,952 B1 | 9/2012 | Smith |
| 8,364,521 B2 | 1/2013 | Ramer et al. |
| 8,387,858 B2 | 3/2013 | Bohn et al. |
| 8,489,452 B1 | 7/2013 | Warner et al. |
| 8,560,398 B1 | 10/2013 | Gregov et al. |
| 8,566,197 B2 | 10/2013 | Satyavolu et al. |
| 8,577,856 B2 * | 11/2013 | Mizrahi ............... 707/705 |
| 8,600,857 B2 | 12/2013 | Satyavolu et al. |
| 8,615,719 B2 | 12/2013 | Ramer et al. |
| 8,639,629 B1 | 1/2014 | Hoffman et al. |
| 8,650,105 B2 | 2/2014 | Satyavolu et al. |
| 8,660,891 B2 | 2/2014 | Ramer et al. |
| 8,660,893 B2 | 2/2014 | Fordyce, III et al. |
| 8,666,376 B2 | 3/2014 | Ramer et al. |
| 8,688,517 B2 | 4/2014 | Lutnick et al. |
| 8,688,671 B2 | 4/2014 | Ramer et al. |
| 8,738,486 B2 * | 5/2014 | McGeehan ............ G06Q 30/02 705/35 |
| 8,768,802 B2 * | 7/2014 | Engle .................. G06Q 40/123 705/35 |
| 8,812,351 B2 | 8/2014 | Zollino et al. |
| 8,930,265 B2 | 1/2015 | Blackhurst et al. |
| 2001/0007978 A1 | 7/2001 | Marsh et al. |
| 2001/0014868 A1 * | 8/2001 | Herz .................. G06Q 10/0637 705/14.38 |
| 2001/0032207 A1 | 10/2001 | Hartley et al. |
| 2001/0034704 A1 | 10/2001 | Farhat et al. |
| 2001/0037236 A1 | 11/2001 | Dixon, III et al. |
| 2001/0038624 A1 | 11/2001 | Greenberg et al. |
| 2001/0044762 A1 | 11/2001 | Nault |
| 2001/0049636 A1 | 12/2001 | Hudda et al. |
| 2001/0051907 A1 | 12/2001 | Kumar et al. |
| 2001/0051920 A1 | 12/2001 | Joao et al. |
| 2002/0008626 A1 | 1/2002 | Waters et al. |
| 2002/0010598 A1 | 1/2002 | Johnson et al. |
| 2002/0013728 A1 | 1/2002 | Wilkman |
| 2002/0023051 A1 | 2/2002 | Kunzle et al. |
| 2002/0026348 A1 | 2/2002 | Fowler et al. |
| 2002/0040359 A1 | 4/2002 | Green et al. |
| 2002/0052776 A1 * | 5/2002 | Rothman et al. ............ 705/10 |
| 2002/0052782 A1 | 5/2002 | Landesmann |
| 2002/0055835 A1 | 5/2002 | Carcoba Olivares et al. |
| 2002/0055924 A1 | 5/2002 | Liming |
| 2002/0065713 A1 | 5/2002 | Awada et al. |
| 2002/0065772 A1 | 5/2002 | Saliba et al. |
| 2002/0082920 A1 | 6/2002 | Austin et al. |
| 2002/0086660 A1 | 7/2002 | Sullivan et al. |
| 2002/0087682 A1 | 7/2002 | Roach |
| 2002/0091650 A1 | 7/2002 | Ellis |
| 2002/0104087 A1 | 8/2002 | Schaffer et al. |
| 2002/0120540 A1 | 8/2002 | Kende et al. |
| 2002/0123919 A1 | 9/2002 | Brockman et al. |
| 2002/0138284 A1 | 9/2002 | DeCotiis et al. |
| 2002/0138848 A1 | 9/2002 | Alao et al. |
| 2002/0154751 A1 | 10/2002 | Thompson et al. |
| 2002/0169658 A1 | 11/2002 | Adler |
| 2002/0169664 A1 | 11/2002 | Walker et al. |
| 2002/0169668 A1 | 11/2002 | Bank et al. |
| 2002/0174061 A1 | 11/2002 | Srinivasan et al. |
| 2002/0198775 A1 | 12/2002 | Ryan |
| 2002/0198803 A1 | 12/2002 | Rowe et al. |
| 2003/0009393 A1 | 1/2003 | Norris |
| 2003/0009401 A1 | 1/2003 | Ellis |
| 2003/0014307 A1 | 1/2003 | Heng |
| 2003/0028415 A1 | 2/2003 | Herschap, III et al. |
| 2003/0032409 A1 | 2/2003 | Hutcheson et al. |
| 2003/0040964 A1 | 2/2003 | Lacek |
| 2003/0045266 A1 | 3/2003 | Staskal et al. |
| 2003/0046155 A1 | 3/2003 | Himmel et al. |
| 2003/0055723 A1 | 3/2003 | English |
| 2003/0056092 A1 | 3/2003 | Edgett et al. |
| 2003/0061132 A1 | 3/2003 | Yu et al. |
| 2003/0078800 A1 | 4/2003 | Salle et al. |
| 2003/0088463 A1 | 5/2003 | Kanevsky et al. |
| 2003/0093414 A1 | 5/2003 | Litzow et al. |
| 2003/0097270 A1 | 5/2003 | Musselwhite et al. |
| 2003/0130878 A1 | 7/2003 | Kruk et al. |
| 2003/0134648 A1 | 7/2003 | Reed et al. |
| 2003/0149596 A1 | 8/2003 | Bost |
| 2003/0154123 A1 | 8/2003 | Subbloie et al. |
| 2003/0158800 A1 | 8/2003 | Pisello et al. |
| 2003/0158818 A1 | 8/2003 | George et al. |
| 2003/0158844 A1 | 8/2003 | Kramer et al. |
| 2003/0191832 A1 | 10/2003 | Satyavolu et al. |
| 2003/0208754 A1 | 11/2003 | Sridhar et al. |
| 2003/0212598 A1 | 11/2003 | Raman et al. |
| 2003/0216971 A1 | 11/2003 | Sick et al. |
| 2003/0229572 A1 | 12/2003 | Raines et al. |
| 2003/0233276 A1 | 12/2003 | Pearlman et al. |
| 2003/0233278 A1 | 12/2003 | Marshall |
| 2004/0002924 A1 | 1/2004 | Boone et al. |
| 2004/0005900 A1 | 1/2004 | Zilliacus |
| 2004/0006608 A1 | 1/2004 | Swarna et al. |
| 2004/0043770 A1 | 3/2004 | Amit et al. |
| 2004/0054572 A1 * | 3/2004 | Oldale ............... G06F 17/30699 706/1 |
| 2004/0054610 A1 | 3/2004 | Amstutz et al. |
| 2004/0067747 A1 | 4/2004 | Carpenter et al. |
| 2004/0083146 A1 | 4/2004 | Goodwin et al. |
| 2004/0083183 A1 | 4/2004 | Hardesty et al. |
| 2004/0090458 A1 | 5/2004 | Yu et al. |
| 2004/0093324 A1 | 5/2004 | Marappan |
| 2004/0102980 A1 | 5/2004 | Reed et al. |
| 2004/0103017 A1 | 5/2004 | Reed et al. |
| 2004/0111370 A1 | 6/2004 | Saylors et al. |
| 2004/0117300 A1 | 6/2004 | Jones et al. |
| 2004/0122736 A1 | 6/2004 | Strock et al. |
| 2004/0123314 A1 | 6/2004 | Bova |
| 2004/0143546 A1 | 7/2004 | Wood et al. |
| 2004/0162778 A1 | 8/2004 | Kramer et al. |
| 2004/0209595 A1 | 10/2004 | Bekanich |
| 2004/0210524 A1 | 10/2004 | Benenati et al. |
| 2004/0217585 A1 | 11/2004 | Mitchell |
| 2004/0225609 A1 | 11/2004 | Greene |
| 2004/0243468 A1 | 12/2004 | Cohagan et al. |
| 2004/0267611 A1 * | 12/2004 | Hoerenz ............ G06Q 10/0637 705/14.13 |
| 2004/0267665 A1 | 12/2004 | Nam et al. |
| 2005/0010472 A1 | 1/2005 | Quatse et al. |
| 2005/0021420 A1 | 1/2005 | Michelitsch et al. |
| 2005/0026117 A1 | 2/2005 | Judson et al. |

(56) References Cited

U.S. PATENT DOCUMENTS

| | | |
|---|---|---|
| 2005/0030291 A1 | 2/2005 | Yanagisawa |
| 2005/0037755 A1 | 2/2005 | Hind et al. |
| 2005/0038893 A1 | 2/2005 | Graham |
| 2005/0055275 A1 | 3/2005 | Newman et al. |
| 2005/0059397 A1 | 3/2005 | Zhao |
| 2005/0065855 A1 | 3/2005 | Geller |
| 2005/0065981 A1 | 3/2005 | Blinn et al. |
| 2005/0080665 A1 | 4/2005 | Bowman-Amuah |
| 2005/0096976 A1 | 5/2005 | Nelms et al. |
| 2005/0120389 A1 | 6/2005 | Boss et al. |
| 2005/0125343 A1 | 6/2005 | Mendelovich |
| 2005/0131761 A1 | 6/2005 | Trika et al. |
| 2005/0131792 A1 | 6/2005 | Rowe |
| 2005/0160003 A1 | 7/2005 | Berardi et al. |
| 2005/0165646 A1 | 7/2005 | Tedesco et al. |
| 2005/0183002 A1* | 8/2005 | Chapus ................. 715/505 |
| 2005/0189414 A1* | 9/2005 | Fano ................. G06Q 30/02 235/383 |
| 2005/0192897 A1 | 9/2005 | Rogers et al. |
| 2005/0209921 A1 | 9/2005 | Roberts et al. |
| 2005/0213511 A1 | 9/2005 | Reece, Jr. et al. |
| 2005/0220280 A1 | 10/2005 | Steinberg |
| 2005/0278716 A1 | 12/2005 | Koppen et al. |
| 2006/0004825 A1* | 1/2006 | Barda ................. 707/102 |
| 2006/0016875 A1 | 1/2006 | Bonalle et al. |
| 2006/0022048 A1 | 2/2006 | Johnson |
| 2006/0044307 A1 | 3/2006 | Song |
| 2006/0053056 A1 | 3/2006 | Alspach-Goss et al. |
| 2006/0053060 A1 | 3/2006 | Wyker |
| 2006/0111967 A1 | 5/2006 | Forbes |
| 2006/0123462 A1 | 6/2006 | Lunt et al. |
| 2006/0143027 A1 | 6/2006 | Jagannathan et al. |
| 2006/0143072 A1 | 6/2006 | Herman et al. |
| 2006/0149648 A1 | 7/2006 | Brown |
| 2006/0151598 A1 | 7/2006 | Chen et al. |
| 2006/0161599 A1 | 7/2006 | Rosen |
| 2006/0165060 A1 | 7/2006 | Dua |
| 2006/0173767 A1 | 8/2006 | Hansen |
| 2006/0173772 A1 | 8/2006 | Hayes et al. |
| 2006/0173974 A1 | 8/2006 | Tang |
| 2006/0178868 A1 | 8/2006 | Billerey-mosier |
| 2006/0195359 A1 | 8/2006 | Robinson et al. |
| 2006/0206376 A1 | 9/2006 | Gibbs |
| 2006/0208060 A1 | 9/2006 | Mendelovich et al. |
| 2006/0208064 A1 | 9/2006 | Mendelovich et al. |
| 2006/0208065 A1 | 9/2006 | Mendelovich et al. |
| 2006/0229996 A1 | 10/2006 | Keithley et al. |
| 2006/0242050 A1 | 10/2006 | Haggerty et al. |
| 2006/0247978 A1 | 11/2006 | Davis |
| 2006/0253321 A1 | 11/2006 | Heywood |
| 2006/0259364 A1 | 11/2006 | Strock et al. |
| 2006/0259390 A1 | 11/2006 | Rosenberger et al. |
| 2006/0271997 A1 | 11/2006 | Jacoby et al. |
| 2006/0277465 A1 | 12/2006 | Pandit et al. |
| 2006/0287950 A1 | 12/2006 | Steinberg |
| 2007/0011044 A1 | 1/2007 | Hansen |
| 2007/0043608 A1 | 2/2007 | May et al. |
| 2007/0061487 A1* | 3/2007 | Moore et al. ................. 709/246 |
| 2007/0067208 A1 | 3/2007 | Haggerty et al. |
| 2007/0078719 A1 | 4/2007 | Schmitt et al. |
| 2007/0084917 A1 | 4/2007 | Fajkowski |
| 2007/0094114 A1 | 4/2007 | Bufford et al. |
| 2007/0129955 A1 | 6/2007 | Dalmia et al. |
| 2007/0150352 A1 | 6/2007 | Kelly-Frank et al. |
| 2007/0156530 A1 | 7/2007 | Schmitt et al. |
| 2007/0156533 A1 | 7/2007 | Hammond et al. |
| 2007/0168267 A1 | 7/2007 | Zimmerman et al. |
| 2007/0181674 A1 | 8/2007 | Taylor et al. |
| 2007/0185756 A1 | 8/2007 | Ahn |
| 2007/0201376 A1 | 8/2007 | Marshall-Wilson |
| 2007/0203880 A1 | 8/2007 | Kumar et al. |
| 2007/0260520 A1 | 11/2007 | Jha et al. |
| 2007/0263069 A1 | 11/2007 | Jendbro |
| 2007/0294271 A1 | 12/2007 | Bammi et al. |
| 2007/0298766 A1 | 12/2007 | Fan et al. |
| 2008/0010099 A1 | 1/2008 | Walker et al. |
| 2008/0010132 A1 | 1/2008 | Aaron et al. |
| 2008/0071634 A1* | 3/2008 | Rampell ................. G06Q 30/08 705/26.3 |
| 2008/0077487 A1 | 3/2008 | Davis et al. |
| 2008/0077506 A1* | 3/2008 | Rampell ................. G06Q 20/12 705/26.1 |
| 2008/0078831 A1 | 4/2008 | Johnson et al. |
| 2008/0082373 A1 | 4/2008 | Durocher et al. |
| 2008/0085707 A1 | 4/2008 | Fadell |
| 2008/0086356 A1 | 4/2008 | Glassman et al. |
| 2008/0086361 A1 | 4/2008 | Eliezerov et al. |
| 2008/0086365 A1* | 4/2008 | Zollino et al. ................. 705/10 |
| 2008/0086474 A1 | 4/2008 | Haycraft et al. |
| 2008/0091528 A1* | 4/2008 | Rampell ................. G06Q 30/0207 705/14.1 |
| 2008/0091539 A1 | 4/2008 | Ruckart |
| 2008/0091593 A1 | 4/2008 | Egnatios et al. |
| 2008/0103883 A1 | 5/2008 | Szybalski et al. |
| 2008/0103968 A1 | 5/2008 | Bies et al. |
| 2008/0108308 A1 | 5/2008 | Ullah |
| 2008/0109304 A1 | 5/2008 | Sarelson et al. |
| 2008/0109888 A1 | 5/2008 | Ullah |
| 2008/0120292 A1 | 5/2008 | Sundaresan et al. |
| 2008/0133327 A1 | 6/2008 | Ullah |
| 2008/0133336 A1 | 6/2008 | Altman et al. |
| 2008/0133351 A1 | 6/2008 | White et al. |
| 2008/0140484 A1 | 6/2008 | Akerman |
| 2008/0140505 A1 | 6/2008 | Romano et al. |
| 2008/0141281 A1 | 6/2008 | Ramsey et al. |
| 2008/0155453 A1 | 6/2008 | Othmer |
| 2008/0162258 A1 | 7/2008 | Kala et al. |
| 2008/0187118 A1 | 8/2008 | Short |
| 2008/0201143 A1* | 8/2008 | Olligschlaeger et al. ..... 704/235 |
| 2008/0201206 A1 | 8/2008 | Pokorney et al. |
| 2008/0208649 A1 | 8/2008 | Ficery et al. |
| 2008/0220760 A1 | 9/2008 | Ullah |
| 2008/0221972 A1 | 9/2008 | Megdal et al. |
| 2008/0221984 A1 | 9/2008 | Abhyanker |
| 2008/0222015 A1 | 9/2008 | Megdal et al. |
| 2008/0228566 A1 | 9/2008 | Williams et al. |
| 2008/0243587 A1 | 10/2008 | Chang et al. |
| 2008/0268868 A1 | 10/2008 | Maitland et al. |
| 2008/0270240 A1 | 10/2008 | Chu |
| 2008/0275774 A1 | 11/2008 | Pepe et al. |
| 2008/0277465 A1 | 11/2008 | Pletz et al. |
| 2008/0288405 A1 | 11/2008 | John |
| 2008/0294513 A1 | 11/2008 | Buse, Jr. |
| 2008/0300973 A1 | 12/2008 | DeWitt et al. |
| 2008/0304638 A1 | 12/2008 | Jackowitz et al. |
| 2008/0306985 A1 | 12/2008 | Murray et al. |
| 2008/0313256 A1 | 12/2008 | Kanazawa et al. |
| 2009/0006212 A1 | 1/2009 | Krajicek et al. |
| 2009/0006525 A1 | 1/2009 | Moore |
| 2009/0012844 A1 | 1/2009 | Ohlsen et al. |
| 2009/0015211 A1 | 1/2009 | Ribellino et al. |
| 2009/0027223 A1 | 1/2009 | Hill |
| 2009/0037268 A1 | 2/2009 | Zaid et al. |
| 2009/0037332 A1 | 2/2009 | Cheung et al. |
| 2009/0037735 A1 | 2/2009 | O''Farrell et al. |
| 2009/0048884 A1 | 2/2009 | Olives et al. |
| 2009/0074300 A1 | 3/2009 | Hull et al. |
| 2009/0076887 A1 | 3/2009 | Spivack et al. |
| 2009/0076896 A1 | 3/2009 | DeWitt et al. |
| 2009/0076925 A1 | 3/2009 | DeWitt et al. |
| 2009/0077163 A1 | 3/2009 | Ertugrul et al. |
| 2009/0089176 A1 | 4/2009 | McCabe |
| 2009/0091650 A1 | 4/2009 | Kodama et al. |
| 2009/0106202 A1* | 4/2009 | Mizrahi ................. 707/3 |
| 2009/0112639 A1 | 4/2009 | Robinson Beaver |
| 2009/0132347 A1 | 5/2009 | Anderson et al. |
| 2009/0132395 A1 | 5/2009 | Lam et al. |
| 2009/0138386 A1 | 5/2009 | Wilson, Jr. et al. |
| 2009/0144201 A1 | 6/2009 | Gierkink et al. |
| 2009/0150211 A1 | 6/2009 | Bayne |
| 2009/0156190 A1 | 6/2009 | Fisher |
| 2009/0164274 A1 | 6/2009 | Narayanaswamy et al. |
| 2009/0170483 A1 | 7/2009 | Barnett et al. |
| 2009/0171779 A1 | 7/2009 | Shrivathsan et al. |

(56) References Cited

U.S. PATENT DOCUMENTS

| | | |
|---|---|---|
| 2009/0182597 A1 | 7/2009 | Bull et al. |
| 2009/0192876 A1 | 7/2009 | De et al. |
| 2009/0193046 A1 | 7/2009 | Desai et al. |
| 2009/0234710 A1* | 9/2009 | Belgaied Hassine .. G06Q 30/02 705/7.29 |
| 2009/0234742 A1 | 9/2009 | Hart |
| 2009/0234826 A1 | 9/2009 | Bidlack |
| 2009/0254412 A1 | 10/2009 | Braswell et al. |
| 2009/0259518 A1 | 10/2009 | Harvey et al. |
| 2009/0265233 A1 | 10/2009 | Sendo et al. |
| 2009/0271275 A1 | 10/2009 | Regmi et al. |
| 2009/0282036 A1 | 11/2009 | Fedtke |
| 2009/0287562 A1 | 11/2009 | Bosch et al. |
| 2009/0292599 A1* | 11/2009 | Rampell ............. G06Q 30/02 705/14.13 |
| 2009/0292608 A1 | 11/2009 | Polachek et al. |
| 2009/0293018 A1 | 11/2009 | Wilson et al. |
| 2009/0299857 A1 | 12/2009 | Brubaker |
| 2009/0313106 A1 | 12/2009 | Taylor et al. |
| 2009/0327111 A1 | 12/2009 | Bulawa et al. |
| 2010/0003967 A1 | 1/2010 | Datta et al. |
| 2010/0005048 A1 | 1/2010 | Bodapati et al. |
| 2010/0010836 A1 | 1/2010 | Rosen et al. |
| 2010/0010887 A1 | 1/2010 | Karlin et al. |
| 2010/0017325 A1 | 1/2010 | Scherpa et al. |
| 2010/0042471 A1 | 2/2010 | Chang et al. |
| 2010/0063891 A1 | 3/2010 | Townsend et al. |
| 2010/0064001 A1 | 3/2010 | Daily et al. |
| 2010/0070334 A1 | 3/2010 | Monteverde |
| 2010/0070448 A1 | 3/2010 | Omoigui et al. |
| 2010/0076835 A1 | 3/2010 | Silverman |
| 2010/0100470 A1 | 4/2010 | Buchanan et al. |
| 2010/0100478 A1 | 4/2010 | Hansen et al. |
| 2010/0106568 A1 | 4/2010 | Grimes et al. |
| 2010/0106577 A1 | 4/2010 | Grimes |
| 2010/0106580 A1 | 4/2010 | Etheredge et al. |
| 2010/0106598 A1 | 4/2010 | Grimes |
| 2010/0112990 A1 | 5/2010 | Dingler et al. |
| 2010/0114654 A1* | 5/2010 | Lukose ............. G06Q 30/0256 705/14.54 |
| 2010/0114713 A1 | 5/2010 | Anderson et al. |
| 2010/0138344 A1 | 6/2010 | Wong et al. |
| 2010/0146263 A1* | 6/2010 | Das ................. G06Q 20/385 713/155 |
| 2010/0153242 A1 | 6/2010 | Preston et al. |
| 2010/0161379 A1 | 6/2010 | Bene et al. |
| 2010/0161446 A1 | 6/2010 | Alfred et al. |
| 2010/0169234 A1 | 7/2010 | Metzger et al. |
| 2010/0183132 A1 | 7/2010 | Satyavolu et al. |
| 2010/0185452 A1 | 7/2010 | Satyavolu et al. |
| 2010/0185453 A1 | 7/2010 | Satyavolu et al. |
| 2010/0185454 A1 | 7/2010 | Satyavolu et al. |
| 2010/0185489 A1 | 7/2010 | Satyavolu et al. |
| 2010/0185490 A1 | 7/2010 | Satyavolu et al. |
| 2010/0185491 A1 | 7/2010 | Satyavolu et al. |
| 2010/0185492 A1 | 7/2010 | Satyavolu et al. |
| 2010/0185534 A1 | 7/2010 | Satyavolu et al. |
| 2010/0223641 A1 | 9/2010 | Hubbard |
| 2010/0250534 A1* | 9/2010 | Lee et al. ............. 707/736 |
| 2010/0257612 A1 | 10/2010 | McGuire et al. |
| 2010/0262487 A1 | 10/2010 | Edwards et al. |
| 2010/0274627 A1 | 10/2010 | Carlson |
| 2010/0287115 A1 | 11/2010 | Lo et al. |
| 2010/0331016 A1 | 12/2010 | Dutton et al. |
| 2011/0022540 A1 | 1/2011 | Stern et al. |
| 2011/0035288 A1 | 2/2011 | Clyne |
| 2011/0047016 A1 | 2/2011 | Cook |
| 2011/0054981 A1 | 3/2011 | Faith et al. |
| 2011/0087546 A1 | 4/2011 | Fordyce, III et al. |
| 2011/0087550 A1 | 4/2011 | Fordyce et al. |
| 2011/0093886 A1 | 4/2011 | Reddy et al. |
| 2011/0106698 A1 | 5/2011 | Isaacson et al. |
| 2011/0106840 A1 | 5/2011 | Barrett et al. |
| 2011/0119185 A1 | 5/2011 | Drummond et al. |
| 2011/0125565 A1 | 5/2011 | MacIlwaine et al. |
| 2011/0137928 A1* | 6/2011 | Engle ............. G06Q 40/123 707/769 |
| 2011/0153402 A1 | 6/2011 | Craig |
| 2011/0208588 A1 | 8/2011 | Joa et al. |
| 2011/0216292 A1 | 9/2011 | Lafarre et al. |
| 2011/0225033 A1 | 9/2011 | Schmeyer et al. |
| 2011/0238476 A1 | 9/2011 | Carr et al. |
| 2011/0238499 A1 | 9/2011 | Blackhurst et al. |
| 2011/0246268 A1 | 10/2011 | Satyavolu et al. |
| 2011/0246280 A1 | 10/2011 | Satyavolu et al. |
| 2011/0246281 A1 | 10/2011 | Satyavolu et al. |
| 2011/0246284 A1 | 10/2011 | Chaikin et al. |
| 2011/0246292 A1 | 10/2011 | Satyavolu et al. |
| 2011/0246299 A1 | 10/2011 | Satyavolu et al. |
| 2011/0246346 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0257985 A1 | 10/2011 | Goldstein |
| 2011/0258028 A1 | 10/2011 | Satyavolu et al. |
| 2011/0258049 A1 | 10/2011 | Ramer et al. |
| 2011/0270618 A1 | 11/2011 | Banerjee et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010936 A1 | 1/2012 | Satyavolu et al. |
| 2012/0053987 A1 | 3/2012 | Satyavolu et al. |
| 2012/0066046 A1 | 3/2012 | Satyavolu et al. |
| 2012/0066050 A1 | 3/2012 | Satyavolu et al. |
| 2012/0078682 A1* | 3/2012 | Pinsley ............. G06Q 30/0201 705/7.29 |
| 2012/0101896 A1 | 4/2012 | Veeneman et al. |
| 2012/0102036 A1 | 4/2012 | Parker, III et al. |
| 2012/0123924 A1 | 5/2012 | Rose et al. |
| 2012/0189186 A1 | 7/2012 | Csulits et al. |
| 2012/0265587 A1 | 10/2012 | Kinkead et al. |
| 2012/0303430 A1 | 11/2012 | Tiku et al. |
| 2013/0073389 A1 | 3/2013 | Heath |
| 2013/0132410 A1 | 5/2013 | Rineer |
| 2013/0254008 A1 | 9/2013 | Ovick et al. |
| 2013/0275190 A1* | 10/2013 | Rossi ................. G06Q 30/02 705/14.4 |
| 2013/0290096 A1 | 10/2013 | Lizotte, III |
| 2013/0325587 A1 | 12/2013 | Kothari et al. |
| 2013/0325608 A1 | 12/2013 | Kulkarni et al. |
| 2013/0325667 A1 | 12/2013 | Satyavolu et al. |
| 2013/0325680 A1 | 12/2013 | Satyavolu et al. |
| 2013/0325681 A1 | 12/2013 | Somashekar et al. |
| 2013/0346170 A1 | 12/2013 | Epstein et al. |
| 2014/0025461 A1 | 1/2014 | Knowles et al. |
| 2014/0025492 A1 | 1/2014 | Donlan et al. |
| 2014/0051501 A1* | 2/2014 | Boyles ............. G06Q 30/02 463/25 |
| 2014/0095364 A1 | 4/2014 | Satyavolu et al. |
| 2014/0129357 A1* | 5/2014 | Goodwin ............. G06Q 30/02 705/16 |
| 2014/0136410 A1 | 5/2014 | Akin et al. |
| 2014/0143109 A1 | 5/2014 | Satyavolu et al. |
| 2014/0172560 A1 | 6/2014 | Satyavolu et al. |
| 2014/0180783 A1 | 6/2014 | Satyavolu et al. |
| 2014/0195398 A1 | 7/2014 | Rose et al. |
| 2014/0297392 A1 | 10/2014 | Moffitt |
| 2015/0170175 A1 | 6/2015 | Zhang et al. |
| 2015/0220951 A1 | 8/2015 | Kurapati et al. |
| 2015/0220961 A1 | 8/2015 | Jenkins et al. |
| 2015/0220999 A1 | 8/2015 | Thornton et al. |
| 2015/0348083 A1 | 12/2015 | Brill et al. |
| 2016/0086222 A1 | 3/2016 | Kurapati |
| 2016/0189213 A1 | 6/2016 | Gopalan et al. |
| 2017/0098234 A1 | 4/2017 | Carlson et al. |

(56) References Cited

U.S. PATENT DOCUMENTS

FOREIGN PATENT DOCUMENTS

| KR | 1020030080797 A | 10/2003 |
|---|---|---|
| KR | 20090003416 A | 1/2009 |
| KR | 1020090003416 A | 1/2009 |
| KR | 20100052896 A | 5/2010 |
| KR | 1020120047461 A | 5/2012 |
| WO | 200241556 A2 | 5/2002 |
| WO | 2008035044 A2 | 3/2008 |
| WO | WO 2009/001394 A1 | 12/2008 |
| WO | 2010085445 A1 | 7/2010 |
| WO | 2011058581 A2 | 5/2011 |
| WO | 2012044692 A2 | 4/2012 |
| WO | 2012044692 A3 | 6/2012 |
| WO | 2012044692 A8 | 11/2012 |
| WO | 2013181258 A1 | 12/2013 |
| WO | 2016025291 A1 | 2/2016 |

OTHER PUBLICATIONS

"Everything about Loyalty Marketing and Technology", Jan. 2011 (Loyalty)., 10 Pages.
"Mobile Miles Reward Program", http://web.archive.org/web/20071017062928/http://www.onesimcard.com/?idmenu=22, One Sim Card, Jan. 2007, 1 page.
U.S. Appl. No. 12/533,447, U.S. Appl. No. 12/533,447, Non-Final Office Action dated Oct. 27, 2010, 7 pages.
U.S. Appl. No. 12/533,517, U.S. Appl. No. 12/533,517, Non-Final Office Action dated Mar. 17, 2010, 3 pages.
U.S. Appl. No. 12/533,517, U.S. Appl. No. 12/533,517, Final Office Action dated Oct. 13, 2010, 9 pages.
AT&T Community Forums, "Do MMS pictures messages incur Data charges?", http://forums.att.com/t5/Data-Messaging-Features-Internet/Do-MMS-pictures-messages-incurr-DATA-charges/td-p/1856555, 2009, 7 pages.
Balasubramanian, Dushyanth , "QoS in Cellular Networks", http://www.cse.wustl.edu/-jain/cse574-06/ftp/cellular_qos.pdf, Washington University in Saint Louis, May 2006, 24 pages.
Bundlemyservices, "Bundle Your Internet, Phone & TV to Save", http://web.archive.org/web/20080711052327/http://www.bundlemyservices.com, Jul. 2008, 2 pages.
Chakrabarty, Gargi , "Rochester, N.Y. Based Firm Lures Big Indiana Customers from Telecom Giants", The Indianapolis Star (Indianapolis, IN), www.highbeam.com/doc/1G1-120488613.html, Apr. 19, 2002, 1 page.
Chakrabarty, Gargi , "Rochester, N.Y.-Based Firm Lures Big Indiana Customers from Telecom Giants", Knight Ridder Tribune Business News [Washington], Apr. 19, 2002, 3 pages.
city-data.com, "Best savings account rate?", http://www.city-data.com/forum/personal-finance/533408-best-savings-account-rate.html (accessed online Apr. 12, 2012), Jan. 9, 2009, 6 pages.
Cotter, James F. et al., "The Limits of Reverse Auction Pricing Strategy and priceline.com", Journal of Business and Entrepreneurship, suppl. Special Issue 13: 23-0_11, Oct. 2001, 5 pages.
Dialog Web, "CheckFree and Netonomy Sign Strategic Reseller Agreement", PR Newswire(US), Dec. 15, 2004, 3 pages.
Lieber, Ron , "Your Money, Where's It All Going? Find Out Online", http://www.nytimes.com/2008/10/04/business/yourmoney/04money.html?_r=1&pagewanted=all, Sep. 10, 2012 12:39:08 AM, Oct. 3, 2008,, 4 pages.
mint. com, "Free Money Management, Manage Your Finances, Expense Management, Budget and Money Software—Mint.com", http://web.archive.org/web/20080315110811/http://www.mint.com/features.html, Mar. 15, 2008, 2 pages.
mint.com, "Mint Refreshing Money Management", Mint Software, Inc., http://web.archive.org/web/20071 029162033/http://www.mint.com/features.html., 2007, 2 pages.
mint.com, "MintLife Blog Track Spending Online and Compare", Mint.com, http://www.mint.com/blog/updates/trackspending-online-compare-your-spending, Sep. 10, 2012 12:41 :18 AM], Jan. 16, 2008, 2 pages.
mint.com, "Mint™ refreshing money management", Personal Finance-Free Personal Budget Software & Financial Planning Software, Mint.com , http://web.archive.org/web/20080701 042934/http://www.mint.com/features.html, 12:35:17 AM, Sep. 10, 2012, 3 pages.
mint.com, "Personal Finance Software from Mint-Personal Finance Management and Financial Calculator Online—Mint.com,", http://web.archive.org/web/20080604065549/http://www.mint.com/personal-finance.html, Jun. 4, 2008, 2 pages.
money-rates.com, "Highest Rates and Yields on bank savings accounts updated daily", http://web.archive.org/web/20071226132433/http:www.money-rats.com/savings.html (accessed online Apr. 12, 2012), Dec. 19, 2007, 3 pages.
PCT/US2007/018960, International Application Serial No. PCT/US2007/018960, Search Report and Written Opinion dated May 3, 2010, Micron Technology, Inc., 11 pages.
PCT/US2010/021371, International Application Serial No. PCT/US2010/021371, International Search Report and Written Opinion dated May 3, 2010, 7 pages.
PCT/US2011/053696, International Application Serial No. PCT/US2011/053696, International Preliminary Report on Patentability dated Apr. 11, 2013, Truaxis, Inc. et al, 7 pages.
PCT/US2011/053696, International Application Serial No. PCT/US2011/053696, International Search Report and Written Opinion dated May 4, 2012, Billshrink, Inc. et al, 10 pages.
PCT/US2013/043125, International Application Serial No. PCT/US2013/043125, International Search Report and Writtan Opinion dated Oct. 28, 2013, Truaxis, Inc, 15 pages.
Strupp, Joe , "Gifts that keep on giving . . . ad dollars", Editor & Publisher, vol. 141, issue 8, http://search.proquest.com/printviewfile?accountid=14753 (accessed online Oct. 17, 2012), Aug. 2008, pp. 9-10 (4 pages online).
Strupp, Joe , "Gifts that keep on giving . . . ad dollars", Editor & Publisher 141. 8, Aug. 2008, 2 pages.
Vestal, Shawn , "It's never too late to trim dollars off your energy bill", Powering Down, Spokesman Review [Spokane, Wash], Jan. 12, 2009, 3 pages.
White Fence, "Purchase Your Bundles and Save", http://web.archive.org/web/20080505084851/www.whitefence.com/bundled-services.html, May 2008, 1 page
"Are you spending too much for wireless?", http://www.myvalidas.com, Oct. 2008, 1 Page.
"Cellular Resources—Night and Weekend Minutes", http://web.archive.org/web/20060319163017/http://www.myrateplan.com/wireless/knowledge/nightsandweekends.php, MyRatePian.com, Mar. 19, 2006, 2 Pages.
"Free Money Management, Manage Your Finances, Expense Management, Budget and Money Software", Mint.com, http://web.archive.org/web/20080315110811/http://www.mint.com/features.html, Mar. 15, 2008, 2 Pages.
"G. VDSL: A universal frequency plan for VDSL: The quest for the holy grail?", Internatonal Telecommunication Union, Geneva, CH, Aug. 6, 1999, 18 Pages.
"Macy's Launches Rewards Program-Star Rewards", Jan. 20, 2005, 1 Page.
"Personal Finance Software from Mint-Personal Finance Management and Financial Calculator Online", Mint.com, http://web.archive.org/web/20080604065549/http://www.mint.com/personal-finance.html, Jun. 4, 2008, 1 Page.
Press Release, "Macy's Launches Star Rewards Loyalty Program", Jan. 20, 2005, pp. 1-2, 2 Pages.
"www.flagstar.com, FinanceWorks (Progress Statement)", https://www.flagstar.com/...1/bank:ing/online-banking-login/online-banking/jcr_content/tabs/tabitem_1/image.img.jpg/13 79434197099 .jpg, 1 Page.
10733783.4, "European Application Serial No. 10733783.4, European Extended Search Report dated Oct. 15, 2014", Billshrink Inc., 11 Pages.
2011308914, "Australian Application Serial No. 2011308914, First Examiner Report dated Jul. 31, 2014", Truaxis, Inc., 5 Pages.
2011308914, "Australian Application Serial No. 2011308914, Second Examiner Report dated Mar. 27, 2015", Truaxis, Inc., 6 Pages.

(56) References Cited

OTHER PUBLICATIONS

Lai, Eric, "BillShrink exec responds to problems with its money-saving service", Computer World blogs http://blogs.computerworld.com/billshrink_exec_responds_to_problems_with_itsmaney_saving_service, Nov. 27, 2008, 5 Pages.
"Approximate string matching", URL:https:jjen.wikipedia.org/w/index.php?title=Approximate string matching&oldid=491554584, May 9, 2012, 4 Pages.
"Free Personal Finance Software, Money Management, Budget Planner and Tools, Online Financial Planning", http://web.archive.org/web/20080425073230/http://www.mint.com/features.html, Mint.com, Apr. 25, 2008.
"Lucene", URL:https:jjen.wikipedia.orgjwjindex.php?title=Time complexity&oldid=492506715, May 6, 2012, 6 Pages.
"Radix tree", URL:https:;;en.wikipedia.org/w/index.php?title=Radix tree&oldid=493867529, May 22, 2012, 6 Pages.
"Time complexity", XP055230138, Retrieved from the Internet: URL:https:jjen.wikipedia.orgjwindex.php?title=Time complexity&oldid=492506715 [retrieved on Nov. 20, 2015] * the whole document *, May 14, 2012, 12 pages.
11829829.8, "European Application Serial No. 11829829.8, European Search Report dated Apr. 4, 2016", Truaxis, Inc., 8 Pages.
13797304.6, "European Application Serial No. 13797304.6, European Search Report dated Dec. 17, 2015", Truaxis, Inc., 9 Pages.
Daniel, Domenech, "Geographical Information Resolution and its Application to the Question Answering Systems", Universitat Polifecnica de Catalunya, 147 Pages.
PCT/US2015/044000, "International Application Serial No. PCT/US2015/044000, International Search Report and Written Opinion dated Nov. 19, 2015", Truaxis, Inc., 11 Pages.
Final Rejection corresponding to U.S. Appl. No. 13/180,533, dated May 17, 2017.
Office Action corresponding to Canadian Patent Application No. 2812945, dated Mar. 30, 2017, 6 pgs.
Office Action corresponding to Canadian Patent Application No. 2956453, dated Nov. 9, 2017, 8 pgs.
Office Action corresponding to U.S. Appl. No. 14/789,700, dated Nov. 29, 2017, 18 pgs.
Office Action corresponding to U.S. Appl. No. 14/637,150, dated Oct. 6, 2017, 16 pgs.
Advisory Action corresponding to U.S. Appl. No. 12/501,572, dated Aug. 13, 2015, 3 pgs.
Advisory Action corresponding to U.S. Appl. No. 12/501,572, dated Nov. 4, 2016, 3 pgs.
Advisory Action corresponding to U.S. Appl. No. 12/501,572, dated Sep. 12, 2012, 3 pgs.
Advisory Action corresponding to U.S. Appl. No. 12/533,120, dated Apr. 12, 2013, 3 pgs.
Advisory Action corresponding to U.S. Appl. No. 12/533,162, dated Apr. 24, 2013, 3 pgs.
Advisory Action corresponding to U.S. Appl. No. 12/533,162, dated Mar. 22, 2012, 3 pgs.
Advisory Action corresponding to U.S. Appl. No. 12/533,303, dated Jul. 16, 2015, 3 pgs.
Advisory Action corresponding to U.S. Appl. No. 12/533,303, dated Mar. 13, 2014, pgs.
Advisory Action corresponding to U.S. Appl. No. 12/533,303, dated Oct. 1, 2012, 3 pgs.
Advisory Action corresponding to U.S. Appl. No. 12/533,386, dated Apr. 24, 2013, 3 pgs.
Advisory Action corresponding to U.S. Appl. No. 12/533,386, dated Aug. 10, 2011, 3 pgs.
Advisory Action corresponding to U.S. Appl. No. 12/533,447, dated Aug. 23, 2011, 2 pgs.
Advisory Action corresponding to U.S. Appl. No. 12/533,447, dated Aug. 28, 2013, 3 pgs.
Advisory Action corresponding to U.S. Appl. No. 12/533,447, dated Aug. 4, 2015, 3 pgs.
Advisory Action corresponding to U.S. Appl. No. 12/533,517, dated Mar. 10, 2011, 3 pgs.
Advisory Action corresponding to U.S. Appl. No. 12/533,517, dated Mar. 12, 2014, 3 pgs.
Advisory Action corresponding to U.S. Appl. No. 12/533,517, dated Oct. 3, 2012, 3 pgs.
Advisory Action corresponding to U.S. Appl. No. 12/533,618, dated Sep. 11, 2012, 5 pgs.
Advisory Action corresponding to U.S. Appl. No. 12/533,678, dated Apr. 18, 2013, 3 pgs.
Advisory Action corresponding to U.S. Appl. No. 12/533,678, dated Aug. 23, 2011, 3 pgs.
Advisory Action corresponding to U.S. Appl. No. 12/533,678, dated Mar. 30, 2015, 3 pgs.
Advisory Action corresponding to U.S. Appl. No. 13/082,606, dated Jun. 14, 2013, 3 pgs.
Advisory Action corresponding to U.S. Appl. No. 13/082,622, dated May 28, 2013, 3 pgs.
Advisory Action corresponding to U.S. Appl. No. 13/082,644, dated May 9, 2013, 3 pgs.
Advisory Action corresponding to U.S. Appl. No. 13/082,655, dated Jul. 31, 2013, 4 pgs.
Advisory Action corresponding to U.S. Appl. No. 13/082,751, dated Dec. 18, 2012, 2 pgs.
Advisory Action corresponding to U.S. Appl. No. 13/082,762, dated Aug. 30, 2012, 3 pgs.
Advisory Action corresponding to U.S. Appl. No. 13/082,784, dated Mar. 19, 2013, 19 pgs.
Advisory Action corresponding to U.S. Appl. No. 13/180,511, dated Sep. 11, 2013, 3 pgs.
Advisory Action corresponding to U.S. Appl. No. 13/180,513, dated Feb. 21, 2014, 3 pgs.
Advisory Action corresponding to U.S. Appl. No. 13/180,521, dated Feb. 6, 2014, 2 pgs.
Advisory Action corresponding to U.S. Appl. No. 13/180,524, dated Jul. 22, 2014, 3 pgs.
Advisory Action corresponding to U.S. Appl. No. 13/180,524, dated Nov. 19, 2013, 3 pgs.
Advisory Action corresponding to U.S. Appl. No. 13/180,526, dated Jul. 15, 2013, 3 pgs.
Advisory Action corresponding to U.S. Appl. No. 13/180,528, dated Jun. 23, 2015, 3 pgs.
Advisory Action corresponding to U.S. Appl. No. 13/180,528, dated Nov. 22, 2013, 3 pgs.
Advisory Action corresponding to U.S. Appl. No. 13/180,530, dated Jun. 19, 2013, 3 pgs.
Advisory Action corresponding to U.S. Appl. No. 13/180,531, dated Apr. 10, 2013, 3 pgs.
Advisory Action corresponding to U.S. Appl. No. 13/180,531, dated May 3, 2013, 5 pgs.
Advisory Action corresponding to U.S. Appl. No. 13/180,533, dated Aug. 14, 2013, 6 pgs.
Advisory Action corresponding to U.S. Appl. No. 13/180,535, dated Jun. 19, 2013, 6 pgs.
Advisory Action corresponding to U.S. Appl. No. 13/247,657, dated Mar. 11, 2014, 3 pgs.
Advisory Action corresponding to U.S. Appl. No. 13/247,657, dated Mar. 28, 2016, 3 pgs.
Advisory Action corresponding to U.S. Appl. No. 13/300,090, dated Sep. 26, 2012, 3 pgs.
Advisory Action corresponding to U.S. Appl. No. 13/300,121, dated Sep. 21, 2012, 3 pgs.
Advisory Action corresponding to U.S. Appl. No. 13/904,593, dated Aug. 11, 2016, 4 pgs.
Advisory Action corresponding to U.S. Appl. No. 14/058,654, dated Nov. 16, 2016, 3 pgs.
Advisory Action corresponding to U.S. Appl. No. 14/080,135, dated Jul. 17, 2015, 2 pgs.
Advisory Action corresponding to U.S. Appl. No. 14/080,135, dated Oct. 27, 2016, 3 pgs.
Advisory Action corresponding to U.S. Appl. No. 14/166,525, dated Jul. 17, 2015, 2 pgs.
Examiner's Answer to Appeal Brief corresponding to U.S. Appl. No. 12/533,447, dated Jun. 23, 2016, 11 pgs.

(56) References Cited

OTHER PUBLICATIONS

Examiner's Answer to Appeal Brief corresponding to U.S. Appl. No. 12/533,618, dated Dec. 13, 2012, 23 pgs.
Examiner's Answer to Appeal Brief corresponding to U.S. Appl. No. 13/082,751, dated Jun. 6, 2013, 5 pgs.
Examiner's Answer to Appeal Brief corresponding to U.S. Appl. No. 13/082,762, dated Dec. 20, 2012, 11 pgs.
Examiner's Answer to Appeal Brief corresponding to U.S. Appl. No. 13/180,511, dated Feb. 7, 2014, 21 pgs.
Examiner's Answer to Appeal Brief corresponding to U.S. Appl. No. 13/180,531, dated Dec. 20, 2013, 10 pgs.
Examiner's Answer to Appeal Brief corresponding to U.S. Appl. No. 13/180,533, dated Feb. 24, 2014, 30 pgs.
Examiner's Answer to Appeal Brief corresponding to U.S. Appl. No. 13/247,657, dated Dec. 15, 2016, 44 pgs.
Examiner's Answer to Appeal Brief corresponding to U.S. Appl. No. 14/058,654, dated Jun. 6, 2017, 9 pgs.
Examiner's Answer to Appeal Brief corresponding to U.S. Appl. No. 14/166,525, dated Apr. 21, 2017, 9 pgs.
International Search Report with Written Opinion corresponding to International Patent Application No. PCT/US2015/049999, dated Dec. 14, 2015, 14 pgs.
Notice of Allowance corresponding to U.S. Appl. No. 13/082,591, dated Feb. 20, 2013, 11 pgs.
Notice of Allowance corresponding to U.S. Appl. No. 13/180,526, dated Aug. 26, 2013, 10 pgs.
Notice of Allowance corresponding to U.S. Appl. No. 13/300,090, dated Oct. 4, 2013, 13 pgs.
Office Action corresponding to Australian Patent Application No. 2011308914, dated Apr. 22, 2016, 7 pgs.
Office Action corresponding to Australian Patent Application No. 2011308914, dated Jul. 16, 2015, 6 pgs.
Office Action corresponding to Australian Patent Application No. 2016202766, dated Jun. 8, 207, 4 pgs.
Office Action corresponding to U.S. Appl. No. 12/501,572, dated Aug. 29, 2016, 11 pgs.
Office Action corresponding to U.S. Appl. No. 12/501,572, dated Dec. 11, 2014, 10 pgs.
Office Action corresponding to U.S. Appl. No. 12/501,572, dated Feb. 25, 2016, 11 pgs.
Office Action corresponding to U.S. Appl. No. 12/501,572, dated Jul. 5, 2012, 28 pgs.
Office Action corresponding to U.S. Appl. No. 12/501,572, dated May 29, 2015, 10 pgs.
Office Action corresponding to U.S. Appl. No. 12/501,572, dated May 8, 2014, 25 pgs.
Office Action corresponding to U.S. Appl. No. 12/501,572, dated Oct. 3, 2011, 26 pgs.
Office Action corresponding to U.S. Appl. No. 12/533,120, dated Aug. 1, 2014, 35 pgs.
Office Action corresponding to U.S. Appl. No. 12/533,120, dated Jan. 4, 2013, 31 pgs.
Office Action corresponding to U.S. Appl. No. 12/533,120, dated Mar. 9, 2012, 10 pgs.
Office Action corresponding to U.S. Appl. No. 12/533,162, dated Apr. 25, 2014, 24 pgs.
Office Action corresponding to U.S. Appl. No. 12/533,162, dated Jan. 7, 2013, 22 pgs.
Office Action corresponding to U.S. Appl. No. 12/533,162, dated Jul. 13, 2015, 8 pgs.
Office Action corresponding to U.S. Appl. No. 12/533,162, dated Jun. 5, 2012, 21 pgs.
Office Action corresponding to U.S. Appl. No. 12/533,162, dated Mar. 22, 2011, 8 pgs.
Office Action corresponding to U.S. Appl. No. 12/533,162, dated Nov. 28, 2014, 10 pgs.
Office Action corresponding to U.S. Appl. No. 12/533,162, dated Oct. 5, 2011, 17 pgs.
Office Action corresponding to U.S. Appl. No. 12/533,303, dated Jan. 15, 2014, 31 pgs.
Office Action corresponding to U.S. Appl. No. 12/533,303, dated Jun. 22, 2012, 26 pgs.
Office Action corresponding to U.S. Appl. No. 12/533,303, dated Jun. 27, 2013, 38 pgs.
Office Action corresponding to U.S. Appl. No. 12/533,303, dated May 7, 2015, 17 pgs.
Office Action corresponding to U.S. Appl. No. 12/533,303, dated Nov. 18, 2014, 26 pgs.
Office Action corresponding to U.S. Appl. No. 12/533,303, dated Oct. 14, 2011, 9 pgs.
Office Action corresponding to U.S. Appl. No. 12/533,386, dated Aug. 14, 2014, 25 pgs.
Office Action corresponding to U.S. Appl. No. 12/533,386, dated Dec. 22, 2010, 7 pgs.
Office Action corresponding to U.S. Appl. No. 12/533,386, dated Jan. 17, 2013, 23 pgs.
Office Action corresponding to U.S. Appl. No. 12/533,386, dated May 25, 2012, 22 pgs.
Office Action corresponding to U.S. Appl. No. 12/533,386, dated May 27, 2011, 17 pgs.
Office Action corresponding to U.S. Appl. No. 12/533,447, dated Apr. 13, 2015, 10 pgs.
Office Action corresponding to U.S. Appl. No. 12/533,447, dated Apr. 24, 2014, 15 pgs.
Office Action corresponding to U.S. Appl. No. 12/533,447, dated Mar. 20, 2012, 13 pgs.
Office Action corresponding to U.S. Appl. No. 12/533,447, dated Mar. 29, 2013, 15 pgs.
Office Action corresponding to U.S. Appl. No. 12/533,447, dated May 6, 2011, 10 pgs.
Office Action corresponding to U.S. Appl. No. 12/533,447, dated Nov. 28, 2014, 8 pgs.
Office Action corresponding to U.S. Appl. No. 12/533,517, dated Jan. 27, 2014, 36 pgs.
Office Action corresponding to U.S. Appl. No. 12/533,517, dated Jul. 30, 2014, 41 pgs.
Office Action corresponding to U.S. Appl. No. 12/533,517, dated Jun. 20, 2013, 29 pgs.
Office Action corresponding to U.S. Appl. No. 12/533,517, dated Jun. 22, 2012, 32 pgs.
Office Action corresponding to U.S. Appl. No. 12/533,517, dated Sep. 22, 2011, 11 pgs.
Office Action corresponding to U.S. Appl. No. 12/533,618, dated Apr. 26, 2012, 31 pgs.
Office Action corresponding to U.S. Appl. No. 12/533,618, dated Nov. 3, 2011, 15 pgs.
Office Action corresponding to U.S. Appl. No. 12/533,678, dated Dec. 20, 2010, 9 pgs.
Office Action corresponding to U.S. Appl. No. 12/533,678, dated Feb. 4, 2013, 28 pgs.
Office Action corresponding to U.S. Appl. No. 12/533,678, dated Jun. 11, 2012, 26 pgs.
Office Action corresponding to U.S. Appl. No. 12/533,678, dated Jun. 25, 2015, 10 pgs.
Office Action corresponding to U.S. Appl. No. 12/533,678, dated Mar. 1, 2016, 10 pgs.
Office Action corresponding to U.S. Appl. No. 12/533,678, dated Mar. 28, 2014, 33 pgs.
Office Action corresponding to U.S. Appl. No. 12/533,678, dated May 26, 2011, 18 pgs.
Office Action corresponding to U.S. Appl. No. 12/533,678, dated Nov. 18, 2014, 9 pgs.
Office Action corresponding to U.S. Appl. No. 13/082,591, dated Jan. 2, 2013, 10 pgs.
Office Action corresponding to U.S. Appl. No. 13/082,591, dated Mar. 1, 2012, 6 pgs.
Office Action corresponding to U.S. Appl. No. 13/082,591, dated Oct. 23, 2012, 18 pgs.
Office Action corresponding to U.S. Appl. No. 13/082,606, dated Dec. 18, 2015, 30 pgs.
Office Action corresponding to U.S. Appl. No. 13/082,606, dated Mar. 1, 2013, 17 pgs.

(56) References Cited

OTHER PUBLICATIONS

Office Action corresponding to U.S. Appl. No. 13/082,606, dated May 16, 2014, 22 pgs.
Office Action corresponding to U.S. Appl. No. 13/082,606, dated May 7, 2015, 27 pgs.
Office Action corresponding to U.S. Appl. No. 13/082,606, dated Oct. 23, 2014, 17 pgs.
Office Action corresponding to U.S. Appl. No. 13/082,606, dated Sep. 17, 2012, 14 pgs.
Office Action corresponding to U.S. Appl. No. 13/082,622, dated Feb. 15, 2013, 14 pgs.
Office Action corresponding to U.S. Appl. No. 13/082,622, dated May 30, 3014, 19 pgs.
Office Action corresponding to U.S. Appl. No. 13/082,622, dated May 8, 2015, 29 pgs.
Office Action corresponding to U.S. Appl. No. 13/082,622, dated Oct. 23, 2014, 17 pgs.
Office Action corresponding to U.S. Appl. No. 13/082,622, dated Sep. 19, 2012, 10 pgs.
Office Action corresponding to U.S. Appl. No. 13/082,634, dated Jun. 25, 2015, 29 pgs.
Office Action corresponding to U.S. Appl. No. 13/082,634, dated Mar. 1, 2013, 11 pgs.
Office Action corresponding to U.S. Appl. No. 13/082,634, dated Mar. 1, 2016, 35 pgs.
Office Action corresponding to U.S. Appl. No. 13/082,634, dated May 15, 2014, 14 pgs.
Office Action corresponding to U.S. Appl. No. 13/082,634, dated Oct. 23, 2014, 18 pgs.
Office Action corresponding to U.S. Appl. No. 13/082,634, dated Sep. 26, 2012, 13 pgs.
Office Action corresponding to U.S. Appl. No. 13/082,644, dated Feb. 27, 2014, 17 pgs.
Office Action corresponding to U.S. Appl. No. 13/082,644, dated Jan. 17, 2013, 17 pgs.
Office Action corresponding to U.S. Appl. No. 13/082,644, dated Jun. 11, 2015, 19 pgs.
Office Action corresponding to U.S. Appl. No. 13/082,644, dated Jun. 19, 2012, 14 pgs.
Office Action corresponding to U.S. Appl. No. 13/082,644, dated Sep. 12, 2014, 17 pgs.
Office Action corresponding to U.S. Appl. No. 13/082,655, dated Dec. 21, 2012, 26 pgs.
Office Action corresponding to U.S. Appl. No. 13/082,655, dated Jun. 3, 3013, 35 pgs.
Office Action corresponding to U.S. Appl. No. 13/082,655, dated Jun. 4, 2012, 18 pgs.
Office Action corresponding to U.S. Appl. No. 13/082,751, dated Jul. 9, 2012, 9 pgs.
Office Action corresponding to U.S. Appl. No. 13/082,751, dated Nov. 2, 2012, 9 pgs.
Office Action corresponding to U.S. Appl. No. 13/082,762, dated Aug. 26, 2011, 6 pgs.
Office Action corresponding to U.S. Appl. No. 13/082,762, dated Mar. 22, 2012, 9 pgs.
Office Action corresponding to U.S. Appl. No. 13/082,784, dated Dec. 12, 2012, 46 pgs.
Office Action corresponding to U.S. Appl. No. 13/082,784, dated Jan. 7, 2016, 23 pgs.
Office Action corresponding to U.S. Appl. No. 13/082,784, dated Jun. 1, 2012, 22 pgs.
Office Action corresponding to U.S. Appl. No. 13/082,784, dated Sep. 12, 2014, 48 pgs.
Office Action corresponding to U.S. Appl. No. 13/082,801, dated Feb. 9, 2015, 18 pgs.
Office Action corresponding to U.S. Appl. No. 13/082,801, dated Jul. 8, 2015, 19 pgs.
Office Action corresponding to U.S. Appl. No. 13/180,511, dated Aug. 10, 2016, 12 pgs.
Office Action corresponding to U.S. Appl. No. 13/180,511, dated Jan. 31, 2017, 16 pgs.
Office Action corresponding to U.S. Appl. No. 13/180,511, dated May 29, 2013, 16 pgs.
Office Action corresponding to U.S. Appl. No. 13/180,511, dated Nov. 29, 2012, 14 pgs.
Office Action corresponding to U.S. Appl. No. 13/180,513, dated Dec. 2, 2013, 25 pgs.
Office Action corresponding to U.S. Appl. No. 13/180,513, dated Dec. 5, 2014, 29 pgs.
Office Action corresponding to U.S. Appl. No. 13/180,513, dated Feb. 19, 2016, 36 pgs.
Office Action corresponding to U.S. Appl. No. 13/180,513, dated Mar. 1, 2013, 24 pgs.
Office Action corresponding to U.S. Appl. No. 13/180,519, dated Dec. 5, 2013, 13 pgs.
Office Action corresponding to U.S. Appl. No. 13/180,519, dated Jul. 21, 2015, 25 pgs.
Office Action corresponding to U.S. Appl. No. 13/180,519, dated May 15, 2014, 17 pgs.
Office Action corresponding to U.S. Appl. No. 13/180,519, dated May 24, 2013, 13 pgs.
Office Action corresponding to U.S. Appl. No. 13/180,519, dated Sep. 18, 2014, 14 pgs.
Office Action corresponding to U.S. Appl. No. 13/180,521, dated Dec. 10, 2014, 24 pgs.
Office Action corresponding to U.S. Appl. No. 13/180,521, dated Dec. 24, 2013, 22 pgs.
Office Action corresponding to U.S. Appl. No. 13/180,521, dated Mar. 29, 2013, 20 pgs.
Office Action corresponding to U.S. Appl. No. 13/180,521, dated Mar. 30, 2016, 30 pgs.
Office Action corresponding to U.S. Appl. No. 13/180,524, dated Apr. 8, 2014, 34 pgs.
Office Action corresponding to U.S. Appl. No. 13/180,524, dated Dec. 26, 2012, 23 pgs.
Office Action corresponding to U.S. Appl. No. 13/180,524, dated Feb. 13, 2015, 37 pgs.
Office Action corresponding to U.S. Appl. No. 13/180,524, dated Jun. 12, 2012, 27 pgs.
Office Action corresponding to U.S. Appl. No. 13/180,524, dated Jun. 30, 2015, 40 pgs.
Office Action corresponding to U.S. Appl. No. 13/180,524, dated Jun. 5, 2014, 31 pgs.
Office Action corresponding to U.S. Appl. No. 13/180,524, dated Sep. 20, 2013, 30 pgs.
Office Action corresponding to U.S. Appl. No. 13/180,526, dated Mar. 11, 2013, 23 pgs.
Office Action corresponding to U.S. Appl. No. 13/180,526, dated Nov. 7, 2012, 19 pgs.
Office Action corresponding to U.S. Appl. No. 13/180,528, dated Apr. 9, 2014, 29 pgs.
Office Action corresponding to U.S. Appl. No. 13/180,528, dated Dec. 28, 2012, 23 pgs.
Office Action corresponding to U.S. Appl. No. 13/180,528, dated Mar. 11, 2015, 29 pgs.
Office Action corresponding to U.S. Appl. No. 13/180,528, dated May 24, 2012, 24 pgs.
Office Action corresponding to U.S. Appl. No. 13/180,528, dated Sep. 20, 2013, 23 pgs.
Office Action corresponding to U.S. Appl. No. 13/180,528, dated Sep. 29, 2014, 28 pgs.
Office Action corresponding to U.S. Appl. No. 13/180,530, dated Aug. 21, 2014, 32 pgs.
Office Action corresponding to U.S. Appl. No. 13/180,530, dated Mar. 11, 2013, 18 pgs.
Office Action corresponding to U.S. Appl. No. 13/180,530, dated May 5, 2015, 33 pgs.
Office Action corresponding to U.S. Appl. No. 13/180,530, dated Nov. 8, 2012, 18 pgs.
Office Action corresponding to U.S. Appl. No. 13/180,531, dated Feb. 17, 2012, 13 pgs.

(56) References Cited

OTHER PUBLICATIONS

Office Action corresponding to U.S. Appl. No. 13/180,531, dated Jan. 22, 2013, 15 pgs.
Office Action corresponding to U.S. Appl. No. 13/180,533, dated Apr. 3, 2013, 19 pgs.
Office Action corresponding to U.S. Appl. No. 13/180,533, dated Aug. 30, 2012, 12 pgs.
Office Action corresponding to U.S. Appl. No. 13/180,533, dated Nov. 2, 2016, 7 pgs.
Office Action corresponding to U.S. Appl. No. 13/180,535, dated Apr. 22, 2016, 14 pgs.
Office Action corresponding to U.S. Appl. No. 13/180,535, dated Aug. 21, 2014, 31 pgs.
Office Action corresponding to U.S. Appl. No. 13/180,535, dated Mar. 14, 2013, 20 pgs.
Office Action corresponding to U.S. Appl. No. 13/180,535, dated May 5, 2015, 34 pgs.
Office Action corresponding to U.S. Appl. No. 13/180,535, dated Nov. 23, 2012, 18 pgs.
Office Action corresponding to U.S. Appl. No. 13/180,535, dated Nov. 7, 2016, 13 pgs.
Office Action corresponding to U.S. Appl. No. 13/247,657, dated Apr. 26, 2013, 31 pgs.
Office Action corresponding to U.S. Appl. No. 13/247,657, dated Aug. 1, 2013, 29 pgs.
Office Action corresponding to U.S. Appl. No. 13/247,657, dated Jan. 13, 2016, 44 pgs.
Office Action corresponding to U.S. Appl. No. 13/247,657, dated Jan. 6, 2014, 39 pgs.
Office Action corresponding to U.S. Appl. No. 13/247,657, dated Jun. 15, 2015, 40 pgs.
Office Action corresponding to U.S. Appl. No. 13/247,657, dated Nov. 13, 2014, 39 pgs.
Office Action corresponding to U.S. Appl. No. 13/247,657, dated Sep. 14, 2012, 26 pgs.
Office Action corresponding to U.S. Appl. No. 13/300,090, dated Apr. 11, 2012, 14 pgs.
Office Action corresponding to U.S. Appl. No. 13/300,090, dated Aug. 6, 2012, 9 pgs.
Office Action corresponding to U.S. Appl. No. 13/300,121, dated Apr. 16, 2012, 13 pgs.
Office Action corresponding to U.S. Appl. No. 13/300,121, dated Dec. 2, 2015, 42 pgs.
Office Action corresponding to U.S. Appl. No. 13/300,121, dated Feb. 15, 2012, 12 pgs.
Office Action corresponding to U.S. Appl. No. 13/300,121, dated Jul. 20, 2016, 28 pgs.
Office Action corresponding to U.S. Appl. No. 13/300,121, dated Jul. 27, 2012, 22 pgs.
Office Action corresponding to U.S. Appl. No. 13/300,121, dated May 1, 2014, 32 pgs.
Office Action corresponding to U.S. Appl. No. 13/300,121, dated Oct. 23, 2014, 51 pgs.
Office Action corresponding to U.S. Appl. No. 13/904,529, dated Feb. 2, 2016, 13 pgs.
Office Action corresponding to U.S. Appl. No. 13/904,529, dated May 22, 2015, 13 pgs.
Office Action corresponding to U.S. Appl. No. 13/904,548, dated Apr. 10, 2015, 16 pgs.
Office Action corresponding to U.S. Appl. No. 13/904,548, dated Jul. 24, 2015, 20 pgs.
Office Action corresponding to U.S. Appl. No. 13/904,548, dated Mar. 9, 2016, 35 pgs.
Office Action corresponding to U.S. Appl. No. 13/904,558, dated Apr. 3, 2015, 12 pgs.
Office Action corresponding to U.S. Appl. No. 13/904,558, dated Mar. 31, 2016, 31 pgs.
Office Action corresponding to U.S. Appl. No. 13/904,558, dated Nov. 9, 2015, 21 pgs.
Office Action corresponding to U.S. Appl. No. 13/904,558, dated Oct. 28, 2016, 45 pgs.
Office Action corresponding to U.S. Appl. No. 13/904,573, dated Feb. 23, 2015, 20 pgs.
Office Action corresponding to U.S. Appl. No. 13/904,573, dated Nov. 6, 2015, 27 pgs.
Office Action corresponding to U.S. Appl. No. 13/904,593, dated Jul. 1, 2015, 20 pgs.
Office Action corresponding to U.S. Appl. No. 13/904,593, dated Mar. 24, 2016, 41 pgs.
Office Action corresponding to U.S. Appl. No. 13/904,650, dated Jul. 15, 2015, 25 pgs.
Office Action corresponding to U.S. Appl. No. 13/904,650, dated Mar. 9, 2016, 32 pgs.
Office Action corresponding to U.S. Appl. No. 14/058,654, dated Aug. 25, 2016, 10 pgs.
Office Action corresponding to U.S. Appl. No. 14/058,654, dated Dec. 14, 2015, 9 pgs.
Office Action corresponding to U.S. Appl. No. 14/080,135, dated Apr. 2, 2015, 12 pgs.
Office Action corresponding to U.S. Appl. No. 14/080,135, dated Apr. 27, 2016, 8 pgs.
Office Action corresponding to U.S. Appl. No. 14/080,135, dated Aug. 18, 2016, 9 pgs.
Office Action corresponding to U.S. Appl. No. 14/080,135, dated Sep. 24, 2014, 8 pgs.
Office Action corresponding to U.S. Appl. No. 14/166,525, dated Apr. 27, 2016, 6 pgs.
Office Action corresponding to U.S. Appl. No. 14/166,525, dated Apr. 3, 2015, 11 pgs.
Office Action corresponding to U.S. Appl. No. 14/166,525, dated Aug. 18, 2016, 8 pgs.
Office Action corresponding to U.S. Appl. No. 14/166,525, dated Nov. 23, 2016, 8 pgs.
Office Action corresponding to U.S. Appl. No. 14/166,525, dated Nov. 6, 2014, 8 pgs.
Office Action corresponding to U.S. Appl. No. 14/631,130, dated Feb. 10, 2017, 37 pgs.
Office Action corresponding to U.S. Appl. No. 14/631,130, dated Jul. 6, 2017, 41 pgs.
Patent Board Decision regarding the Appeal Proceedings corresponding to U.S. Appl. No. 12/533,618, dated May 22, 2015, 8 pgs.
Patent Board Decision regarding the Appeal Proceedings corresponding to U.S. Appl. No. 13/082,751, dated May 26, 2016, 7 pgs.
Patent Board Decision regarding the Appeal Proceedings corresponding to U.S. Appl. No. 13/082,762, dated May 21, 2015, 12 pgs.
Patent Board Decision regarding the Appeal Proceedings corresponding to U.S. Appl. No. 13/180,511, dated Jul. 12, 2016, 7 pgs.
Patent Board Decision regarding the Appeal Proceedings corresponding to U.S. Appl. No. 13/180,531, dated Aug. 5, 2016, 9 pgs.
Patent Board Decision regarding the Appeal Proceedings corresponding to U.S. Appl. No. 13/180,533, dated Aug. 4, 2016, 7 pgs.
Office Action corresponding to U.S. Appl. No. 14/631,130, dated Jan. 22, 2018, 53 pgs.
Office Action corresponding to Australian Patent Application No. 2013267530, dated Jan. 19, 2018, 3 pgs.
Canadian Patent Office Action for Application No. 2,812,945 dated Feb. 12, 2018 (4 pages).
United States Patent Office Action for U.S. Appl. No. 14/955,862 dated May 3, 2018 (11 pages).
United States Patent Office Action for U.S. Appl. No. 14/631,091 dated Jul. 2, 2018 (15 pages).
United States Patent Office Action for U.S. Appl. No. 14/637,150 dated Jun. 13, 2018 (25 pages).
Canadian Patent Office Action for Application No. 2,956,453 dated Jul. 23, 2018 (8 pages).
Canadian Patent Office Action for Application No. 2,874,981 dated Aug. 16, 2018 (3 pages).
United States Patent Office Action for U.S. Appl. No. 14/631,130 dated Sep. 19, 2018 (26 pages).
United States Patent Office Action for U.S. Appl. No. 14/789,700 dated Sep. 6, 2018 (29 pages).

(56) References Cited

OTHER PUBLICATIONS

Australian Patent Office Examination Report No. 2 for Application No. 2013267530 dated Oct. 23, 2018 (3 pages).
European Patent Office Action for Application No. 11829829.8 dated Nov. 23, 2018 (10 pages).
United States Patent Office Action for U.S. Appl. No. 14/955,862 dated Nov. 5, 2018 (8 pages).
United States Patent Office Action for U.S. Appl. No. 13/180,533 dated Oct. 4, 2018 (26 pages).
United States Patent Office Action for U.S. Appl. No. 14/631,091 dated Apr. 16, 2019 (20 pages).
United States Patent Office Action for U.S. Appl. No. 14/631,130 dated Mar. 22, 2019 (27 pages).
Canadian Patent Office Action for Application No. 2,812,945 dated Jan. 4, 2019 (5 pages).
United States Patent Office Action for U.S. Appl. No. 13/180,533 dated Jul. 10, 2019 (27 pages).
United States Patent Office Action for U.S. Appl. No. 14/631,130 dated Sep. 19, 2019 (28 pages).

\* cited by examiner

|  | Weekday, 7 am – 8am | Weekday, 1 pm – 2 pm | Weekday, 11 pm – 12 am | Saturday, 7 am – 8am | Message Rate | Roaming Rate | Data Rate |
|---|---|---|---|---|---|---|---|
| Provider A | $0.05/min | $0.05/min | $0/min | $0/min | $0.15/msg | $0.05/min | $0.05/Kb |
| Provider B | $0.06/min | $0.06/min | $0.06/min | $0/min | $0.05/msg | $0.10/min | $0.05/Kb |
| Provider C | $0.05/min | $0.05/min | $0.01/min | $0/min | $0.05/msg | $0.05/min | $0.06/Kb |
| Provider D | $0.07/min | $0.07/min | $0/min | $0/min | $0.05/msg | $0.15/min | $0.06/Kb |
| Provider E | $0.05/min | $0.05/min | $0.05/min | $0/min | $0.05/msg | $0.05/min | $0.06/Kb |

SYSTEM AND METHOD OF OBTAINING MERCHANT SALES INFORMATION FOR MARKETING OR SALES TEAMS

CROSS-REFERENCE TO RELATED APPLICATIONS

This application claims the benefit of the following provisional applications, each of which is hereby incorporated by reference in its entirety: U.S. Provisional Application No. 61/652,662, filed May 29, 2012; and U.S. Provisional Application No. 61/783,477, filed Mar. 14, 2013.

This application is also a continuation-in-part of, and claims the benefit of the filing date of U.S. patent application Ser. No. 13/247,657, filed on Sep. 28, 2011 and hereby incorporated by reference.

This application is also continuation-in-part of, and claims the benefit of the filing date of U.S. patent application Ser. No. 13/180,511, filed on Jul. 11, 2011, which claims the benefit of the filing date of Provisional Application 61/427,138, filed on Dec. 24, 2010.

This application is also a continuation-in-part of, and claims the benefit of the filing date of U.S. patent application Ser. No. 13/082,591, filed on Apr. 8, 2011, which claims the benefit of the filing date of Provisional Appl. 61/388,680, filed on Oct. 1, 2010.

This application is also a continuation-in-part of, and claims the benefit of the filing date of U.S. patent application Ser. No. 12/501,572, filed on Jul. 13, 2009, which claims the benefit of the filing date of Provisional Appl. 61/146,120, filed on Jan. 21, 2009.

BACKGROUND

Field

The present disclosure is generally related to an in-statement rewards platform.

Description of the Related Art

While consumer comparison shopping for products is known, an unbiased way of comparison shopping for competing services is unavailable. Often a consumer may only be aware of some of the information related to a service provider's services, options, terms, conditions, costs, and the like. Also, the consumer may not be aware of how the service options change based on their particular usage characteristics. Thus, there remains a need for a consumer comparison shopping method that obtains actual or predicted service usage data from the consumer and service provider information in order to present the consumer with relevant alternative service offering options.

SUMMARY

In embodiments, methods and systems may comprise gathering transaction data from a user's financial account, analyzing the transaction data for a savings opportunity indication, matching a savings opportunity from a database of savings opportunities to the user based on the savings opportunity indication, and displaying the savings opportunity in association with a statement of a user's financial account. Further, a past response may be gathered to a savings opportunity indication and analyzing it, wherein the savings opportunity is based on both the analyzed transaction data and past response data. The statement may be an online statement, an online graphical user interface associated with the user's financial account, an online bill pay area, a dialog box associated with the user's financial account, an ATM receipt, a teller receipt, a mobile statement, a paper statement, and the like. The step of analyzing may comprise extracting at least one of a merchant name, a merchant category, a merchant location, a store number, a transaction amount, a transaction frequency, a zip code, a store category, a transaction description, and a total spending amount. The step of analyzing may comprise analyzing the transaction data for a savings opportunity indication relating to a merchant. The step of analyzing may comprise analyzing the transaction data for a savings opportunity indication relating to a market segment. The step of displaying the savings opportunity may comprise displaying the savings opportunity within a field of the statement where prior transaction data may be presented. The savings opportunity may be presented interweaved within the presented prior transaction data. The step of displaying the savings opportunity may comprise displaying the savings opportunity within a field of the statement not where prior transaction data may be presented. The user's financial account may be a credit card account, a bank account, a checking account, a savings account, a personal finance program account, a loan account, and the like. The step of analyzing may comprise anonymizing the transaction data. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction. The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program. The merchant loyalty program may be implemented through the use of a transaction card associated with the financial account. The merchant loyalty program may be implemented by providing the user with a printed coupon, a bar code coupon presented on a mobile device, a credit on a merchant loyalty card, and the like. Wherein analyzing the transaction data may comprise analyzing market segment information. The step of matching may be limited to savings opportunities near a user's identified location. The user's location may be identified manually by the user. The user's location may be identified automatically from a mobile device implementing the method.

In embodiments, methods and systems may comprise following a secure user login procedure, presenting a graphical user interface where a user's financial transaction data are presented, wherein the financial transaction data were obtained from a financial institution that maintains a financial account on behalf of the user, and presenting a savings opportunity, in proximity to the financial transaction data, wherein the savings opportunity relates to the financial transaction data. The sales offer may be presented in an interweaved fashion amongst more than one financial transaction of the financial transaction data. The financial account may be a credit card account, a bank account, a checking account, a savings account, a personal finance program account, a loan account, and the like. A past response may be gathered to a savings opportunity and analyzing it, wherein the current savings opportunity may be based on both the financial transaction data and past response data. The savings opportunity may relate to an aspect of the financial transaction data chosen from a merchant name, a merchant category, a merchant location, a store number, a transaction amount, a transaction frequency, a zip code, a store category, a transaction description, a total spending amount, and the like. Further, the financial transaction data may be anonymized. The step of presenting may be limited to savings opportunities near a user's identified location. The user's location may be identified manually by the user. The user's location may be identified automatically from a mobile device implementing the method. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction. The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program.

In embodiments, methods and systems may comprise presenting an opportunity to assess alternative offerings related to a financial transaction from a user's financial account, wherein the financial transaction is related to a presently selected offering, in response to the selection of the opportunity, gathering transaction data relating to the presented selected offering and analyzing the transaction data, wherein the step of analyzing involves normalizing the transaction data such that a comparison to other offers can be assessed, collecting offer data relating to an alternative offering and normalizing the offer data such that a comparison with the normalized transaction data can be assessed, comparing the normalized transaction data with the normalized offer data to assess if the alternative offering presents an improvement to the user in comparison to the presently selected offering, and presenting the alternative offering to the user if the alternative offering presents an improvement. Presenting may be done in a statement. The statement may be an online statement, an online graphical user interface associated with the user's financial account, an online bill pay area, a dialog box associated with the user's financial account, an ATM receipt, a teller receipt, a mobile statement, a paper statement, and the like. The financial transaction may be presented in a bill for payment in an online bill pay area. The improvement may be related to at least one of a cost, a coverage, a quality, and a rating. The user financial account is may be a credit card account, a bank account, a checking account, a savings account, a personal finance program account, a loan account, and the like. Analyzing the transaction data may involve extracting a merchant name, a merchant category, a merchant location, a transaction amount, a transaction frequency, a zip code, a store name, a store category, a store number a transaction description, a purchase frequency, a total spending amount, and the like. Further, the transaction data may be anonymized.

In embodiments, methods and systems may comprise presenting, in a user financial account graphical user interface, an opportunity to assess alternative offerings related to a transaction that is presented within the account graphical user interface, wherein the transaction is related to a presently selected offering, and in response to the selection of the opportunity, redirecting the user to an alternative offering graphical user interface adapted to present the user with alternative offerings. The bill's details may be analyzed and normalized for comparison with an alternative offering that has been normalized, and if the alternative offering presents an improvement in comparison to the presently selected offering, the alternative offering may be presented in the alternative offering graphical user interface. The bill details may include a merchant name, a merchant category, a merchant location, a transaction amount, a transaction frequency, a zip code, a store name, a store category, a store number a transaction description, a purchase frequency, a total spending amount, and the like. The improvement may be related to a cost, a coverage, a quality, a rating, and the like. The financial account may be a credit card account, a bank account, a checking account, a savings account, a personal finance program account, a loan account, and the like. Further, the transaction may be anonymized. The opportunity to assess alternative offerings may relate to a plurality of transactions.

In embodiments, methods and systems may comprise gathering transaction data relating to a user's bill wherein the bill is related to a presently selected offering, analyzing the transaction data, wherein the step of analyzing involves normalizing the transaction data such that a comparison to other offers can be assessed, collecting offer usage data relating to an alternative offering and normalizing the offer usage data such that a comparison with the transaction data can be assessed, comparing the normalized transaction data with the normalized offer usage data to assess if the alternative offering presents an advantage to the user in comparison to the presently selected offering, and in response to an assessment indicating that the alternative offering presents an improvement to the user, presenting, in a user financial account statement, an indication that an alternative offering related to the bill is available. The statement may be an online statement, an online graphical user interface associated with the user's financial account, an online bill pay area, a dialog box associated with the user's financial account, an ATM receipt, a teller receipt, a mobile statement, a paper statement, and the like. The improvement may be related to a cost, a coverage, a quality, a rating, and the like. The financial account may be a credit card account, a bank account, a checking account, a savings account, a personal finance program account, a loan account, and the like. Analyzing the transaction data may comprise anonymizing the transaction data.

In embodiments, methods and systems may comprise presenting a statement of a user's financial transaction data, where the financial transaction data were obtained from a financial institution that maintains a financial account on behalf of the user, and presenting a map of a geographic area and indicating where, within the geographic area, a savings opportunity is presented, wherein the savings opportunity relates to the financial transaction data. The map may be presented in proximity to the financial transaction data. The map may be presented in a separate window from the financial transaction data. The statement may be an online statement, an online graphical user interface associated with the user's financial account, an online bill pay area, a dialog box associated with the user's financial account, an ATM receipt, a teller receipt, a mobile statement, a paper statement, and the like. The financial account may be a credit card account, a bank account, a checking account, a savings account, a personal finance program account, a loan account, and the like. Further, the financial transaction data may be anonymized. The geographic area may relate to a user's identified location. The user's location may be identified manually by the user. The user's location may be identified automatically from a mobile device implementing the method. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction. The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program.

In embodiments, methods and systems may comprise gathering transaction data from a user for a merchant from a user's financial account, where the user's financial account is a financial institution account that is maintained on behalf of the user; analyzing the transaction data to determine if an aspect of the transaction data meet a criteria set by the merchant; if the transaction data meet the criteria, matching a savings opportunity from the merchant to the user based on the analyzed transaction data; and enabling the user to redeem the savings opportunity during a subsequent transaction with the merchant. The criteria may comprise a total spending amount with the merchant, a number of transactions with the merchant, a number of transactions within a category, total spending during a period of time, a particular transaction, a particular set of transactions, a transaction at a particular merchant location, and the like. The financial account may be a bank account, a checking account, a savings account, a credit account, a personal finance program account, a loan account, and the like. Enabling may comprise automatic redemption upon presentation of a transaction card associated with the user's financial account. Enabling may comprise providing the user with a printed coupon, a bar code coupon presented on a mobile device, a credit on a merchant loyalty card, and the like. Analyzing may comprise anonymizing the financial transaction data. Analyzing may comprise extracting a merchant name, a merchant category, a merchant location, a transaction amount, a transaction frequency, a zip code, a store name, a store category, a store number, a transaction description, a purchase frequency, a total spending amount, and the like.

In embodiments, methods and systems may comprise gathering transaction data from a user for a merchant from a user's financial account, wherein the user's financial account is a financial institution account that is maintained on behalf of the user; analyzing the transaction data; matching a savings opportunity from the merchant to the user based on the analyzed transaction data; and enabling the user to redeem the savings opportunity during a subsequent transaction with the merchant. The financial account may be a bank account, a checking account, a savings account, a credit account, a personal finance program account, a loan account, and the like. Enabling may comprise automatic redemption upon presentation of a transaction card associated with the user's financial account. Enabling may comprise providing the user with at least one of a printed coupon, a bar code coupon presented on a mobile device, and a credit on a merchant loyalty card. Analyzing may comprise anonymizing the financial transaction data. Analyzing may comprise extracting a merchant name, a merchant category, a merchant location, a transaction amount, a transaction frequency, a zip code, a store name, a store category, a store number, a transaction description, a purchase frequency, a total spending amount, and the like.

In embodiments, methods and systems may comprise presenting a merchant bill assessment graphical user interface where an indication of a savings opportunity is presented, and in response to a placement of a savings opportunity in a graphical user interface associated with a user's financial account, wherein the savings opportunity was related to one or more transactions processed through the user's financial account, tracking interaction with the savings opportunity and reporting the tracking to a merchant through the merchant bill assessment graphical user interface. The reporting may comprise reporting on a total spending amount with the merchant, a number of transactions with the merchant, a number of transactions within a category, total spending during a period of time, a particular transaction, a particular set of transactions, a transaction at a particular merchant location, and the like.

In embodiments, methods and systems may comprise an executable script such that when embedded in a graphical user interface of a user's financial account will automatically provide the user, through the graphical user interface, a savings opportunity interface, wherein savings opportunities relating to user financial transactions will be presented. The executable program may be implemented in the JavaScript programming language.

In embodiments, methods and systems may comprise embedding an executable script in a graphical user interface of a user's financial account, executing the executable script when the user accesses the user financial account; and using the executable script to: (1) gather transaction data from the user financial account and anonymize the transaction data before transmitting the anonymized transaction data to a server for analysis; (2) instruct a decision engine in communication with the server to select a savings opportunity to match to the user based on the anonymized transaction data analyzed by the server; (3) receive an indication of the matched savings opportunity from the decision engine; and (4) display the savings opportunity in the user financial account graphical user interface. Analyzing may comprise extracting a merchant name, a merchant category, a merchant location, a transaction amount, a transaction frequency, a zip code, a store name, a store category, a store number, a transaction description, a purchase frequency, a total spending amount, and the like. Further, the executable script may be used to instruct the decision engine to consult a rules database in making the match. The rules database may comprise criteria that the transaction data should meet before a match is made. The criteria may comprise a total spending amount with the merchant, a number of transactions with the merchant, a number of transactions within a category, total spending during a period of time, a particular transaction, a particular set of transactions, a transaction at a particular merchant location, and the like. The financial account may be a bank account, a checking account, a savings account, a credit account, a personal finance program account, a loan account, and the like.

In embodiments, methods and systems may comprise: providing an executable script such that when embedded in a graphical user interface of a user's financial account will automatically provide a merchant with anonymized information relating to transactions made by the user from the user's financial account; and in response to receipt of the anonymized information, enabling the merchant to present a savings opportunity to the user, which will appear in the graphical user interface. The executable program may be implemented in the JavaScript programming language. The user may select to which merchants the executable program can transmit the anonymized information. A user financial account host may select to which merchants the executable program can transmit the anonymized information.

In embodiments, methods and systems may comprise embedding a first executable script in a graphical user interface of a user's financial account, executing the first executable script when the user accesses the user financial account, and using the first executable script to: (1) gather transaction data from the user financial account and anonymize the transaction data before transmitting the anonymized transaction data to a first server for analysis and (2) specify the address of a second executable script, wherein the second executable script accesses the analyzed transaction data and performs a function with the analyzed transaction data. The executable script may be implemented in the JavaScript programming language.

In embodiments, methods and systems may comprise embedding an executable script in a graphical user interface of a user's financial account, executing the executable script when the user accesses the user financial account, and using the executable script to: (1) gather transaction data from the user financial account and anonymize the transaction data before transmitting the anonymized transaction data to a server for analysis; and (2) transmit the transaction data to a third party application to be leveraged. The third party application may be a fraud detection application. The third party application may be a transaction analytics application. The third party application may be a marketing application. The third party application may be a social networking application. The executable script may be implemented in the JavaScript programming language.

In an aspect of the disclosure, a method for a conditional purchase may include receiving a conditional purchase offer for a good or service, wherein the conditional purchase offer specifies at least one of a desired discount and an offer price, comparing the conditional purchase offer with at least one of an inventory and a pricing information to determine if the conditional purchase offer is acceptable, if the conditional purchase offer is acceptable, optionally binding the customer to purchase the good or service, wherein binding comprises automatically charging a financial account of the user for the good or service, and if the conditional purchase offer is not acceptable, allowing the user to modify at least one of the discount and offer price.

A system and method for platform-driven savings opportunity matching includes gathering transaction data from a user's financial account, wherein the user's financial account is a financial institution account that is maintained on behalf of the user and analyzing the transaction data for a psychographic inference. A savings opportunity from a database of savings opportunities is matched to the user based on the psychographic inference. The savings opportunity is displayed in association with a statement of the user's financial account. The psychographic inference may relate to at least one of a credit rating, a gender, an age group, a life event, an income level, and a demographic.

A system and method for financial institution- and merchant-driven savings opportunity matching includes gathering transaction data from a user's financial account, wherein the user's financial account is a financial institution account that is maintained on behalf of the user and analyzing the transaction data for a savings opportunity indication. A filter may be applied to a database of savings opportunities prior to matching one to the user based on the savings opportunity indication. The savings opportunity may be displayed in association with a statement of a user's financial account. The filter may relate to a host of the user's financial account. The filter may be a blacklist of at least one of a merchant, a merchant type, a transaction type, a time period, and a savings opportunity type. The filter may relate to a merchant offering a savings opportunity. The filter may relate to a past spend with the merchant, a past spend in a category, a past purchase frequency, a transaction, and a change in purchase pattern.

A system and method for user-driven savings opportunity matching includes gathering transaction data from a user's financial account, wherein the user's financial account is a financial institution account that is maintained on behalf of the user and analyzing the transaction data for a savings opportunity indication. A savings opportunity from a database of savings opportunities may be matched to the user based on the savings opportunity indication. The savings opportunity may be displayed in association with a statement of a user's financial account, and the user is allowed to interact with the savings opportunity. The interaction data may be used to drive a subsequent match of a savings opportunity. The interaction data may be a past response to a savings opportunity. The system and method may further include decreasing the number of matches made if the response is negative. The system and method may further include increasing the number of matches made if the response is positive. The system and method may further include changing the type of savings opportunity matched if the response is negative. The interaction data may be a like or dislike of the savings opportunity. The interaction data may be an expansion of a savings opportunity headline to reveal additional details. The interaction data may be a sharing of the savings opportunity with at least one of a second user and a social network.

A system and method for providing rewards through a user financial instrument includes gathering transaction data from a user's financial account, wherein the user's financial account is a financial institution account that is maintained on behalf of the user and analyzing the transaction data to determine a reward level. The savings opportunity from the merchant may be matched to the user based on the reward level. The user is enabled to redeem the savings opportunity during a subsequent transaction with the merchant. The system and method may further include allowing the merchant to set a criterion for determining the reward level. The criterion may relate to an amount spent with the merchant. The criterion may relate to a number of visits to the merchant. As the reward level improves, the matched savings opportunity may improve.

A system and method for providing a future reward through a user financial instrument includes gathering transaction data from a user's financial account, wherein the user's financial account is a financial institution account that is maintained on behalf of the user and analyzing the transaction data to determine a future savings opportunity accessible to the user after completion of a goal. Systems and methods track progress towards completing the goal. The user is enabled to obtain the future savings opportunity when the goal is completed. The system and method may further include allowing the merchant to set the goal. The goal may relate to an amount spent with the merchant. The goal may relate to a number of visits to the merchant.

A system and method for providing socially enabled rewards through a user financial instrument includes gathering transaction data from a user's financial account and analyzing the transaction data for a savings opportunity indication. A savings opportunity from a database of savings opportunities is matched to the user based on the savings opportunity indication, wherein the savings opportunity can be shared with other users or a social network. The savings opportunity is displayed in association with a statement of a user's financial account and the user is allowed to share the savings opportunity, wherein sharing causes a shared savings opportunity to be generated. A second user, one who received the shared savings opportunity, can redeem the shared savings opportunity. The sharing and redemption of the shared savings opportunity is tracked, such as to improve targeting users who are influential based on the number of redemptions of the shared savings opportunity. The system and method may further include allowing a merchant to modify the savings opportunity priori to generating the shared savings opportunity.

A system and method for providing a geo-enhanced savings opportunity in association with a financial account includes gathering transaction data from a user's financial account and analyzing the transaction data for a savings opportunity indication. A savings opportunity from a database of savings opportunities is matched to the user based on the savings opportunity indication. The savings opportunity is displayed in association with a statement of a user's financial account. A response to the savings opportunity is tracked in order to receive an indication of whether or not the savings opportunity has been accepted. If it was not accepted, an additional incentive to accept the savings opportunity may be made when the user is in a geographic location set by a merchant offering the savings opportunity. The incentive may be at least one of an additional % discount, an additional monetary discount, an additional savings opportunity, the opportunity to share the savings opportunity, and a related opportunity.

A system and method for providing a savings opportunity matched to a spend pattern in association with a financial account includes gathering transaction data from a user's financial account and analyzing the transaction data for a spend pattern. A savings opportunity from a database of savings opportunities is matched to the user based on the spend pattern. The savings opportunity is displayed in association with a statement of a user's financial account. The system and method may further include gathering a past response to a savings opportunity and analyzing it, wherein the savings opportunity is based on both the spend pattern and past response data.

Methods and systems for a conditional purchase may include gathering transaction data from a user's financial account, wherein the user's financial account is a financial institution account that is maintained on behalf of the user and analyzing the transaction data for a savings opportunity indication. A savings opportunity is matched from a database of savings opportunities to the user based on the savings opportunity indication. The user may provide a conditional purchase offer for a good or service identified by the savings opportunity, wherein the conditional purchase offer specifies at least one of a desired discount and an offer price. The conditional purchase offer is compared with at least one of an inventory and a pricing information to determine if the conditional purchase offer is acceptable. If the conditional purchase offer is acceptable, the customer may be bound to purchase the good or service, wherein binding comprises automatically charging a financial account of the user for the good or service. If the conditional purchase offer is not acceptable, the user may modify at least one of the discount and offer price of the conditional purchase offer to try to gain acceptance again.

A system and method for matching a savings opportunity using census data includes gathering transaction data from a user's financial account and analyzing the transaction data for a savings opportunity indication. Third party census data related to a geographic location of the user may be used in addition to the savings opportunity indication to match a savings opportunity from a database of savings opportunities to the user. The savings opportunity is displayed in association with a statement of the user's financial account. The system and method may further include gathering a past response to a savings opportunity indication and analyzing it, wherein the savings opportunity is based on both the analyzed transaction data and past response data.

A system and method for matching a savings opportunity using third party data includes gathering transaction data from a user's financial account and analyzing the transaction data for a savings opportunity indication. Third party data regarding the savings opportunity may be used in addition to the savings opportunity indication to match a savings opportunity from a database of savings opportunities to the user. The savings opportunity is displayed in association with a statement of the user's financial account. The third party data may relate to an aspect of the merchant. The third party data may relate to an aspect of a product or service offered by the merchant.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 3 depicts an alternative service offering model.

FIG. 52 depicts a statement rewards embodiment.

FIG. 58 depicts a statement rewards embodiment.

DETAILED DESCRIPTION

Figure 1:
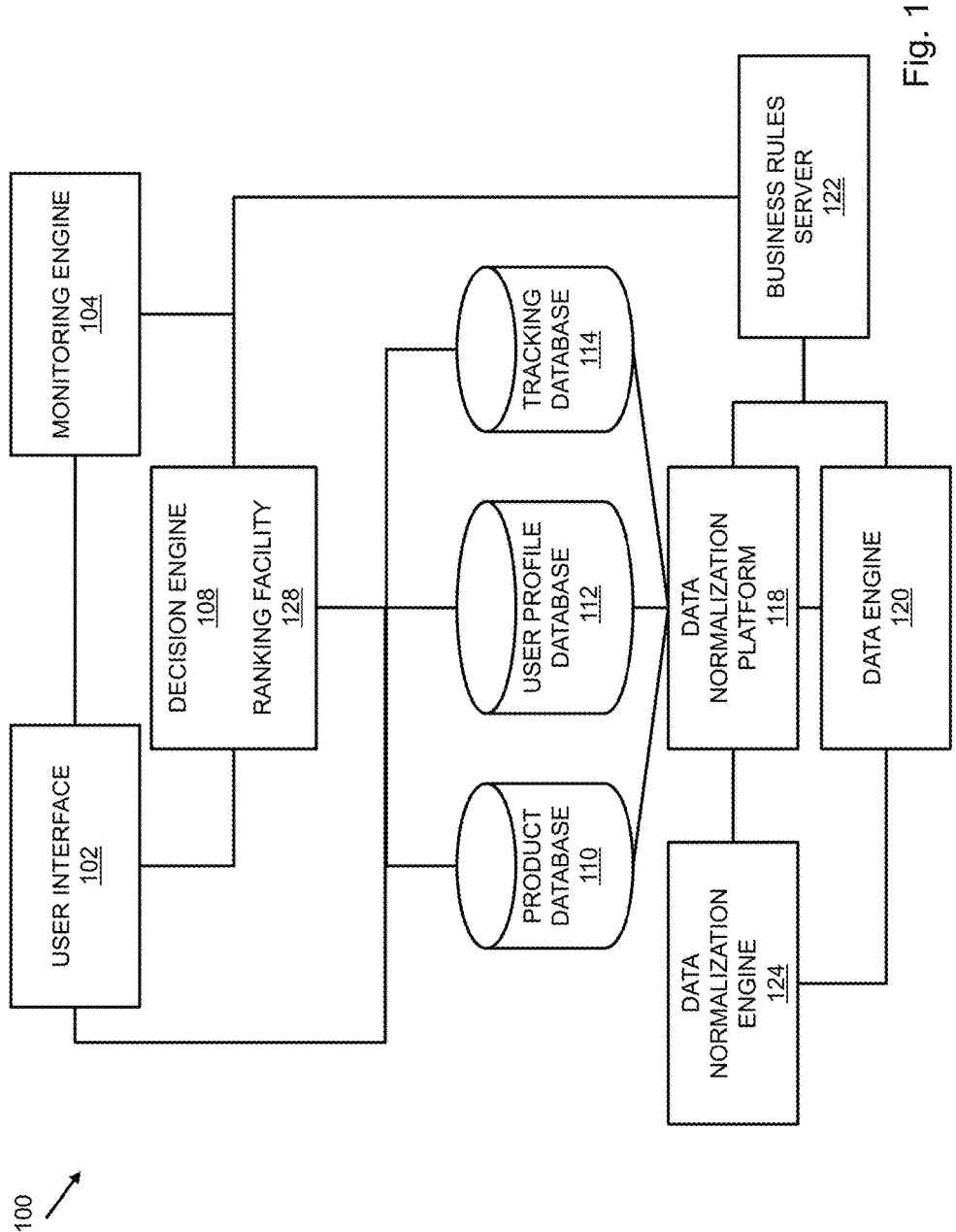
FIG. 1 depicts a block diagram of a consumer service comparison shopping system.

Referring to FIG. 1, an embodiment of a consumer service comparison shopping system 100 is depicted. Through the user interface 102, a user may access the decision engine 108 and monitoring engine 104. In an embodiment, the user interface 102 may be embodied in a website. The user may enter service usage data and preference data into a user profile database 112. For example, the data may include a geographical location, a current service provider, a current service cost, a current service usage, a predicted future service usage, preferences for future service, and other pertinent information. In an alternative embodiment, the data may be gathered automatically from the user's service provider by a data engine 120, such as by logging in to a user's service account after obtaining authorization from the user for release of such information. The data normalization platform 118 may normalize data obtained from the user and stored in the user profile database 112, data obtained about the user's service usage using the data engine 120, as well as alternative service offering data stored in a product database 110. A data normalization engine 124 may perform the normalization step. The decision engine 108 may utilize the usage and preference data from the consumer along with the business rules server 122 to determine how the user's needs, based on a previous or predicted future usage, and preferences match with alternate service offerings offered by various service providers. The decision engine 108 may organize the usage data based on the business rules server 122, and then determines how well each service offering fits the user based on one or more factors, such as total cost, per unit cost, service quality, and the like. The user may then be given the option to select an alternative service offering based on the recommendation by the decision engine 108. The user may be given the option to proceed to acceptance of terms and conditions as well as payment for services. In an embodiment, the monitoring engine 104 may repeat the process of obtaining and normalizing alternative service offering data and comparing it to the user's needs and preferences to determine on an updated basis which alternative service offering best fits the user's needs and preferences. The tracking criteria and output of the monitoring engine 104 may be stored in the tracking database 114. For example, the monitoring engine 104 may repeat the process when a new service offering becomes available, when a user's service usage changes, when a user moves to a new geographic location, when a user indicates a desire to do so, and the like. The user may be alerted when the process is repeated.

Figure 2:
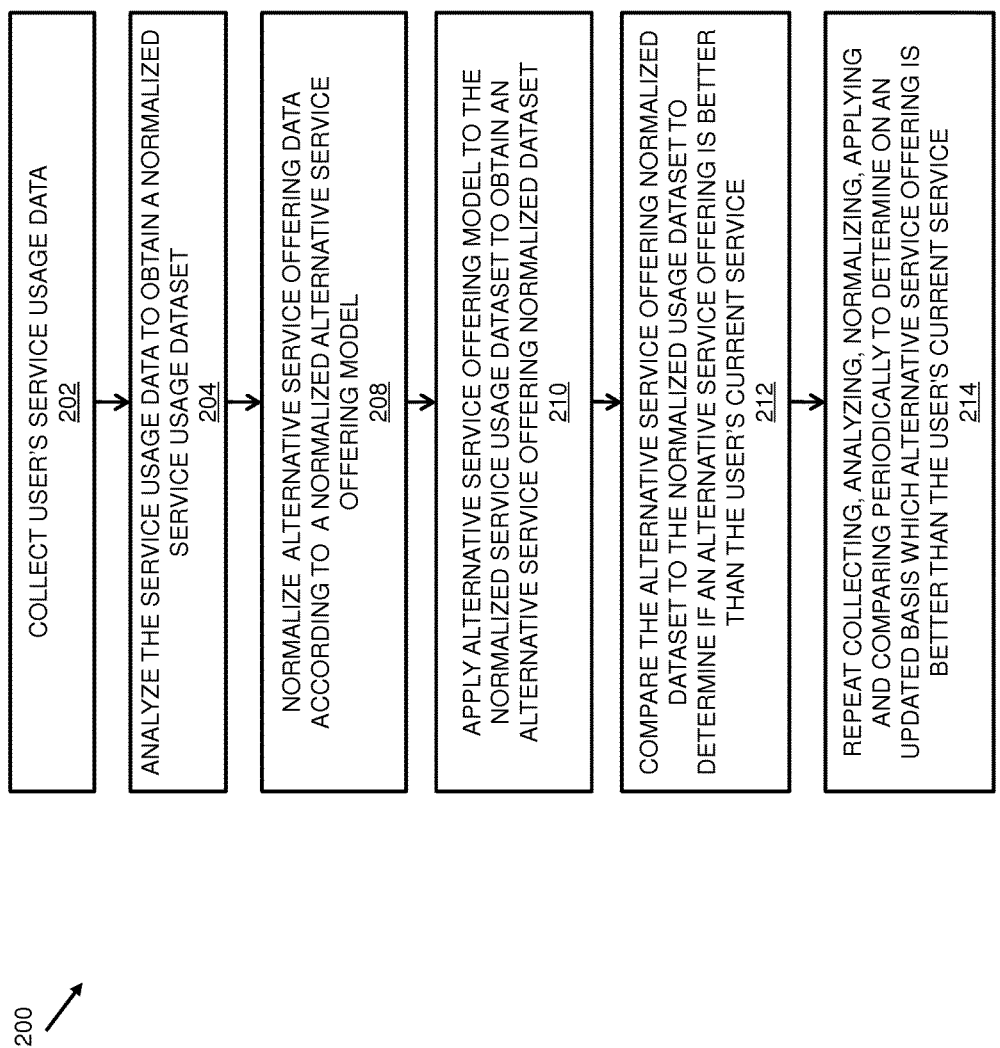
FIG. 2 depicts a flow diagram for comparing alternative service offerings.

Referring now to FIG. 2, a method of comparing service plans based on a user's service usage data may include the steps of collecting service usage data for a user's current service using a computer implemented facility 202, analyzing the service usage data to obtain a normalized service usage dataset 204, optionally, normalizing data related to a plurality of alternative service offerings according to a normalized alternative service offering model 208, applying the normalized alternative service offering model to the normalized service usage dataset to produce a plurality of alternative service offering normalized datasets, wherein the dataset comprises at least the cost for the alternative service offering 210, comparing the alternative service offering normalized datasets to the normalized usage dataset to determine if an alternative service offering is better than the user's current service 212, and optionally, repeating said collecting, analyzing, normalizing, applying and comparing periodically to determine on an updated basis which alternative service offering is better than the user's current service 214. It should be understood that the methods and systems described herein may be applicable to any service plan, policy, or offering engaged in by a user. For example, the service offering may relate to wireless telephony, wireless data, internet service, hotel services, restaurant services, rental car services, loans, insurance services, auto loans, home loans, student loans, life insurance, home insurance, casualty insurance, auto insurance, motorcycle insurance, disability insurance, financial services, a credit card, a checking account, a savings account, a brokerage account, an insurance policy, utility service, personal finance management, residential fuel, automotive fuel, a gym membership, a security service, television programming, VoIP, long distance calling, international calling, utilities, termite services, pest services, moving services, identity theft protection services, travel services, software applications, and the like. For example, in the case where the service offering is travel services, the system 100 may obtain information about a user's previous travel, such as what hotels they have stayed at and what level of service is offered by the hotel, what level of service the user purchases for flights, what type of car the user has rented, if the user pre-purchases tour packages, and the like. When the user requests that the system determine a new travel offering, the system may search for accommodations based on at least one aspect of the user's previous travel. The user's previous travel may be analyzed to obtain a normalized travel service usage dataset which may be compared to an alternative service offering normalized dataset to determine a travel service offering for the user.

In an embodiment, collecting service usage data for a user's current service using a computer implemented facility 202 may comprise the service usage data being input manually by the user to the computer implemented facility. For example, using the user interface 102, a wireless service user may indicate their service usage data, such as how much they spend a month, how many anytime minutes they use, how many wireless lines they have, if they send text, video, or MMS messages, how frequently they message, their geographic locations of use, and the like. The service usage data may be for a current use, past use, or a predicted future use. The service usage data may relate to more than one service plan. In an embodiment, the service usage data may relate to a single service usage parameter. In an alternative embodiment, the service usage data may be obtained automatically, such as with a secure retrieval application. For example, the user may give permission for the data engine 120 to log into the user's service account and obtain the service usage data. In an embodiment, the service usage data are obtained from usage records or billing records, either current or historical. In some embodiments, the data engine 120 obtains a copy of a bill and processes it to obtain the service usage data. The service usage data may relate to more than one service plan. In an alternative embodiment, the service usage data are obtained from an application. For example, the application may be an online banking application, personal financial management software, a bill payment application, a check writing application, a logging application, a mobile phone usage logging application, a computer usage logging application, a browsing application, a search application, and the like. The service usage data may consist of average usage data over a specified period of time in the past. The service usage data may be obtained independent of a user's billing data.

In an embodiment, analyzing the service usage data to obtain a normalized service usage dataset 204 may comprise processing historical usage data to obtain an average normalized usage dataset. Alternatively, processing a single time period's usage data may be done to obtain a normalized usage dataset for that time period. Normalizing usage data may be done by sorting the data according to service-related data types used to define a data model. In an embodiment, the data are sorted according the same data types used in the normalized alternative service offering model to facilitate applying the normalized alternative service offering model to the usage data.

In an embodiment, normalizing data related to a plurality of alternative service offerings may be done according to a normalized alternative service offering model. The data engine 120 is programmed to extract data related to alternative service offerings from multiple sources, some of which may be human-generated. For example, the data engine 120 may be programmed to know the location of rate plan data on a wireless carrier's website. The data related to the plurality of alternative service offerings may be obtained from a data vendor, a human-assisted normalization system, public information sources, direct connections to service providers, and the like. The data then are normalized according to an alternative service offering model. Normalizing data related to the plurality of alternative service offerings may include defining a plurality of service usage-related data types, such as number of peak minutes available, number of nights and weekend minutes available, and the like, collecting parameters related to a service usage using the computer implemented facility, such as how many minutes were used during a particular time period, and normalizing the service parameters according to the defined service usage-related data types to generate a normalized alternative service offering model. The data engine 120 may sort all of the data it collects for each plan and its potential add-on's according to the normalized alternative service offering model. As the data are collected from various sources, it is integrated according to the normalized alternative service offering model. Normalization occurs via at least one of two methods, semantic normalization, syntactic normalization, and the like. In semantic normalization, a string of characters or set of words, phrases, number, and the like may be determined to mean something specific in the data model. Semantic normalization may be done by human encoding, where humans decide the semantic meaning, or may be done in an automated fashion. For example, the normalized alternative service offering model may have only a field for afternoon rates, but a provider's rate plan segments the day according to chunks of hours, such as from 1 pm-4 pm, and the like. The data normalization platform 118 may examine the data from the service provider and determine that the 1 pm -4 pm time period rate should be described as an afternoon rate in the normalized alternative service offering model. The assignment of the provider's rate time period to a particular field of the normalized alternative service offering model may only need to be done once in order for the data normalization platform 118 to know how to interpret the data every time it pulls data automatically, such as for updating, from the service provider. In syntactic normalization, the data normalization platform 118 possesses certain information to convert certain patterns to others. For example, the data normalization platform 118 can extract the 1 pm to 2 pm time period and assign it to Hour A, extract the 2 pm to 3 pm time period and assign it to Hour B, extract the 3 pm to 4 pm time period and assign it to Hour C, and so on. In an embodiment, the data may be enhanced or validated prior to normalization.

In an embodiment, a canonical model for the user data may be defined manually. Then, an agent, or data engine, may be defined or taught so it knows how to map data from a given source into the canonical model. The data engine may be automated from then on. The data engine is taught by a human how to read the data, then convert that into a global concept, such as a model of a cell phone bill. Then the data engine may be instructed to run on a specific item, such as a bill from VERIZON, to pull data and map the data to a canonical model.

Figure 9:
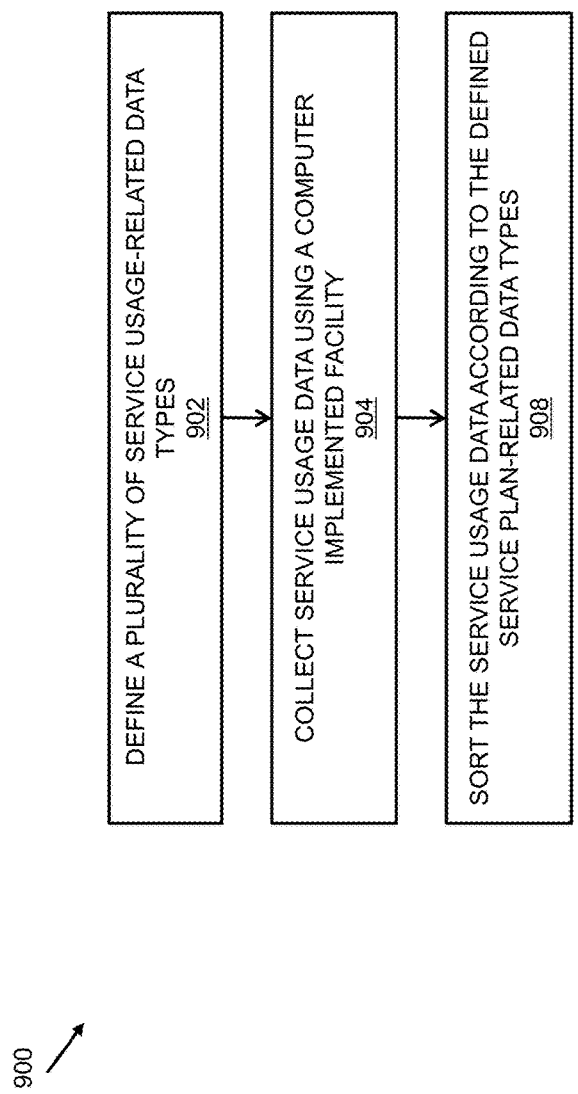
FIG. 9 depicts a flow diagram of a process for normalizing user data.

Referring to FIG. 9, a process for normalizing user data may include defining a plurality of service usage-related data types 902, collecting service usage data using a computer implemented facility 904, and sorting the service usage data according to the defined service plan-related data types 908.

In an embodiment, the business rules server 122 may enhance and/or validate the normalized data, either the normalized service usage dataset or the normalized alternative service offering dataset, and/or the normalized alternative service offering model. Rules may be applied to the datasets or model, such as rules regarding a given vertical, rules based on facts about a rate plan, add-on's, phones or devices, their relative importance in determining the best plan or an aggregate score, information about the user, information about similar users, and the like. The business rules server 122 may verify that the datasets and/or model fit known facts and heuristics stored in the business rules server 122.

In an embodiment, producing a plurality of alternative service offering normalized datasets may comprise applying the normalized alternative service offering model to the normalized service usage dataset. In some embodiments, the alternative service offering normalized datasets comprise at least the cost for the alternative service offering. The normalized alternative service offering model is applied to the normalized service usage dataset in order to determine what the cost of a particular alternative service offering would be given the user's service usage. For example, the normalized alternative service offering model may be envisioned as a matrix 300. For example, in FIG. 3, an embodiment of a model in the form of a matrix is shown. In this example and without limitation, the model is for wireless plans and comprises a Weekday, 7 am-8 am rate, a Weekday, 1 pm-2 pm, a Weekday, 11 pm-12 am rate, a Saturday 7 am-8 am rate, a messaging rate, a roaming rate, and a data rate. A person of skill in the art will understand that the model may include any defined data types, such as data by the hour, by ranges of time, by day, by weekend, and the like. Data may be acquired from each provider with regard to what their rates are during the defined time periods. For example, Provider A's Weekday, 7 am-8 am rate is $0.05/min while Provider D's is $0.07/min. The message rate for Provider A is $0.15/msg while Provider D's is $0.05/msg.

In an embodiment, determining if an alternative service offering is better than the user's current service may comprise comparing the alternative service offering normalized datasets to the normalized usage dataset. Applying the model to the usage data may comprise the decision engine 108 multiplying the number of minutes or messages used during the time period by the rate during the time period. If the data normalization platform 118 determined that 100 calls were made during the Weekday 7 am-8 am time period and the user sent and/or received 100 text messages, the cost for the Current Provider A, if only these two data types were considered, would be $20 while Provider D would be $12. The decision engine 108 may determine that given the user's service usage, the service offering from Provider D may be a better fit to the user given the lower cost. In an alternative embodiment, the data engine 120 may have pulled additional information, such as the opportunity to purchase an unlimited message plan, and placed it in the matrix 300. Therefore, when the model is applied to the service usage data, the decision engine 108 may perform an optimization with respect to messaging, calculating if it is cheaper to go with the pay-as-you-go plan or getting unlimited messaging. Continuing with the above example, if Current Provider A offered a flat rate for messaging of $5 per month while Provider D only offered the pay-per-message rate structure, the decision engine 108 optimization may result in Current Provider A offering the service offering with the better fit to the user given the lower cost of Current Provider A's service ($10) versus Provider D's service ($12). In this case, the user may be advised to not change their service provider but perhaps ask the provider to add on the flat message rate feature.

Cost may be only one component in determining if an alternative service offering is better than the user's current service. User preference, signal strength, terms and conditions, and the like may all be components of determining if an alternative service offering is better than the user's current service. In an embodiment, the decision engine 108 may perform a personalized impact analysis. The decision engine 108 may compute an aggregate score for each alternative service offering normalized dataset. For example, when the service offering is a wireless service, the aggregate score may include a normalization of the alternative service offering savings and signal strength. In an example, the data engine 120 may extract usage information then map the usage onto a wireless plan. In embodiments, the wireless plan may also have optional add-ons and Terms & Conditions added into the calculation for aggregate score. For any given service, the decision engine 108 may be able to select the best possible option from a range of service plans. Then, the decision engine 108 may be able to select optimal add-on's to achieve the lowest impact, or the best aggregate score. In embodiments, the user may be able to specify what criteria to include in the aggregate score calculation. In the case of wireless plans, wireless coverage or signal strength may also be a component of the aggregate score. Individual scores attributed to components of the service may be added together, often in a non-trivial formula, to weight them and come up with an aggregate score. For example, a score may be assigned to terms and conditions, a score may be assigned to signal strength, a score may be assigned to savings over a current service plan, and the like. Users may be able to set the weighting, such as with a slider or manually. Alternatively, certain assumptions may be made in providing an automatic weighting. Assumptions may be provided and stored on the business rules server 122.

The aggregate score may include cost and at least one other element. The other element may be selected from the group consisting of total cost, per unit cost, savings, and service quality. The instruction may further include collecting data points about the service offering and calculating the aggregate score based on those data points. The data points may be identified in the terms and conditions of the service offering. The data points may be in declarations related to the service offering.

In an embodiment, once an aggregate score is calculated, the alternative service plans may be ranked, such as according to aggregate score, according to savings, according to signal strength, according to a combination of the above, and the like, in order to compare the various alternative service plans. In some embodiments, the aggregate score may be plotted according to the overall cost of the service plan. In some embodiments, comparing service plans includes ranking the alternative service offerings according to total costs, per unit costs, and service quality or signal strength.

In an embodiment, after comparing service plans, the user may have the option to purchase a service plan or contact a current service provider in order to modify their current service.

In an embodiment, at any point during the process of collecting 202, analyzing 204, normalizing 208, applying 210 and comparing 212, an advertisement may be presented to the user, wherein the advertisement is selected based on an alternative service offering.

In an embodiment, the system 100 may repeat 214 the steps of collecting 202, analyzing 204, normalizing 208, applying 210 and comparing 212 periodically to determine on an updated basis which alternative service offering is better than the user's current service. The user may be alerted when an alternative service offering that is better than the user's current service is available, such as by email, phone, SMS, MMS, and the like. The repetition interval may be set by the user or may be a pre-determined system 100 interval. The user may also be alerted that the repetition 214 is occurring.

In an embodiment, the user may be a business entity.

In an embodiment, when the service offering is a wireless service offering, the service usage data and data related to the alternative service offering may relate to at least one of plan definitions, add-on's, carrier coverage networks, cost, included minutes, plan capacity, additional line cost, anytime minutes, mobile-to-mobile minutes, minutes overage, nights & weekends minutes, nights start, nights end, roaming minutes, peak/off-peak minutes, data/downloads/applications charges, data overages, data megabytes used/unused, most frequently called numbers, most frequently called locations, networks/carriers called, calls per day, time of day usage, day of week usage, day of month usage, overages, unused services, carrier charges, messaging, messaging overage, activation fees, early termination fees, payment preferences, carrier, current hardware, compatible hardware, hardware availability, coverage area, signal strength, included services, caller ID block, call waiting, call forwarding, caller ID, voicemail, visual voicemail, 3-way calling, insurance, at least one wireless service related item. and the like. Any of the aforementioned service usage data types may be used to calculate an aggregate score, in comparing service offerings, in ranking service offerings, and the like.

In an embodiment, when the service offering is a credit card service, the service usage data and data related to the alternative service offering may relate to at least one of monthly spending, spending categories, credit rating, current credit card, years of use of credit card, current balance, monthly pay-off amount, current APR, pay off every month, carry a balance, sign-up bonus, bonus rewards, base earning rate, maximum earning rate, earning limit, total value of rewards, earned program promotions, spend program promotions, net asset promotions, annual fee, late fee, balance transfer fee, cash advance fee, purchases APR, introductory APR, regular APR, penalty APR, balance transfer APR, cash advance APR, typical redemptions, redemption options, rewards type, credit card network, credit card issuer, features and benefits, at least one credit card related item and the like. For example, typical redemptions may include domestic airfare, international airfare, car rentals, cash rebates, charitable donations, consumer electronics, cruises, hotel stays, restaurants, shopping, and the like. The redemption may relate to an item of value, a service, and a class of services. The class of services may be one of first class, business class, coach class, and premium class.

A user may weight the availability of domestic airfare redemption options higher than the option of receiving a cash rebate, and the weighting may be used to rank credit card offerings accordingly. In another example, the rewards type may be at least one of cash, points, certificates, vouchers, discounts, and miles. In another example, the features and benefits may include at least one of instant approval, no annual fee, secured card, no fraud liability, 24 hr. customer service, airport lounge access, auto rental insurance, concierge service, emergency replacement, extended warranty, online account management, photo security, price protection, purchase protection, return protection, roadside assistance, travel insurance, and the like. Any of the aforementioned credit card data types may be used to calculate an aggregate score, in comparing credit card offerings, in ranking credit card offerings, and the like.

Figure 4:
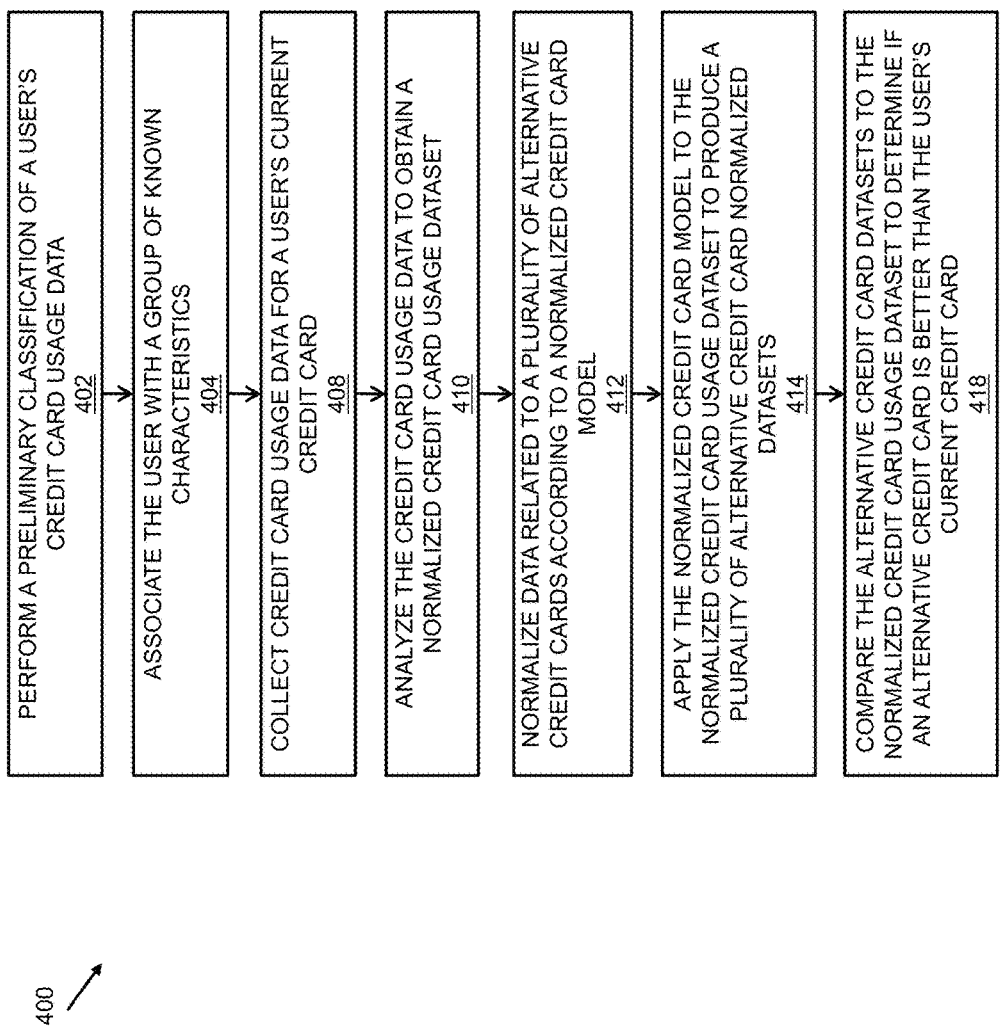
FIG. 4 depicts a flow diagram for comparing alternative credit card offerings.
Figure 5:
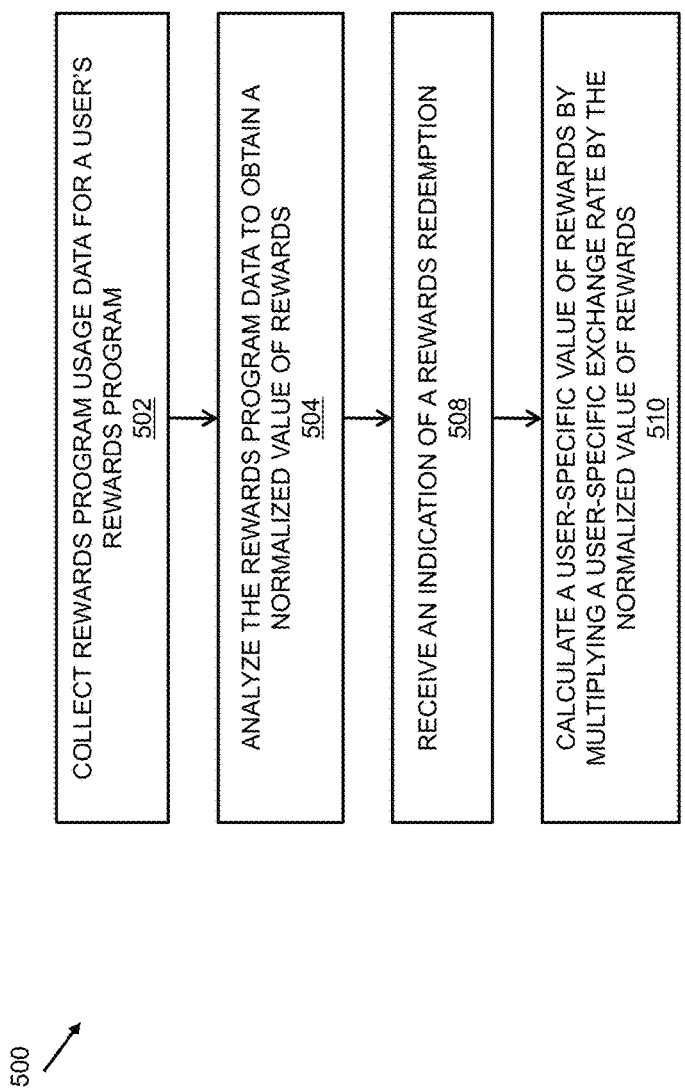
FIG. 5 depicts a flow diagram for comparing alternative credit card offerings according to a value of rewards.

Referring now to FIG. 4, in embodiments, the service offering may be a credit card offering. When the service offering is a credit card offering, a preliminary classification of a user's credit card usage data 402 may be performed to associate the user with a group of known characteristics 404. For example, the group may be those that pay their credit cards off every month, those that carry a balance, and the like. In an example, if the user pays off their balance every month, the credit card usage data collected in subsequent steps may include monthly spending, credit rating, categories of spending, current credit card, number of years holding current credit card, and the like. In another example, if the user does not pay off their balance every month, the credit card usage data collected may be monthly spending, credit rating, categories of spending, current credit card, number of years holding current credit card, existing balance, interest rate, late payments, monthly payment, and the like. After associating the user with a group of known characteristics 404, credit card usage data may be collected for a user's current credit card 408 using a computer implemented facility according to the preliminary classification. The credit card usage data may be analyzed to obtain a normalized credit card usage dataset 410. Analyzing may include processing historical usage data to obtain an average normalized usage dataset, processing a single time period's usage data to obtain a normalized usage dataset for that time period, and the like. Data related to a plurality of alternative credit cards may be normalized according to a normalized credit card model 412. Normalizing data related to the plurality of alternative credit cards may include defining a plurality of credit card usage-related data types, collecting parameters related to a credit card usage using the computer implemented facility, and normalizing the credit card parameters according to the defined credit card usage-related data types to generate a normalized alternative credit card model. Then, the normalized credit card model may be applied to the normalized credit card usage dataset to produce a plurality of alternative credit card normalized datasets 414. A comparison of the alternative credit card datasets with the normalized credit card usage dataset may reveal if an alternative credit card is better than the user's current credit card 418. Comparing may include ranking the alternative credit cards according to an aggregate score calculated for the alternative credit card normalized dataset, an aspect of the alternative credit card normalized dataset, and the like. In an embodiment of comparing, the aggregate score may be plotted against the cost for the alternative credit card. The aspect may be the total card cost, a value of rewards, an additional earnings over the user's current credit card, a savings over the user's current credit card, at least one of an introductory purchase APR, an introductory rate period, a purchase APR, an annual fee, a balance transfer fee, and a credit level required, at least one of a reward type, a rewards sign-up bonus, a base earning rate, a maximum earning rate, and an earning limit, and the like. As described previously, an aggregate score for each of the plurality of alternative credit card normalized datasets may be calculated, where the score may be used for ranking. As described previously, users may specify which components of the dataset or terms & conditions to include in the calculation for the aggregate score and with what weighting to include them. Credit card data, both usage and alternative credit cards, may be obtained from public information sources, direct connections to credit card providers, automatically, input manually by the user to a computer implemented facility for a current card usage or predicted future credit card usage, chosen by a user from among a sampling of standard credit card profiles, for multiple credit cards, and the like. In some embodiments, credit card usage data may be obtained by the data engine 120 in a computer readable format, such as in a billing record. The billing record may be for a current bill only, may be historical billing data, may be a paper bill, an electronic bill, and the like. Once the user may have compared various credit card offerings, they may be provided the option of applying for a selected credit card, contact a current credit card provider in order to modify their current credit card terms and conditions, and the like.

In an embodiment, at any point during the process of performing 402, associating 404, collecting 408, analyzing 410, normalizing 412, applying 414 and comparing 418, an advertisement may be presented to the user, wherein the advertisement is selected based on an alternative service offering.

In an embodiment, the system 100 may repeat the steps of performing 402, associating 404, collecting 408, analyzing 410, normalizing 412, applying 414 and comparing 418 periodically to determine on an updated basis which alternative service offering is better than the user's current service. The user may be alerted when an alternative service offering that is better than the user's current service is available, such as by email, phone, SMS, MMS, and the like. The repetition interval may be set by the user or may be a pre-determined system 100 interval. The user may also be alerted that the repetition is occurring.

In an embodiment, the user may be a business entity.

In an embodiment, the credit card usage data and data related to the alternative credit card may relate to at least one of monthly spending, spending categories, credit rating, current credit card, years of use of credit card, current balance, monthly pay-off amount, current APR, pay off every month, carry a balance, sign-up bonus, bonus rewards, base earning rate, maximum earning rate, earning limit, total value of rewards, earned program promotions, spend program promotions, net asset promotions, annual fee, late fee, balance transfer fee, cash advance fee, purchases APR, introductory APR, regular APR, penalty APR, balance transfer APR, cash advance APR, typical redemptions, redemption options, rewards type, credit card network, credit card issuer, features and benefits, and the like. For example, typical redemptions may be for domestic airfare, international airfare, car rentals, cash, charitable donations, consumer electronics, cruises, hotel stays, restaurants, and shopping. The rewards type may be one of cash, points, and/or miles. The features and benefits may include at least one of instant approval, no annual fee, secured card, no fraud liability, 24 hr. customer service, airport lounge access, auto rental insurance, concierge service, emergency replacement, extended warranty, online account management, photo security, price protection, purchase protection, return protection, roadside assistance, travel insurance, and the like.

In an alternative embodiment, credit card usage data may be analyzed to obtain a value of rewards. For example, credit card usage data for a user's current credit card may be collected 502, such as by using a computer implemented facility. Then the data may be analyzed to obtain a value of rewards 504. An indication of a rewards redemption may be received 508. A user-specific value of rewards may be calculated by multiplying a user-specific exchange rate by the normalized value of rewards 510. In addition to the rewards program data described herein, information related to calculating a value of rewards may also be collected 502. Analyzing 504 may include processing historical usage data to obtain an average value of rewards, processing a single time period's usage data to obtain a value of rewards for that time period, and the like. The exchange rate may relate to the currency system of the user's country or a different country. The system 1000 may automatically compare the value of rewards in different currencies because the system 100 may be able to convert the value of a reward point to a dollar in a personalized way. The personalized exchange rate for you may depend on what the user wants to redeem the points for. For example, redemption outside the user's country might have much more value than redemption inside the user's country. In the example, a user might get as much as 4 cents per point as compared to 0.5 cents per point depending on what, and where, the user redeems the points. Certain currencies, for example, may be more valuable to one user when compared to another user.

In an embodiment, the system 100 may repeat the steps of collecting 502, analyzing 504, receiving 508, and calculating 510 periodically to determine on an updated basis a user-specific value of rewards. The user may be alerted when a reward of a different or particular value is available, such as by email, phone, SMS, MMS, and the like. The repetition interval may be set by the user or may be a pre-determined system 100 interval. The user may also be alerted that the repetition is occurring.

Figure 6:
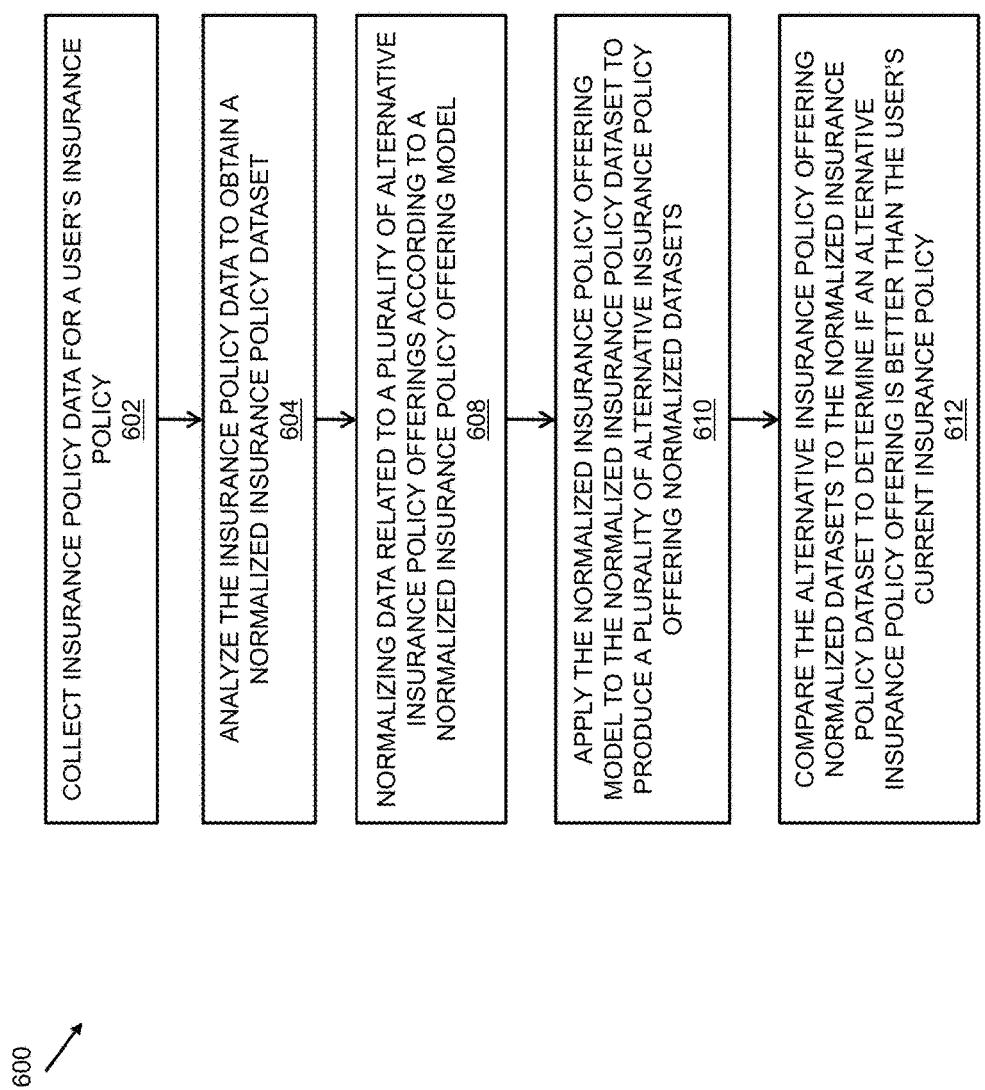
FIG. 6 depicts a flow diagram for comparing insurance policies.

Referring to FIG. 6, when the service offering relates to an insurance policy, data for a user's current insurance policy may be collected using a computer implemented facility 602. The insurance policy may be at least one of life insurance, auto insurance, health insurance, disability insurance, home insurance, and renter's insurance. Then, the insurance policy data may be analyzed to obtain a normalized insurance policy dataset 604. Analyzing may include processing historical insurance policy data to obtain a normalized insurance policy dataset that represents an average dataset, or processing a single time period's insurance policy data to obtain a normalized insurance policy dataset for that time period. Data related to a plurality of alternative insurance policy offerings may be normalized according to a normalized insurance policy offering model 608. Normalizing data related to the plurality of insurance policy offerings may include defining a plurality of insurance policy-related data types, collecting parameters related to an insurance policy using the computer implemented facility, and normalizing the insurance policy parameters according to the defined insurance policy-related data types to generate a normalized alternative insurance policy offering model. The normalized insurance policy offering model may be applied to the normalized insurance policy dataset to produce a plurality of alternative insurance policy offering normalized datasets 610. Then, the alternative insurance policy offering normalized datasets may be compared with the normalized insurance policy dataset to determine if an alternative insurance policy offering is better than the user's current insurance policy 612. Comparing may include ranking the alternative insurance policy offerings according to cost, plotting the cost versus an aggregate score calculated for the alternative insurance policy, ranking the alternative insurance policy offerings according to an aspect of the alternative insurance policy offering normalized dataset, ranking the alternative insurance policy offerings according to cost and an aspect of the alternative insurance policy offering normalized dataset, and the like. Insurance policy data may include at least one of policy terms and conditions, policy cost, policy benefits, claims made against existing or recent policies, location of residence, make, model, and age of automobiles, driving records of insured parties, length of stay at current residence and employment or school, desired automobile, preference for future residence, policy features such as towing services property tax information, property value information, a driving record, property tax information, and the like. Insurance policy data may be input manually by the user to the computer implemented facility, may be a predicted future usage, may be automatically collected by the computer implemented facility, may include comprise billing records, may be automatically collected by the computer implemented facility from at least one of an insurer and a government agency, and the like. The billing records may be for a current bill only, historical billing data, a paper bill, and the like. In an embodiment, the program instructions further include analyzing the terms and conditions, calculating an aggregate score for the terms and conditions, and adding the aggregate score to the aggregate score for the normalized usage dataset or alternative insurance policy offering normalized dataset. In an embodiment, the program instructions further include calculating an aggregate score for each of the plurality of alternative insurance policy offering normalized datasets. In an embodiment, the program instructions further include ranking the plurality of alternative insurance policy offering normalized datasets based on the aggregate score. The user may specify which aspects of the alternative insurance policy offering normalized dataset to include in the aggregate score. In an embodiment, the system 100 may repeat the steps of collecting 602, analyzing 604, normalizing 608, applying 610 and comparing 612 periodically to determine on an updated basis which alternative insurance policy is better than the user's current insurance policy. The user may be alerted when an alternative insurance policy that is better than the user's current insurance policy is available, such as by email, phone, SMS, MMS, and the like. The repetition interval may be set by the user or may be a pre-determined system 100 interval. The user may also be alerted that the repetition is occurring. In an embodiment, the user may be a business entity. After the program instructions have been completed, the user may have the option to purchase a selected insurance policy offering, contact a current insurance policy provider in order to modify their current insurance policy, and the like. In an embodiment, an advertisement may be presented to the user, wherein the advertisement is selected based on an alternative insurance policy offering.

Figure 10:
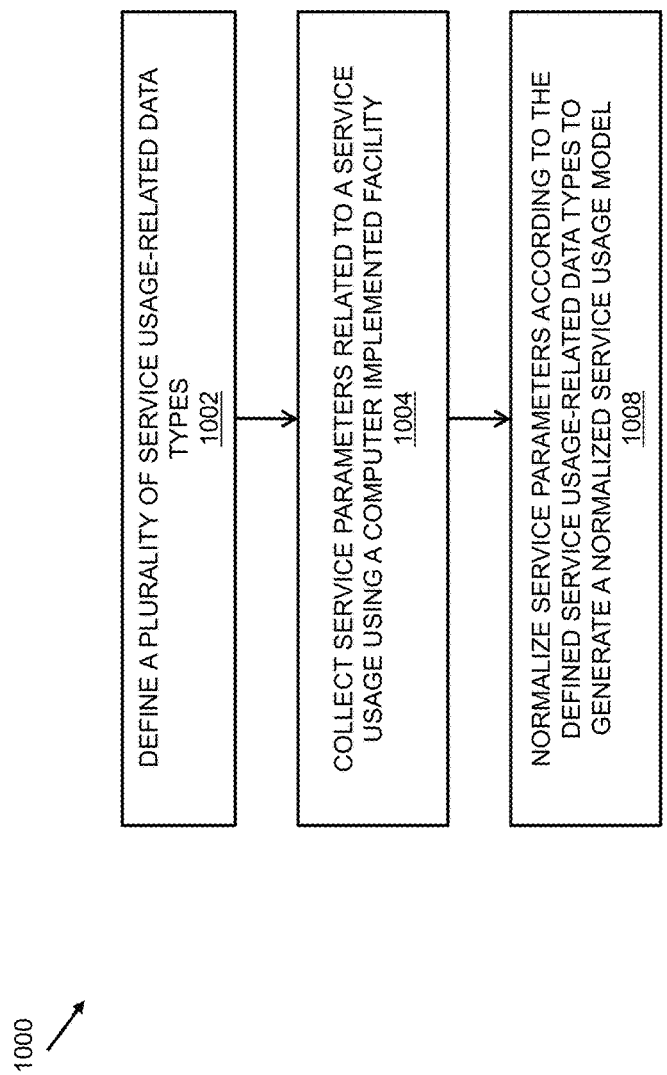
FIG. 10 depicts a flow diagram of a process for generating a normalized service usage model.

In an embodiment, a data normalization platform 118 for generating a normalized service usage model may include a business rules server 122 for storing the definitions of a plurality of service usage-related data types, a data engine 120 for collecting service parameters related to a service usage using a computer implemented facility, and a data normalization engine 124 for normalizing the service parameters according to the defined service usage-related data types to generate a normalized service usage model. In FIG. 10, a flow diagram of a process for generating the normalized service usage model is shown. In the process, a plurality of service usage-related data types are defined 1002. Then, service parameters related to a service usage are collected using a computer implemented facility 1004. The service parameters are then normalized according to the defined service usage-related data types to generate a normalized service usage model 1008. The entire process may be repeated periodically to update the normalized service usage model. The data engine 120 and the data normalization engine 124 may repeat said collecting and normalizing periodically to determine the normalized service usage model on an updated basis. The parameters related to a service usage may be obtained from public information sources. The public information source may be a data feed file. The public information source may be a web crawl. The parameters related to a service usage may be obtained through direct connections to utility service providers, may be supplied, may be extracted, may be input manually by the user to the computer implemented facility, and the like. The business rules server 122 may prioritize the service usage-related data types prior to normalizing. The service parameter may be a user review. The service parameter may be an adoption rate.

In an embodiment, estimating the cost of an alternative service may include a decision engine 108 for applying a normalized alternative service offering model to a normalized service usage dataset to produce a plurality of alternative service offering normalized datasets, and a ranking facility 128 for comparing the alternative service offering normalized datasets to the normalized usage dataset to determine if an alternative service offering is better than the user's current service. In embodiments, the ranking facility 128 may be an integral part of the decision engine 108. The ranking facility 128 may optionally consider weights of certain dataset factors in comparing datasets. The ranking facility 128 may compare datasets based on cost. The cost may be the cost of the service offering. The cost may be a monthly savings over an existing service. The cost may be an annual savings over an existing service. The ranking facility 128 may compare datasets based on cost plus another factor. The factors may be weighted by a user. The factors may be assigned a score. The score may be based on relevance to personal usage. The ranking facility 128 may compare datasets based on a calculated score. The score may be based on relevance to personal usage. The ranking facility 128 may compare datasets based on rewards associated with a credit card offering.

In an embodiment, the system may include a user-interface 102 for performing a comparison of services, receiving input from a user regarding a user's current service usage, wherein the service usage data may be analyzed to obtain a normalized usage dataset, and enabling the user to review a plurality of alternative service offering normalized datasets generated by application of a normalized alternative service offering model to a normalized service usage dataset. The input may be a usage history provided by a user manually. The input may be login information required to automatically acquire a billing record from a service provider or third-party billing agent.

In an embodiment, comparing service offerings may include a business rules server 122 for storing the definitions of a plurality of service usage-related data types, a data engine 120 for collecting service parameters related to a service usage using a computer implemented facility, a data normalization engine 124 for normalizing the service parameters according to the defined service usage-related data types to generate a normalized service usage model for alternative service offerings and a normalized service usage dataset for a user's current service, a decision engine 108 for applying a normalized service usage model to the normalized service usage dataset to produce a plurality of alternative service offering normalized datasets, and a ranking facility 128 for comparing the alternative service offering normalized datasets to the normalized usage dataset to determine if an alternative service offering is better than the user's current service. A monitoring engine 104 may cause the system 100 to periodically compare service offerings to determine on an updated basis which alternative service offering is better than the user's current service. The normalized service usage model may be stored in a product database 110. The normalized service usage dataset may be stored in a user profile database 112. The results from comparing may be stored in a tracking database 114.

Figure 7:
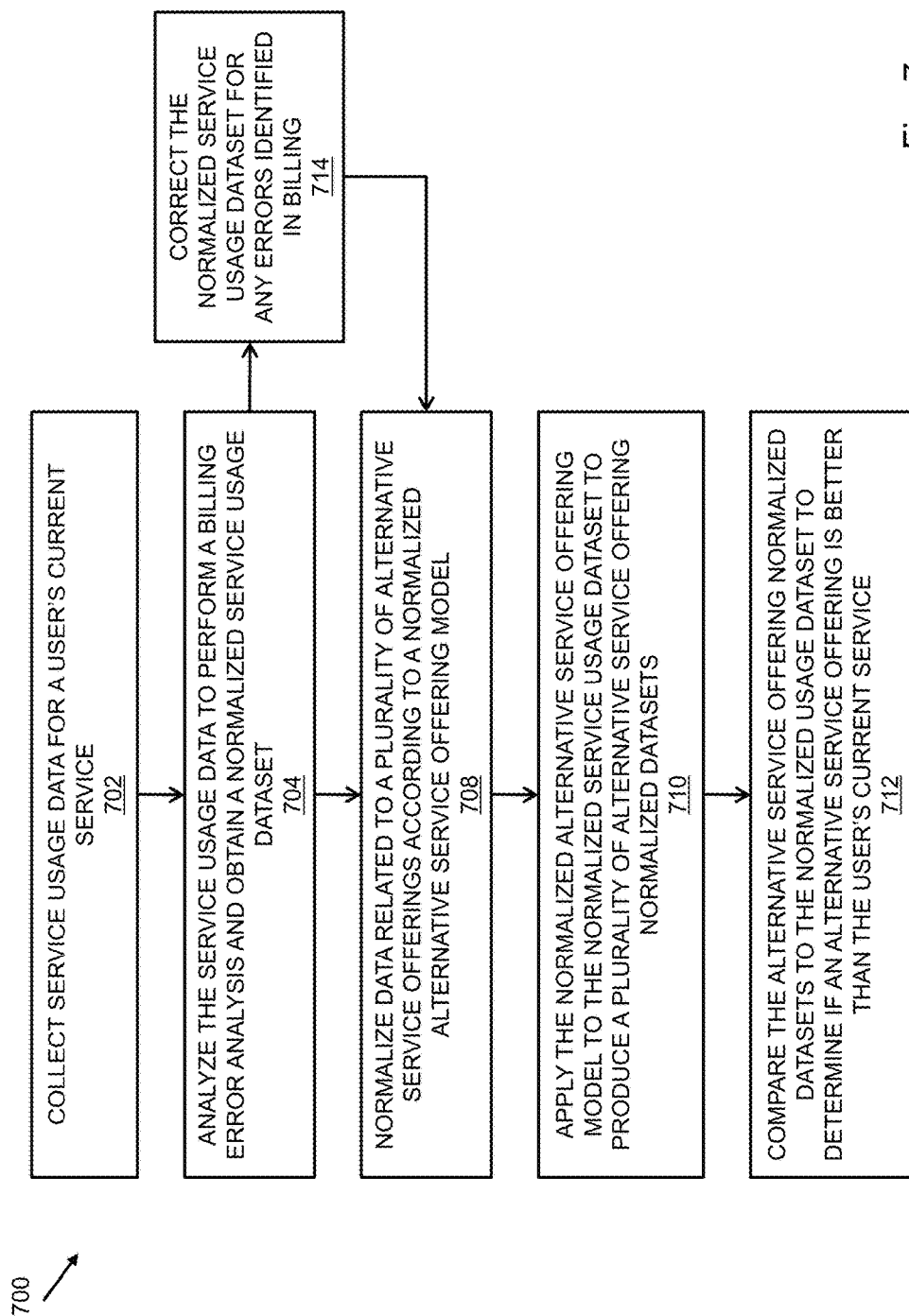
FIG. 7 depicts a flow diagram for comparing alternative service offerings and performing a billing error analysis.

In an embodiment, referring to FIG. 7, the system 100 may collect service usage data for a user's current service using a computer implemented facility 702, analyze the service usage data to perform a billing error analysis and obtain a normalized service usage dataset 704, wherein the normalized service usage dataset may be optionally corrected for any errors identified in billing 714, normalize data related to a plurality of alternative service offerings according to a normalized alternative service offering model 708, apply the normalized alternative service offering model to the normalized service usage dataset to produce a plurality of alternative service offering normalized datasets 710, and compare the alternative service offering normalized datasets to the normalized usage dataset to determine if an alternative service offering is better than the user's current service 712. A service provider may be notified of an error in billing if an error is identified in analyzing the service usage data.

Figure 8:
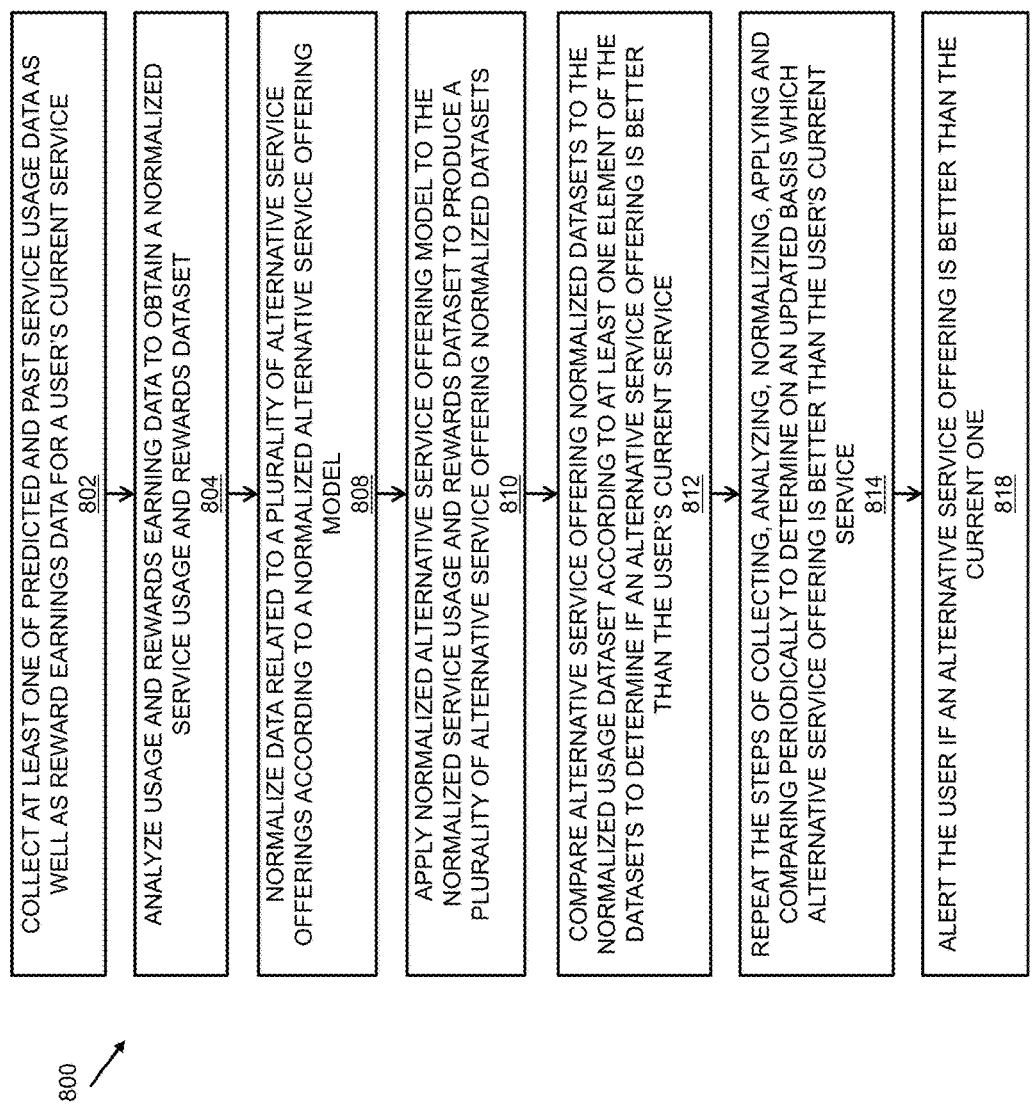
FIG. 8 depicts a flow diagram for determining a personalized true cost of service offerings.

Referring to FIG. 8, the system 100 may provide a system, method, and medium of determining a personalized true cost of service offerings. A personalized cost of a service offering may be calculated for an individual based on your past and/or predicted usage data. The true cost, or impact, of ownership, such as the net cost including rewards and the like, may be quantifiable and unique to each offering. The system 100 may repeat the quantification periodically to alert users of a changed cost/impact when a new offer becomes available or when usage data changes. The system 100 may collect at least one of predicted and past service usage data as well as reward earnings data for a user's current service 802. The usage and rewards earning data may be analyzed to obtain a normalized service usage and rewards dataset 804. Optionally, data related to a plurality of alternative service offerings may be normalized according to a normalized alternative service offering model 808. Alternatively, the data normalized according to a normalized alternative service offering model may be purchased from a third party data provider. The normalized alternative service offering model may be applied to the normalized service usage and rewards dataset to produce a plurality of alternative service offering normalized datasets 810. Finally, the alternative service offering normalized datasets may be compared to the normalized usage dataset according to at least one element of the datasets to determine if an alternative service offering is better than the user's current service 812. The system 100 may repeat the steps of collecting, analyzing, normalizing, applying and comparing periodically to determine on an updated basis which alternative service offering is better than the user's current service 814. Additionally, if the system 100 determines that an alternative service offering is better than the current one, the user may be alerted 818.

Figure 11:
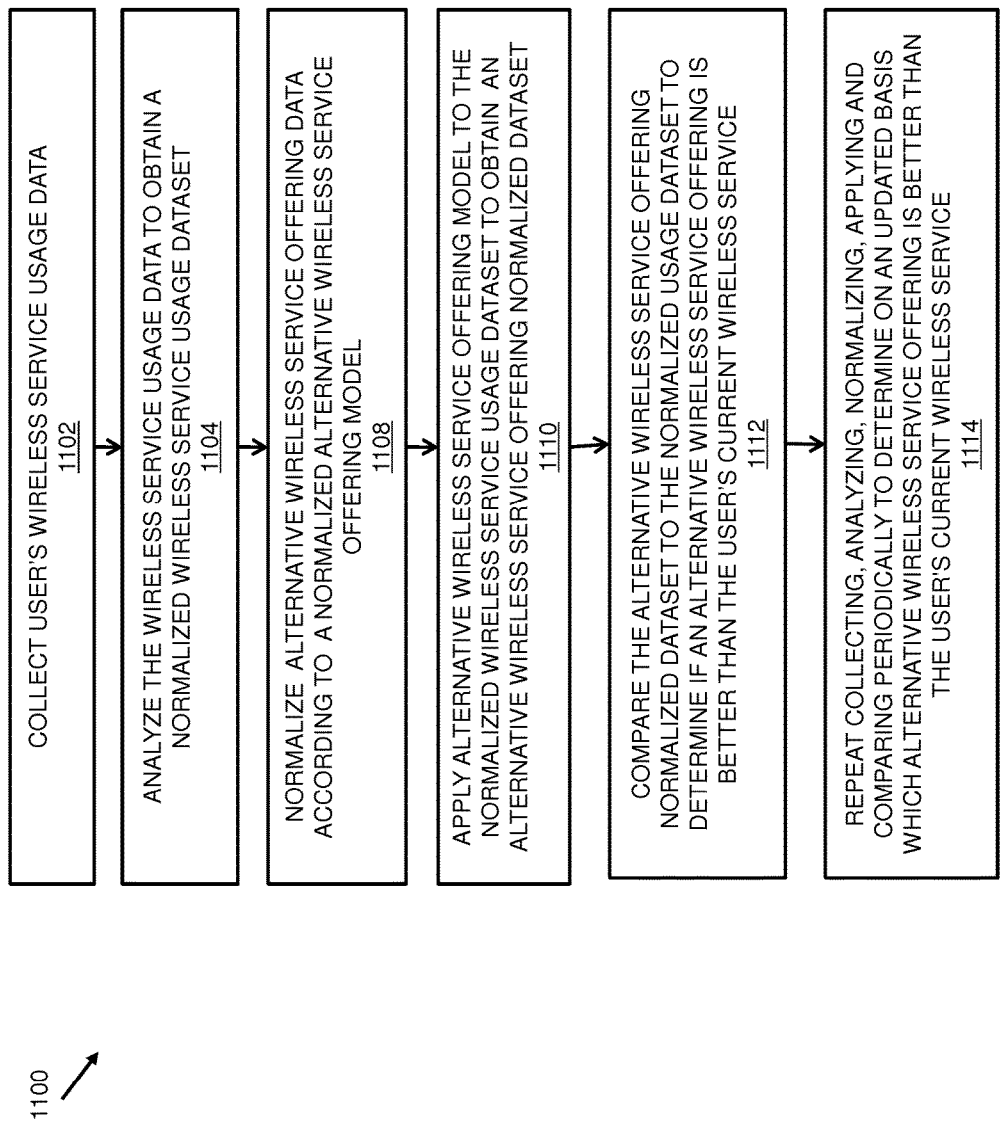
FIG. 11 depicts a flow diagram of a method for comparing alternative wireless service offerings.

Referring now to FIG. 11, a method of comparing wireless service plans based on a user's wireless service usage data may include the steps of collecting wireless service usage data for a user's current wireless service using a computer implemented facility 1102, analyzing the wireless service usage data to obtain a normalized wireless service usage dataset 1104, optionally, normalizing data related to a plurality of alternative wireless service offerings according to a normalized alternative wireless service offering model 1108, applying the normalized alternative wireless service offering model to the normalized wireless service usage dataset to produce a plurality of alternative wireless service offering normalized datasets, wherein the dataset comprises at least the cost for the alternative service offering 1110, comparing the alternative wireless service offering normalized datasets to the normalized usage dataset to determine if an alternative wireless service offering is better than the user's current wireless service 1112, and optionally, repeating said collecting, analyzing, normalizing, applying and comparing periodically to determine on an updated basis which alternative wireless service offering is better than the user's current wireless service 1114.

Figure 12:
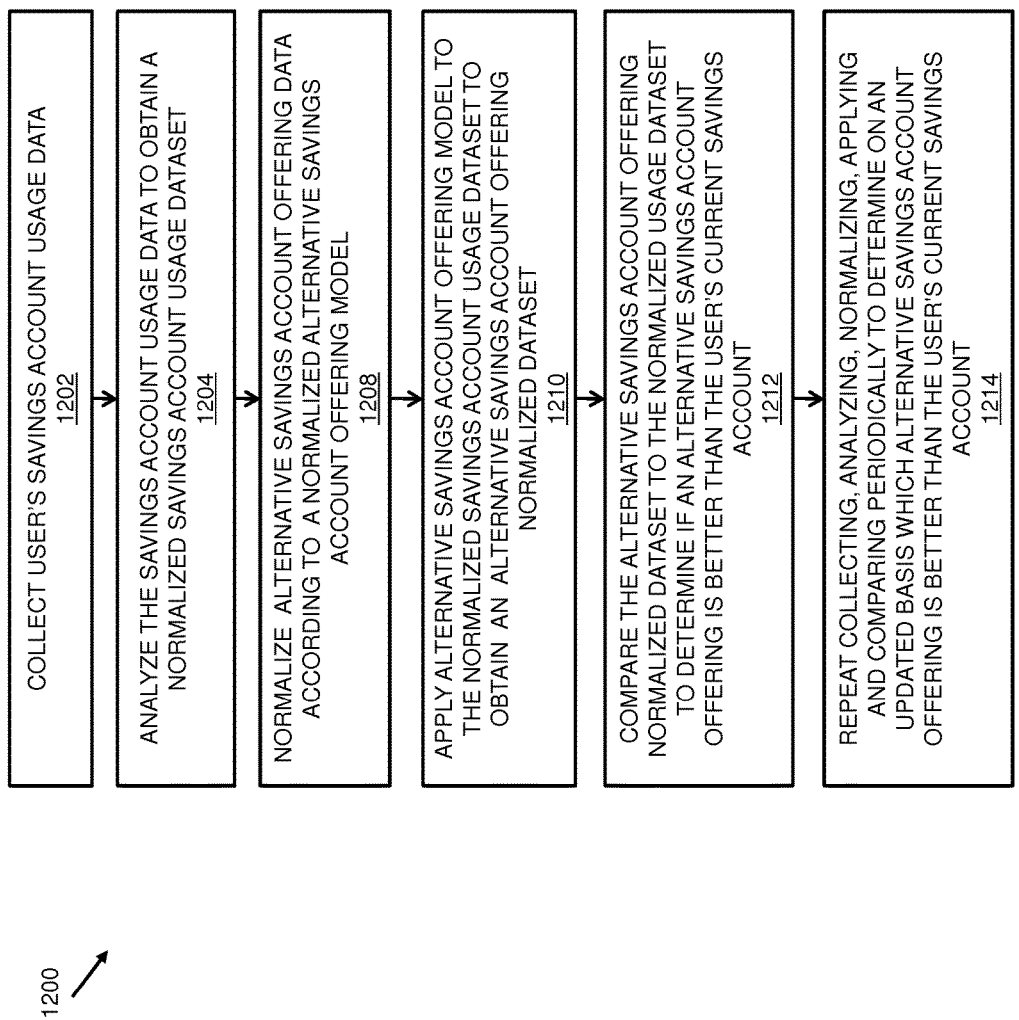
FIG. 12 depicts a flow diagram of a method for comparing savings account offerings.

Referring now to FIG. 12, a method of comparing savings account offerings based on a user's savings account usage data may include the steps of collecting savings account usage data for a user's current savings account using a computer implemented facility 1202, analyzing the savings account usage data to obtain a normalized savings account usage dataset 1204, optionally, normalizing data related to a plurality of alternative savings account offerings according to a normalized alternative savings account offering model 1208, applying the normalized alternative savings account offering model to the normalized savings account usage dataset to produce a plurality of alternative savings account offering normalized datasets, wherein the dataset comprises at least the cost for the alternative savings account offering 1210, comparing the alternative savings account offering normalized datasets to the normalized usage dataset to determine if an alternative savings account offering is better than the user's current savings account 1212, and optionally, repeating said collecting, analyzing, normalizing, applying and comparing periodically to determine on an updated basis which alternative savings account offering is better than the user's current savings account 1214.

Figure 13:
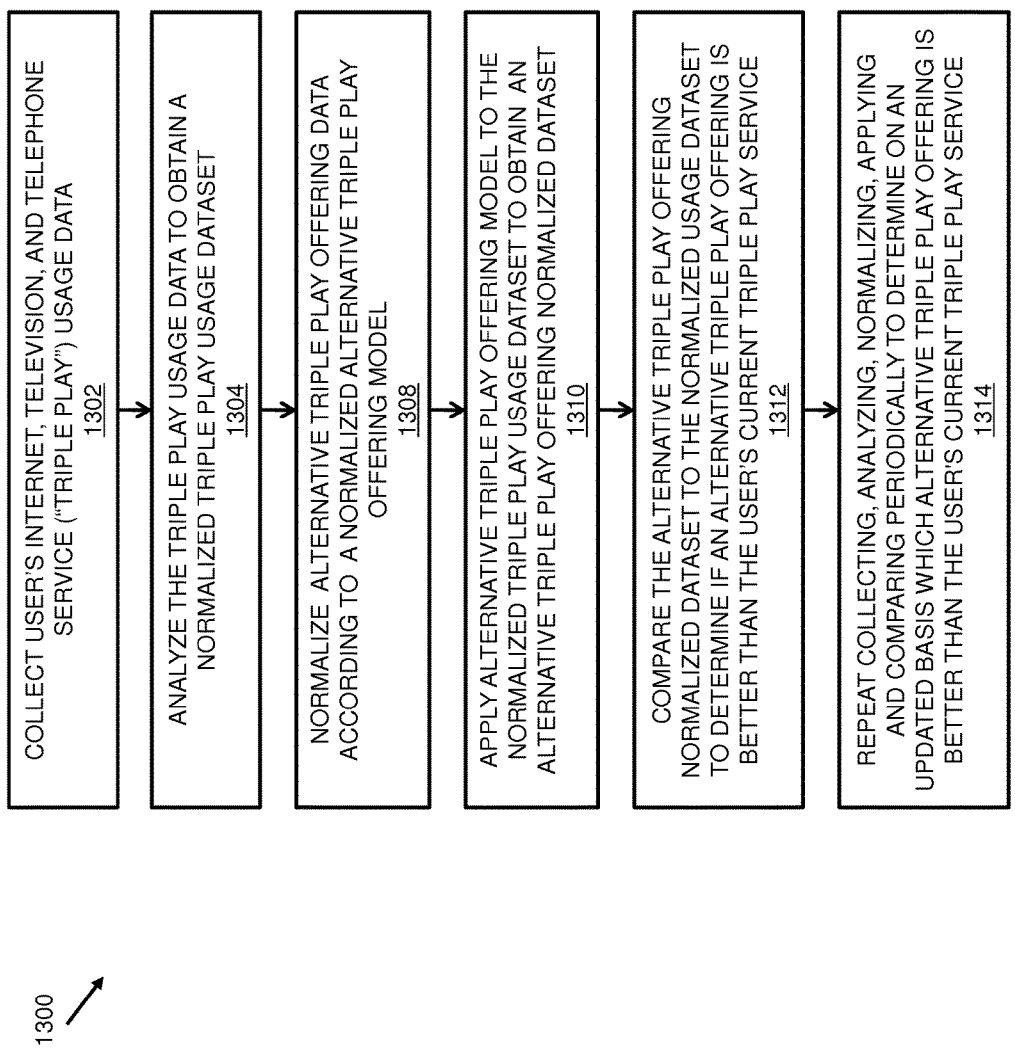
FIG. 13 depicts a flow diagram of a method for comparing internet, television, and telephone service offerings.

Referring now to FIG. 13, a method of comparing internet, television, and telephone ("triple play") service plans based on a user's triple play service usage data may include the steps of collecting service usage data for a user's current triple play service using a computer implemented facility 1302, analyzing the triple play service usage data to obtain a normalized triple play service usage dataset 1304, optionally, normalizing data related to a plurality of alternative triple play service offerings according to a normalized alternative triple play service offering model 1308, applying the normalized alternative triple play service offering model to the normalized triple play service usage dataset to produce a plurality of alternative triple play service offering normalized datasets, wherein the dataset comprises at least the cost for the alternative triple play service offering 1310, comparing the alternative triple play service offering normalized datasets to the normalized usage dataset to determine if an alternative triple play service offering is better than the user's current triple play service 1312, and optionally, repeating said collecting, analyzing, normalizing, applying and comparing periodically to determine on an updated basis which alternative triple play service offering is better than the user's current triple play service 1314.

In an embodiment, the system may be a search engine that may compare a plurality of product and service options according to the needs of the users. On the basis of past and predicted service usage of the user, the system may suggest a service plan to the user that may be appropriate for the user's requirements. In an example, the system may suggest a service plan by comparing the costs of the service plans. The costs may be the cost of the service offering. The costs may be a monthly savings over an existing service. The costs may be an annual savings over an existing service. Also, the system may periodically compare service offerings to determine on an updated basis which alternative service offering is better than the user's current service.

A user reviewing their online financial account presents an opportunity for delivery of offers, sales opportunities, and various other opportunities based on the platform 100 of this disclosure or third party applications. An executable script running on a client used to view a user financial account may enable analysis of transaction data, including bill pay entries, from the user financial account in order to provide offers or sales opportunities based on the transaction data. The executable program may be called via a single line of JavaScript embedded in the user financial account webpage. The single line of JavaScript may also be used to call, or integrate, $3^{rd}$ party or other related applications. For example, a mapping interface may leverage the capability of the executable program to analyze transaction data, match offers from an offer database, and present the locations of the offers on a map. Analyzing the transaction data may include automatically extracting merchant data, such as merchant name, merchant category, transaction category, store name, zip code, spending amounts, purchase frequency, product category, or the like. Transaction entries may be analyzed and matched against a database of offers and sales opportunities to interweave a related offer or sales opportunity. For example, in the case of a transaction description, matching to an offer may be done using natural language processing (NLP). If the transaction entry relates to a service, the analysis may indicate that an alternative offering may be available upon a more detailed analysis. A link to an alternative offering assessment interface may be provided. Alternatively, the executable program may integrate the functionality of the alternative offering assessment interface and provide an indication of an improved offering interweaved with the transaction. Analysis of the transaction data may be limited to individual transactions or may encompass all transactions on a statement, transactions from a particular period of time, transactions from a particular merchant or merchant(s), transactions of a particular nature, and the like. By analyzing transactions from a particular merchant, for example, that merchant may be able to provide offers to the user during a subsequent transaction based on past transactions. In effect, merchants can provide a merchant loyalty program implemented through the use of a transaction card associated with the financial account. Merchants may be able to track various indicia associated with this new kind of loyalty program, as well as make, update track or fulfill offers and sales opportunities through use of a merchant dashboard.

Figure 14:
FIG. 14 depicts a screenshot of a user account.

In embodiments, the platform 100 may be enabled to specifically target current customers or competitor customers as they review their recent transactions via an online or paper account statement. The account statement may be a bank statement, a credit card statement, a debit card statement, a stored value card statement, a bill payment system, and any other system for managing transactions on an account like a personal financial management system. Referring to FIG. 14, an account statement of the user is illustrated in accordance with an embodiment of integrated bill analysis. The account statement may include details and information about various transactions done by the user. In examples, the transactions may be provided for a specific period such as one month, three months, and the like. The transactions may relate to purchases done by a user at different locations such as at a departmental store, electronic store, gas station, and the like. The system of the present disclosure may assign and categorize transactions done by the users. For example, the system may categorize the stores which the user visits frequently, the minimum amount spent by the user, and the like. Further, the system may analyze the transactions done by the user.

In an embodiment, the account statements may facilitate the system to identify various merchants listed in the account statements. Thereafter, the identified merchants may be matched with their appropriate business type or category. For example, the merchant may be automatically categorized as a telephone service provider, gas station owner, a coffeehouse owner, and the like. In an embodiment, the system may notify the user of a potential savings with an alternative service plan or item. For example, the system may recommend alternative services such as wireless plans, oil and gas services, and the like to the users as per their past and predicted usage. In the statement, the user may be invited to interact with the consumer service comparison shopping system 100 to investigate whether there are indeed savings to be had with an alternative service plan or item.

Figure 15:
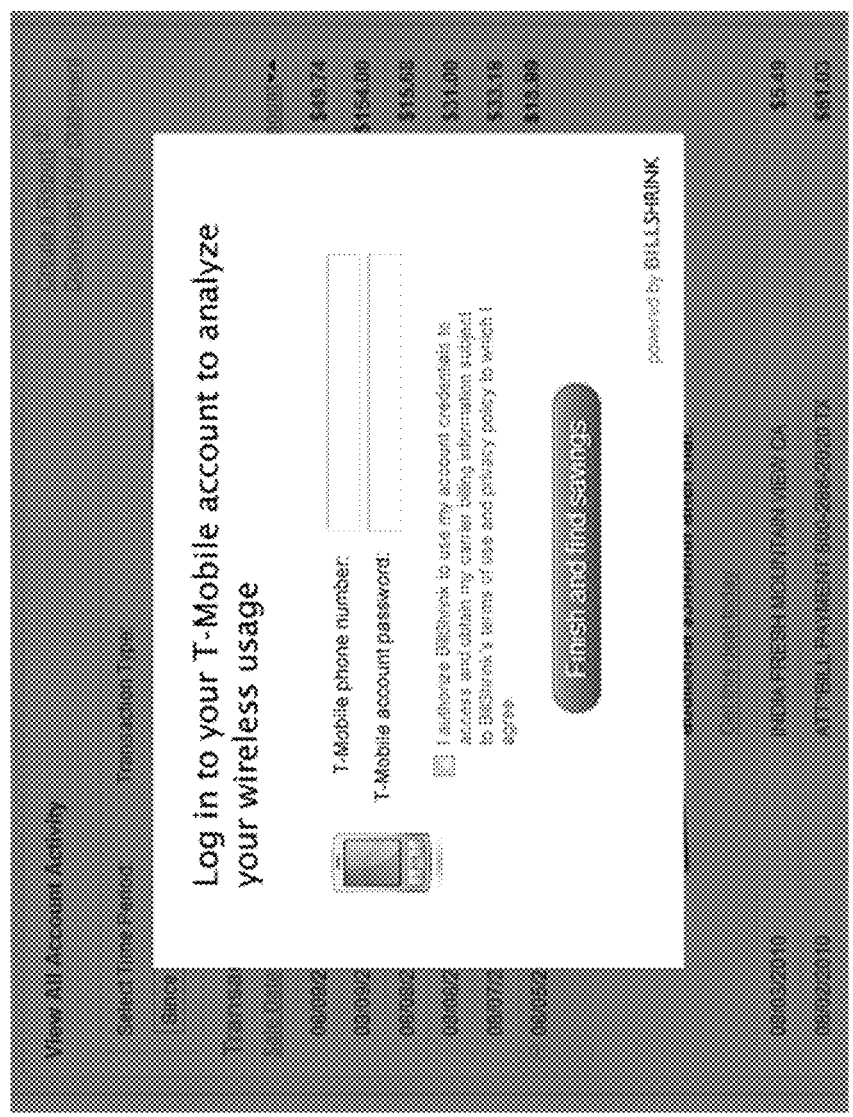
FIG. 15 depicts a wireless plan log in window.
Figure 16:
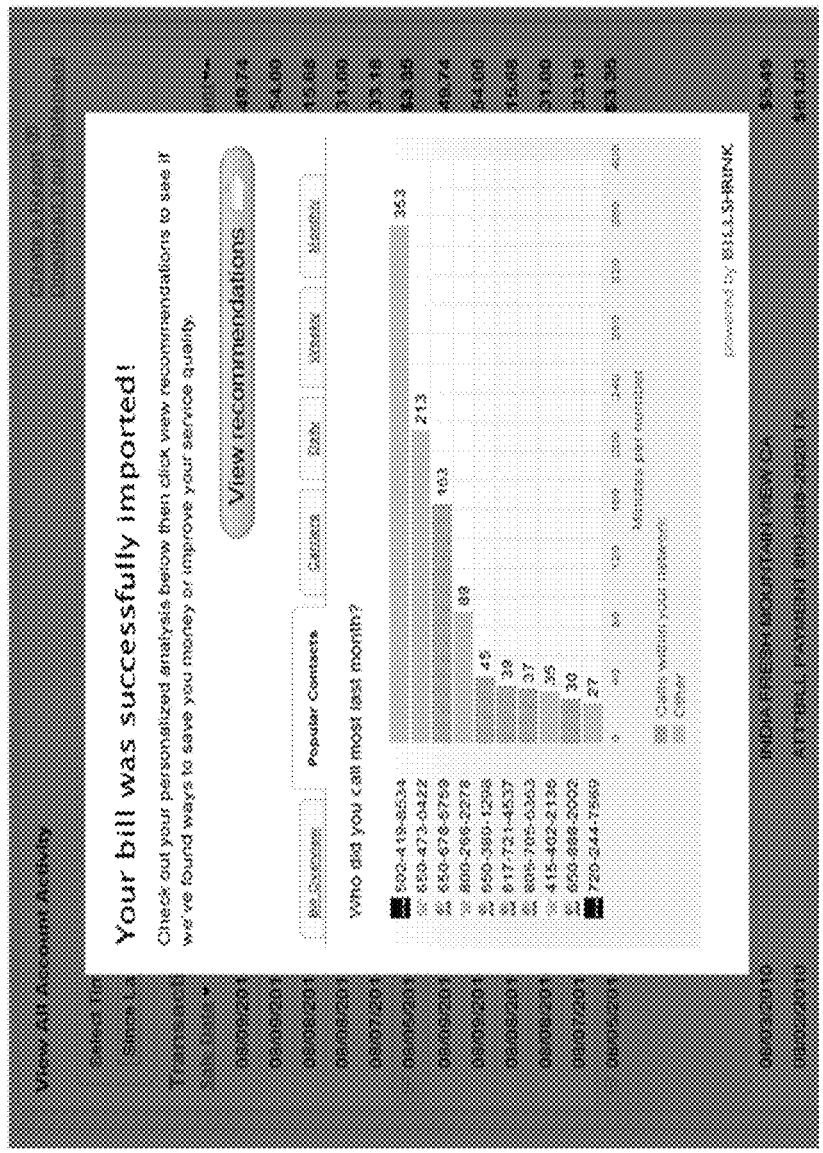
FIG. 16 depicts a data import report window.
Figure 17:
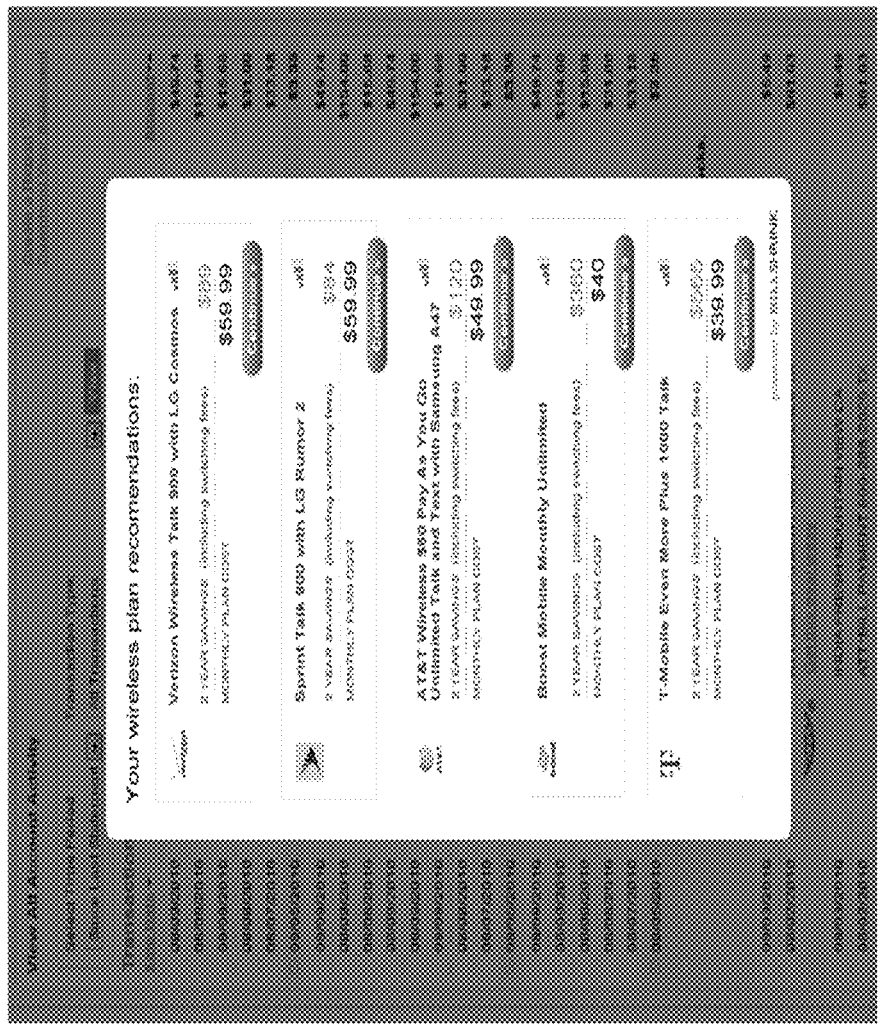
FIG. 17 depicts an alternative service plan recommendation window.

FIGS. 15-17 provide an overview of the recommendations provided by the system, in accordance with an embodiment of the present disclosure. In the example shown here, the user is attempting to determine if there are better cell phone plans available in terms of coverage, cost, quality, and any other desired factors. It should be understood that the system may be enable the user to log into any number of service plans to determine if there are better service plans available, such as television services bundled services, and the like. Continuing with this example, the system may request some information such as a mobile phone number, password of the cell phone account of the user, and the like, from the user. This information may be used for analyzing the account summary of the user. In an example, the user may provide the required information after logging into the system. Thereafter, the system may import the account summary of the user. Further, the system may analyze the cell phone bill of the user based on various aspects such as service plan currently in use by the user, calls made by the user, roaming charges paid, text messages charges, MMS charges, and the like. The system may also generate reports based on the analysis. Accordingly, in other examples, the system may collect internet, television, and telephone service usage data from the user for suggesting alternative service plans for optimizing usage by the user.

In an embodiment, the system may provide offers/recommendations based on analysis and identification of transactions made in a single account. Again referring to FIG. 16, the system may analyze a telephone bill of a user. The analysis may include a list of contacts that may be frequently contacted by the user, number of calls made, number of international calls made, number of text messages sent, and the like. In an embodiment, the system may provide recommendations to the user after analyzing the transaction details of the user. The recommendations may include different ways that may be suggested to the users for saving money. Further, FIG. 17 illustrates various recommendations suggested by the system, in accordance with an embodiment of the present disclosure. The recommendations may include the various monthly costs of the service plans suggested by the system along with the annual savings that the user may receive. In an embodiment, the recommendations may be directed to reduce the expenses incurred by the user, improve the coverage, improve the signal strength, and the like. The account statement may include an entry for a cell phone bill. The system 100 may recommend a cheaper cell phone plan that may be provided by another service provider. The offers may include discounts that may be offered by the service providers. The discount may include unlimited talk time, some minutes of free talk time, and the like. The system may also provide an estimate of average wireless savings that may be done by the user over a period of time.

Figure 18:
FIG. 18 depicts a screenshot of a user account.

FIG. 18 illustrates an account statement of a user, in accordance with an embodiment of the present disclosure. The account statement of the user may include an entry for a gasoline refill. The system may analyze the costs incurred by the user for gasoline refilling and may provide an offer for recommending a cheaper gasoline refilling station to the user along with the total savings that may done by the user. The offer may be integrated in the account statement of the user.

Figure 19:
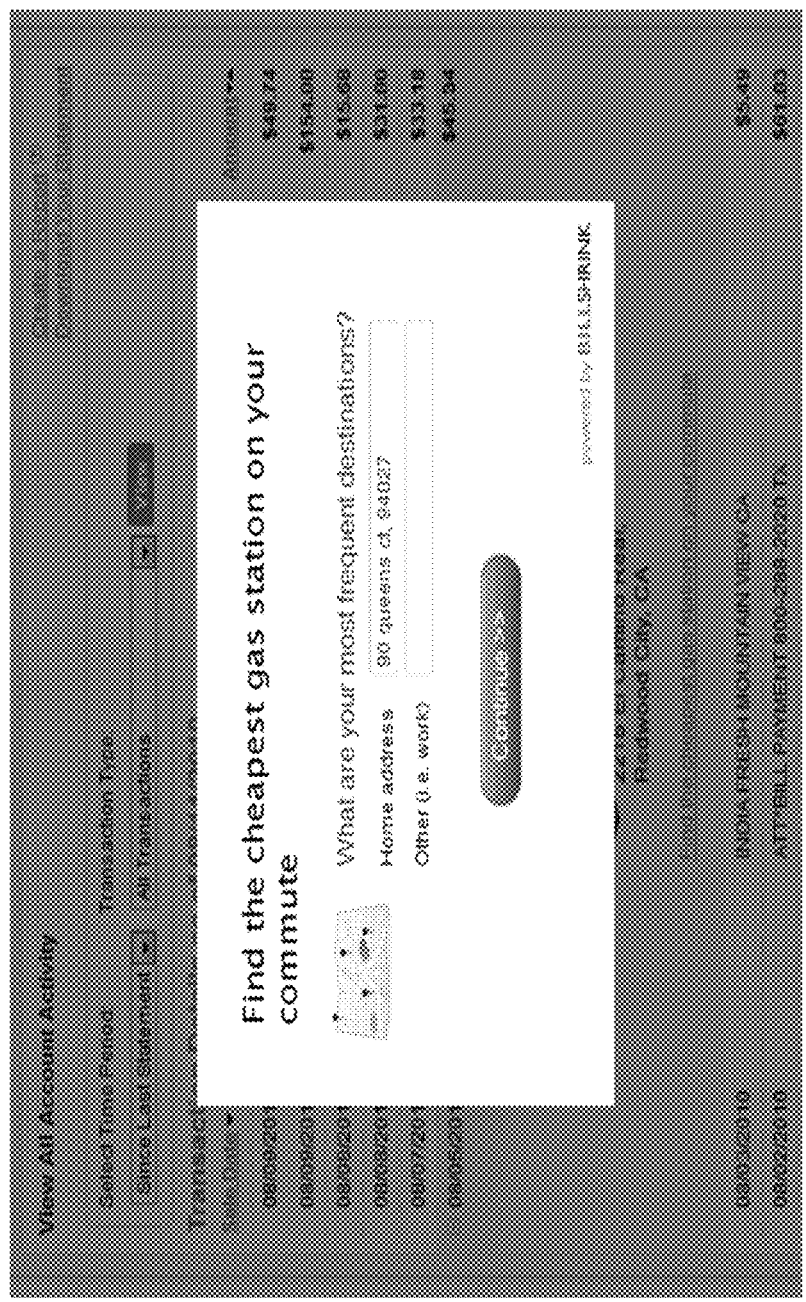
FIG. 19 depicts a data entry window for a gasoline savings application of the system.
Figure 20:
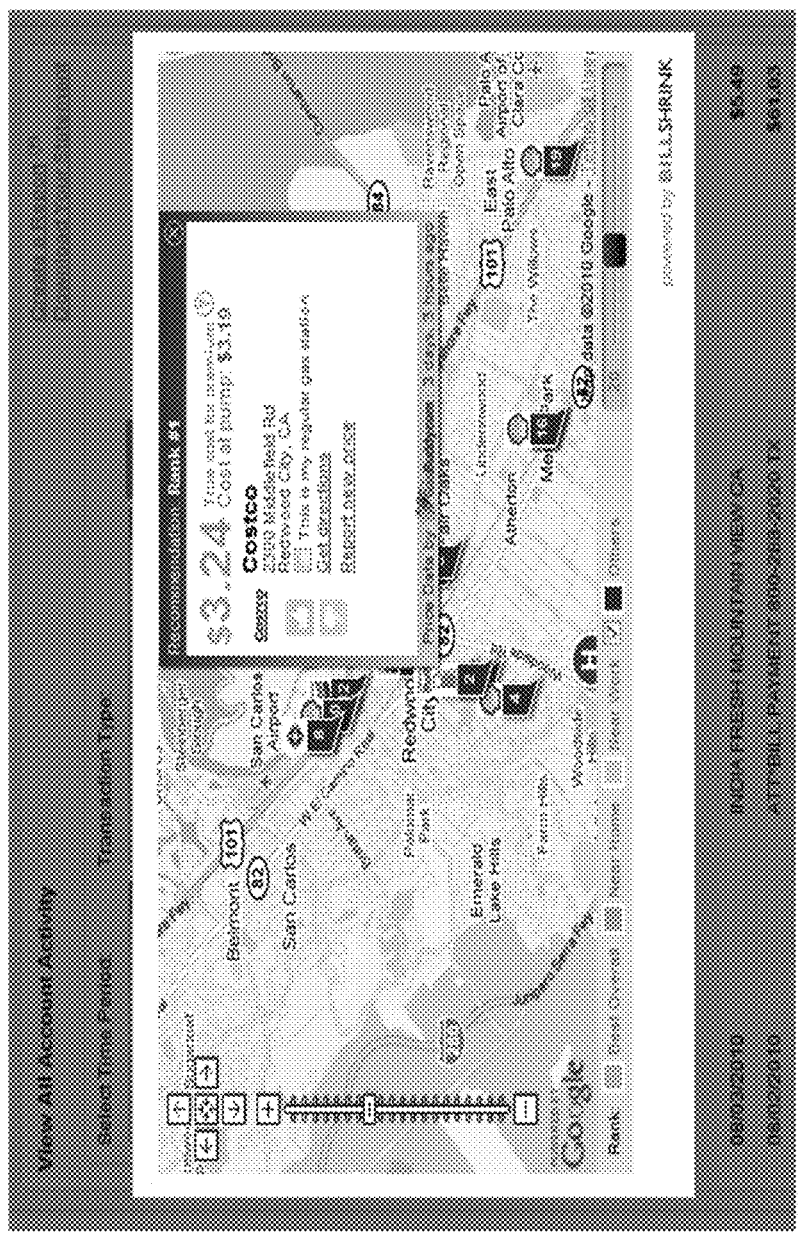
FIG. 20 depicts a map showing results of the gasoline savings application.

FIGS. 19 and 20 illustrate a recommendation option that may be selected by the user, in accordance with an embodiment of the present disclosure. The user may click on the suggested recommendation to activate them. The system may require some information such as home address, frequent destinations, and the like, from the user. When the user enters the required information, a list of recommendations may be provided to the user. Further, the recommendations may include various gas stations that come on the way to the frequent destinations of the users. The user may also view details of the recommendations by clicking on them. The details may include the address of the gas station, cost of gasoline per gallon, directions to the gas station, and the like.

Figure 21:
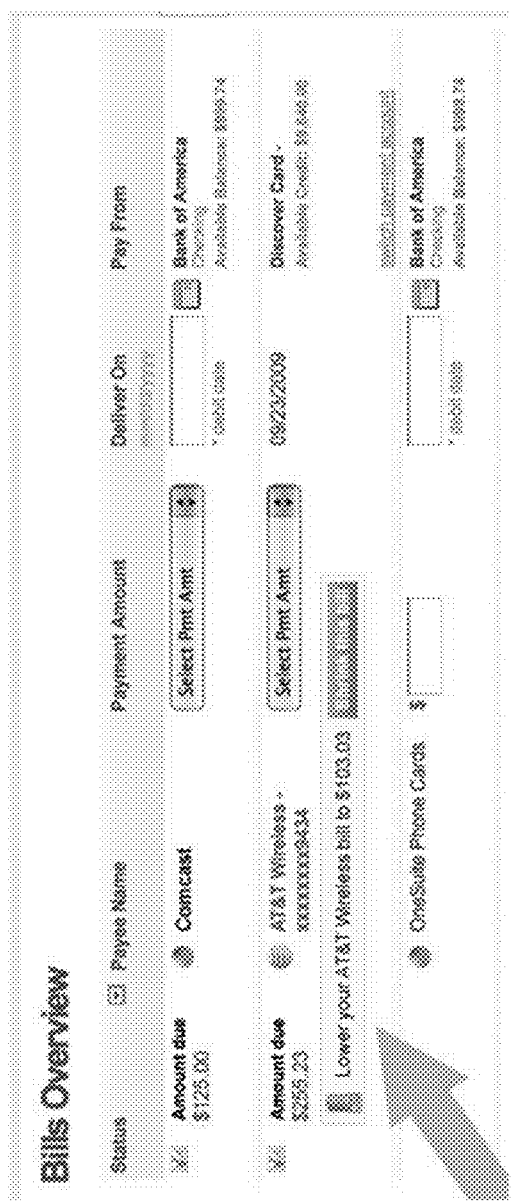
FIG. 21 depicts a screenshot of a user BillPay window.
Figure 22:
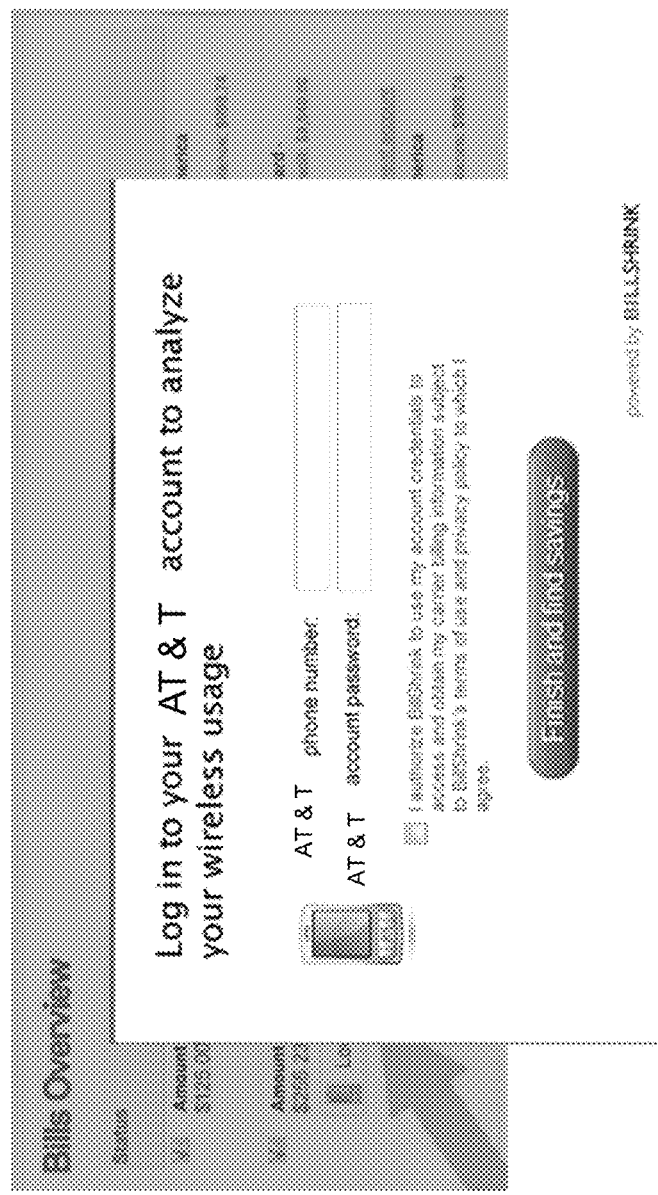
FIG. 22 depicts a wireless plan log in window.
Figure 23:
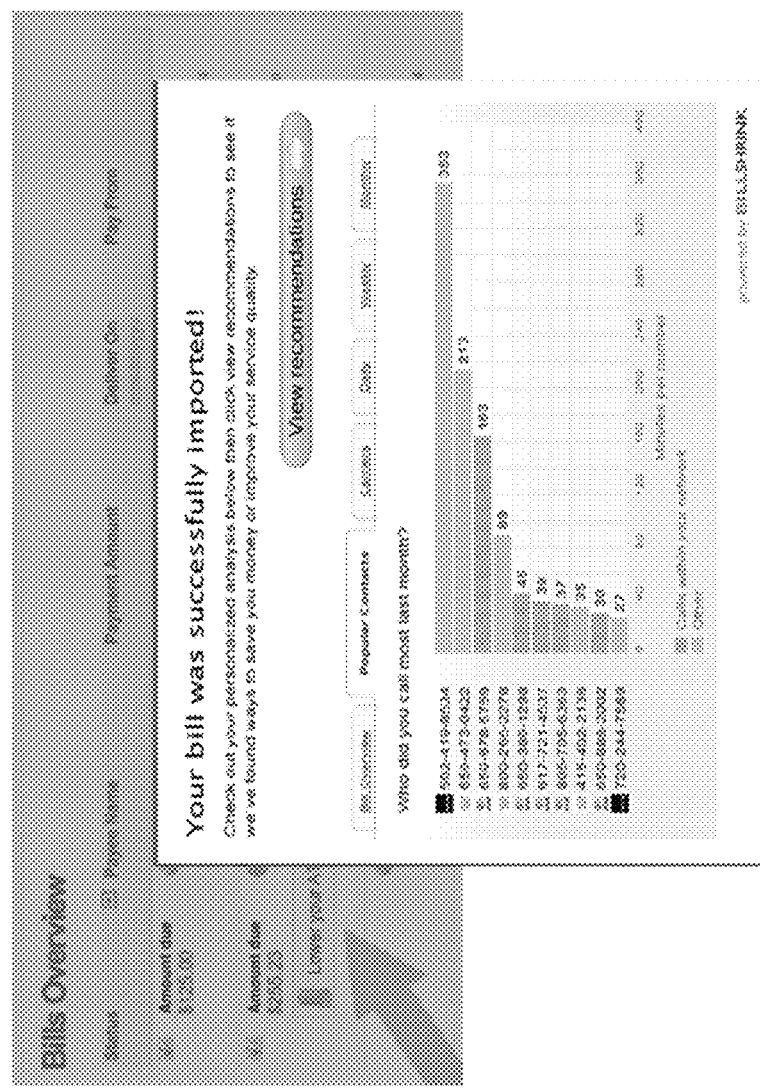
FIG. 23 depicts a data import report window.

Further, FIGS. 21-23 illustrate saving recommendations provided by the system, in accordance with an embodiment of the present disclosure. In this example, the system is integrated with a Bill Pay screen, such as in FIG. 21. The system may provide saving options to the users such as how much the user may save, which bank may offer reward points to the users, and the like along side the Bill Pay options. In FIG. 22, the user has activated the option to 'Shrink this bill'. This may launch a dialog box for logging into their wireless account to obtain the usage data needed for analysis by the platform 100. FIG. 23 depicts a screen indicating successful import of the usage data to the platform 100 and a graph showing analysis of the bill for most popular contacts.

Figure 24:
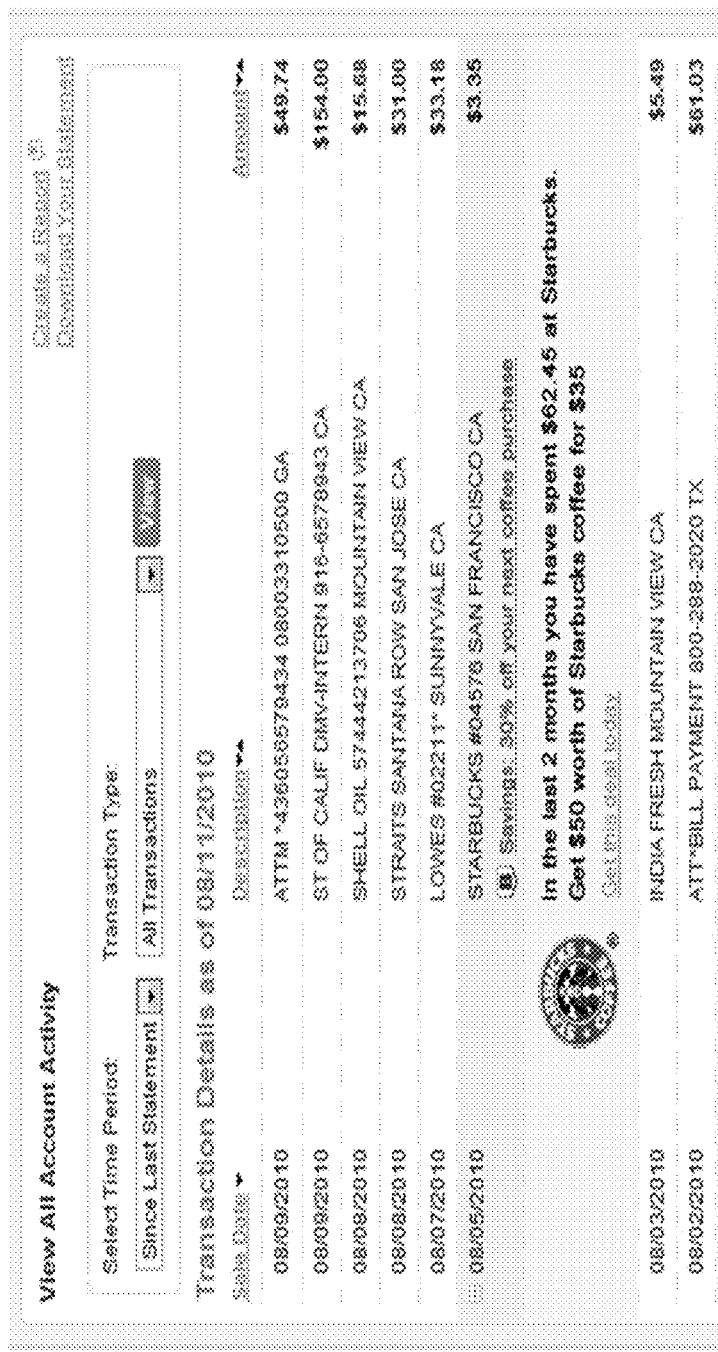
FIG. 24 depicts a screenshot of a user account.

FIG. 24 illustrates a reward being offered to the user, in accordance with an embodiment of the present disclosure. The system may offer rewards to the users based on the loyalty of the users. As shown in FIG. 24, an account statement of the user may reveal that the user have done multiple purchases from a particular store. In such cases, the store may make a loyalty-based offer to the user. For example, if a user shops frequently from a store such as Starbucks, the system may automatically enroll the user in a loyalty program. Thus, every time the users use their regular transaction card such as a credit card, a debit card, and the like, at Starbucks, the user may automatically earn loyalty points. The user may redeem the loyalty points for free products or services from that store. For example, the store may offer some discount to the user on a next purchase of the user. The system may not require loyalty cards to redeem the loyalty offers. In another example, the system 2700 may track the purchases at a particular retailer, such as STARBUCKS. Instead of having a punch card to track coffee purchases, the system 2700 may analyze a user's transactions to keep track of the purchases. The loyalty reward may be a free $12^{th}$ coffee after 11 coffee purchases. When the user makes the $12^{th}$ coffee purchase, the system 2700 may credit back the cost of the $12^{th}$ coffee to the user.

Thus, the 12$^{th}$ coffee is free and the user needed only to swipe a single financial account card to effect payment and receive the loyalty reward.

Figure 25:
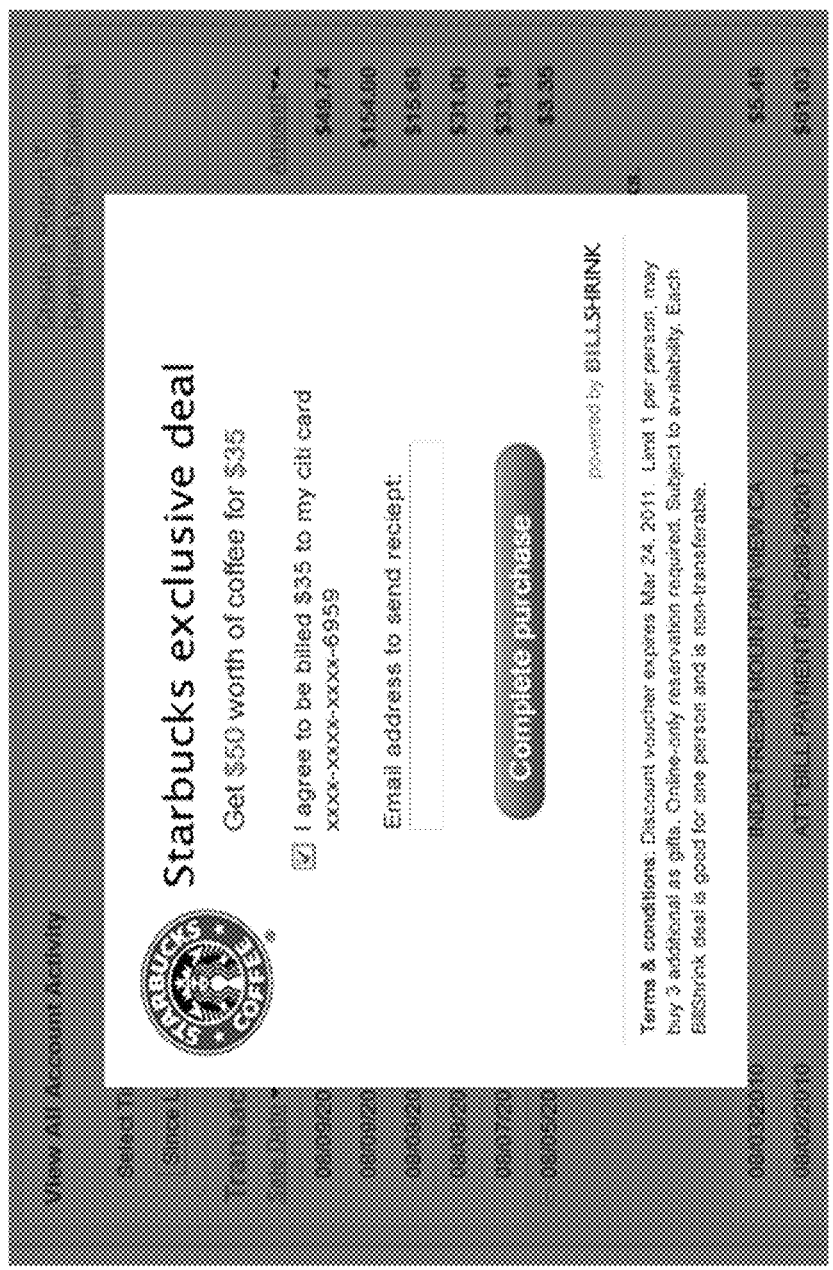
FIG. 25 depicts a deal purchase window.
Figure 26:
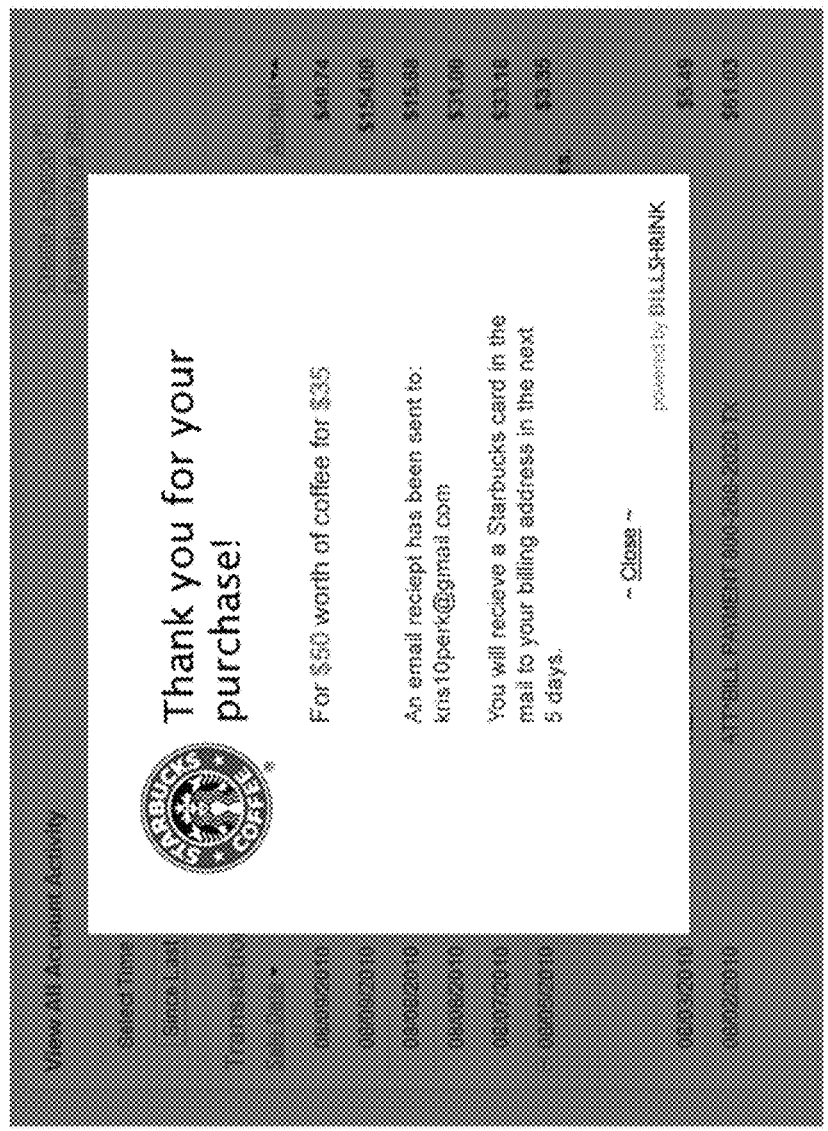
FIG. 26 depicts a receipt for deal purchase.

FIG. 25 illustrates a loyalty based offer made to the user, in accordance with an embodiment of the present disclosure. The loyalty based offer may include a coupon with validity for a limited time period such as one month, three months, six months and the like. The user may receive a confirmation receipt on accepting the offer. The offer may be available on a stored value or loyalty card, the items of the offer may be delivered or may be available for pickup at a location, such as upon presenting a receipt, and the like. In this embodiment, the loyalty-based offer is a deep discount on subsequent purchases if the user pre-pays. FIG. 26 illustrates a confirmation receipt that may be provided to the user, in accordance with an embodiment of the present disclosure. The user may receive the coupon through mail and a corresponding receipt may be sent to the e-mail address of the user.

The system may match an offer based on identification and analysis of the transactions made across multiple accounts. The offer shown to the customer may be driven by a combination of three different rules: what the merchant wants to show the customer, what the financial institutions want to show the customer, and what the customer chooses to see. These rules may be stored in a rules database of the system.

Further, the system may provide an account aggregation and other online financial services. Account aggregation may include compilation of information from different accounts, which may include bank accounts, credit card accounts, investment accounts, and other user or business accounts, into a single place. The account aggregation may be provided by online banking solution providers. The account aggregators may analyze the transaction summary of a user and may categorize merchants from it. The merchants may be categorized such as Oil & Gas, Grocery, Retail, and the like. In few cases, the merchants may not fall under any of the pre-defined categories. In such cases, the account aggregators may assign codes to such merchants.

Further, the account statements of the different accounts may be analyzed by the system. The account aggregators may analyze the transactions across all the accounts. For example, a user may charge their Starbucks purchases to a plurality of banks such as Citibank, Bank of America, and the like. The activity at Starbucks across all accounts held by the user may be identified by the account aggregator. Therefore, if a user makes a payment through any of the banks associated with the account aggregator, the user may get loyalty-based offers from Starbucks through the system. In an embodiment, the system may include a natural language processing (NLP) technology. The NLP technology is a form of human-to-computer interaction where the elements of human language, spoken or written, may be formalized so that a computer may perform value-adding tasks based on that interaction. The NLP technology may match offers with relevant and targeted transactions. For example, if a transaction statement is not clear, the system may get details about the purchases using the NLP technology. The details may include, but are not limited to, merchant, location of the store, and amount spent.

In an embodiment, the system may provide anonymity of the users. The identity of the user may not be provided to the system and the merchant. The bank may be the only one that may know the identity, however, the bank may not be provided with the information of the various offers that may be provided/redeemed to the users.

Figure 27:
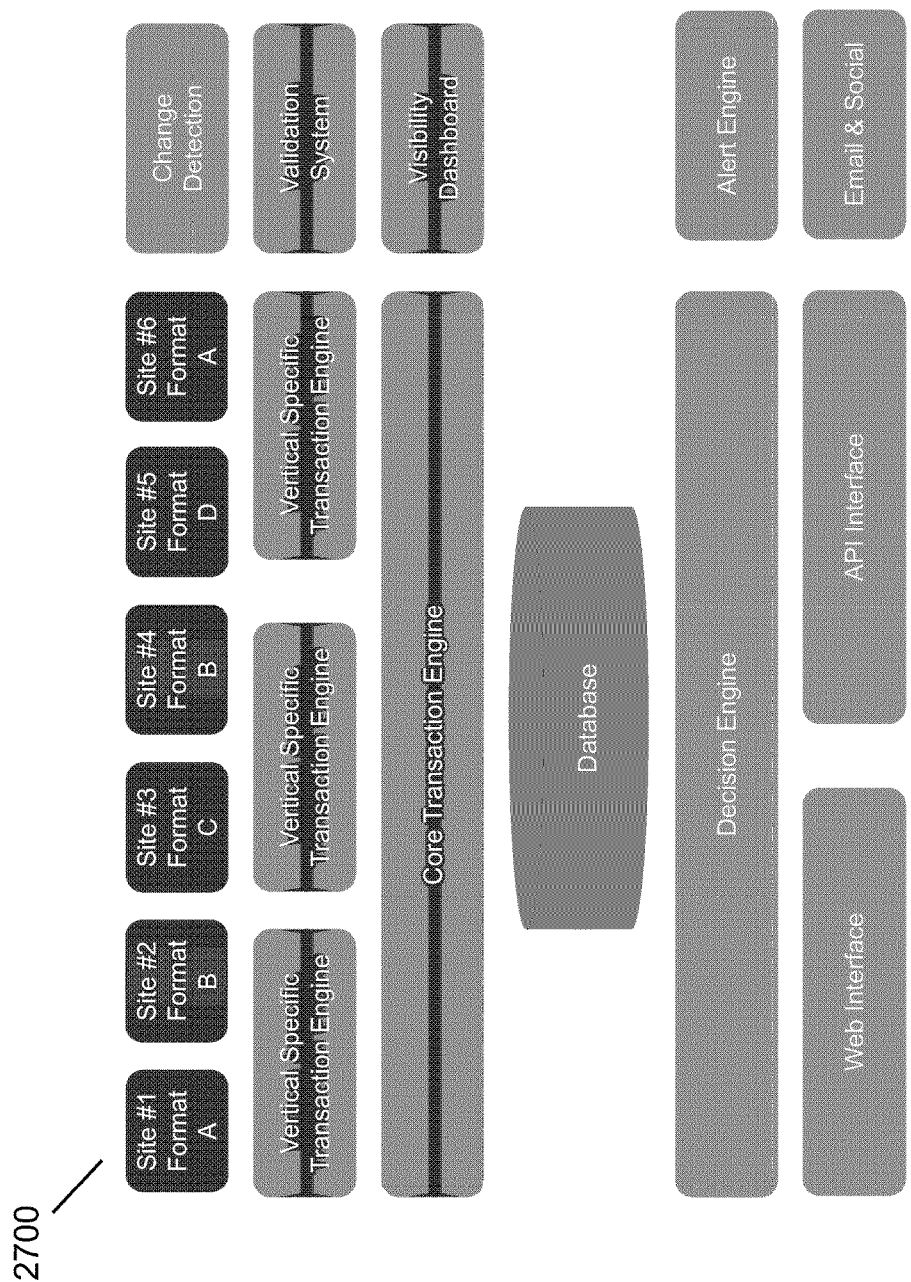
FIG. 27 depicts a block diagram of the system.

FIG. 27 illustrates a block diagram of the system, in accordance with an embodiment of the present disclosure. The system may include a user interface that may enable the users to access the system. The user interface may be embodied in a website. For example, the system may be associated with a bank having a user account. The bank may provide transaction cards such as a debit card, a credit card, a pre-paid card, and the like. In such a scenario, the user interface may be a web interface that may enable the users to access the system through the bank's website. In another scenario, the system may be a standalone program that may be used for enhancing an existing rewards system. In this scenario, the users may access the system through the user interface.

Once the users access the system, the users may enter their service usage data and preference data through the user interface. The data may include a current service provider, a current service cost, a current service usage, and the like. In an alternative embodiment, the data may be gathered automatically from the user's service provider by a transaction engine when the user logs into the user's service account. Either a core transaction engine or one of a plurality of transaction engines, such as one per merchant, may be used to gather a user's data. The service usage data provided by the user may be compared with other service usage plans that may be stored in a database of the system. Thereafter, a decision engine may suggest the service usage plan to the user that may fit as per the preferences of the user.

The service usage plan may be suggested to the user by an alert engine by sending an e-mail, a text message, an alert, and the like. Further, a dashboard of the system may also include information about the present and suggested service plans of the user. In an embodiment, if the user changes his/her preferences about the service usage plan, the system may reflect those changes and may suggest other plans as per the new preferences of the user. The system may analyze the transactions carried out by a user and may verify the details of the transactions.

The system may include an API interface. This API interface may enable users to interact with the raw and analyzed data stored in the system through any number of applications.

Figure 28:
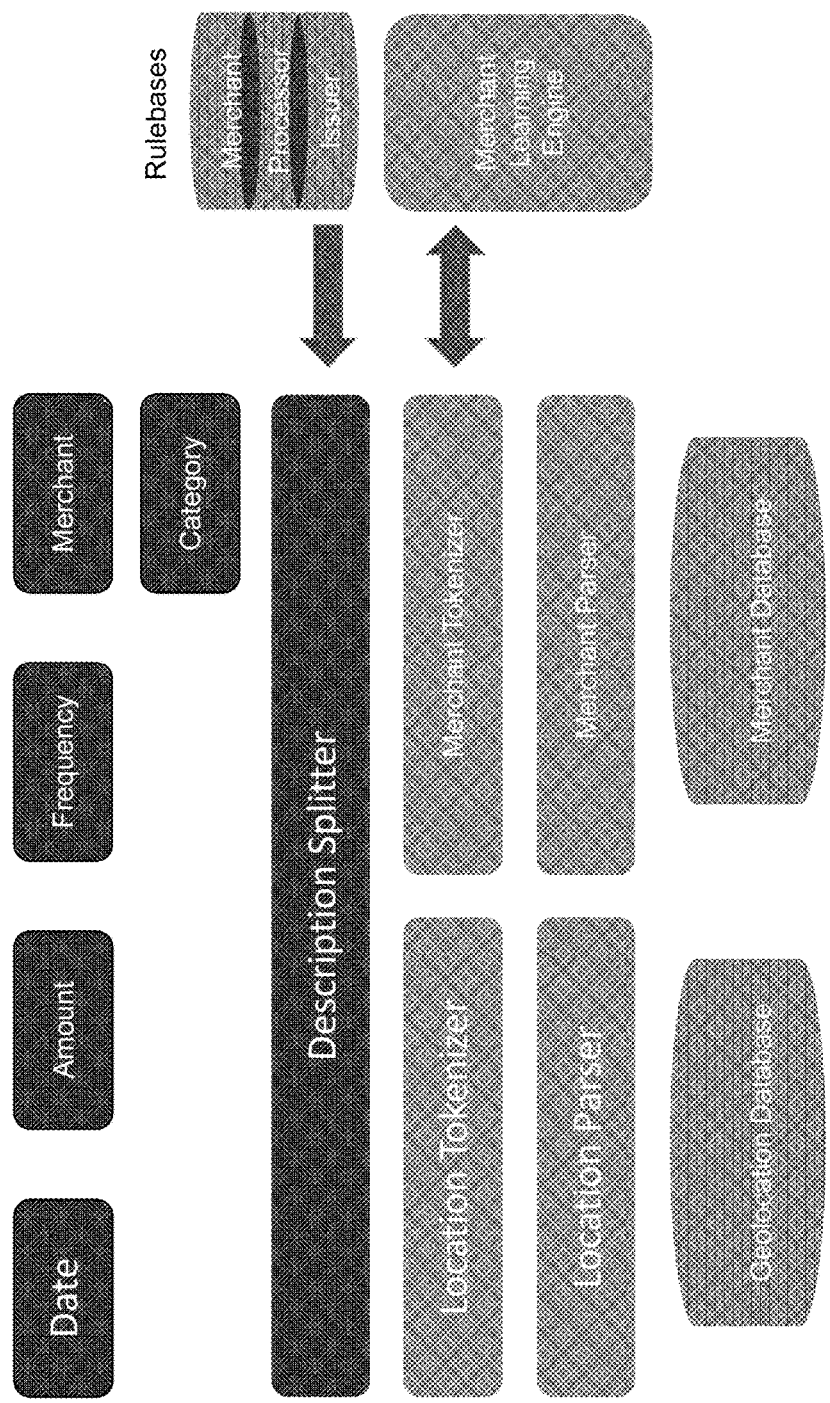
FIG. 28 depicts a block diagram of a merchant categorization system.

FIG. 28 illustrates a block diagram for matching the transactions carried out by a user, in accordance with an embodiment of the present disclosure. The system may match the transactions that may be carried out by the users. The system may include a description splitter that may segregate the information about the transactions carried out. The information may include the date of purchase, amount spent, merchant from which a product has been bought, and the like. The description splitter may include a location tokenizer that may generate a sequence of tokens that may relate to a location of the merchant. The sequence of tokens may be generated by a merchant learning engine that may suggest similar locations. The location of the merchant may be searched in a geolocation database of the system. Thereafter, a location parser of the system may parse through the geolocation database. If the location of the merchant is stored in the geolocation database, the system may match the location in the transaction. However, if the location of the merchant is new, the geolocation database may store that location for future reference.

Further, the description splitter may include a merchant tokenizer that may generate a sequence of tokens that may relate to a merchant. The sequence of tokens may be generated by a merchant learning engine that may suggest similar merchant names. The merchant may be searched in a merchant database of the system. Thereafter, a merchant parser of the system may parse through the merchant database. If the merchant is already stored in the merchant database, the system may match the merchant in the transaction. However, if the merchant is new, the merchant database may store that merchant for future reference. Further, the system may include architecture for offering rewards to the users.

Figure 28A:
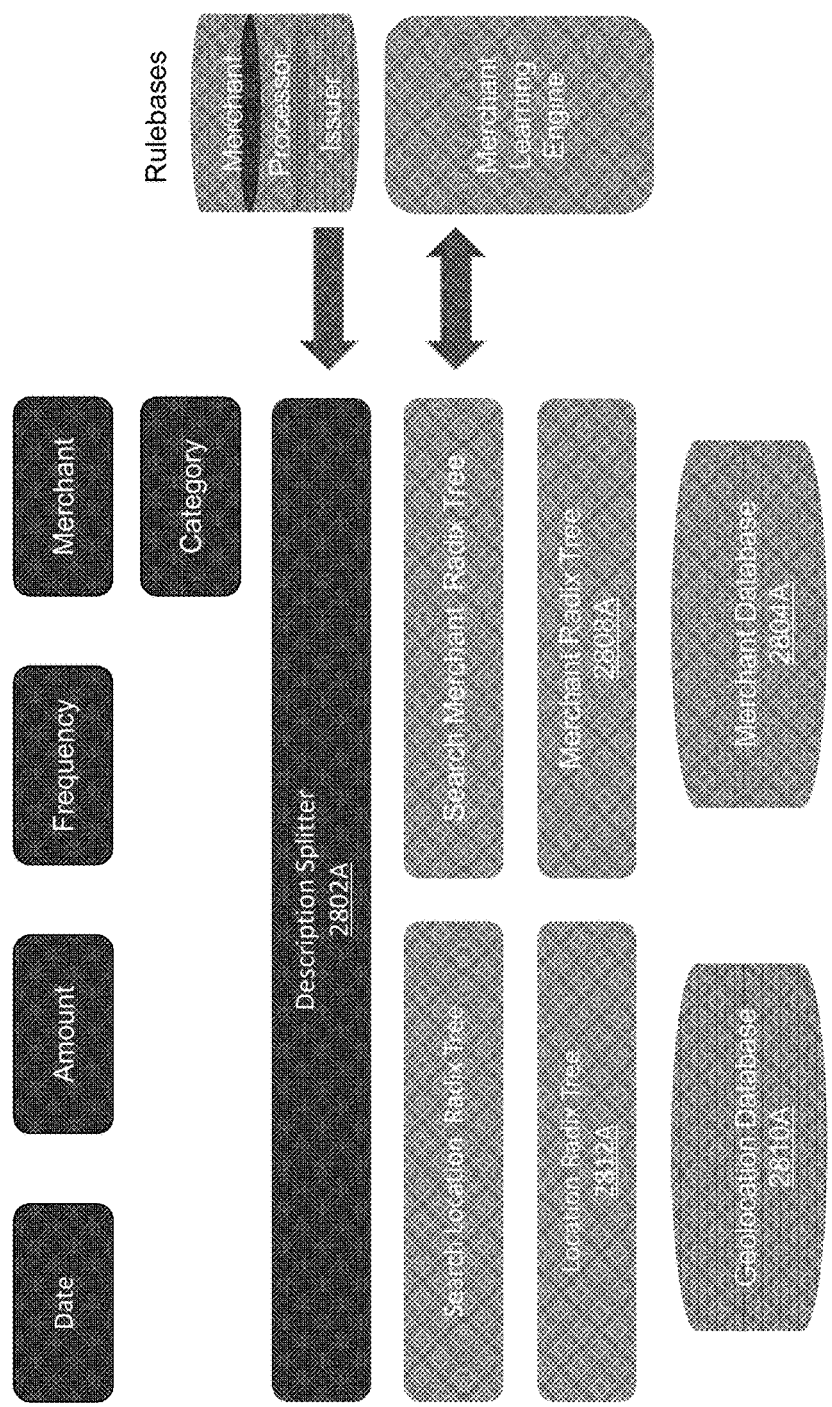
FIG. 28A depicts a block diagram of a merchant categorization system.

FIG. 28A illustrates an alternative block diagram for matching the transactions carried out by a user, in accordance with an embodiment of the present disclosure. The system may include a description splitter 2802A that may segregate the information about the transactions carried out. The segregated information may include the date of purchase, amount spent, merchant, geographic location and the like. A variety of preprocessing techniques may be used to clean the transaction description and parse it into distinct meta data such as merchant, city, state and the like. Preprocessing techniques may include a set of processing rules focused on text transition between character types such as letter to number, delimiting characters and the like.

Figure 28B:
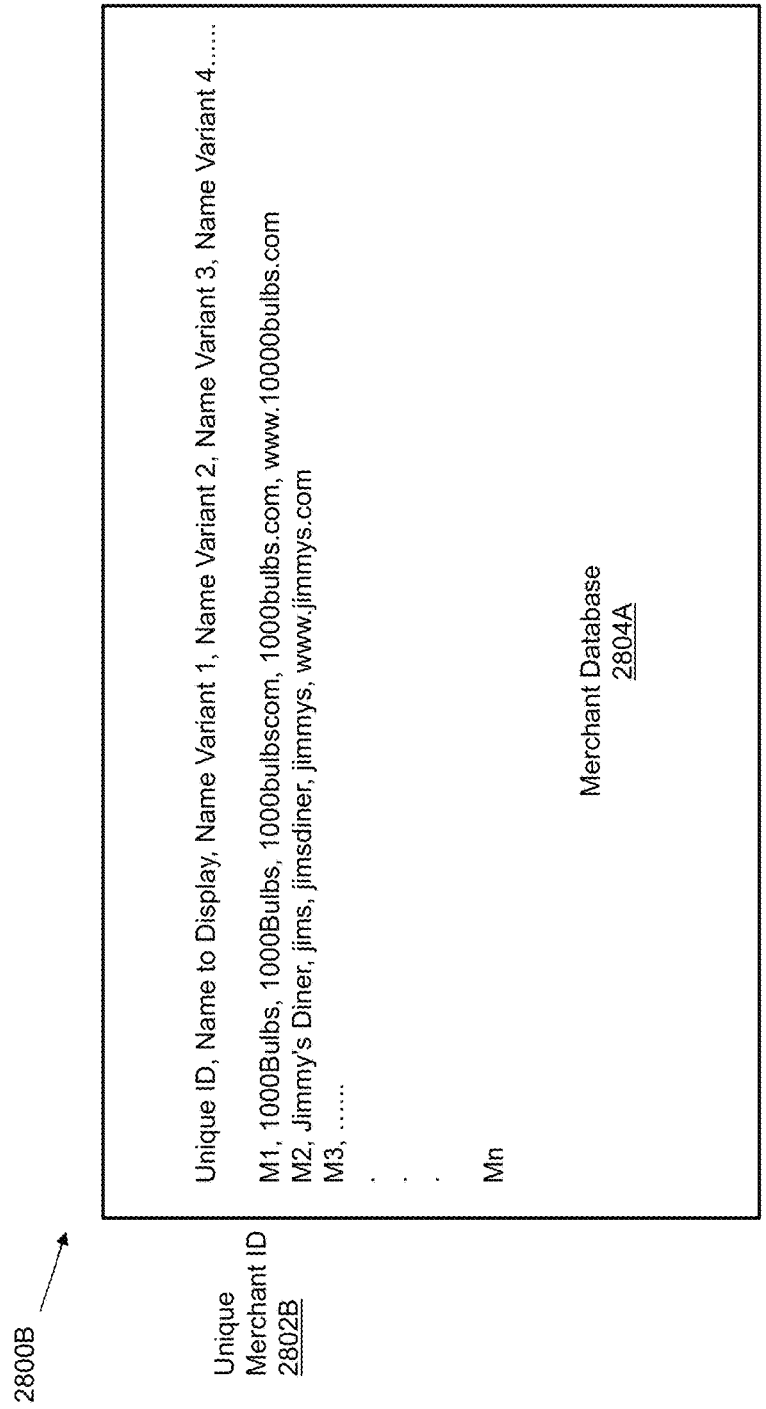
FIG. 28B depicts an example merchant database.
Figure 28C:
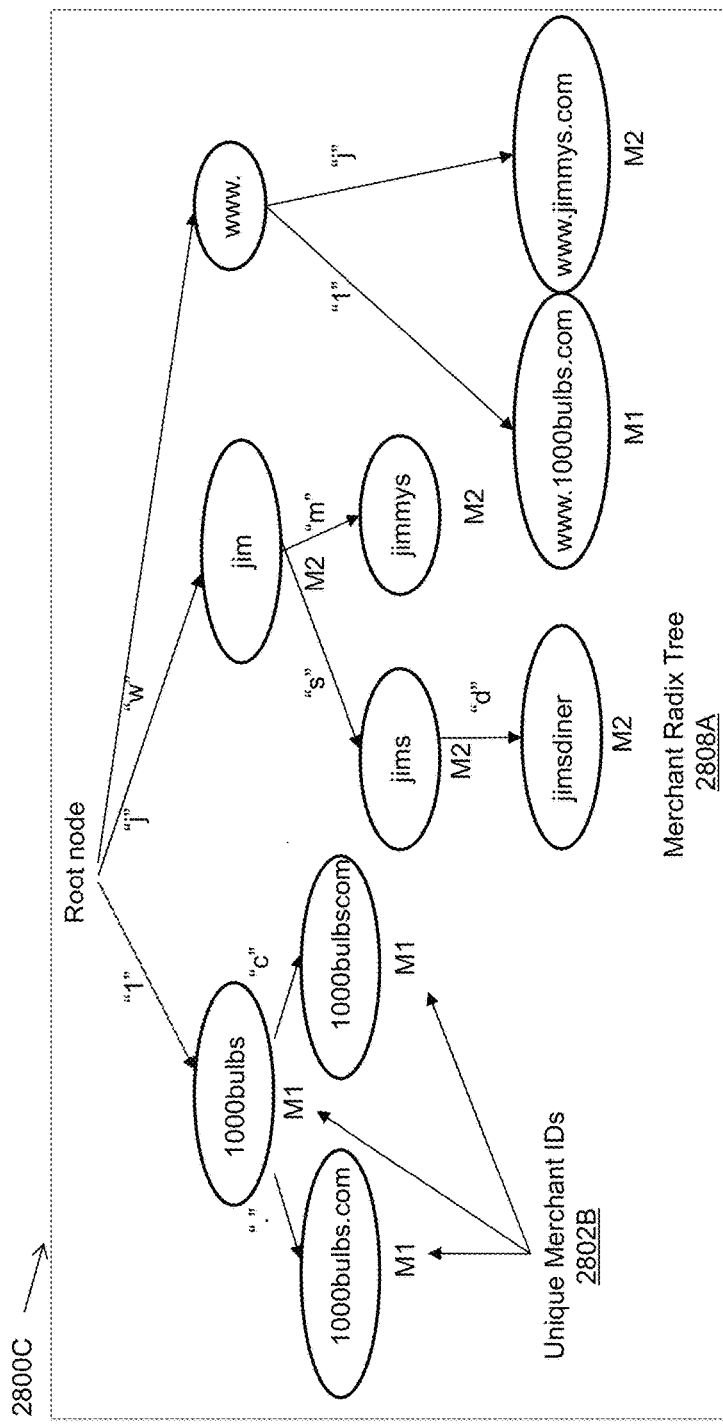
FIG. 28C depicts an example merchant radix tree.

The description splitter 2802A may extract merchant meta data, such as a representative text string or the like, for a given financial transaction. However, the textual information contained in the meta data identifying the merchant may include a partial name, typographical errors, variations on the merchant's name, truncated names and the like. It is important to correctly identify the merchant over multiple transactions to develop an accurate model of customer preferences with respect to merchants. While associating a unique merchant ID 2804C with a merchant name and its variants might be done with a large look-up table, pattern matching techniques and the like there are other data processing techniques including hash-tags, radix indices, and the like to reduce the processing time required. FIG. 28B depicts an example of a merchant database 2804A which includes a merchant unique ID 2802B for each merchant, merchant name as it is to be displayed, variations on the merchant name, and the like. From this merchant database 2804A a search tree may be created such as the radix tree illustrated in FIG. 28C. A merchant name in a transaction record will be searched upon in the Radix tree 2808A and the value, a corresponding merchant unique ID 2802B, will be obtained. Using a unique merchant ID 2802B for each merchant, irregardless of the name variant in the transaction record will allow for more accurate recording of which merchants are frequented regularly by the customer.

The search of the merchant radix tree 2808A may result in a partial match rather than an exact match between the merchant meta data and a node with an associated merchant unique ID 2802B. When a partial match is identified techniques such as thresholding, probability, confidence limits and the like may be used. The selection of a threshold level may vary depending on type of meta data such as merchant, location, and the like. Additionally, the appropriate level for the threshold may be set or adjusted using machine learning techniques such as k-nearest neighbor, any generalized linear and non-linear regression techniques, SVM, and the like. In one embodiment, the percent to which the merchant meta data text matches one of the nodes in the merchant radix tree is compared to a percent match threshold level. If the percent match exceeds the threshold, the merchant is given the unique merchant ID 2802B associated with the node. If the percent match falls below the threshold a variety of actions may occur including the creation of a new merchant unique ID 2802B and entry into the merchant database, the assignment of the transaction to a "miscellaneous" merchant, and the like. Additionally, the machine learning techniques may be augmented with manual feedback and corrections as needed.

Figure 28D:
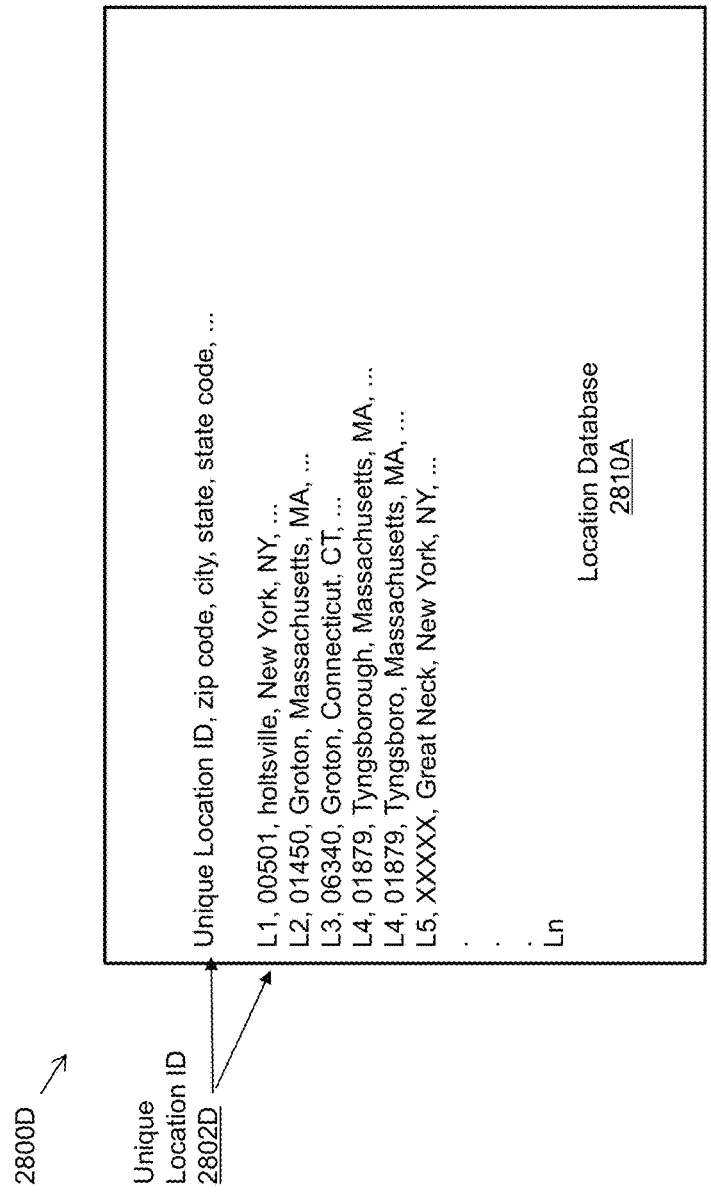
FIG. 28D depicts an example location database.
Figure 28E:
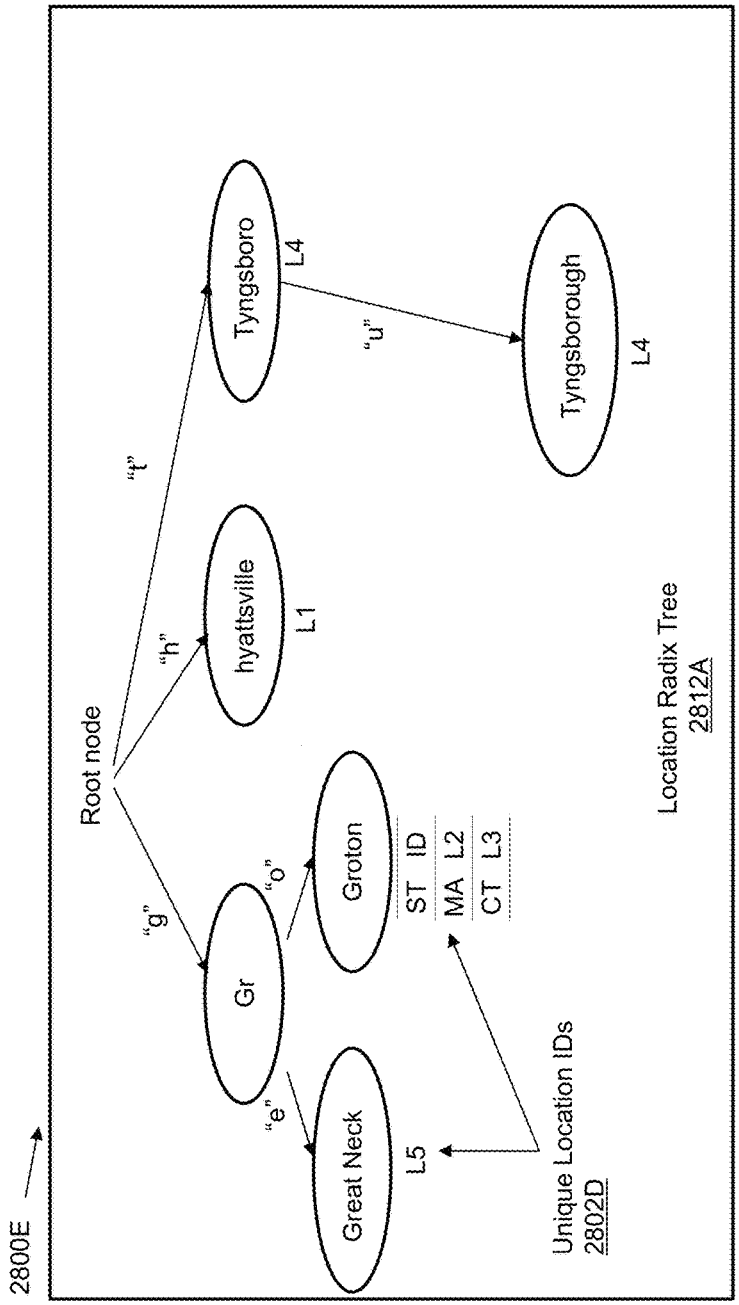
FIG. 28E depicts an example location radix tree.

As illustrated in FIG. 28A the description splitter 2802A may extract the geographic location of the transaction. However, the information identifying the geographic location may include city, state, country, address, zipcode, and the like. As with the merchant information there may be partial names, duplicate city names, typographical errors, variations on place name, and the like. Different transactions may contain the geographic information to a varying degree of specificity. However, the degree to which the geographic location of a transaction may be consistently identified enhances the ability to fine tune offers based on geographic location. FIG. 28D depicts an example of a location database 2810A including a location unique ID 2802D, zip code, city, state name, state code and the like. From the location database 2810A a location search tree may be created such as the radix tree illustrated in FIG. 28E. A city name in a transaction record may be searched upon in the Radix tree 2802E. Once an adequate match for the city name is found it may be necessary, where there are duplicate city names, to utilize additional geographic information including state name, state or zip code to reduce location ambiguity and identify the corresponding location unique ID 2802D. Using a unique location ID 2802D for each location, irregardless of the name variant in the transaction record will allow for more accurate recording of which locations are frequented regularly by the customer.

It is an object of this disclosure to enable a scalable process for extracting customer transaction data. It is known in the art that processing time may increase as the size of the data set to be processed increases. An example of this may be the increase in time required by typical classification algorithms to classify data as the classification set increases. Given the very large sets of financial transaction data contemplated it is desirable to use algorithms that do not vary in time with size of data set such as those using constant-time lookup data structures, and the like. However, these constant-time lookup data structures require classified data as input to their construction. A method of generating the constant-time lookup data structures may include using one or more training sets of transaction data together with a Radix classification method, or the like to create constant-time lookup data structures.

Figure 28F:
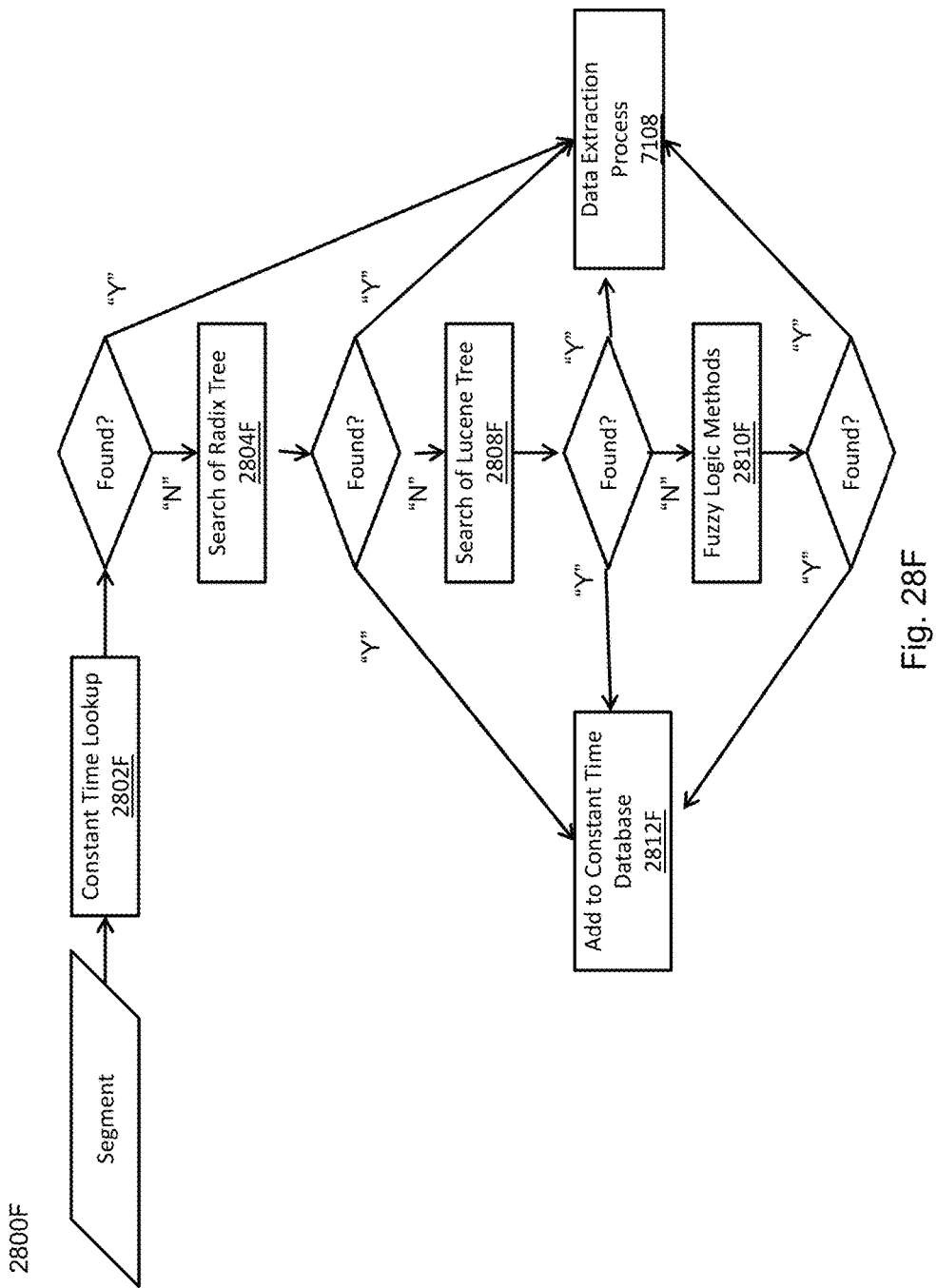
FIG. 28F depicts an example of multilevel classification.

FIG. 28F illustrates a workflow for minimizing overall elapsed time required by data extraction processes 7108. Once the financial transaction data has been split or segmented, a segment may be sent through a corresponding constant-time lookup data structure 2802F to assign a unique ID. If there is no match for the segment in the constant-time lookup data structure 2802F, the data extraction process 7108 may return an unknown or miscellaneous ID. Additionally, the segment may then be processed by conducting a search of a corresponding Radix tree 2804F, or the like. If a match is found, a unique ID may be assigned to the transaction, the data extraction process 7108 may continue, and the match may also be processed for addition to the constant-time lookup data structure 2812F. If a match is not located using the Radix tree search 2804F the segment may then be processed using an inverted index strategy such as a Lucene classifier 2808F, or the like. If a match is still not found, additional fuzzy text search methods 2810F including techniques such as fuzzy distance measures to get a closeness measure of the transaction string and appropriately chosen cutoff values for the closeness measure may be used. The more robust data classification techniques described including Radix tree search 2804F, Lucene classifier search 2808F, fuzzy text search methods 2810F, and the like may be done asynchronously to the data extraction process 7108 to enhance the time-constant database by adding new constant-time lookup data structures.

Figure 29:
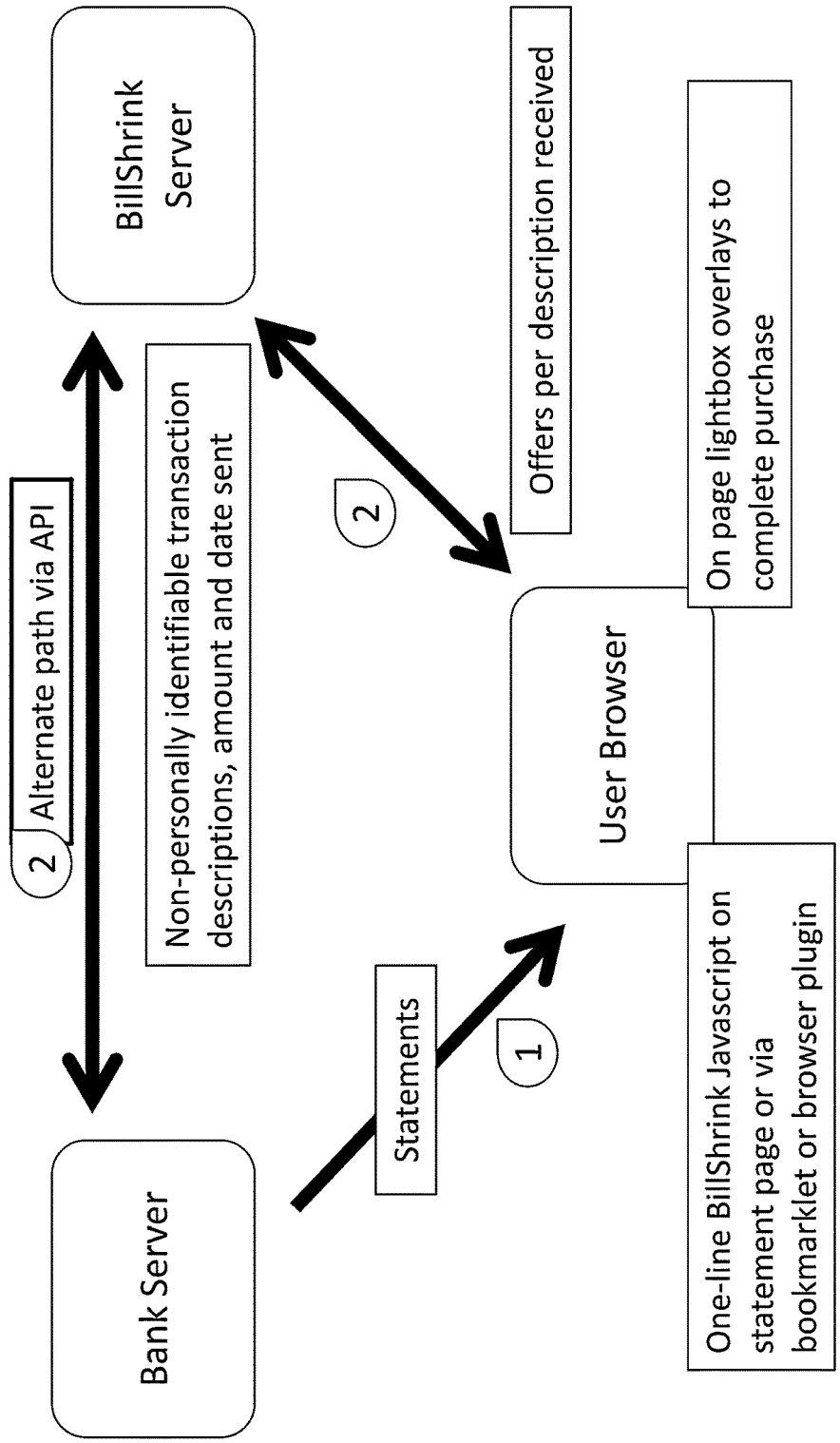
FIG. 29 depicts a method of the system.

FIG. 29 illustrates a block diagram for delivering rewards to users, in accordance with an embodiment of the present disclosure. As mentioned herein, the system may be accessed directly through an Application Programming Interface (API) or may be accessed through a financial institution's website. For example, a consumer may receive online account statement that may include some offers suggested to the user. These offers may be integrated in the account statement, such as through a JavaScript™ code. Alternatively, the offers may be linked to the account statement of the user by using a bookmarklet, a browser plug-in, and the like. The user may click on the offers to activate them. In another embodiment, the user may access the system through a user interface. The user may enter information about service plans being used by the user. The system may, in turn, provide offers based on the information entered by the user. An account server of the financial institution where the user may have an account may be unable to determine some transaction details. The account server may send such information to the system such as the amount spent during that transaction, date on which the transaction was done, and the like. The NLP technology of the system may enable the system to get details of the transaction carried out by the user and may be sent back to the account server.

The system of the present disclosure may provide automatic offer redemption to the users. The users may be informed about the various offers that may be applicable as per their account statements. Once the users have subscribed to the services offered by the system, the system may automatically provide various saving offers to the users. Further, the system may provide various offers to the users through multiple channels such as through short message service (SMS), e-mails, and the like. The banks may offer some rewards for the users for using their transaction cards while shopping. Therefore, when a user purchases some items using a transaction card, rewards may be automatically applied to the account associated with the transaction card.

In an embodiment, an offer may be redeemed by clicking on a link that takes the user to a special page that includes a discount for an online purchase. In another embodiment of redemption, a user may use a coupon code, either one-time or multiple use, at an online or offline location to gain discount. In another embodiment of redemption, a user may receive a prepaid instrument of some kind, such as a prepaid debit card, prepaid credit card, gift card, and the like, that can be used to redeem the discount. In another embodiment of redemption, the user may receive a credit on the statement automatically post purchase. In this embodiment, the user may receive an automated discount when a purchase is made or a discount that is applied off of a prior pre-purchased amount.

In an exemplary embodiment, the offers may be included in the account statements of the users. For example, if a user receives the account summary of a bank as a paper statement, the paper statement may include offers that may be printed below the expenses mentioned in the bank statement. In this example, if a user has spent some amount for paying internet bills, the system may provide information about other internet plans as per the requirement of the user.

Further, the system may provide offers/suggestions integrated in an electronic account statement of the user. The system may include a bookmarklet that enables displaying offers/rewards in-line with the transaction history of the user. The bookmarklet may be an applet that may be integrated with the browser to show in-line offers when a bank website, that may have the user's account, may be accessed. The applet may be a uniform resource locator (URL) of a bookmark in a web browser or the applet may be a hyperlink on a web page. The bookmarklet may enable the system to provide real-time analysis of the expenses incurred by the user. In an example, a user may wish to compare other product and service options against the analysis of the user's expenses. The real-time analysis may enable the user to find whether the user is over spending on various expenses or not.

Financial institutions including banks, credit unions, credit card companies, and the like may have an interest in providing their customers with value added services. The specifics of the value added services, which may vary among financial institutions, may include some of the systems described herein including user dashboards, customer offers, purchase insights, statement insights, fraud detection, and the like. These value added services may require access to customer anonymized financial data, while at the same time, the financial institutions may have an interest in controlling access to customer financial information due to security concerns, privacy concerns and the like. Described herein is a system where a single point or limited access is made available at the financial institution. This point of access may provide the financial institution with access to a centralized platform, similar to an app store, which may host select financial applications and the like. A financial institution or individual customers may be able to easily select and configure a plurality of desired value added services while access to the financial institute by the plurality of applications is limited. Additionally, this single point or limited access point may act as a conduit for outgoing anonymized customer financial data and incoming insights provided by the value added services. The use of single point or limited access enables greater ease including in the configuration and incorporation mechanisms to verify, validate, filter, execute and the like the value added services. Access to the centralized platform of applications may be on the financial institute dashboard, the user dashboard, the financial web site, a separate application, and the like.

The centralized platform, or application store, may be hosted by a provider of financial service analytics. The provider of the centralized platform may receive the customer financial data from the financial institution. The provider of the centralized platform may allow $3^{rd}$ party applications on the centralized platform. The provider of the centralized platform may act as a gate-keeper between one or more $3^{rd}$ party applications and one or more financial institutes to limit the exposure of customer financial information to that needed by the $3^{rd}$ party service provider. The provider of the centralized platform may vet the service results to assure high quality financial service applications for the financial institutions and their customers.

In an embodiment, the services offered by the system of the present disclosure may be accessed through a JavaScript code. The financial institutions that may be associated with the system may include a single line of the JavaScript that may be added as per their requirement into the account statement page of the user's account. For example, the system may allow advertiser's to create targeted offers that may be delivered through the user's online account statements. The advertiser's may target the users based on many criteria such as zip code, store name, store category, transaction description, purchase frequency, spending amount, and the like.

In embodiments, there may be multiple possibilities for delivery of the rewards. For example, as mentioned herein, JavaScript integration may occur via a financial institution, aka partner, adding JavaScript to online account pages targeted for display of rewards. The system or the partner may host the JavaScript. In another example, push API integration may be used. Here, the system exposes its API to a partner that pushes transaction data to the system, keyed to specific user IDs. This allows the option to push transactions at fixed intervals (batch mode) or preferably upon event (real-time mode). In another example, pull API integration may be used. In pull API integration, a partner may expose its API to the system. The system may request transaction data associated with specific user IDs. The frequency of requests per-user may be done at agreed-upon intervals. In another example, batch transfer, where a partner pushes transaction files to a secure FTP area (hosted by the partner or the system) may be used. The frequency of updates may occur at agreed-upon intervals, such as hourly, daily, and the like. In yet another example, processor integration may be used, where the system integrates directly via an issuer processor to get real-time transactions via authorizations at the merchant processor. In any of the integration methods, integration may provide just the user interface, just the transaction data, or a combination thereof.

Figure 61:
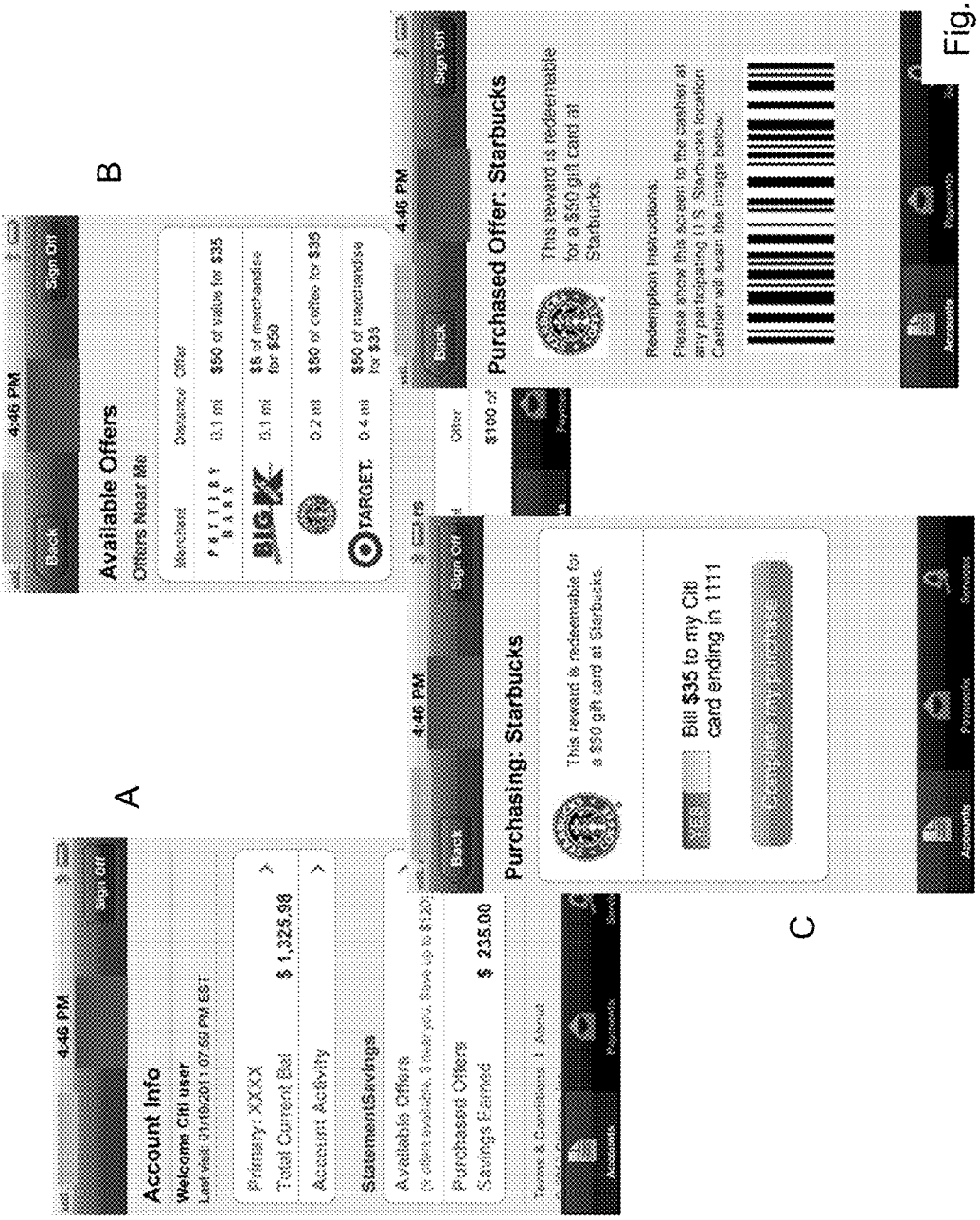
FIG. 61 depicts a mobile statement rewards embodiment.
Figure 62:
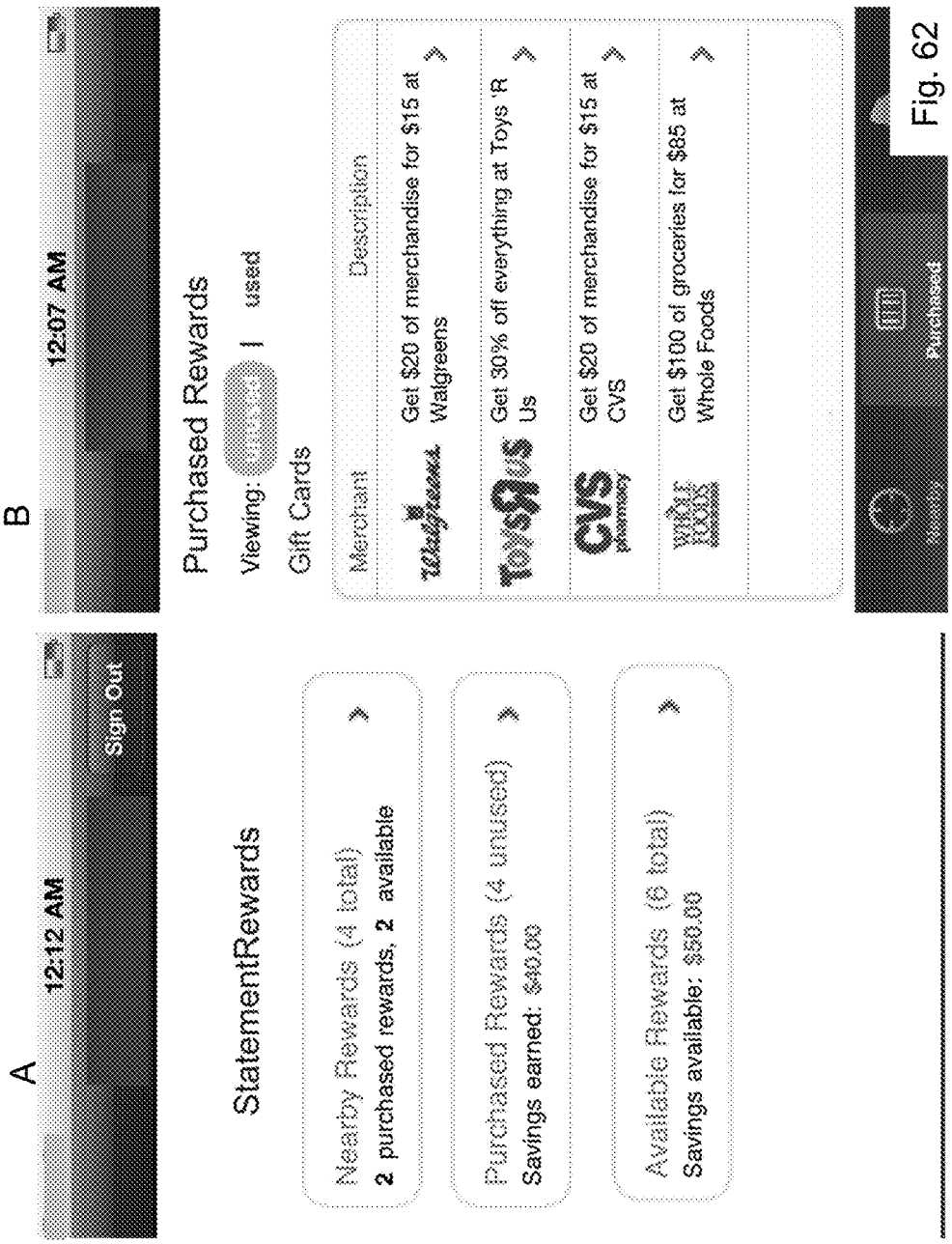
FIG. 62 depicts a mobile statement rewards embodiment.
Figure 63:
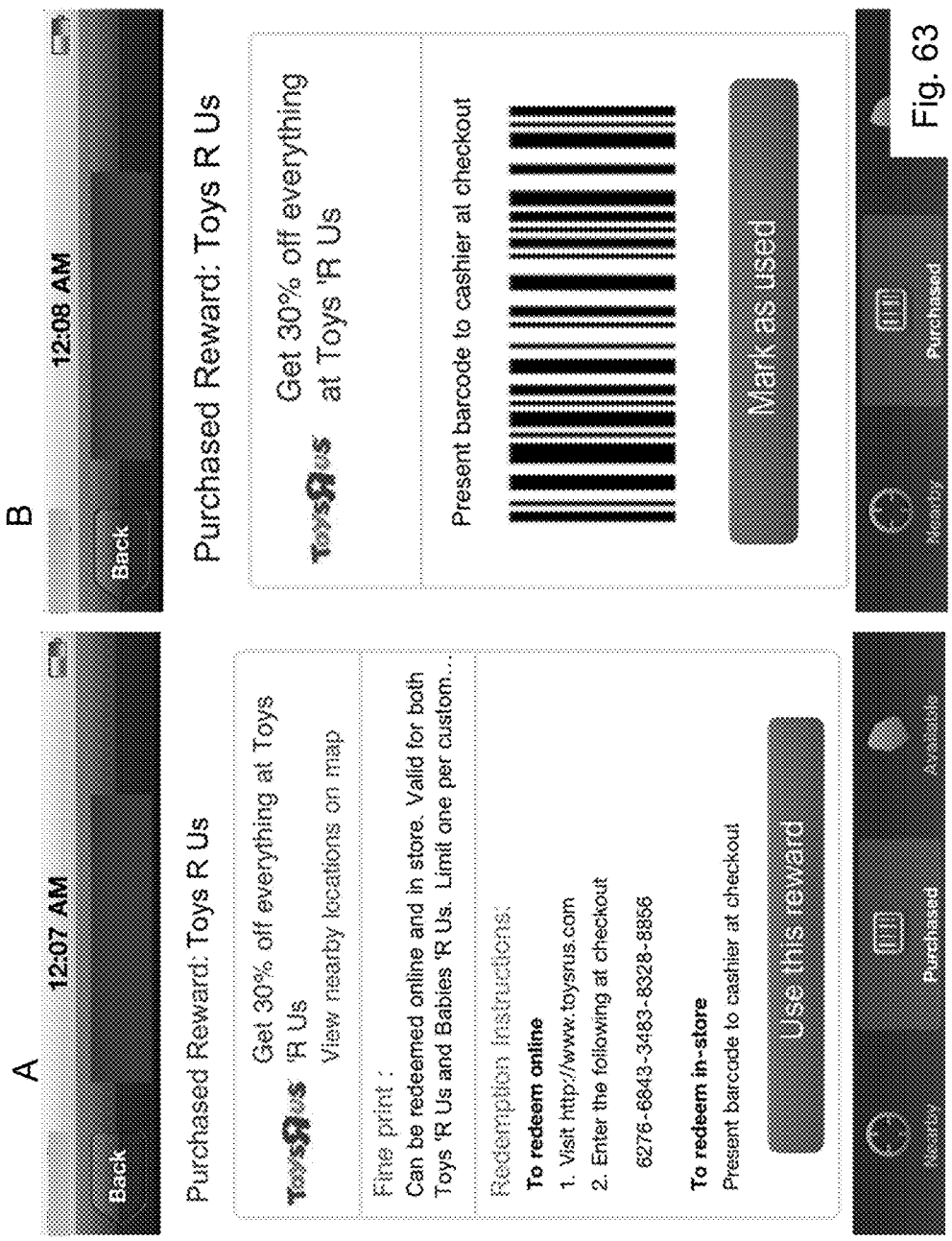
FIG. 63 depicts a mobile statement rewards embodiment.
Figure 64:
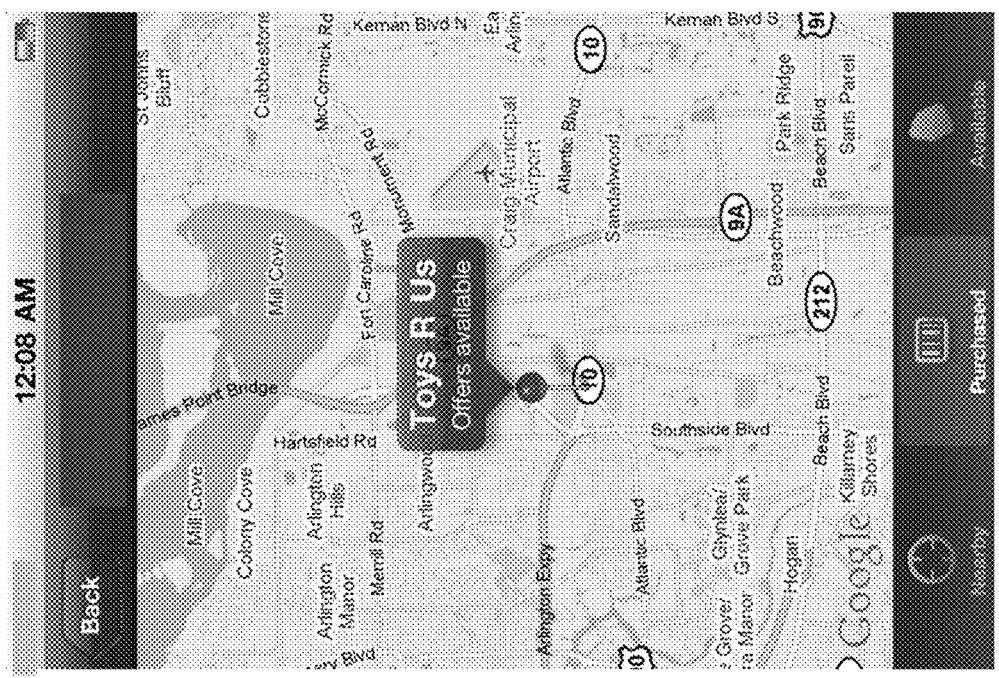
FIG. 64 depicts a mobile statement rewards embodiment.

In embodiments, there may be categories based on which the advertisers target the users, in accordance with an embodiment of the present disclosure. In an example, the advertiser's may send selected offers that may target users who may spend around $500 on internet and cell phone bills. The advertiser's may send offers that may provide more features within the limited budget. In another example, the system may enable the advertiser's to track the users based on the category of stores frequently visited by the users. The stores may be categorized as grocery, retail, oil & gas, and the like. The advertisers may give offers to existing users of a store to increase loyalty and spending of the user. The users may click on the offers made by the advertisers to activate the offers. In an embodiment, the system may enable the advertiser's to track both online and in-store purchases for measuring the results and optimizing the offers. The system tracks online and offline redemptions and may report them to advertisers. The system may also send offers through e-mails to various users. In an embodiment, in addition to the online account statement, the system may include mobile abilities and may facilitate SMS notifications to the users. For example, the system may be embodied as a mobile application, such as in FIGS. 61-65. FIG. 61A-D show an exemplary embodiment of a mobile application. In FIG. 61A, a summary of a user financial account is displayed showing current balance, an indication of account activity available, available savings opportunities, potential savings, purchased offers, savings earned, and the like. FIG. 61B depicts available savings opportunities which can be filtered by which opportunities are in geographic proximity to the mobile device. Thus, certain savings opportunities may be geo-enabled, that is, targeted by the financial history of the user but filtered for presentation to the user by geographic location. Other savings opportunities may be geo-targeted, that is, the savings opportunity is targeted to the user via their location. Other savings opportunities may be geo-enhanced, that is, if a user does not use the savings opportunity online, the merchant can choose to add an incentive when the user is within geographic proximity to the merchant. The merchant may determine the incentive, such as an additional percentage off, a dollar amount discount, an additional savings opportunity, the opportunity to share the savings opportunity, a related opportunity (such as meeting a personality at the merchant location, etc.), and the like. The merchant can set the geographic area in which to trigger the incentive. In any event, the mobile device may be used to accept the offer, which may include auto-billing to a financial account associated with the merchant or the system. FIG. 62C depicts selection of one of the savings opportunities and FIG. 62D depicts redemption instructions, including a bar code for scanning, for the purchased savings opportunity. Instead of a bar code, a QR code, a numeric or alpha-numeric code, or a pin can be used. FIG. 62 A-B shows another exemplary embodiment of a mobile application. In FIG. 62A, a summary of savings opportunities is displayed showing nearby savings opportunities, purchased savings opportunities, and all available savings opportunities. In FIG. 62B, the purchased savings opportunities are viewed. The user can switch the view between the unused savings opportunities, shown here, and the used savings opportunities. In FIG. 63A, one of the unused savings opportunities from FIG. 62B is shown in greater detail. The user may indicate the intent to use the savings opportunity. In response, and referring to FIG. 63B, the user may receive a code, such as a bar code, QR code, alphanumeric code, PIN, or the like, to redeem in-store or online. FIG. 64 depicts the merchant on a map.

Further, the system may offer a "deal-of-the-day", such as a discount on a single type of product for 24 hours, wherein the product is chosen based on a user's past transactions. In an embodiment, the various offers/suggestions provided by the system may be available in the form of printed coupons that may be used at a retail point of sale (POS) terminal. The offers may be delivered to the users through mails, e-mails, gift vouchers, and the like. The users may take a print of the offers sent through e-mails and may show at the POS terminal for redeeming the offer.

Figure 52:
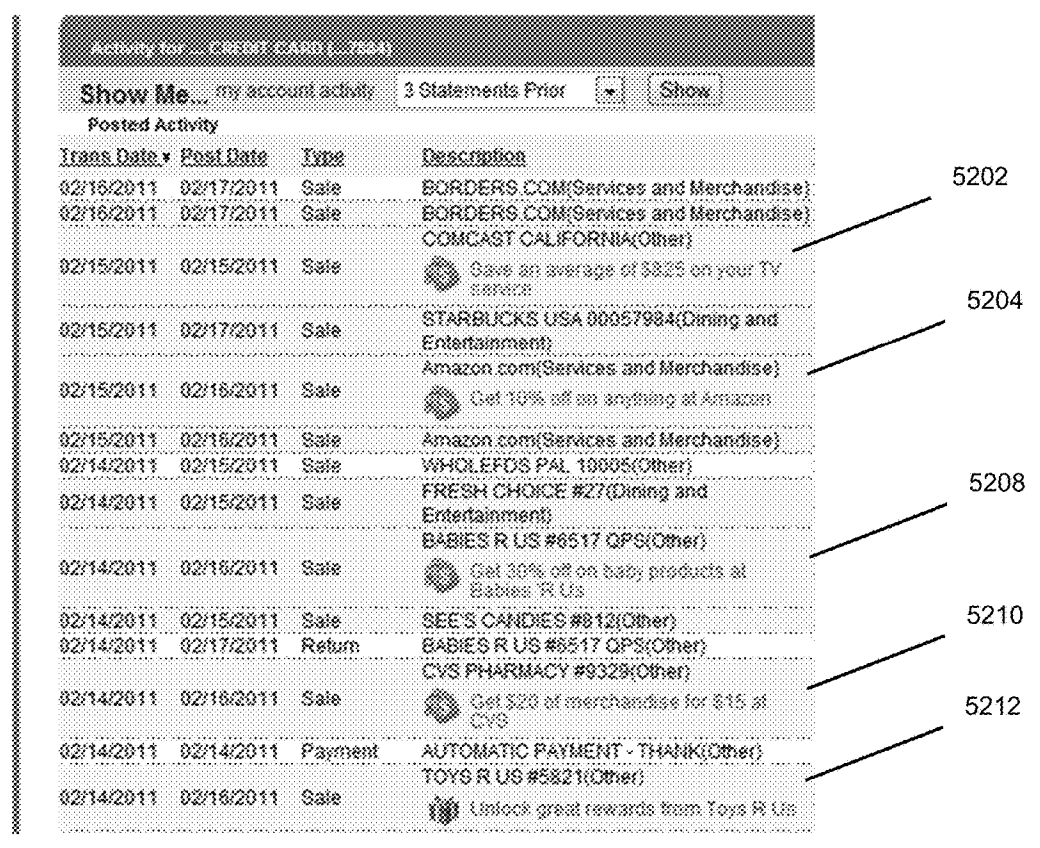

Referring to FIG. 52, a user's statement is displayed with various rewards indicated in association with particular transactions. It should be understood that this example uses an online credit card statement, but the statement could any one of an online statement, an online graphical user interface associated with a user's financial institution account, an online bill pay area, a dialog box associated with the user's financial account, an ATM receipt, a teller receipt, a mobile statement, a paper statement, and the like. The statement rewards indicated in FIG. 52 include a bill analysis opportunity 5202, a savings opportunity 5204, 5208, 5210 and a future reward 5212. A user may click on the various opportunities and rewards to expand the description.

Figure 53:
FIG. 53 depicts a statement rewards embodiment.
Figure 59:
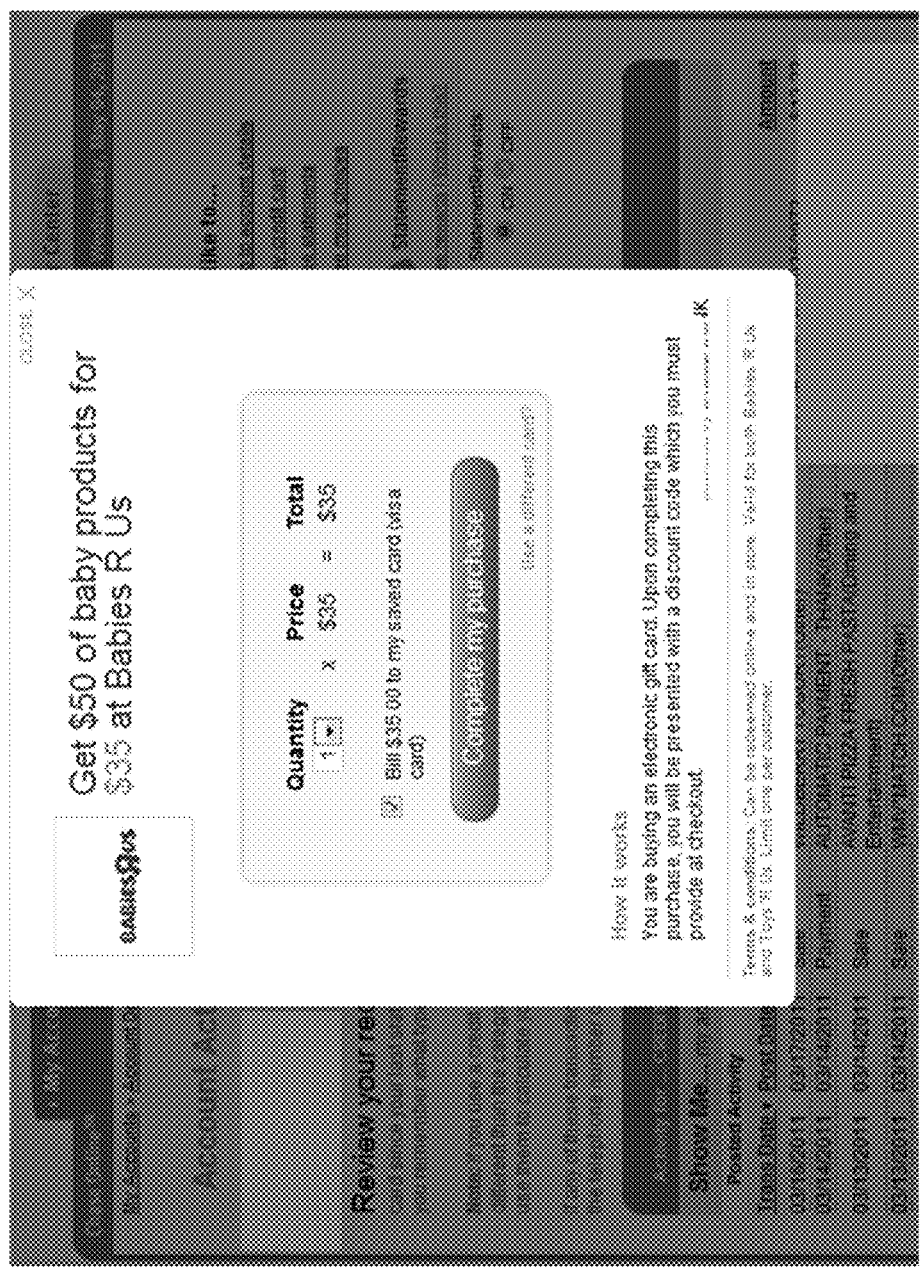
FIG. 59 depicts a statement rewards embodiment.
Figure 60:
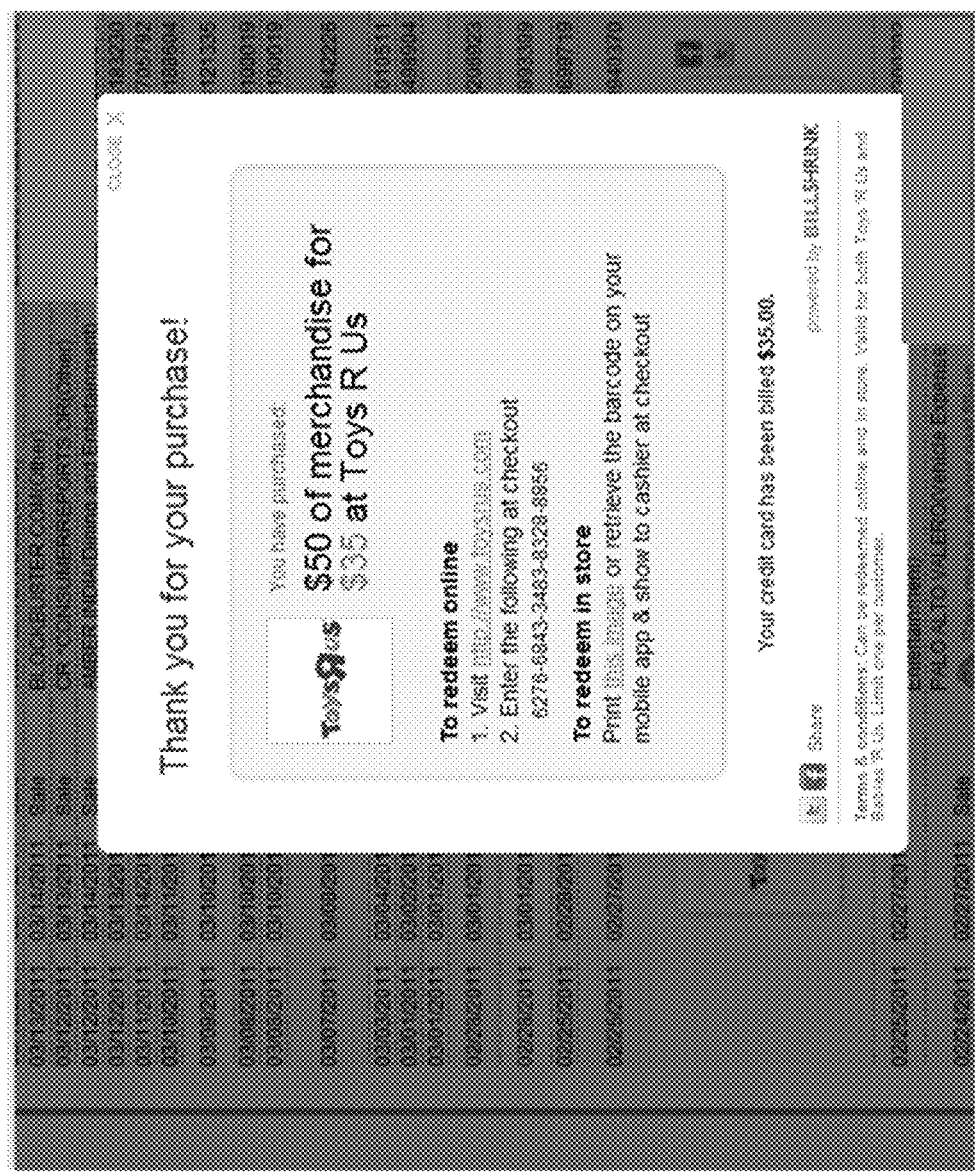
FIG. 60 depicts a statement rewards embodiment.

Referring to FIG. 53, the savings opportunity 5204, 5208 elements are shown in expanded form 5302, 5304, respectively. In this opportunity, a user's prior transaction at Babies R Us triggered a savings opportunity to the store to be offered. The opportunity is a $50 electronic gift card for only $35. The user can indicate that they want that savings opportunity via clicking on a link 5308 and obtaining the purchase screen in FIG. 59, can indicate that they like or dislike the opportunity by clicking a sentiment button 5312, can share the opportunity with a social network by clicking a share button 5310, and the like. Once the purchase of the electronic gift card is complete, confirmation of the purchase may be given, such as that shown in FIG. 60, along with redemption instructions.

There is an indication of reward level 5314 in the savings opportunity. Actions, such as sharing the opportunity, liking the savings opportunity, accepting the savings opportunity and the like may improve the reward level 5314. The savings opportunity may improve with reward level.

The reward levels may be tiered. A merchant or the financial institution may set the reward level tiers. For example, one merchant may set reward levels based on number of visits, another may set them on total spend, while yet another may set levels based on a combination of the two. Via auditing and analyzing transactions, the system 2700 can keep track of reward level status.

In some embodiments, in order for a user to share the savings opportunity, such as by using the share button 5310, the savings opportunity must first be social-enabled by the merchant. When the merchant social-enables a savings opportunity, a shared savings opportunity is created. The shared savings opportunity is designed for the user to share, and may not be subject to the same criteria that may have triggered the offering of the original savings opportunity to the user. The system may track redemption of the shared savings opportunity by individual user or in aggregate. The system may track redemption of various shared savings opportunities to determine which user might have broad influence. The system may then target the influencer with improved, more frequent, or more exclusive savings opportunities.

Figure 54:
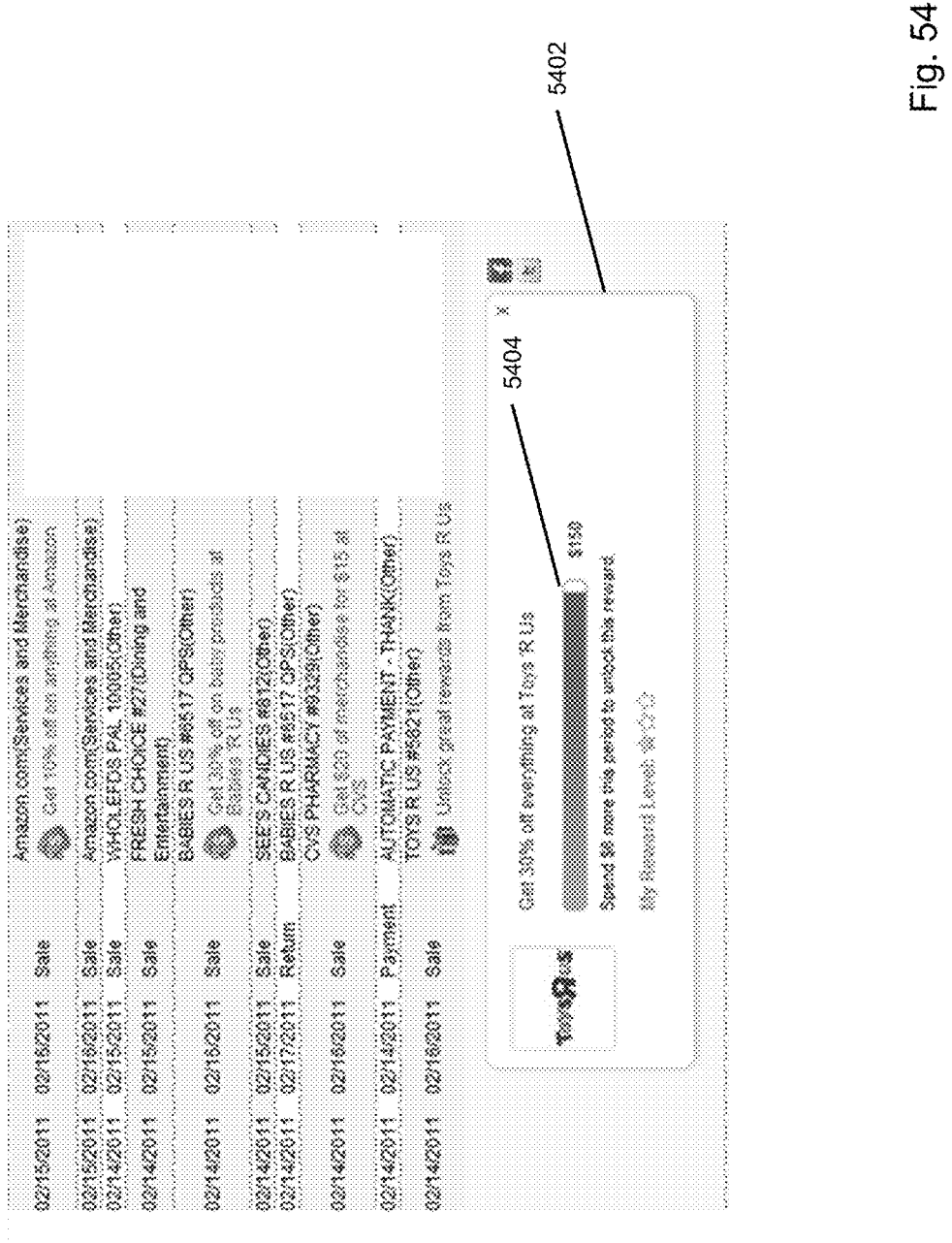
FIG. 54 depicts a statement rewards embodiment.

Referring to FIG. 54, a savings opportunity is shown in expanded form. The savings opportunity depicted here is a future reward 5402. A future reward may be given to a user if the user meets certain goals. For example, to receive a 30% discount at the toy store in the example of FIG. 54, the user would have to spend $150 during a particular time period at the store. The system automatically tracks progress towards meeting the goal with a progress bar 5404 or some other depiction, along with an indication of the actions needed to complete the goal. The progress bar 5404 may be updated as new transactions at the toy store are made. As with the other rewards, the future reward 5402 may improve as reward level improves. The future reward 5402 may be shared with other users or a social network. The future reward 5402 may be liked or disliked. The future reward 5402 may be based on at least one of a past transaction and some future transaction behavior.

Figure 55:
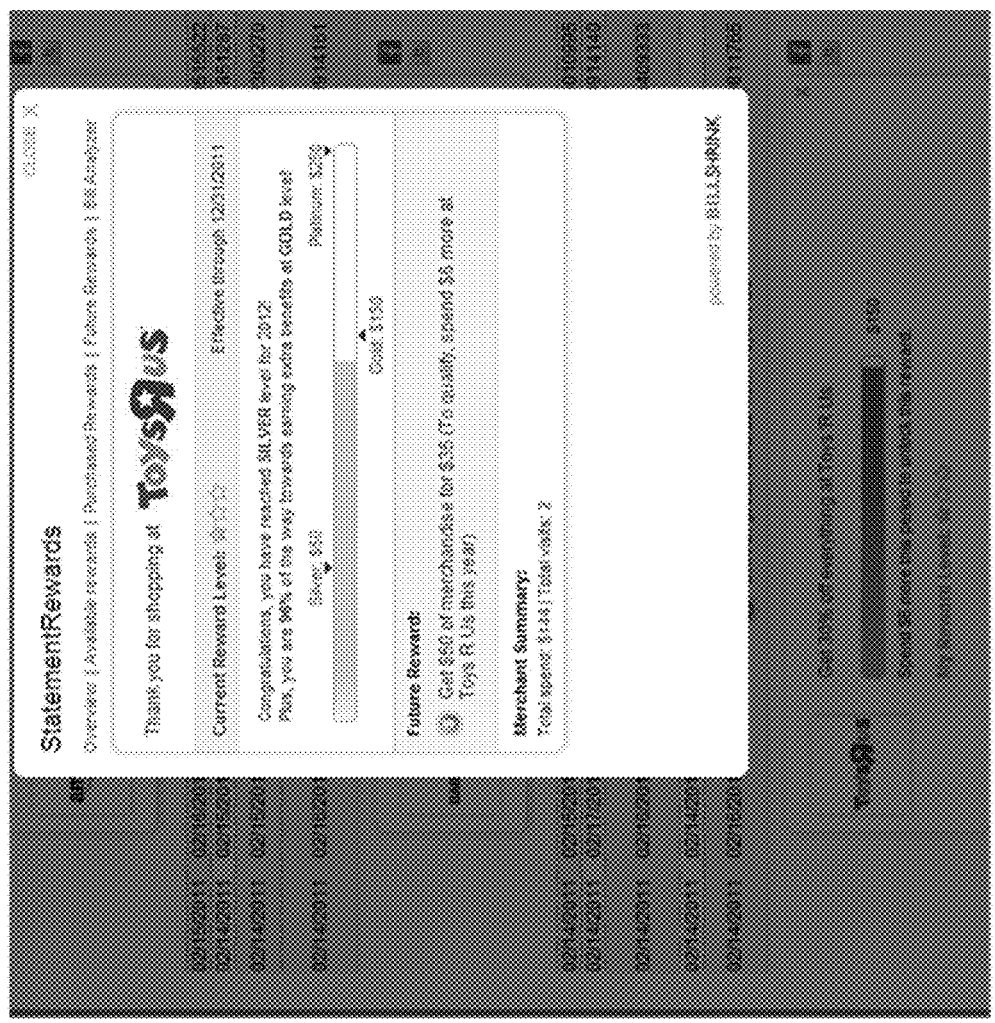
FIG. 55 depicts a statement rewards embodiment.
Figure 56:
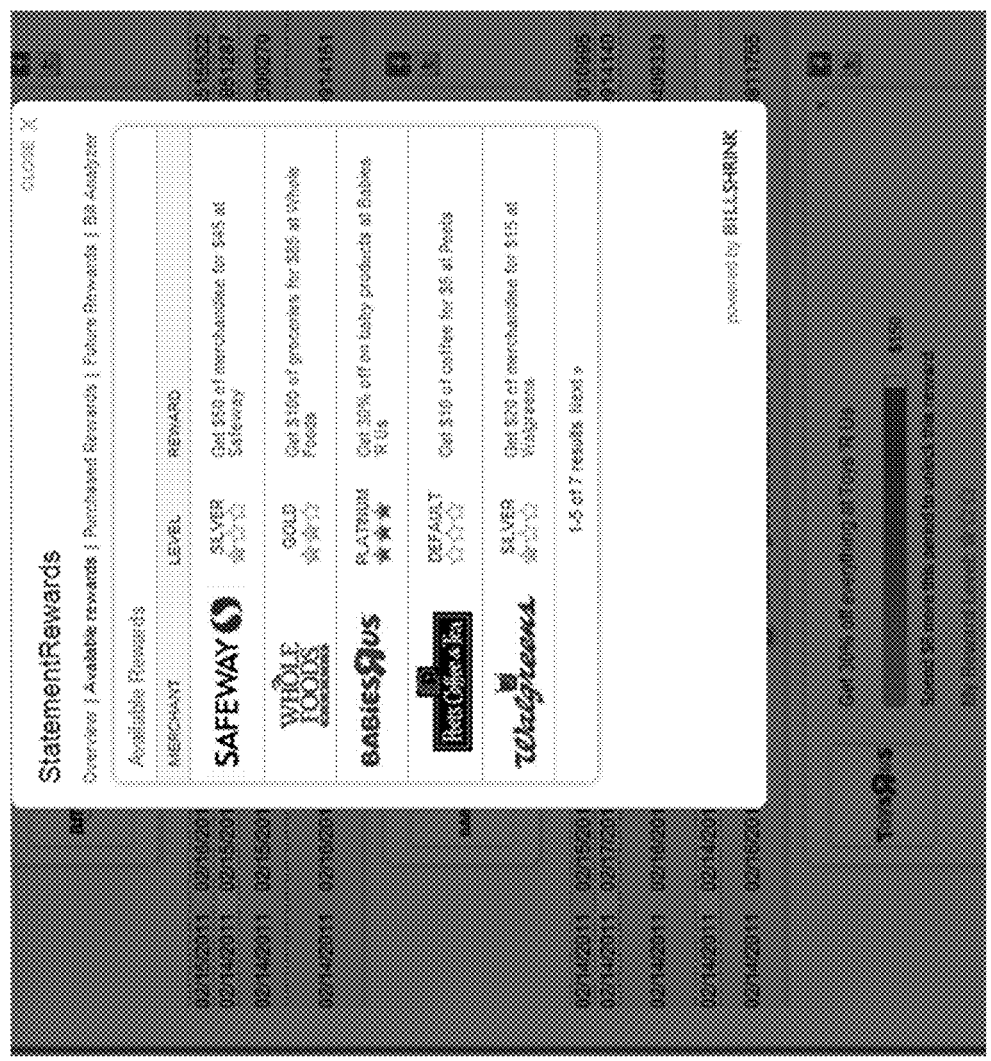
FIG. 56 depicts a statement rewards embodiment.
Figure 57:
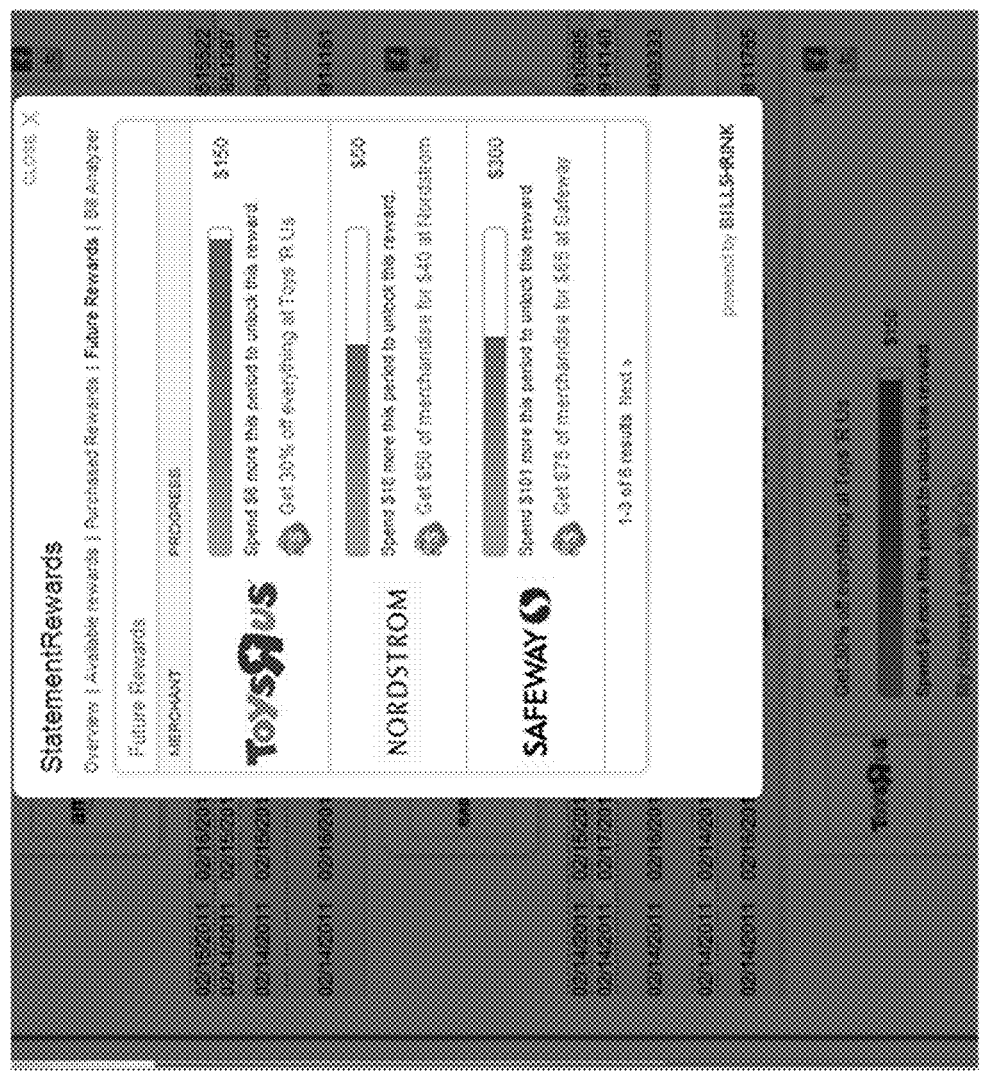
FIG. 57 depicts a statement rewards embodiment.

Using a user dashboard, the user may be able to view all of their reward level statuses with each merchant, view all current rewards, view all future rewards, and the like. Referring to FIG. 55, an embodiment of a user dashboard is shown with additional detail regarding the future reward 5402, including the merchant, the future reward, the current reward level, the effective date, progress towards an improved reward level, a total spend summary, and a total visit summary. Other information available in the user dashboard includes an overview, available rewards listing, purchased rewards listing, future rewards listing, a bill analyzer, past rewards, and the like. Referring to FIG. 56, an exemplary user dashboard is shown with the Available Rewards tab displayed. Information on the tab may include merchant, reward level, reward, and the like. Referring to FIG. 57, an exemplary user dashboard is shown with the Future Rewards tab displayed. Information on the tab may include merchant, future reward, progress towards future reward, and the like.

Figure 58:
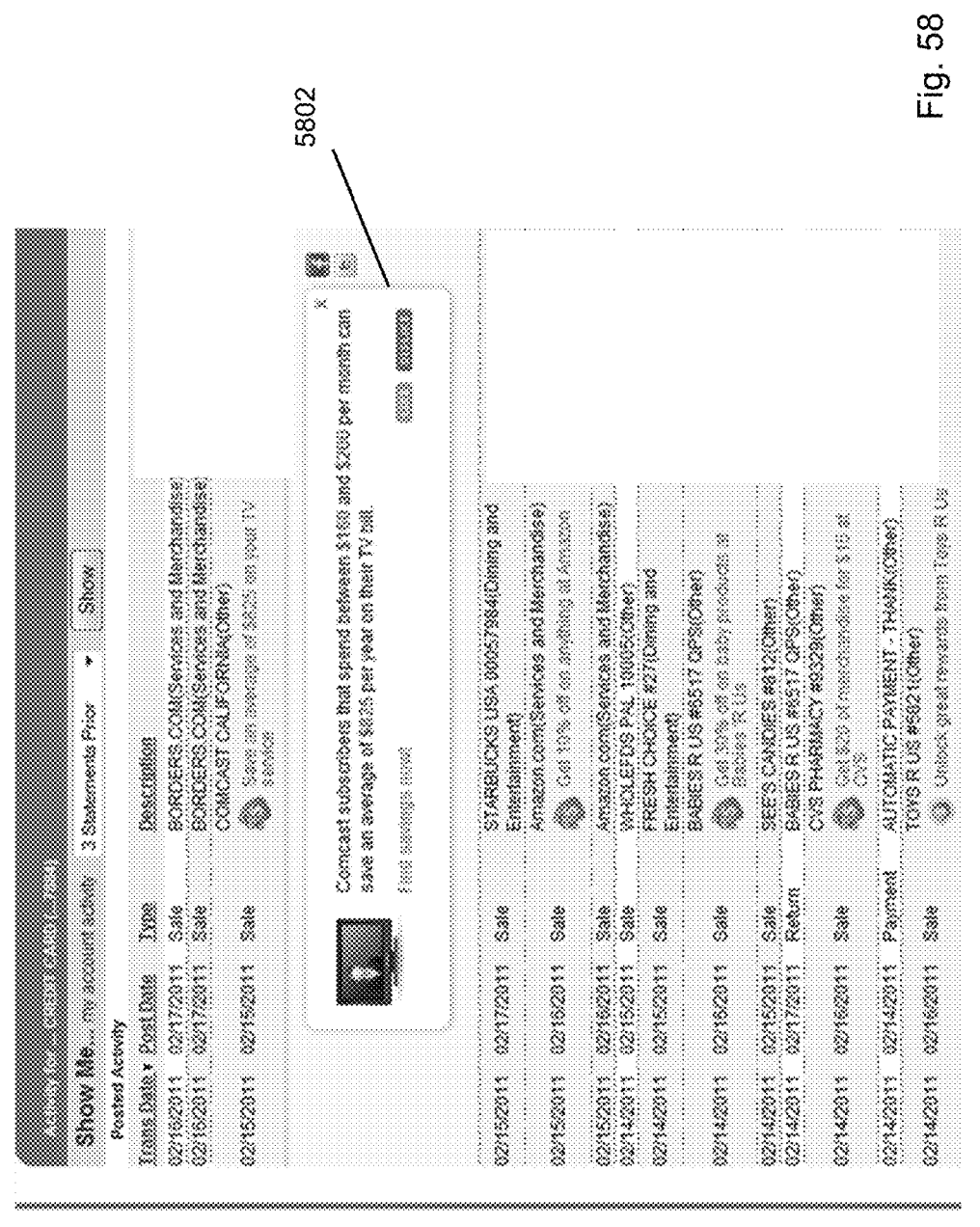

Referring to FIG. 58, the bill analysis opportunity 5202 is shown in expanded form 5802. It too can be shared and liked or disliked.

The system of the present disclosure may include dashboards, such as a merchant dashboard, financial institution dashboard, user dashboard, and the like. Each dashboard may show the appropriate audience how users are doing with all the offers being shown to them, such as opens, clicks, and purchases, as well as enable them to edit and manage the rules governing offer presentation by interfacing to the rules database.

In an embodiment, a user dashboard that may be used for hosting various mini-applications. Users may click on a dashboard icon to activate the dashboard. The dashboard may enable the users to edit the various mini-applications of the dashboard. For example, the users may move the mini-application icons, rearrange the icons on the dashboard, delete some of the mini-applications, recreate the mini-applications so that more than one of the same mini-application is open at the same time, and the like.

In an embodiment, the system may include a merchant dashboard, a financial institution dashboard, and a user dashboard. The merchant dashboard may be used by the various merchants and advertisers for displaying various offers that are being made by them. The various offers may be listed under a tab on the dashboard. The users may click on the tab to view all the offers provided to them. Further, the merchant dashboard may enable a merchant to display the offers in different categories. For example, few offers may be in the form of discount coupons that may be redeemed if a user spends a pre-defined amount. The system may track the activities of the users and may inform the merchants about the user activities. For example, the dashboard may provide information about the number of users who have viewed the offers listed by the merchants. The merchants may also get information about the offers that may be redeemed by the users, and the like. Further, the merchant dashboard may include a merchant re-categorization tool that may facilitate the merchants to categorize themselves as per their business. For example, some merchants may categorize themselves as a retail merchant, oil and gas merchants, and the like.

A multi-merchant loyalty platform is a "universal" program where points apply across the entire financial life of the individual (e.g. points for all their spending, rewards in every area they spend on), as has been described previously herein with respect a loyalty program, loyalty-based offers, and FIGS. 24 and 25. FIGS. 53, 55, and 56 also illustrates a reward level aspect of a loyalty program, wherein the loyalty-based offers are filtered or modified by reward level. In effect, the financial institution card becomes a loyalty card at multiple merchants with no separate card to signup for or swipe at every purchase.

To facilitate receiving feedback regarding campaign effectiveness, adjusting campaign parameters mid-campaign, and the like, merchants may use a self-service platform, or dashboard, which may be financial institution co-branded, to oversee various aspects of the multi-merchant loyalty platform, such as in FIGS. 45-51. The merchant dashboard may allow merchants to review data for all of their customers, not just those with a particular financial institution. The merchant dashboard may include one or more campaign tabs, reporting tabs, a "My Account" tab, and the like as illustrated in FIGS. 45-51.

Figure 45:
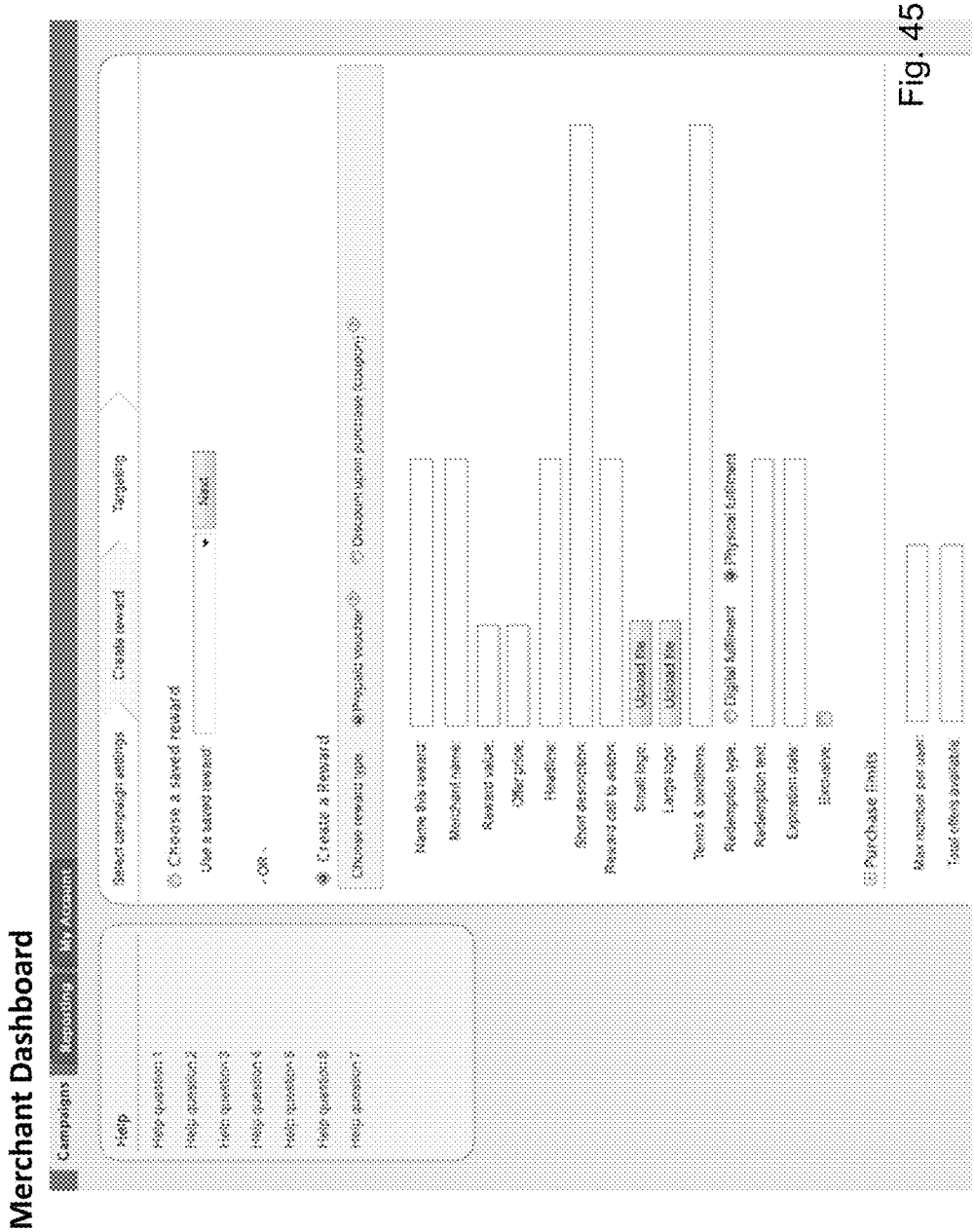
FIG. 45 depicts a campaign window for creating a reward in an embodiment merchant dashboard.
Figure 46:
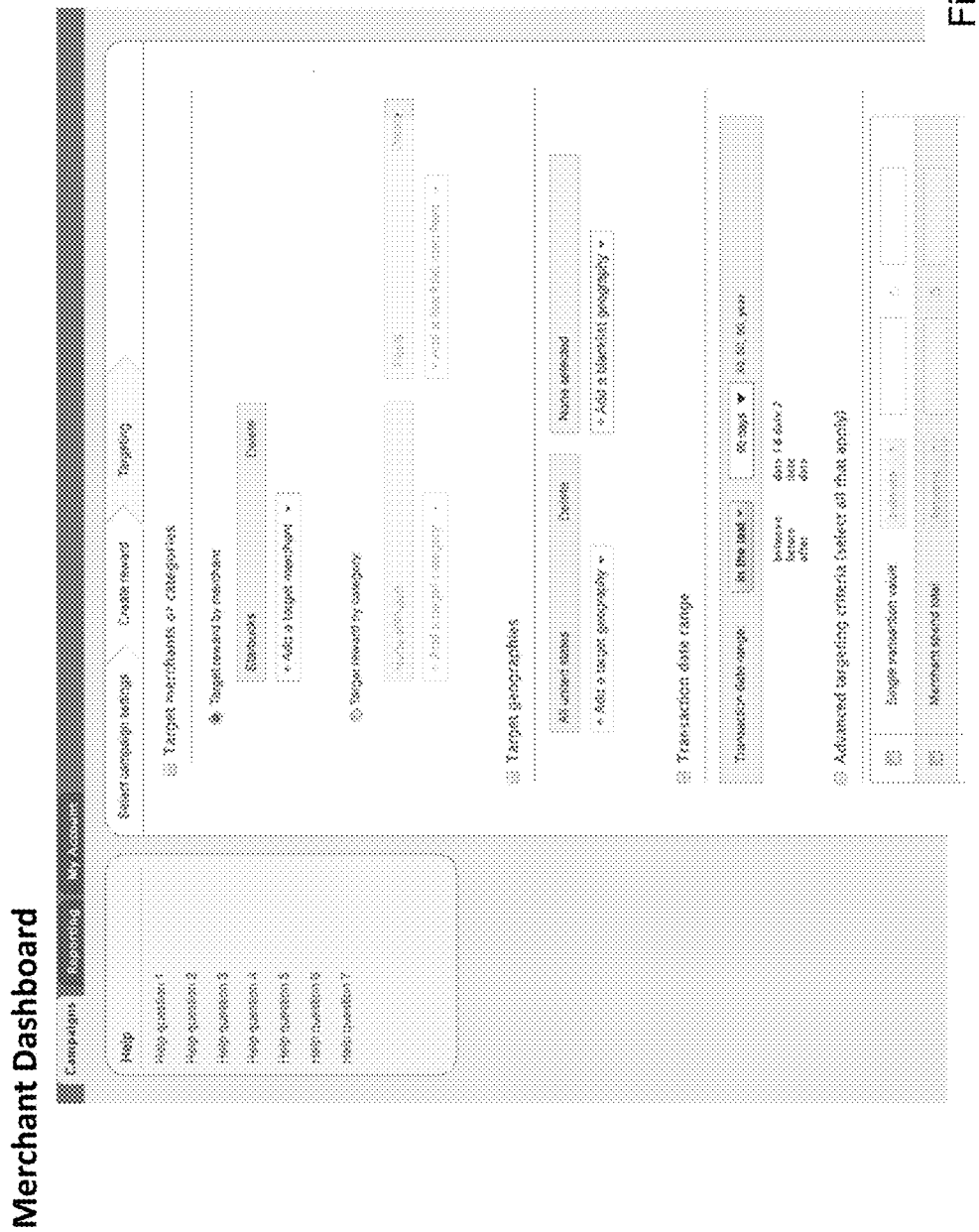
FIG. 46 depicts a campaign window for targeting a reward in an embodiment merchant dashboard.
Figure 47:
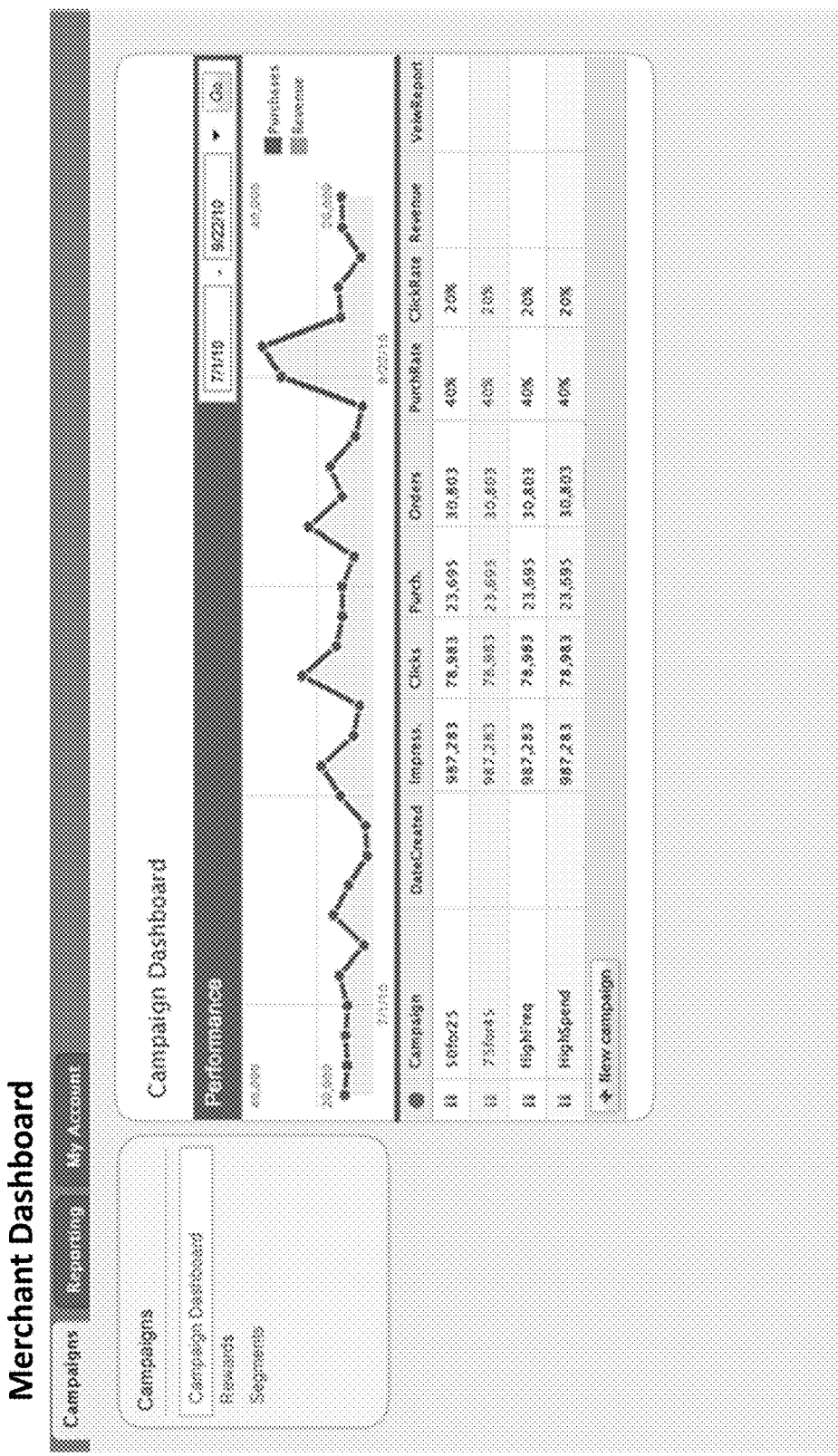
FIG. 47 depicts campaign performance in an embodiment merchant dashboard.
Figure 48:
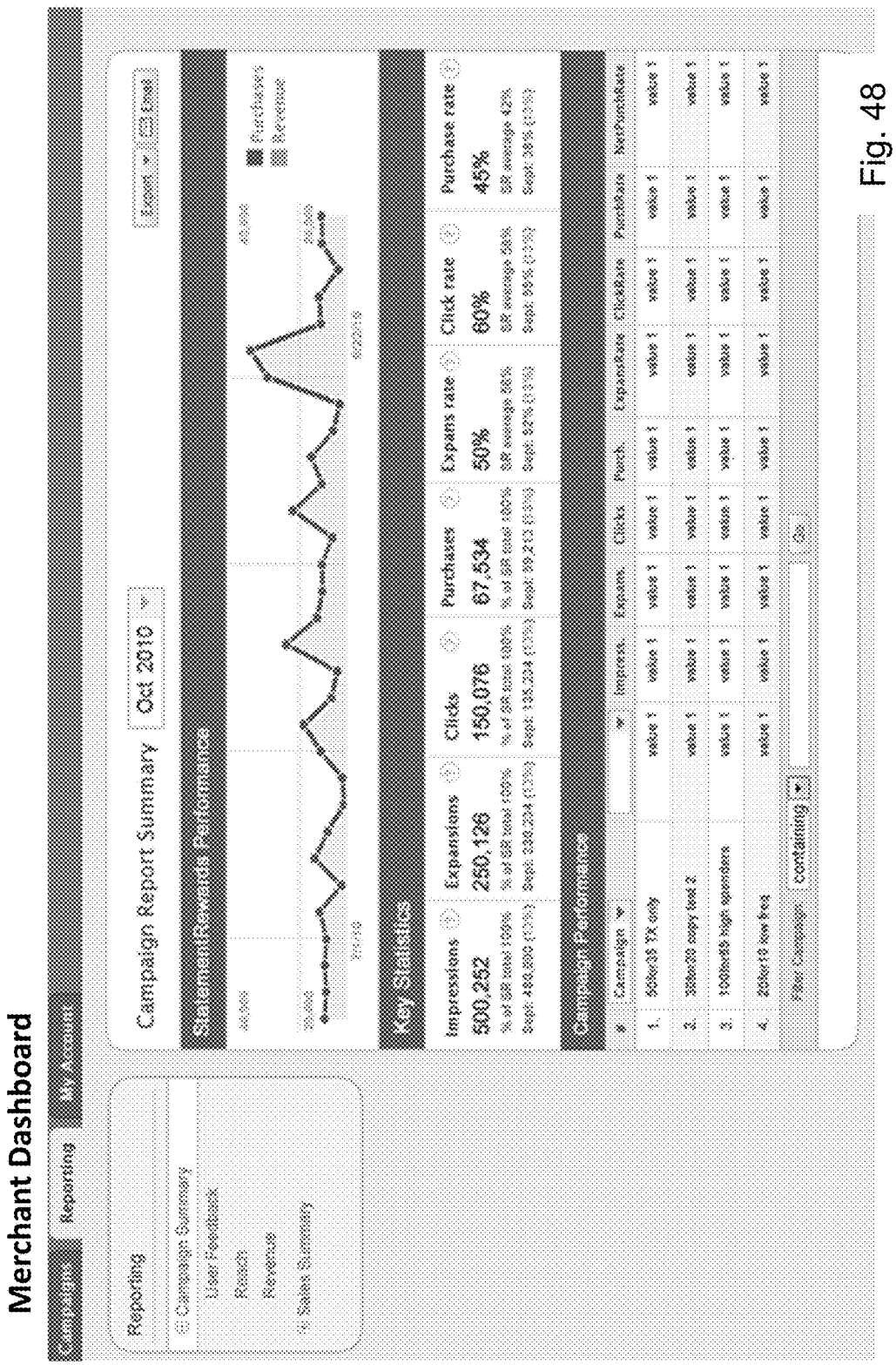
FIG. 48 depicts a reporting window in an embodiment merchant dashboard.
Figure 49:
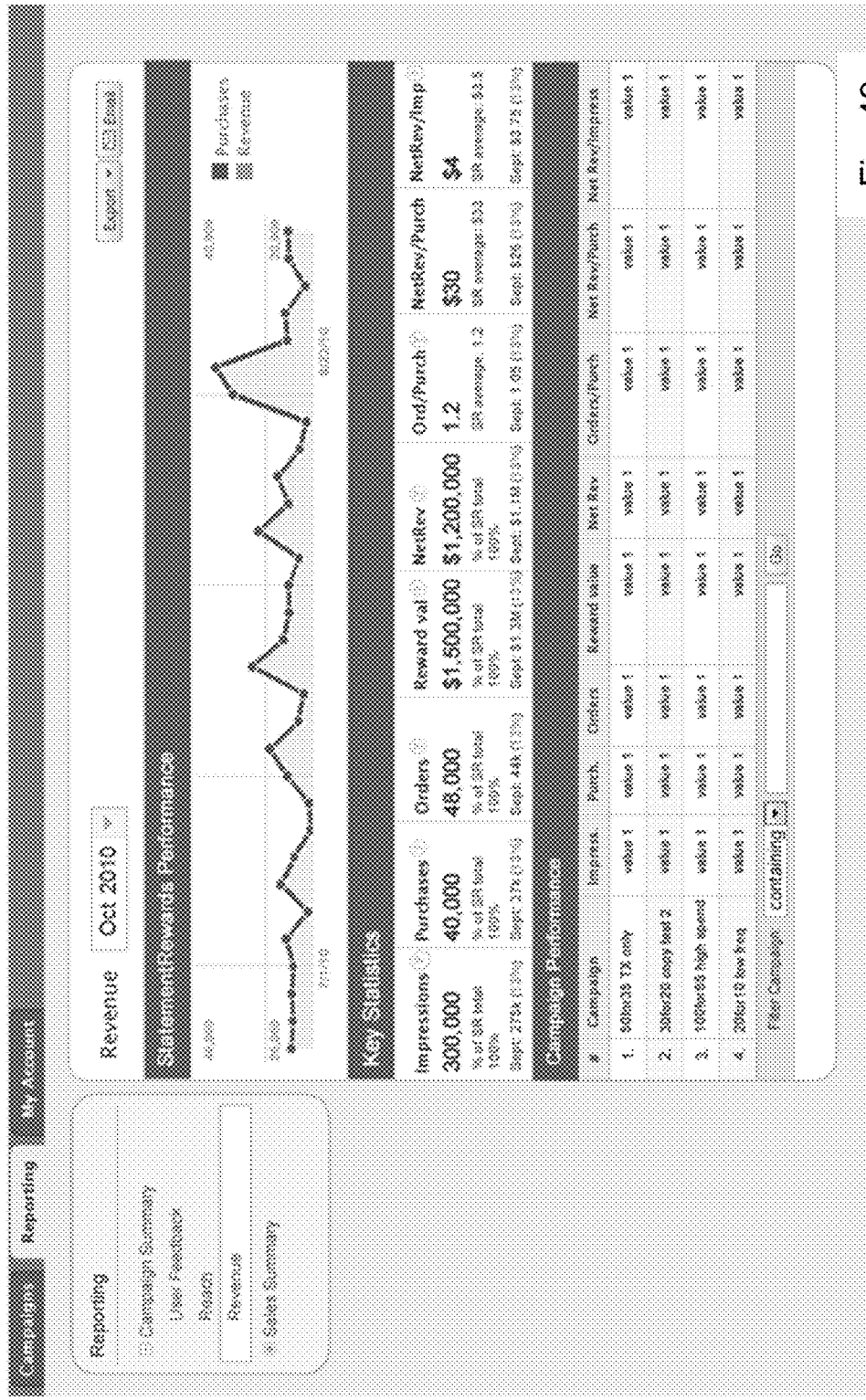
FIG. 49 depicts a reporting window in an embodiment merchant dashboard.
Figure 50:
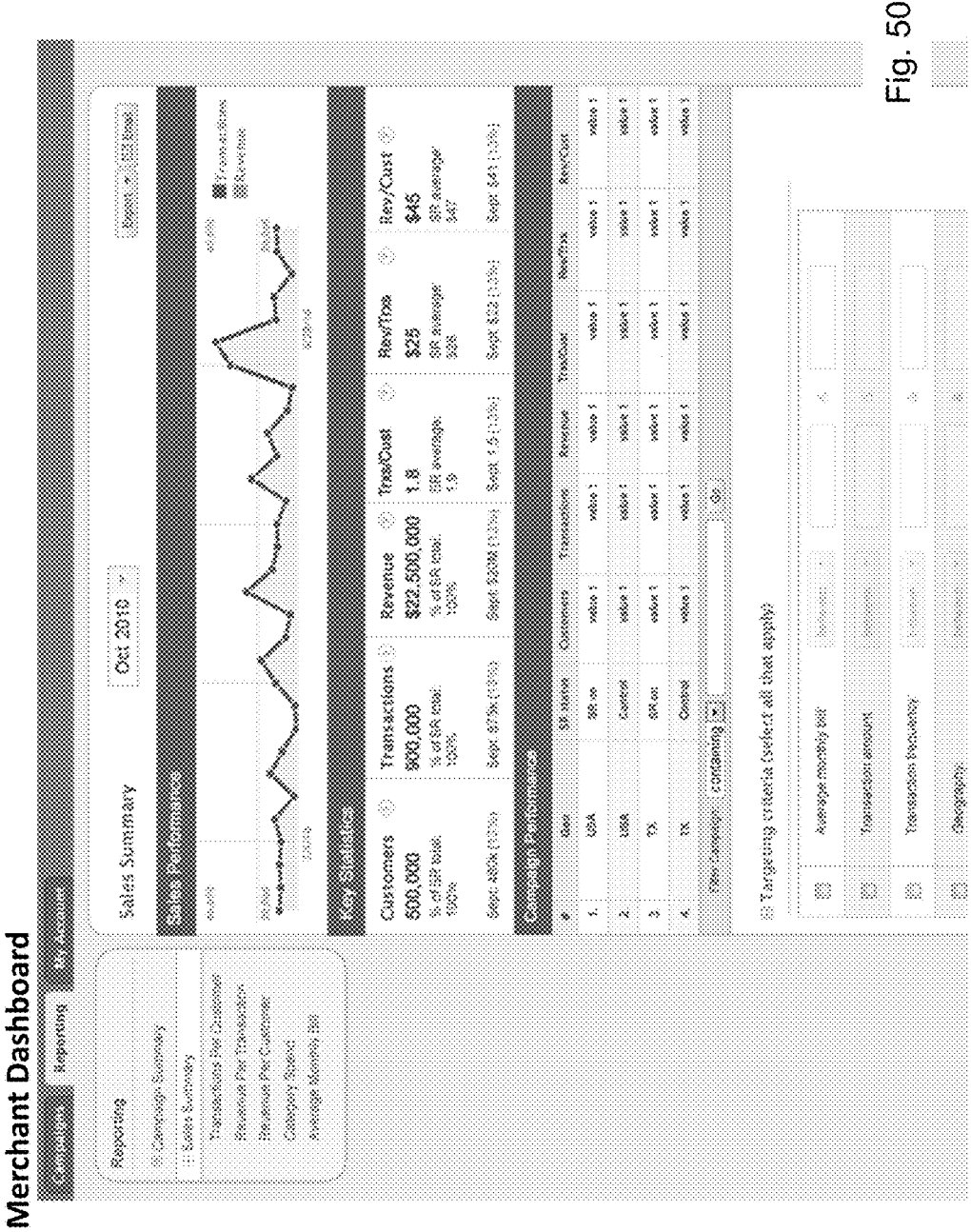
FIG. 50 depicts a reporting window in an embodiment merchant dashboard.
Figure 51:
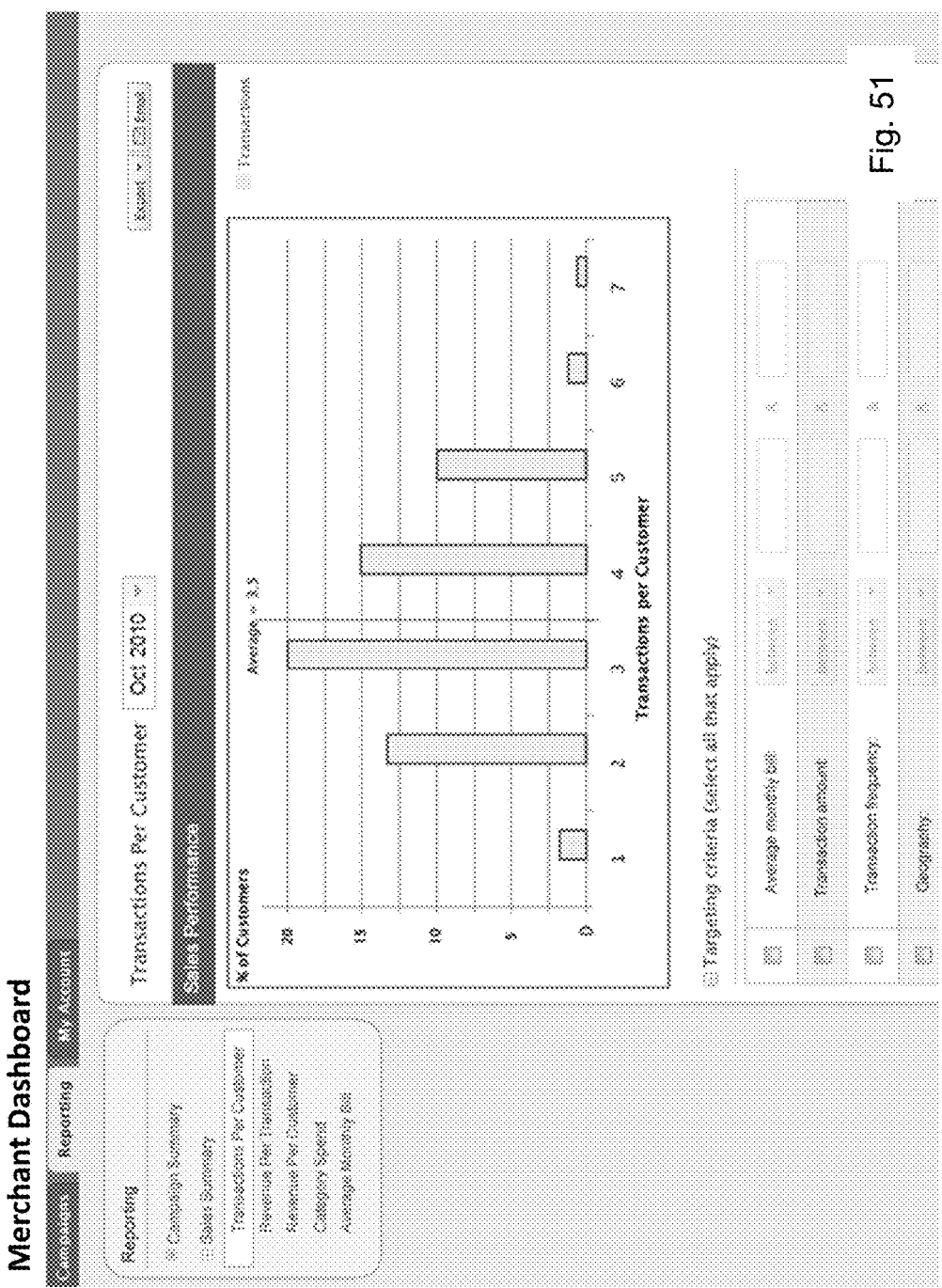
FIG. 51 depicts a reporting window with sales performance in an embodiment merchant dashboard.

The campaign tabs may include ongoing, real time monitoring of campaign performance and enable the merchant to directly modify the offer targeting algorithm to update targeting criteria and impose constraints on an individual campaign basis. The dashboard may further enable merchants in choosing a saved reward, creating a reward, setting reward matching criteria, purchase limits, targeting merchants or categories, targeting rewards by merchant, targeting geographies, date range, the ability to configure and view performance metrics and graphics specific to individual or multiple campaigns, the ability to group different campaigns under a common theme such as new customer acquisition, the ability to reconfigure multiple campaigns, current and future, to be subject to common sets of constraints that can drive similar/dissimilar targeting approaches, and the like. Data viewable on the merchant dashboard may include: category performance such as % shoppers in a category, % dollar spend in a category, % store visits in a category; customer profiles such as spend distribution and visit frequency distribution; regional insights such as same store analysis and a geographic spend profile. A campaign builder, as depicted in FIGS. 45 and 46 may be included in the dashboard and may be used to set reward specifications, provide reward text, determine if the reward is eligible for social sharing. A performance review may give statistics on impressions, engagement rate, purchases, purchase rate, engagement metrics (e.g. expansions, likes, social network shares, change in monthly activity), top active campaigns, and an account profile.

Figure 65:
FIG. 65 depicts a predicted merchant's window.
Figure 66:
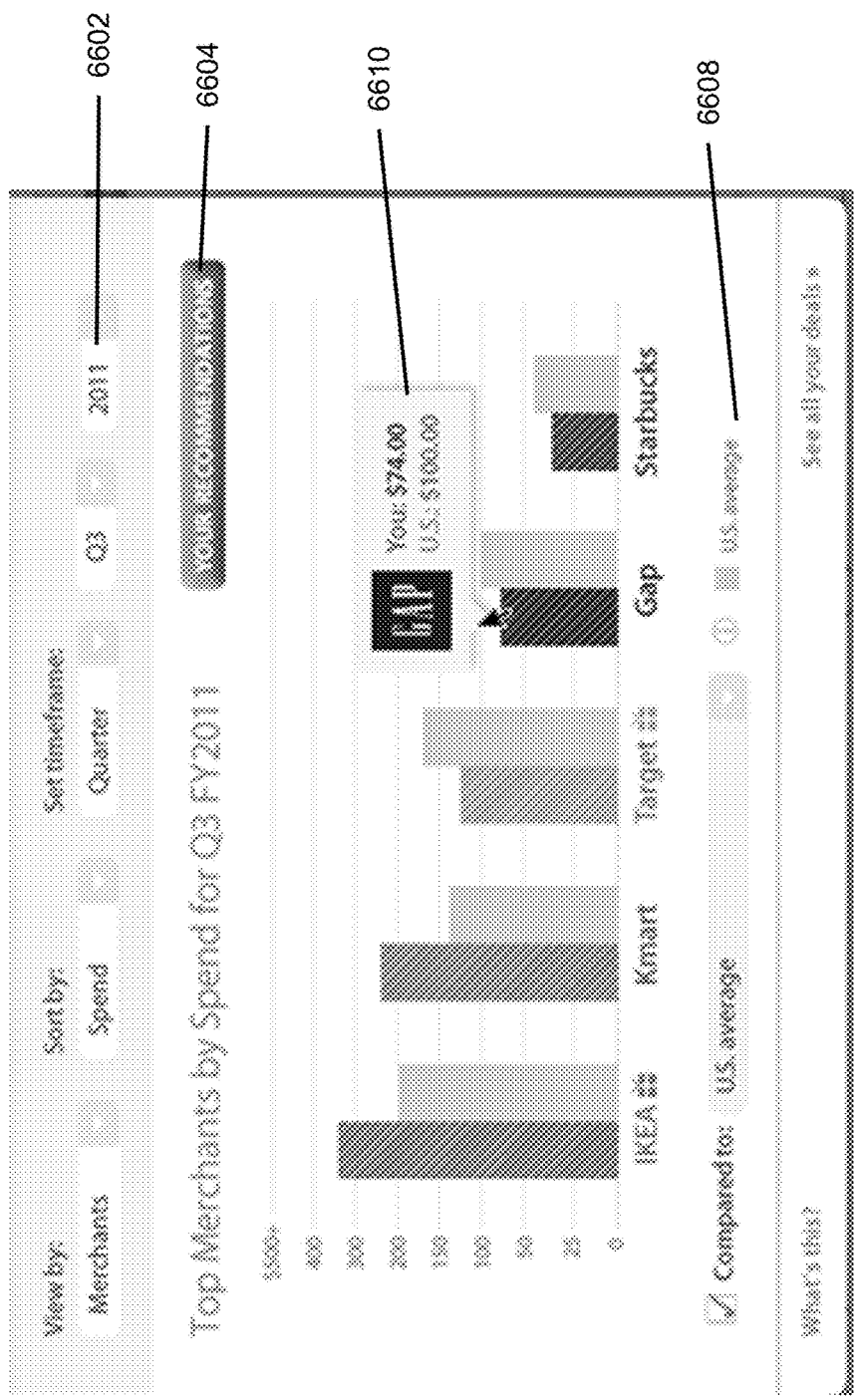
FIG. 66 depicts a merchant level spending chart.
Figure 67:
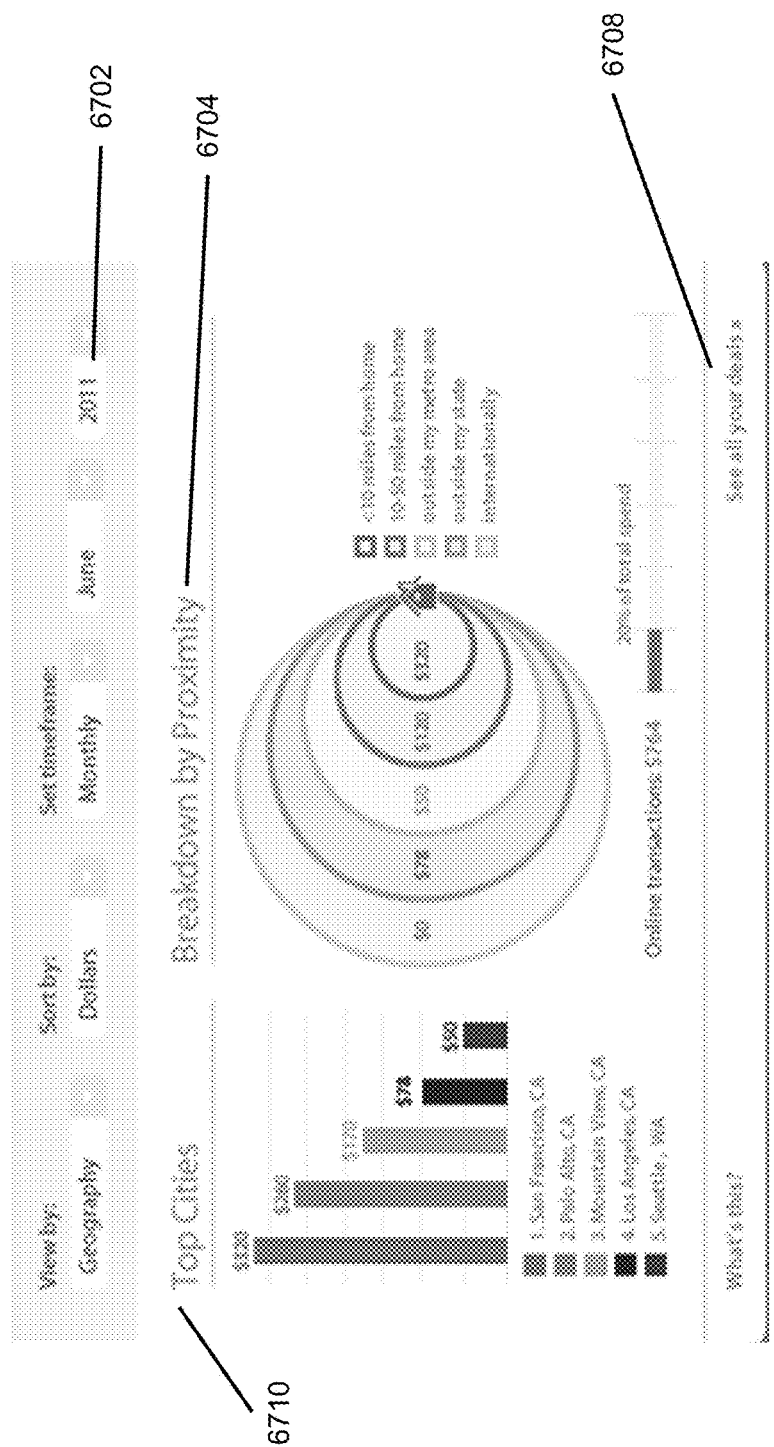
FIG. 67 depicts a geographic proximity spending chart.

The merchant dashboard may also include a reporting tab including performance graphics, key statistics, business analytics, campaign summaries, user feedback, campaign performance as a function of individual campaign, groups of campaigns or overall, sale performance, transactions per customer, revenue per transaction, revenue per customer, category spend, average monthly bill and the like. The reporting tab may also include purchase insights, or spend pattern metrics, which may be useful for providing recommendations based on a cardholder's transactions and social benchmarking of their spend. Purchase insights can provide analysis to merchants and consumers about purchases, as depicted in FIGS. 65-67. The data reported may include data on current and historic campaigns.

The merchant dashboard may also include a "My Account" tab including updating or customizing merchant and business information, updating or customizing specific campaign information, linking campaigns together, and the like. The merchant dashboard may be white-labeled. The merchant dashboard may be self-service.

In an embodiment, the financial institution dashboard may allow the financial institution to connect with the system for providing various offers to the users. The financial institution dashboard may facilitate the financial institutions that may be associated with the system to track the users. The financial institution dashboard may allow the financial institutions to track the opted-in accounts by the users. The opted-in accounts may be the accounts that may be majorly used by a user and the account on which the user may wish to receive offers. Further, the financial institution dashboard may accumulate preferences of the user for receiving the offers. For example, the financial institutions may get information about the offers which the user may wish to receive as a part of their account statement, and the like. Further, the financial institution dashboard may enable the associated financial institutions to re-categorize the merchants as per their convenience. The financial institutions may change the categories in which the merchants may have classified themselves; the financial institution dashboard may enable the financial institutions in doing so.

In an embodiment, the user dashboard may include information about all the offers that were redeemed by the users. The user dashboard may also enable the users to view various transactions done by the users over a specific period such as over a week, over a month, and the like. Further, the user dashboard may include information about the various rewards that may be received by the user. For example, the information may include the minimum amount that the user may need to spend in a day for being eligible for a reward, the number of the times the user may need to shop in a specific category of stores for being eligible for the reward, and the like. Further the user dashboard may also include a merchant re-categorization tool that may enable the users to categorize the merchants as per their convenience.

As mentioned earlier, the users may be provided offers through their account statements and may also get rewarded on using the transaction cards such as a credit card, a debit card, and a pre-paid card. In an embodiment of the present disclosure, the financial institutions associated with the system may get paid when a user redeems an offer provided by the financial institution. For example, if the account statement of the user suggests a cheaper cell phone plan, the user may compare his/her present plan and the suggested plan. If the user activates the suggested plan, the financial institution may get revenues from the redemption. However, if the user decides to continue with the earlier plan, the financial institution may not get any revenue. In a similar scenario, the system may also generate revenues if a user redeems an offer suggested by the system. The offer suggested by the system may be sent to the user in the form of a text message, an e-mail, and the like.

The rapid growth of highly specialized applications may be overwhelming for customers as there may be multiple passwords to remember, multiple user interfaces to learn, difficulty in locating desired information and the like. An example of this may be the many disparate individual offer-distribution mechanisms provided by the different offer-providers including financial institutions such as banks, credit unions and the like, credit cards, merchants and the like. In this environment a customer may have to visit multiple applications to interact with their offers, such as to view, generate, access, redeem, and the like. In an embodiment of this system, a digital wallet mechanism, as is known in the art, may be enhanced with an ability for the customer to interact with their offers, such as to view, generate, manage, select, organize, redeem and the like without having to log-in individual financial institution websites or applications. FIG. 62 illustrates an example of these interactions. Such enhancement may be embodied in a dashboard. Another feature may include the ability to utilize the geographical awareness functionality available on many mobile devices to make new offers available to the user as a function of their geographic location. Another feature may include the ability to alert the customer regarding their offers including newly available offers, goals to reach new offer levels, actions required to obtain new offers and the like.

Figure 30:
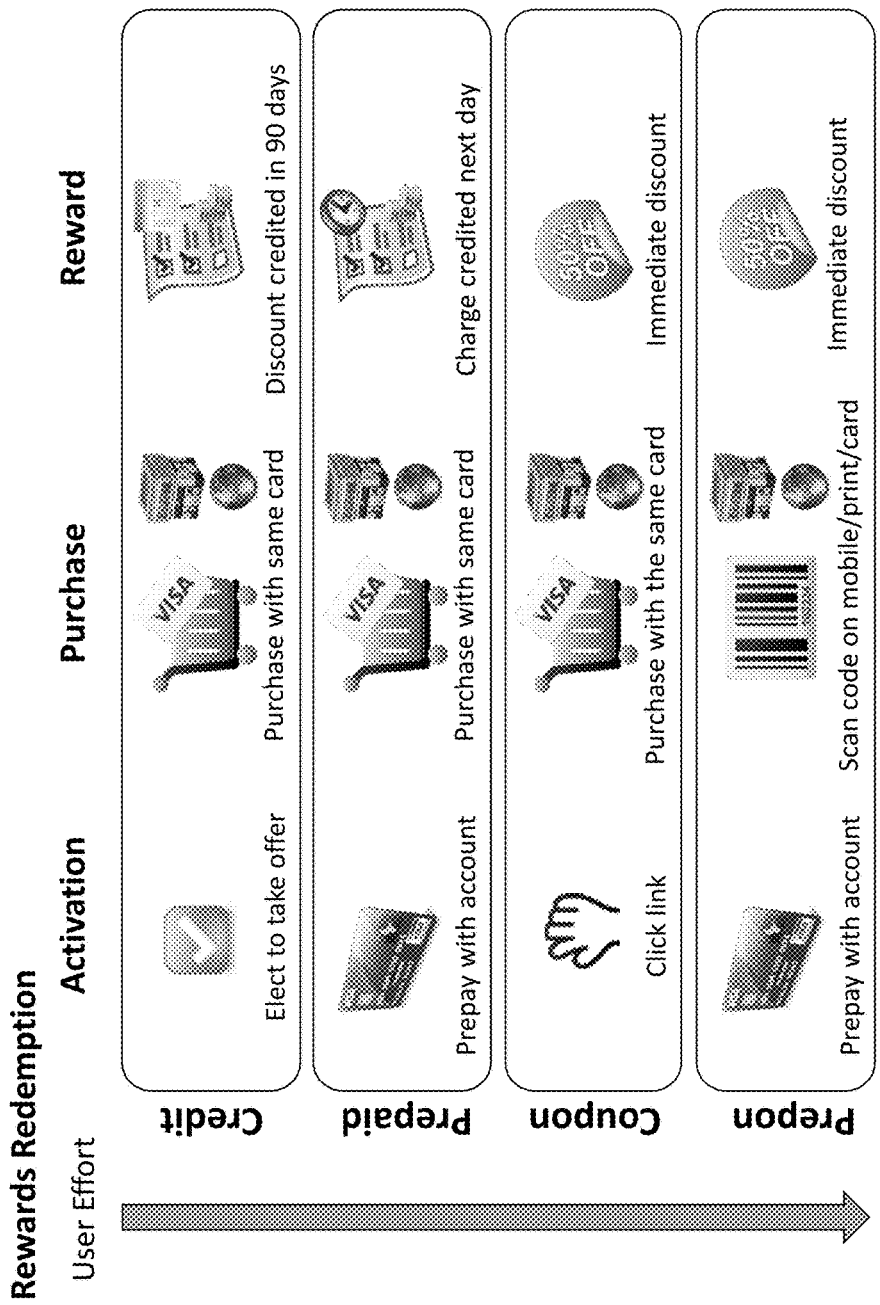
FIG. 30 depicts example rewards redemptions.

FIG. 30 illustrates an example of rewards redemption, including the steps of activation, purchase, reward, and the like. In embodiments, some rewards may be provided to the user after some period of time (e.g. credited in 90 days), the next day, immediately, and the like. For example, a user may elect to take a credit offer, make a purchase with the same card, and have a discount credited in 90 days. In this example, when the user elects to take a credit, they must swipe the same card at the store when they make their purchase and the credit is given automatically. In another example, a user may prepay with an account, purchase with the same card, and have the charge credited the next day. For example, if the pre-paid offer is $50 worth of merchandise for $40, the next time that the user goes to the merchant and pays at least $50, the entire $50 will get credited back to them automatically. In another example, the user may click on the coupon, and receive an immediate discount. The coupon may be online only or a physical coupon that could be printed or added to their mobile device for display or scan at a point of sale. In another example, the user may prepay with an account for a 'prepon', receive a code that can be stored on a mobile, print, card, and the like indicating that they have pre-paid, and receive an immediate discount when the code is scanned.

The decision engine 108 may apply factors in matching a savings opportunity to the user. For example, a financial institution may blacklist certain merchants, merchant types, transactions, transaction types, and the like from being used to match a purchase reward to the user. In another example, the financial institution or the merchant may use a spend pattern to match an offer to the user. In some embodiments, the offer may be made in conjunction with a display of spend pattern metrics. The spend pattern may be used to send alerts to the user regarding spend with a merchant, in a category, of a total amount, in a time period, and the like. In another example, a merchant may use past spend, past spend in a category, past purchase frequency, and the like to match a purchase reward to the user. In another example, the user's likes/dislikes, expand/collapse behavior regarding obtaining more information about an offer after seeing the offer headline, past purchase behavior, and the like may be used to match a purchase reward to the user. In yet another example, the system may use geographic proximity, location, inferences, seasonal adjustments, and the like to match a purchase reward to the user. For example, with respect to inferences, consumer traits may be identified by inference via transactional data, such as merchants, transactions, transaction types, merchant types, spend total, spend at a particular merchant, and the like. For example, based on transactional data, any of gender, credit rating, age group, life events, income level, psychographic state, demographics, and the like may be inferred. For example, a user suddenly spending more during multiple transactions at a high-end baby store may be inferred to be a high income, pregnant woman.

The spend pattern may be used to predict a store, restaurant, transaction, service, good, or the like that the user might like based on transactions, merchant, goods, services, and the like that appear on a user's statement. The prediction may be based on what other people like the user did in terms of transactions, merchant, goods, services, and the like. For example, referring to FIG. 65, a dialog box displaying purchase insights is shown. In embodiments, this dialog box may be associated with a user's financial account. In this example, because the user's prior merchant history 6502 indicates that the user is a customer of MACY'S, JC PENNEY is the predicted merchant 6504 the user might enjoy because other users who were customers of MACY'S also were customers of JC PENNEY'S. In embodiments, the decision engine 108 may be used to predict the predicted merchant 6504. In embodiments, the merchant may present an offer 6508 to the user to entice the user to shop.

In some embodiments, the prediction may be based on a single transaction, merchant, good, or service or may be based on a collection of such. For example, soon-to-be moms may make purchases at a collection of merchants, such as a baby store, maternity store, and bookstore. Past expectant mothers may have frequented the collection of merchants as well as a spa. In this example, the spa would likely not have been the predicted merchant based on only one of the common merchants, such as the bookstore for example, but based on the collection of merchants, the prediction of a spa may be made.

Users may indicate whether they like or dislike the predicted merchant 6504. These ratings may be used in subsequent predictions. For example, if the user does not like the predicted merchant, it will be put on a blacklist and not used in future predictions.

Financial institutions including banks, credit unions, and the like may have an interest in providing their customers with value added services. Currently some financial institutions such as banks, credit unions, credit card companies, and the like may provide the customer with summary information, analytics, and the like in addition to the specifics of individual transactions. An example of this may be a summary of spending by category over a time period, trends in spending in category, and the like. As part of providing the customer with different offers, significant analysis of the customer spending patterns may be done. The customer may benefit from additional insight into their spending profile including some of those generated in the development of a customer model. In one embodiment, the customer may be able to get detailed insights including spend as a function of time, time of day, geography, merchant-visits, category visits, and so on as illustrated in FIGS. 66 and 67. Additionally, the customer may be able to look at their spending relative to spending profiles of relevant peer groups which might include peers in a geographic location, age bracket, earnings bracket, and the like. Further, the customer can configure this information in a form that makes the most sense to the customer. This information may be provided on a financial institutes website, an application associated with a financial institute, a user dashboard, and the like.

One of the spend pattern metrics may be a spending chart, such as the merchant level spending chart shown in FIG. 66. The merchant level spending chart shows which merchants a user is spending at, as opposed to category-level spending. A menu 6602 may be used to set various parameters for the spending chart. For example, users may be able to set the view such as by merchant, by category, by week, by month, by amount, by geographical location, and the like. Users may be able to sort the data, such as by spend. Users may be able to set a time frame for the spending chart. In this example, spending amounts for the third quarter are presented for five merchants. Each of the bars may be interactive. That is, clicking on the bar may pull up the underlying data. Recommendations 6604 for various merchants, transactions, goods, services, offers or the like may be indicated by an icon presented with the spending chart.

Referring to FIG. 67, another example of a spending chart is shown with the parameters 6702 set to show a geographical view, a sort by dollars, and a timeframe of one month. The 'Breakdown by Proximity' chart 6704 shows spending at merchants within 10 miles of the user's home, between 10 and 50 miles, outside the user's metro area, outside the state, internationally, and online 6708. For each geographical category, a dollar amount is indicated. In other embodiments, a percentage may be indicated. A 'Top Cities' chart 6710 may show the level of spend for particular geographical locations, such as cities in this case.

Referring back to FIG. 66, the spending amounts presented for each merchant may be benchmarked against other users or known data. For example, a benchmark menu 6608 is presented for the user to select a desired benchmark for their data. In this case, the US average is selected. The benchmark data for the given merchant may be presented alongside the merchant data in the spending chart. By hovering or clicking on the data, a dialog box 6610 may pop up showing the user's spend at the merchant and the spend for the benchmark category, which is the US average in this case. In other embodiments, benchmarking may be done against a national average, a city average, a state average, similar people as defined by either: a) similar spend patterns, or b) similar demographics, and a private group.

To determine similar demographics, users may indicate certain characteristics in a profile, such as gender, age range, household type, number of children, household income, geographic location, and the like. In doing the benchmarking against similar people, the user may choose to weight particular characteristics over others, such as by assigning a relative priority to each characteristic or a weighting factor. The user may choose to benchmark against those with similar demographics but with one or more restrictions, such as users only in the same state. In embodiments, the user's geographic location may be obtained by a mobile device viewing the user's statement.

In benchmarking against a private group, a user can create a group of individuals, such as high school friends, family, neighbors, and the like to get feedback on how the user compares in spending against that group without sharing any personal information across the group. Likewise, users may accept invitations to be part of other private groups. Certain security features may be built in to creating and joining private groups. For example, users may be required to provide a password in order to join a private group. In any event, users may be members of multiple private groups and may select any of them to benchmark against. Additionally, social features may allow users to share information with the private group. For example, users may be able to share information with private group members by email, a social network, and the like.

Transaction data may be augmented with third party data in order to improve the matches. In an embodiment, census data may be used in addition to the transaction data to make a match of a savings opportunity. Since the system works with anonymized transaction data, the system knows only what it can infer about the user or what is provided by the user. Based on the user's location, possibly inferred by the system or manually input by the user, census data for the location, such as ethnic makeup, population educational level, income levels, and the like, may be used to provide a substitute demographic profile for the user. One or more of the substitute demographic profile, transaction data, and inferred traits may be used to match a savings opportunity to the user. In another embodiment, merchant data may be accessed using a third party data source and used to improve targeting to the user. For example, a restaurant may be searched on YELP.COM to obtain information about the type of cuisine offered, type of atmosphere, price range and the like. These data may be used as factors in the system's match of a savings opportunity to a user. The $3^{rd}$ party data may or may not be displayed to the user along with the savings opportunity. Continuing with the example, if the restaurant was determined to be a family-friendly place, a savings opportunity at the restaurant may not be matched to a person who has been inferred to be single/dating based on transactions for flowers and higher-end restaurants. In yet another embodiment, the savings opportunity may be analyzed and $3^{rd}$ party data may be obtained to improve matching it. For example, $3^{rd}$ party information about a product that is the subject of the savings opportunity may be used to improve the match.

Figure 31:
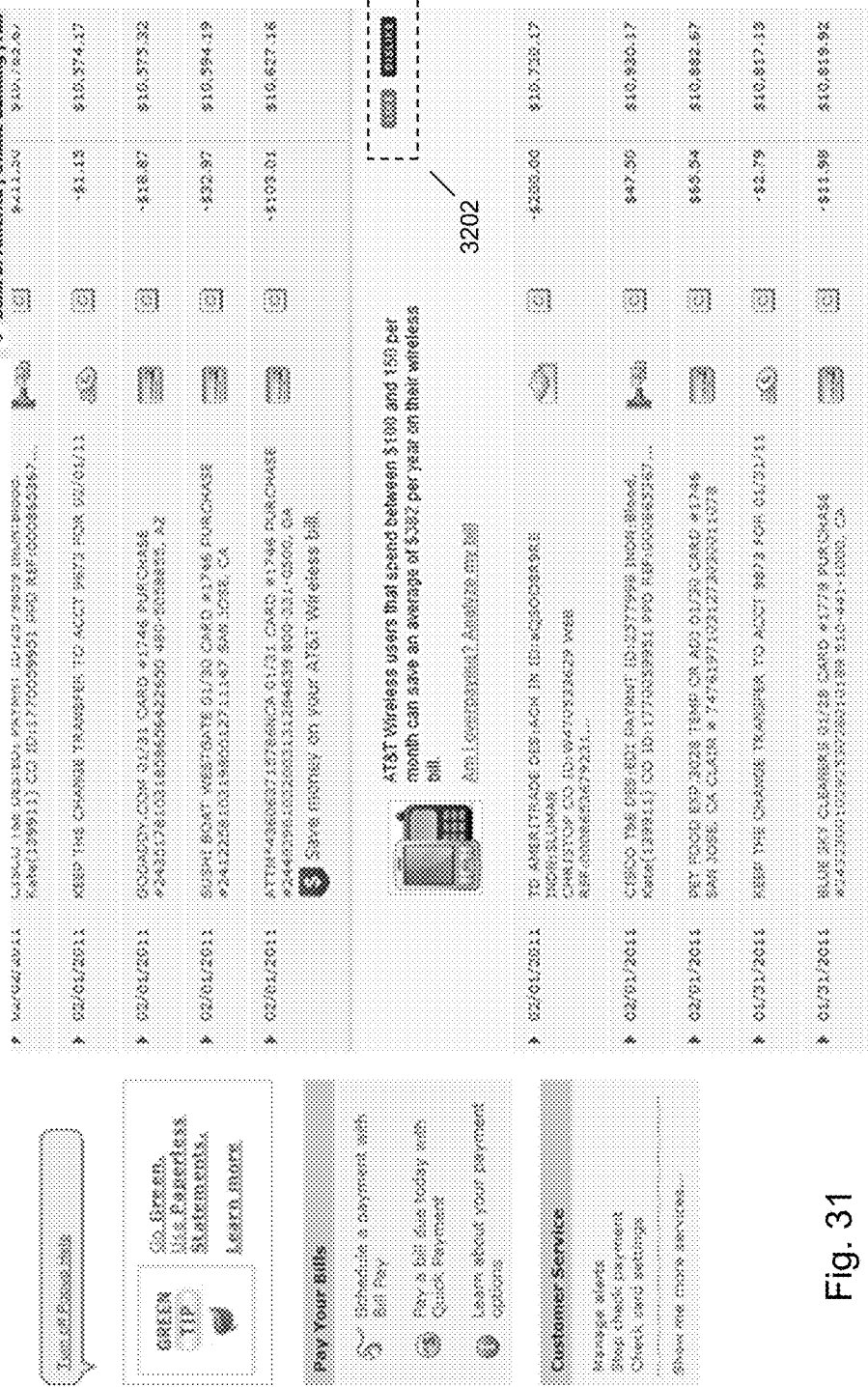
FIG. 31 depicts an integrated bill analysis, with 'like/dislike' button.

FIG. 31 illustrates an example of an integrated bill analysis, such as with a 'like-dislike button' 3202. In embodiments, the like-dislike button may provide the user with the option to select an offer or not, that is, to accept as liking the offer, or to decline as disliking the offer. In embodiments, a selection of dislike may remove the offer, change some physical attribute of the offer (e.g. changing color, hiding, minimizing, deleting). In embodiments, a selection of liking the offer may send the user to a website managed by the present disclosure, performed automatically, sent to a third-party site, and the like, where automatically performed may be implemented through an embedded block of code (e.g. Java code), and the like. In embodiments, the user may be able to share offers, information about offers, and the like, with other individuals, such as through a social network, and as a result improve the value of their offer. Although the like-dislike button has been depicted in an illustrated bill analysis, the like-dislike button may be applied to any user interface disclosed herein where the user has an option to select a service, product, offer, and the like.

Figure 32:
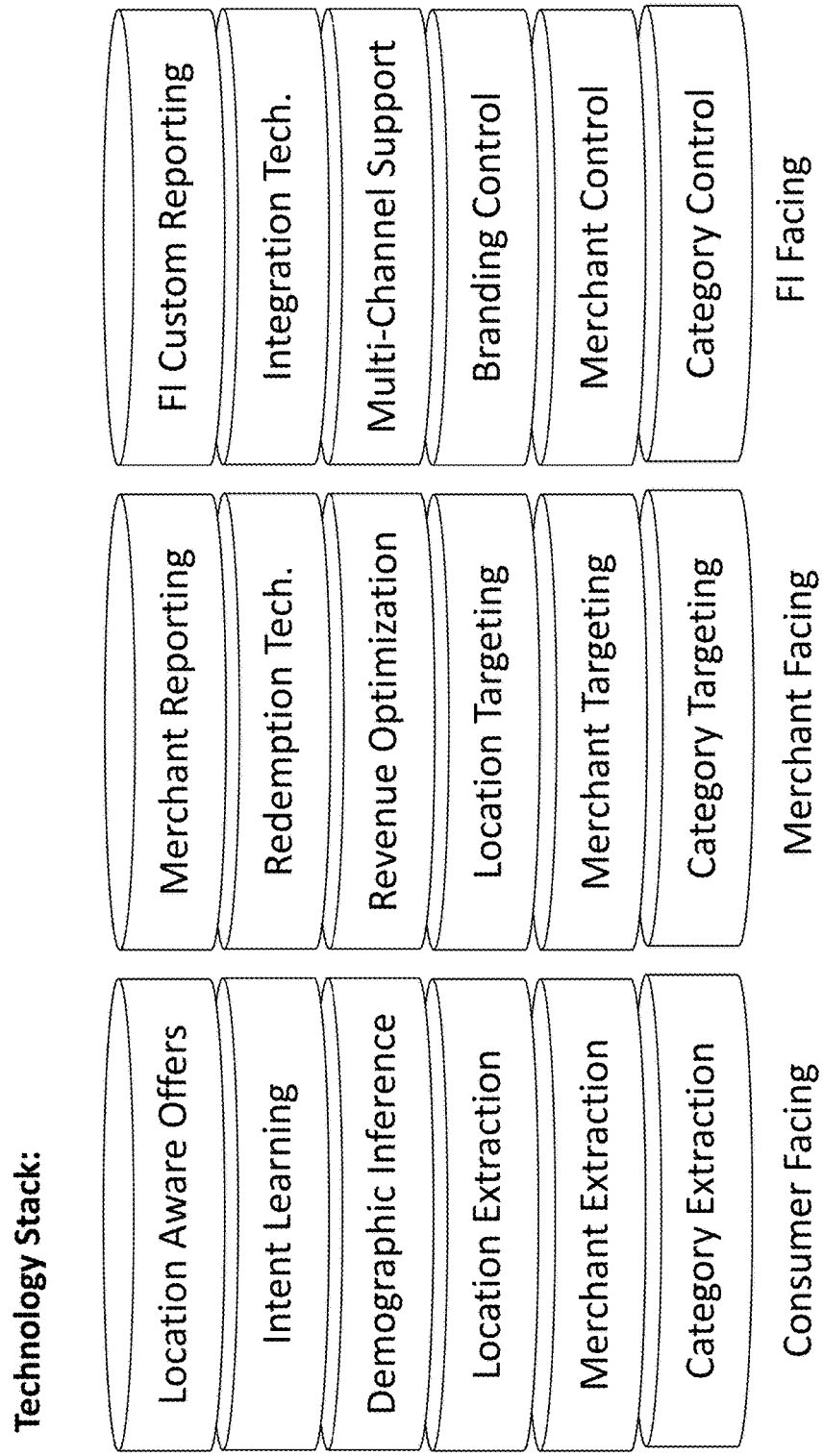
FIG. 32 depicts an embodiment technology stack.
Figure 33:
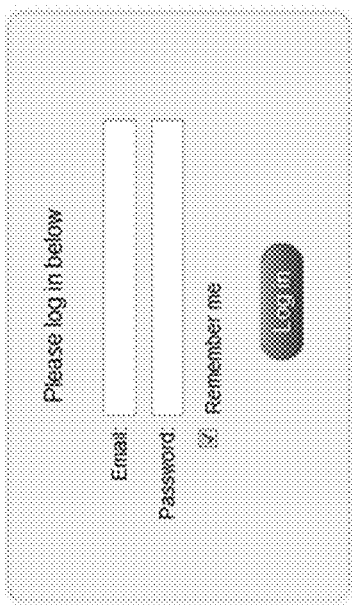
FIG. 33 depicts a welcome and login for an embodiment bank dashboard.
Figure 34:
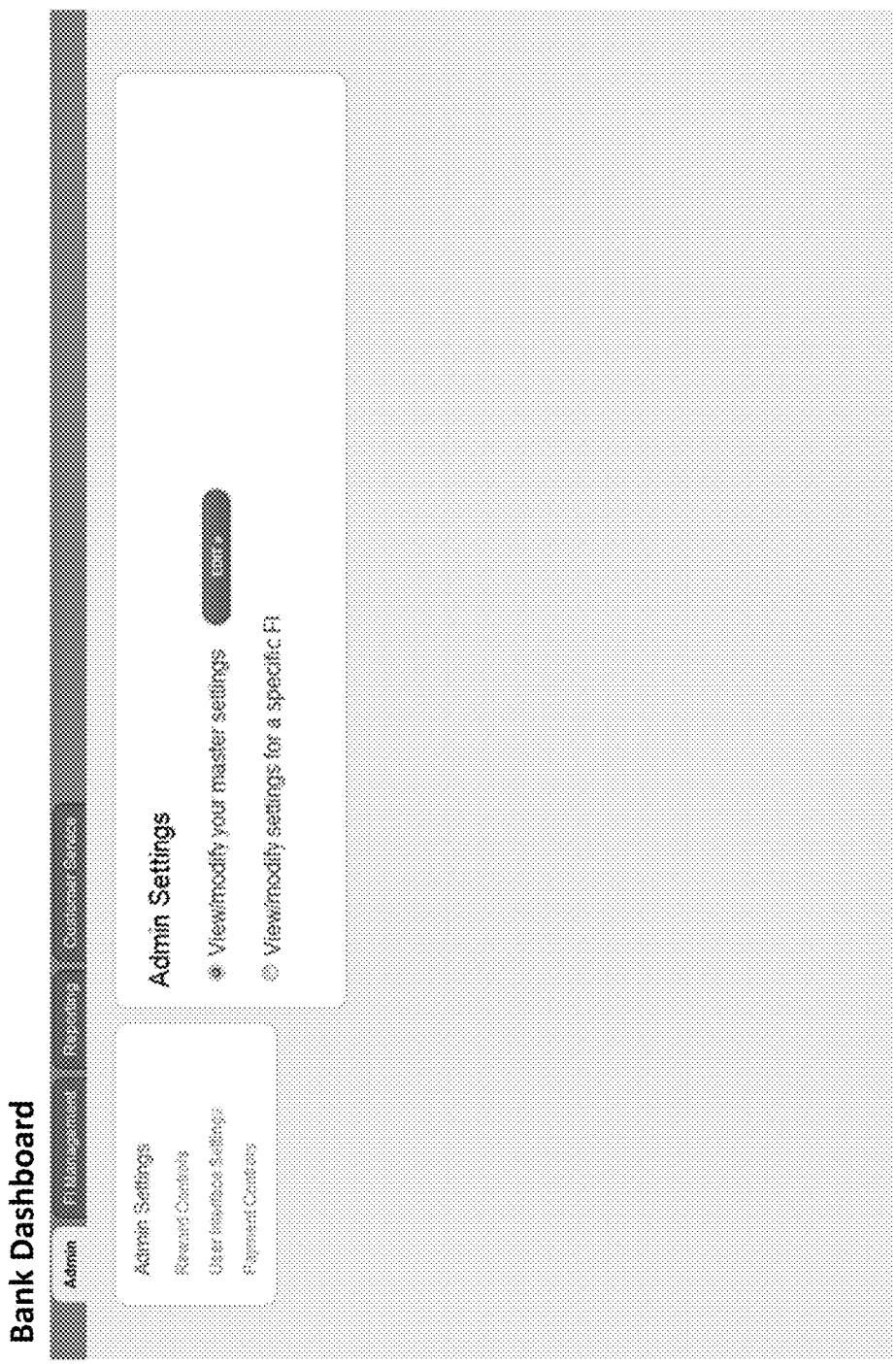
FIG. 34 depicts administration settings for an embodiment bank dashboard.

FIG. 32 illustrates embodiment technology stacks, such as for consumer facing, merchant facing, financial institution (FI) facing applications. For instance, a consumer facing stack may include location aware offers, intent learning, demographic interface, location extraction, merchant extraction, category extraction, and the like. Merchant facing may include merchant reporting, redemption techniques, revenue optimization, location targeting merchant targeting, category targeting, and the like. Financial institution facing may include financial institution custom reporting, integration techniques, multi-channel support, branding control, merchant control, category control, and the like.

FIGS. 33-44 illustrate embodiment windows for a bank dashboard, including a welcome-login window, an administration tab (e.g. with administration settings, reward controls, user interface settings, payment controls), a financial institution tab (e.g. with pending registrations, active registrations, denied registrations), a reporting tab (e.g. with prepaid reward purchases report in FIG. 40, Coupon Reward Purchases report in FIG. 41, Bill Analyzer Metrics in FIG. 42, revenue, active rates, performance graphics, key statistics, campaign performance), a customer service tab (e.g. with user lookup, contacting customer service), and the like. For example, in the dashboard shown in FIG. 35, the financial institution can set a reward density by indicating the maximum number of rewards per statement. In this embodiment, three options are given to the financial institution to customize reward density: no maximum and auto-optimized, the maximum number of rewards per statement, and maximum percentage of transactions matched to a reward. Finer adjustments may be available in other embodiments. The financial institution can set the maximum or any other reward density desired manually. Auto-optimization may be run on a per-user basis. For example, the financial institution may offer three savings opportunities per statement. Depending on the user engagement with the savings opportunities, the reward density may be optimized up or down. Additionally, the reward type may also be changed in auto-optimization. Optimization may be restricted to a time period, to a specific BIN/IIN number, and the like. The dashboard may also be used to blacklist merchants, merchant types, transactions, or transaction types from being included in the analysis for a savings opportunity match.

Financial institutions including banks, credit unions, and the like may have an interest in providing their customers with value added services. A financial institute may have a vested interest in monitoring these services and how they are provided including the actual value provided to the financial institutes customers, the flow of revenue from these services to the financial institute, and the like. In a further embodiment of this system the financial institute may be provided with an interface such as a dashboard, website, mobile app, or the like where they may interact with the services. FIGS. 33-44 illustrate embodiment windows for a financial institute dashboard, including one or more of a welcome-login window, an administration tab, a financial institution tab, a reporting tab, a customer service tab, and the like.

Financial institutions including banks, credit unions, and the like may have relationships with various merchants including acting as a supplier of financial services to a merchant, collaborating with a merchant to issue credit products including merchant branded credit cards, debit cards and the like, having a financial stake in the merchant, and the like. The existence of such relationships may cause a financial institution to have a vested interest in guiding its customer to offers that support such merchants or the use of redemption methods that provide a return to the financial institution. The administration tab may include features to enable this such as blacklisting competitor merchants and or merchant types, limiting the transactions, or redemption methods, including competitor financial instruments, which may be used to redeem the offers. The administrative tab may also include administration settings, reward controls, user interface settings, payment controls, and the like.

Figure 40:
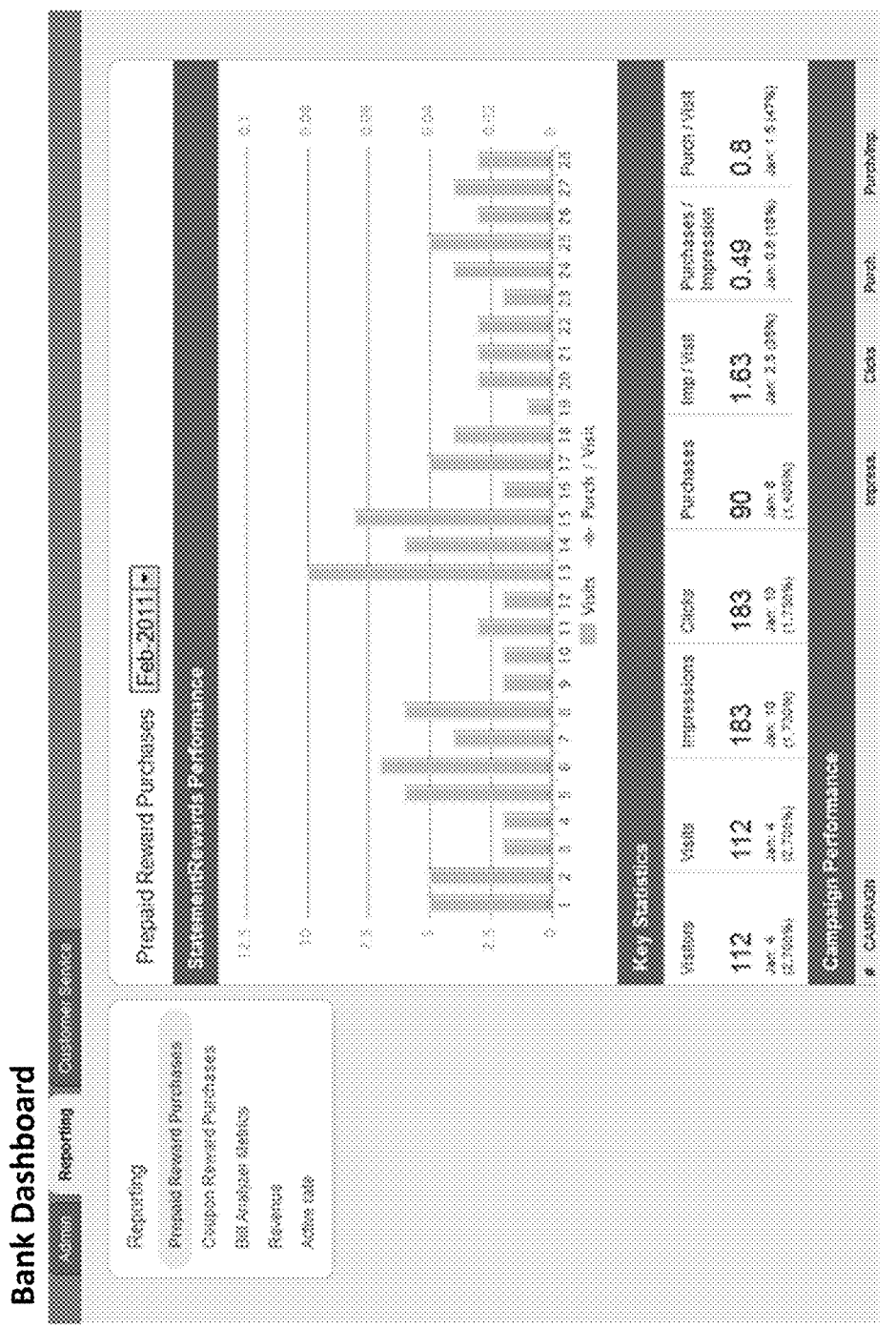
FIG. 40 depicts a reporting window in an embodiment bank dashboard.
Figure 41:
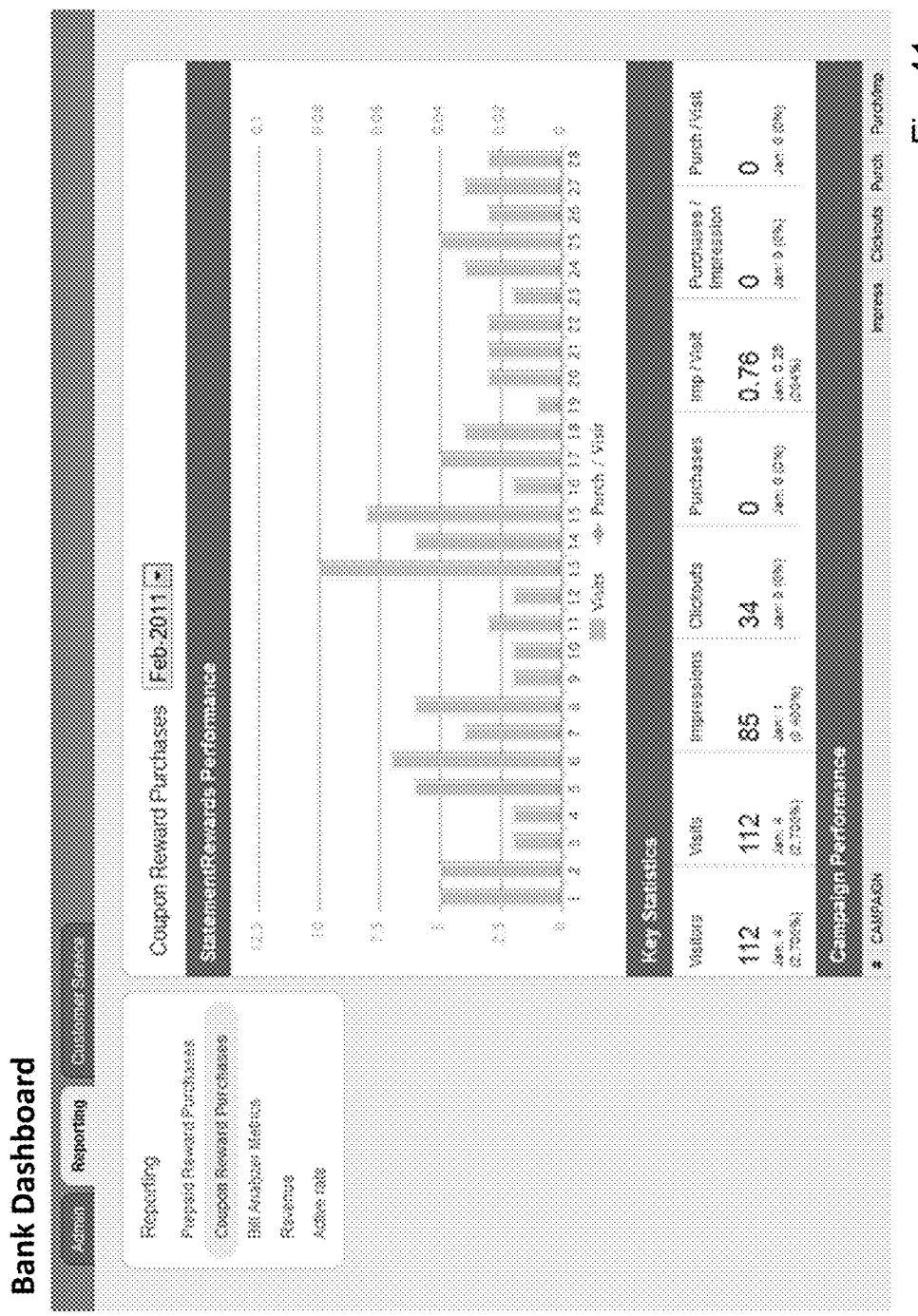
FIG. 41 depicts a reporting window in an embodiment bank dashboard.
Figure 42:
FIG. 42 depicts a reporting window in an embodiment bank dashboard
Figure 43:
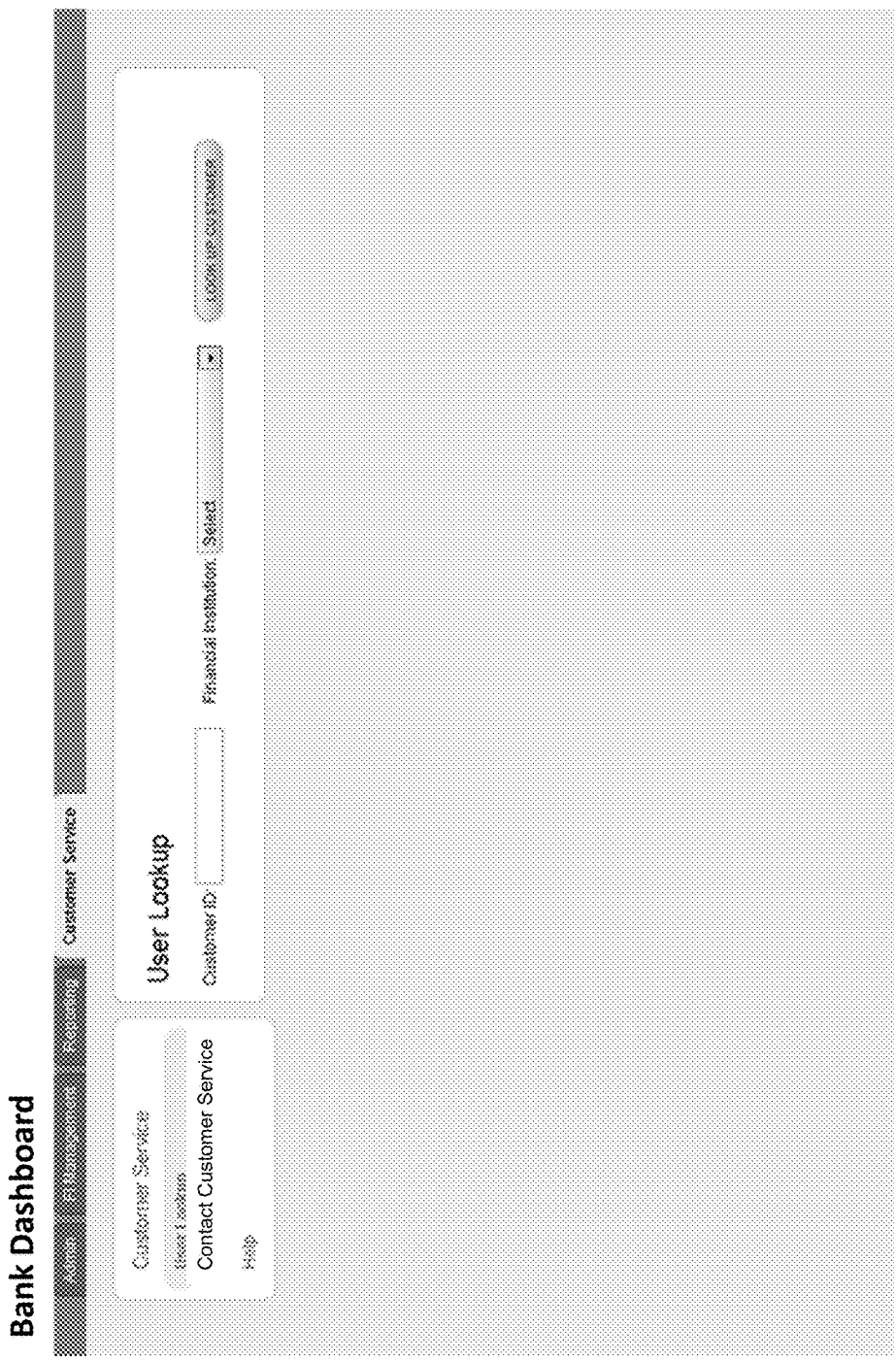
FIG. 43 depicts a customer service user lookup in an embodiment bank dashboard.
Figure 44:
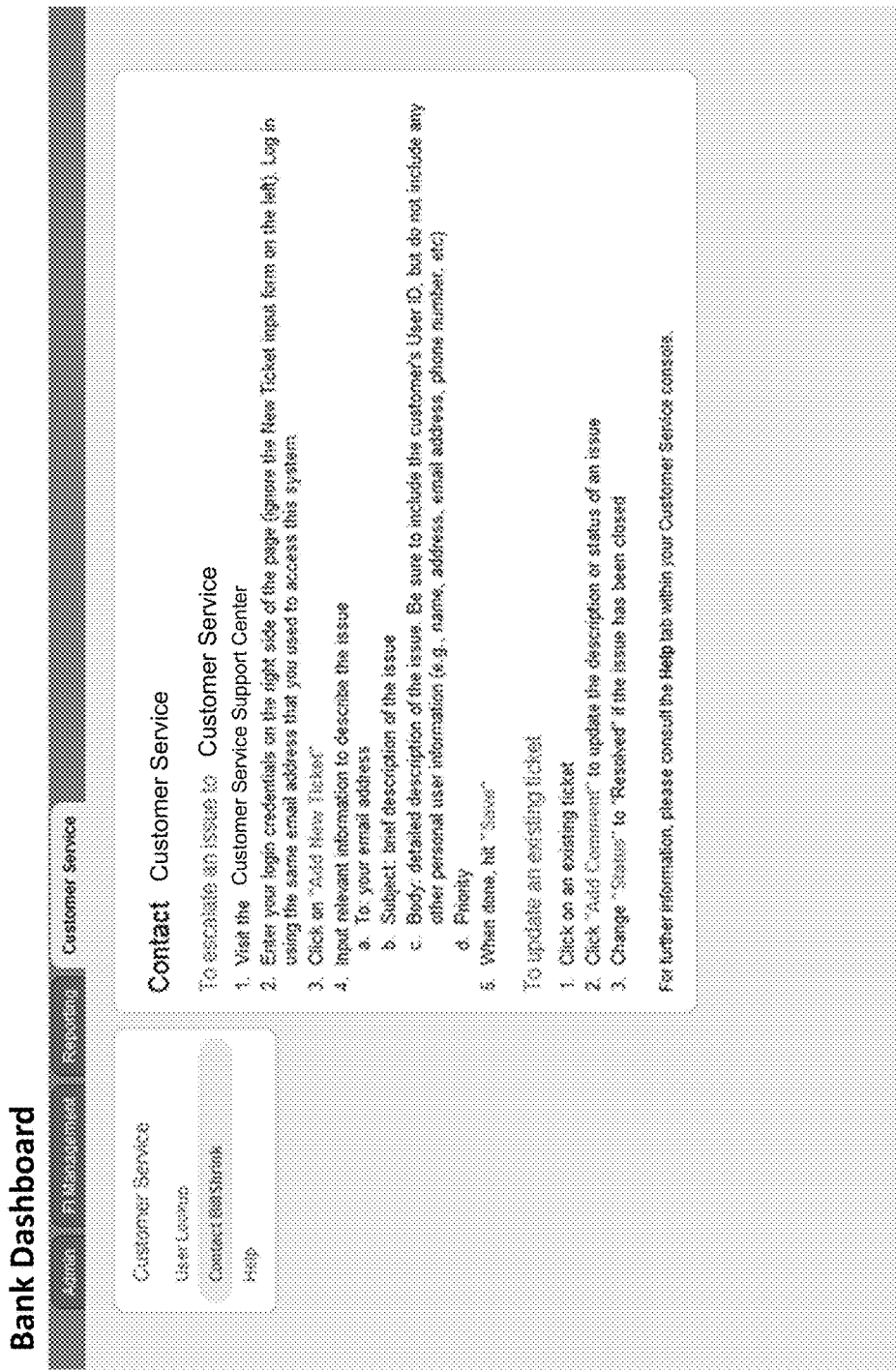
FIG. 44 depicts customer service contact for an embodiment bank dashboard.

A reporting tab may include reports on prepaid reward purchases as illustrated in FIG. 40, coupon reward purchases as illustrated in FIG. 41, bill analyzer metrics as illustrated in FIG. 42, revenue, active rates, performance graphics, key statistics, business analytics, campaign summaries, user feedback, campaign performance as a function of individual campaign, groups of campaigns or overall, sale performance, transactions per customer, revenue per transaction, revenue per customer, category spend, average monthly bill, value-addition to the financial institutes customers and the like. The performance graphics and reports may be customized including time frame, metrics to be reported, campaigns to be included, and the like.

The financial institution tab may include pending registrations, active registrations, denied registrations, and the like. A customer service tab may include user lookup, contacting customer service, and the like.

Figure 35:
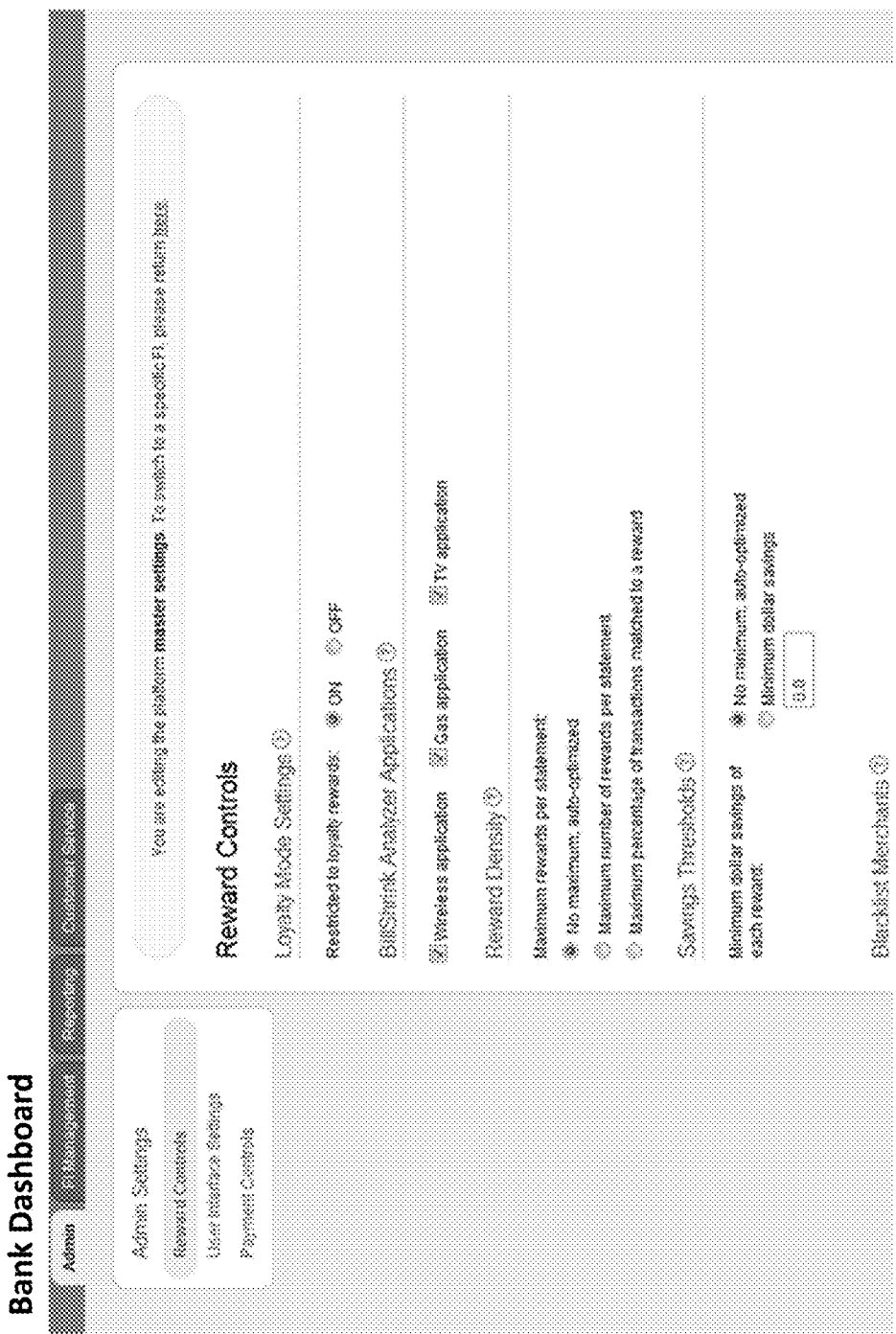
FIG. 35 depicts rewards controls for an embodiment bank dashboard.
Figure 36:
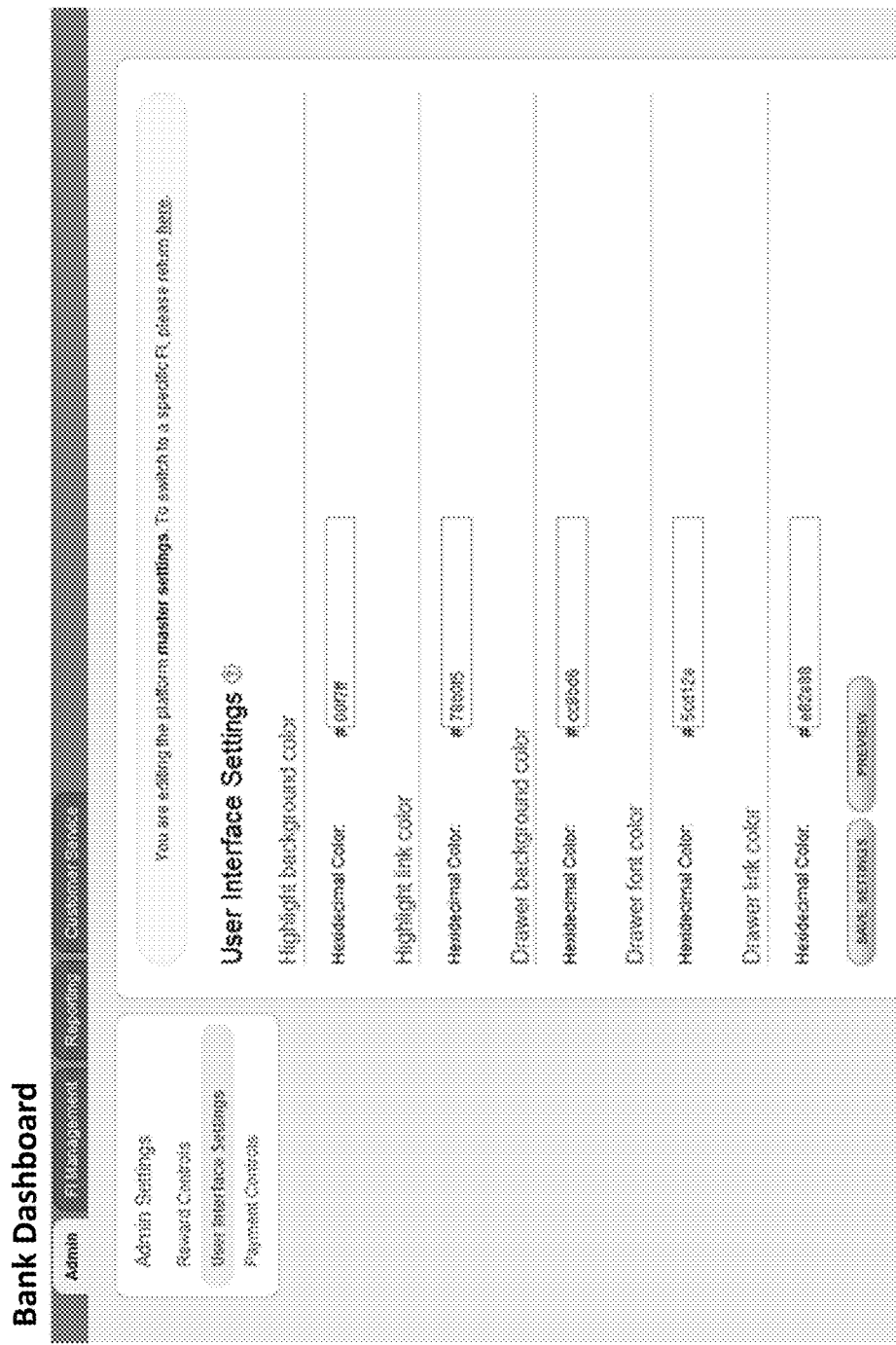
FIG. 36 depicts user interface settings for an embodiment bank dashboard.
Figure 37:
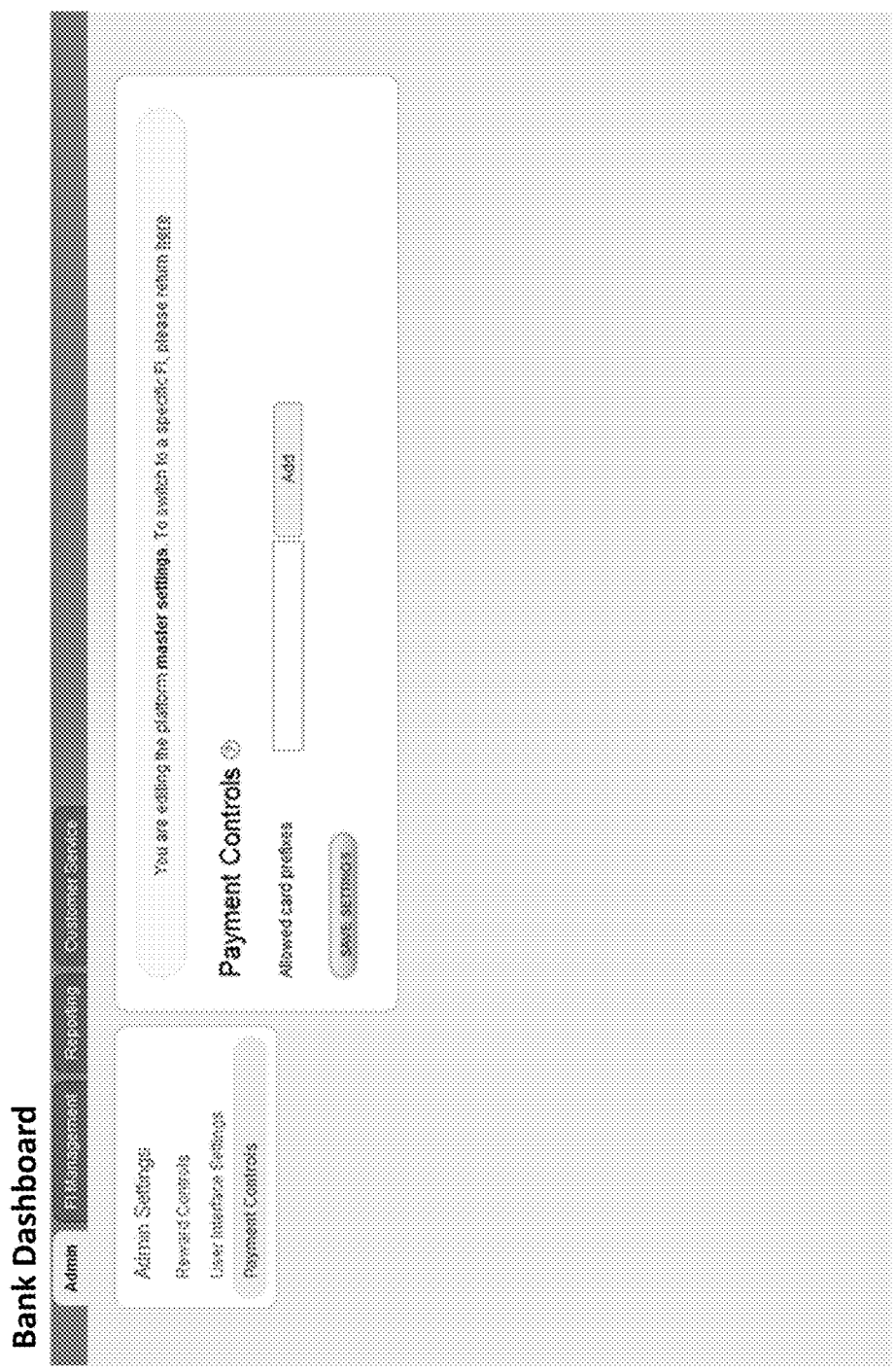
FIG. 37 depicts payment controls for an embodiment bank dashboard.
Figure 38:
FIG. 38 depicts financial institution management for an embodiment bank dashboard.
Figure 39:
FIG. 39 depicts an approve-deny window for financial institution management for an embodiment bank dashboard.

In a further embodiment, as shown in FIG. 35, the financial institution can set a reward density by indicating the maximum number of rewards per statement. In this embodiment, three options are given to the financial institution to customize reward density: no maximum and auto-optimized, the maximum number of rewards per statement, and maximum percentage of transactions matched to a reward. Finer adjustments may be available in other embodiments. The financial institution can set the maximum or any other reward density desired manually. Auto-optimization may be run on a per-user basis. For example, the financial institution may offer three savings opportunities per statement. Depending on the user engagement with the savings opportunities, the reward density may be optimized up or down. Additionally, the reward type may also be changed in auto-optimization. Optimization may be restricted to a time period, to a specific BIN/IIN number, and the like.

Figure 69:
FIG. 69 depicts an example of cross selling.

As a component of doing business financial institutes including banks, credit unions, and the like may use analytic programs to evaluate their customers on one or more criteria including net revenue to the financial institution, spending profile, opportunity to provide additional services, and the like. Identifying net revenue may include classifying customers as revenue-positive, revenue-neutral, revenue-negative and the like. One method of evaluating the customer may involve analyzing spending patterns including merchants, geographic location, category spending, and the like. Future propensity of customer to spend in particular merchant/category buckets and the like may also be computed This analysis may be used to identify potential current and future needs for financial instruments including loans, credit cards, refinancing, and the like. Additionally, analysis may include evaluation of potential profitability to the financial institution based on cross-sell opportunity and customer profitability. These inferences may be leveraged from transactions and data known to the financial institution to deliver timely and perfectly matched cross-sell products. FIG. 69 depicts an example of a cross-sell for an auto-loan refinance based on an auto insurance transaction.

The cross-sell tab on the financial institute dashboard may include identification of cross-sell opportunities, creation of customer offers based on identified opportunities and customer information, performance on offered cross-sell opportunities including financial metrics, acceptance rates and the like.

FIGS. 45-51 illustrate embodiment windows for a merchant dashboard, including a campaign tab (e.g. with choosing a saved reward, creating a reward, setting reward matching criteria, purchase limits, targeting merchants or categories, targeting rewards by merchant, targeting geographies, date range, campaign performance graphics), reporting tab (with performance graphics, key statistics, business analytics, campaign summary, user feedback, campaign performance, sale performance, transactions per customer, revenue per transaction, revenue per customer, category spend, average monthly bill), 'My Account' tab, and the like. The merchant dashboard may be white-labeled. The merchant dashboard may be self-service.

In an embodiment, the system of the present disclosure may facilitate a conditional purchase by a user from a merchant of a good or service, wherein the purchase may be conditioned on receiving a discount wherein the discount may be provided based on various bidding offers that may be received from the user. For example, the user may place a bid for a purchase amount and a discount amount that they may wish to get. For example, a user interested in buying merchandise worth $100 from a retail store may ask for a discount of 40% on that merchandise as a pre-condition. In such cases, the merchant may decide whether or not to accept the bid offer from the user. The merchant decision may be based on one or more of an inventory, a production plan, a pricing strategy, and the like. The user may have the opportunity to modify their bid offer. For example, if the merchant does not accept the user's offer to purchase a $100 item at a 40% discount, after being notified of the decline, the user may decrease the discount requested, increase the quantity of items chosen, add additional items, modify the items, and the like and re-submit the offer for consideration by the merchant. This cycle may continue until the bid is accepted or the user stops bidding.

In another embodiment, the bid offer may be automatically incremented up until an amount indicated by the user or according to a rule. For example, the user may offer to purchase a $100 item at a 40% discount but indicate when they set their offer that if it may be declined by the merchant, it may automatically be incremented to a next bid offer. The next bid offer may be explicitly indicated by the user or may be determined by consulting one or more rules. For example, the user may indicate that the offer should be decreased by 5% each time the merchant declines the offer until reaching 20% where no further offers may be made.

In another example, a user may commit to purchasing an item of a particular value if a merchant is willing to sell that item at a lower cost. The merchant may decide whether or not to accept the commitment from the user.

In an exemplary embodiment, the merchant may accept or decline the bid offer through preset rules. These preset rules may include types of bid offers, types of discounts that the user may seek, and the like. These preset rules may be defined by the merchant. Further, the preset rules may facilitate a merchant to select bid offers to be accepted from the total bid offers received by the merchant. The preset rule may also enable the merchant to decide on the volume and kind of users from which the merchant may accept bid offers. In another embodiment, the merchant may accept bid offers dynamically. In this embodiment, the merchant may need to manually approve certain bid offers from a user from among the total bid offers received by the merchant. It will be evident to a person skilled in the art that merchants may accept bid offers through a combination of the preset rules and the dynamic fashion.

In an embodiment, once the user has placed a bid offer for a good or service, an acceptance message of the bid offer may be delivered to the user through one or more of an email, a text message, a message in their account statement, or the like. The account statement may facilitate the system to identify various merchants for which the user has placed a bid offer. Further, the account statement may also provide information about the merchant who may have accepted the bid offer placed by the user. In another embodiment, the user may be approached directly by the merchant who may have accepted the bid offer of the user. In such cases, the merchant may send an e-mail, text message, or the like to the user to inform them about the acceptance of their bid offer.

In an embodiment, when reviewing an account statement, a user may have the opportunity to present an offer for a future purchase to a merchant. The merchant may be identified on the current statement or may be identified by the system as an alternative good or service supplier. In any event, the statement may include an integrated application to make the offer or may include a link to an application for presenting offers. For example, as the user reviews their credit card statement transactions, the application may be integrated to put an instance of an offer window at each transaction line, somewhere on the statement, somewhere on the web page, and the like.

In an embodiment, the application may be a browser plug-in that is active as the user is visiting various websites. For example, as the user visits WALMART.COM and navigates various pages, the browser plug-in may deploy the application in a banner, frame, or the like for the website. When the user sees an item they would like to purchase, they can interact with the application to present an offer to WALMART for the item.

Figure 68:
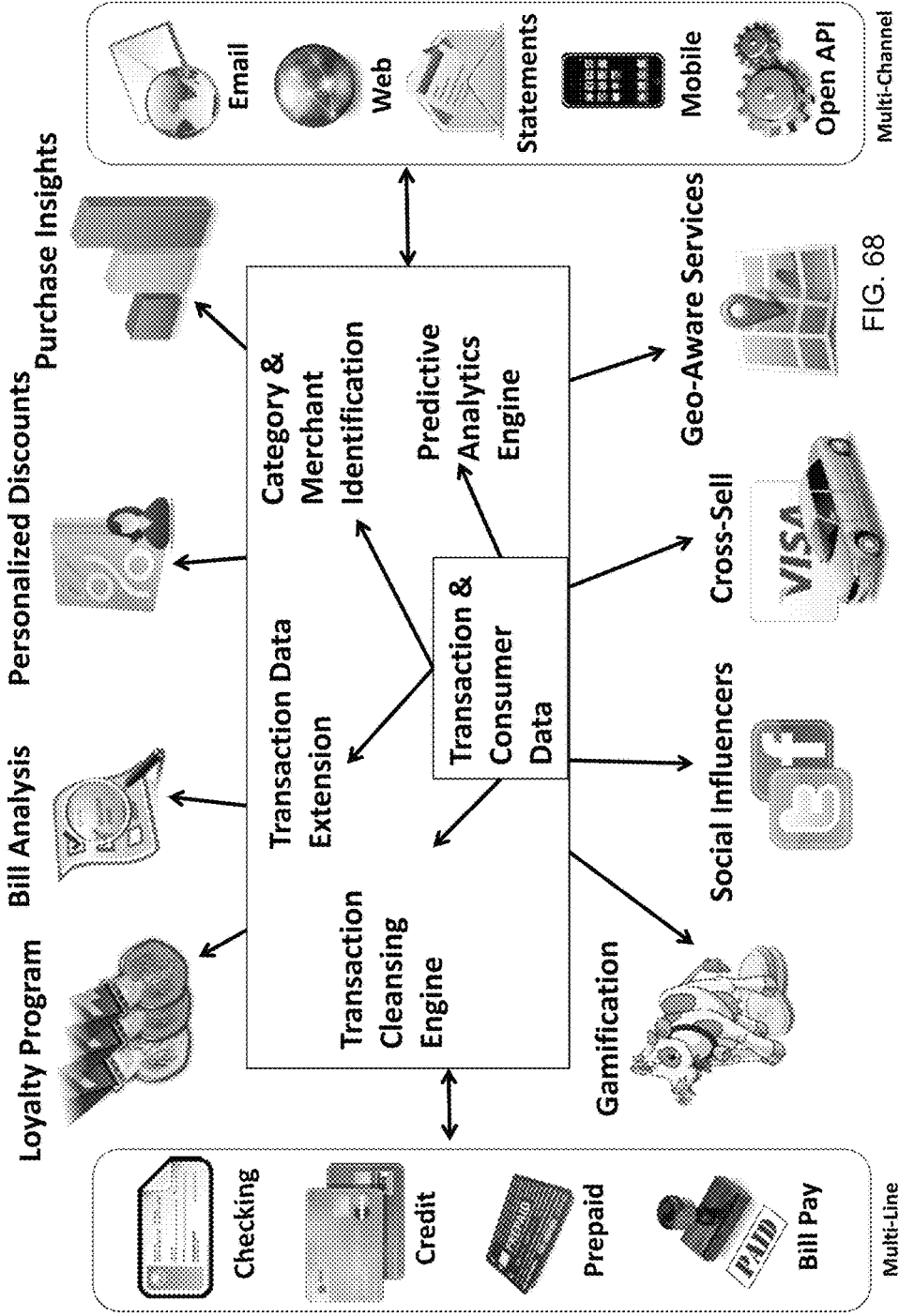
FIG. 68 depicts a data driven personalized services platform.

Referring now to FIG. 68, a data-driven personalized services platform is presented. At the heart of the platform is transaction and consumer data that feed into a transaction cleansing engine to, in embodiments, remove personal data or other identifiers; a transaction data extension which feeds into such processes that extend the platform outside of rewards, such as future spend initiatives (e.g. gamification) and cross-selling and others; category and merchant identification which feeds into loyalty programs, etc.; and a predictive analytics engine. The transaction and consumer data can be derived from any one of checking transactions, credit card transactions, prepaid card transactions, and bill pay transactions.

There are many features of the platform 6800 that build off of this core that will be detailed herein. The platform can enable a user to filter transactions on the bill for reviewing such as by a date range, a proximity to a location, a category of transaction, those transactions with associated rewards, and the like. Further features and functionality will be described herein.

Bill analysis can be done on various, typically recurring, transactions that the data-driven personalized services platform accesses to make recommendations for various services, such as changes to a telephone/cellular service, changes to a television/broadband service, changes to a gasoline provider, and the like. Bill analysis has been previously described herein with respect to the consumer service comparison shopping system 100. All of the methods and features described with respect to that system 100 are encompassed by 'bill analysis' and may be exemplified in FIGS. 14-17, 21-23, and 31. In this embodiment, the bill analysis functionality is integrated with all of the other functionality of the data-driven personalized services platform.

Personalized discounts, or purchase rewards at merchants that cardholders like to shop at, can be created based on the specific profile of a user, such as based on past transaction history and in particular from conclusions drawn about that customer from that transaction history. The platform 6800 may offer rewards on everyday purchases based on user purchases, such as user's own merchants and category preferences, cluster analytics across users, and predictive analytics within and across users. Purchase rewards have been previously described herein and exemplified in FIGS. 52-56, 59, and 60.

Social-enabled rewards involves identifying and leveraging social influencers among users and creates positive social conversations and visibility for the brand and the financial institution. Seeing social networking activity and transactions of a group of people allows recognition of who is really influencing others to purchase. Then, rewards may be targeted to those people with the expectation that they will influence others to also take advantage of the rewards by sharing them with their social network, such as has been described previously herein with respect to a shared savings opportunity and FIG. 53.

A multi-merchant loyalty platform is a "universal" program where points apply across the entire financial life of the individual (e.g. points for all their spending, rewards in every area they spend on), as has been described previously herein with respect a loyalty program, loyalty-based offers, and FIGS. 24 and 25. FIGS. 53, 55, and 56 also illustrates a reward level aspect of a loyalty program, wherein the loyalty-based offers are filtered or modified by reward level. In effect, the financial institution card becomes a loyalty card at multiple merchants with no separate card to signup for or swipe at every purchase. Merchants can use a self-service platform, or dashboard, which may be financial institution co-branded, to oversee various aspects of the multi-merchant loyalty platform, such as in FIGS. 45-51. The merchant dashboard may allow merchants to review data for all of their customers, not just those with a particular financial institution. Data viewable on the merchant dashboard may include: category performance such as % shoppers in a category, % dollar spend in a category, % store visits in a category; customer profiles such as spend distribution and visit frequency distribution; regional insights such as same store analysis and a geographic spend profile. A campaign builder, as depicted in FIGS. 45 and 46 may be included in the dashboard and may be used to set reward specifications, provide reward text, determine if the reward is eligible for social sharing. A performance review may give statistics on impressions, engagement rate, purchases, purchase rate, engagement metrics (e.g. expansions, likes, social network shares, change in monthly activity), top active campaigns, and an account profile.

Future spend incentives, or the gamification of spend, involves the ability of the platform to create game-like dynamics, such as rewarding a customer for accomplishing certain objectives. The objectives may be accumulating points, a total spend at a merchant, a certain number of transactions/visits, a monthly spend at a merchant, a spend in a time period, a total number of items purchased, and the like. These initiatives encourage future customer spend with the financial institution, encourage future spend at a given merchant, and the consumer gets incentives for choosing their future spend patterns. In an embodiment, merchants fund the rewards. FIGS. 54-57 depict various aspects of future spend initiatives.

Geo-enabled rewards deliver value to cardholders on things they love around them. Users can be given offers, points, savings opportunities, etc. based on location, but also based on the users' history and analytics, including spend pattern, as described herein. FIGS. 61A-D depict an embodiment of geo-enabled rewards.

A cross-sell feature of the platform enables cross-sale of related items. The merchant targeting engine can be leveraged by the financial institution for cross-sell. Inferences may be leveraged from transactions and data known to the financial institution to deliver timely and perfectly matched cross-sell products. A real-time dashboard for creation and performance reports on offers may be used for cress-sell. FIG. 69 depicts an example of a cross-sell for an auto-loan refinance based on an auto insurance transaction.

Purchase insights, or spend pattern metrics, may be useful for providing recommendations based on a cardholder's transactions and social benchmarking of their spend. Purchase insights can provide analysis to merchants and consumers about purchases, as depicted in FIGS. 65-67.

The platform may provide a buy on behalf functionality. Users may be able to buy non-network deals (e.g. Groupon) without leaving the financial institution site. The deal may be charged directly to the financial institution card and the fulfillment certificate may be received inline without signups or linkoffs. This functionality may be depicted with respect to FIGS. 53, 59, and 60.

As previously described herein, the reward types offered by the platform 6800 may be a pre-paid certificate, an offline coupon, an online coupon, a statement credit, or a future reward. The offers may be delivered via email, web, statements, mobile, ATM receipts, Open API, and the like.

Due to the highly sensitive nature of financial transaction data, security between a financial institute and external companies such as merchants, service providers, customer analytics, and the like must be robust. Additionally, financial institutes may have strict controls on how external companies may interact with their network, customer information and the like. It is an object of this disclosure to provide for an easy mechanism to authenticate a connection and sharing of data between a financial institution and an external company such as a merchant, service provider, customer analytics company, and the like. As part of this security mechanism, the financial institute and the external service provider may define what types of customer information are to be shared and the format in which it will be shared. The shared information can be any random information including strings, numbers, and the like that the financial institution wishes to associate with a financial institution user. The information to be shared may be anonymized (personal identifying information removed) using techniques such as encryption, hash tags, verification of the data, and the like. The information may be further secured by encrypting or hashing the data to be shared using encryption or hash keys which may have been previously established between the two parties. Information shared from the financial institute may be shared in the form of a cookie, java script variable, through a hidden form element, or the like. Where the service provider supports one or more financial institutes, additional information may be shared including identification of the financial institution and the like.

Merchants benefit from the unique capabilities of the platform 6800 by being able to understand their customers or potential customers in terms of a segmentation but without having to rely on personally identifiable information. Merchants enjoy an engaged reach via the platform that also provides payment integration, thus offering a closed loop system. For merchants, the platform may be a full cycle CRM platform that allows merchants to perform competitive analysis, ROI analysis, offer a social aspect to rewards, and offer a seamless loyalty program, all while engaging and acquiring customers. Other benefits may include higher relationship value & card spend, new customer acquisition, additional direct revenues, higher customer satisfaction, and higher online usage.

Figure 70:
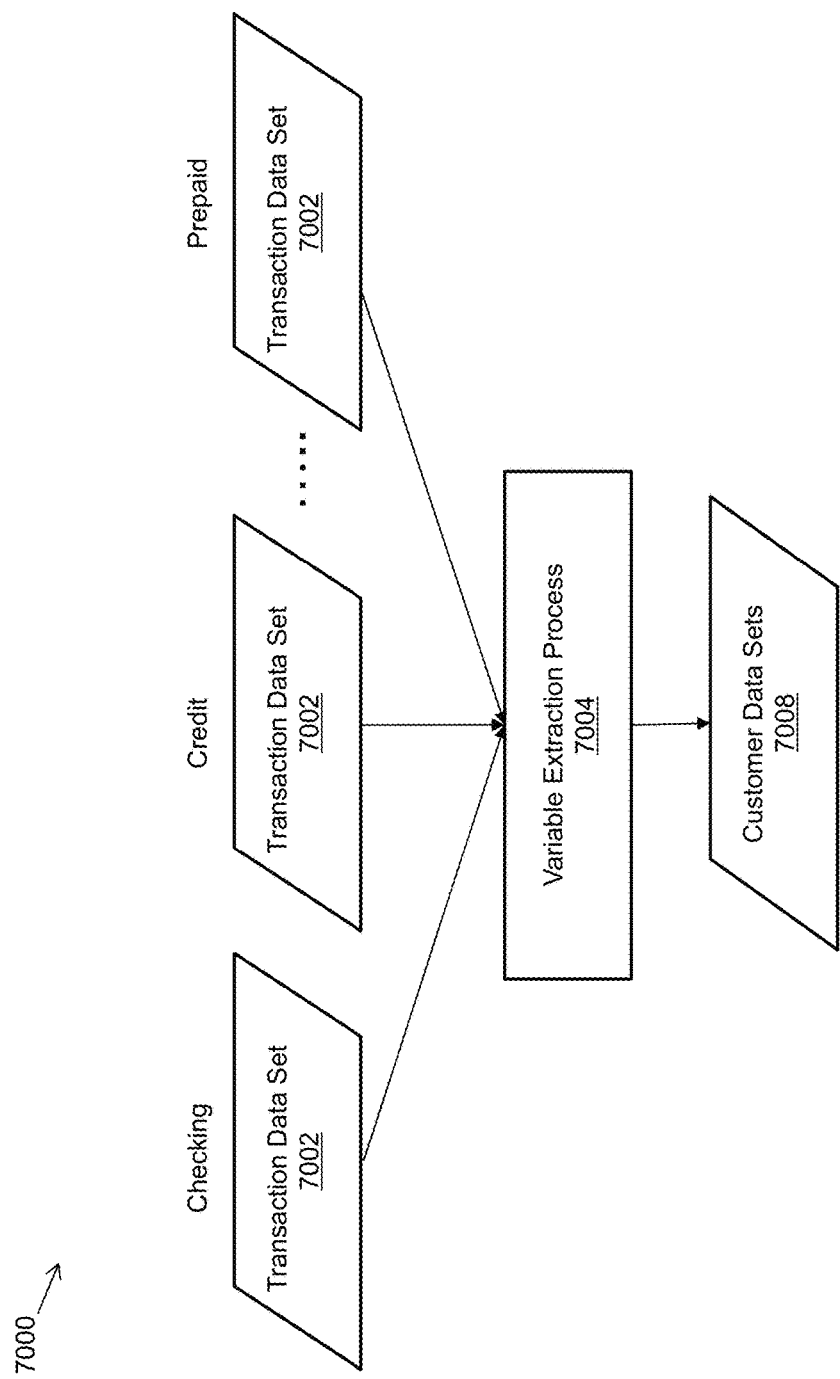
FIG. 70 depicts an example process for collecting financial transactional data from multiple sources.
Figure 70A:
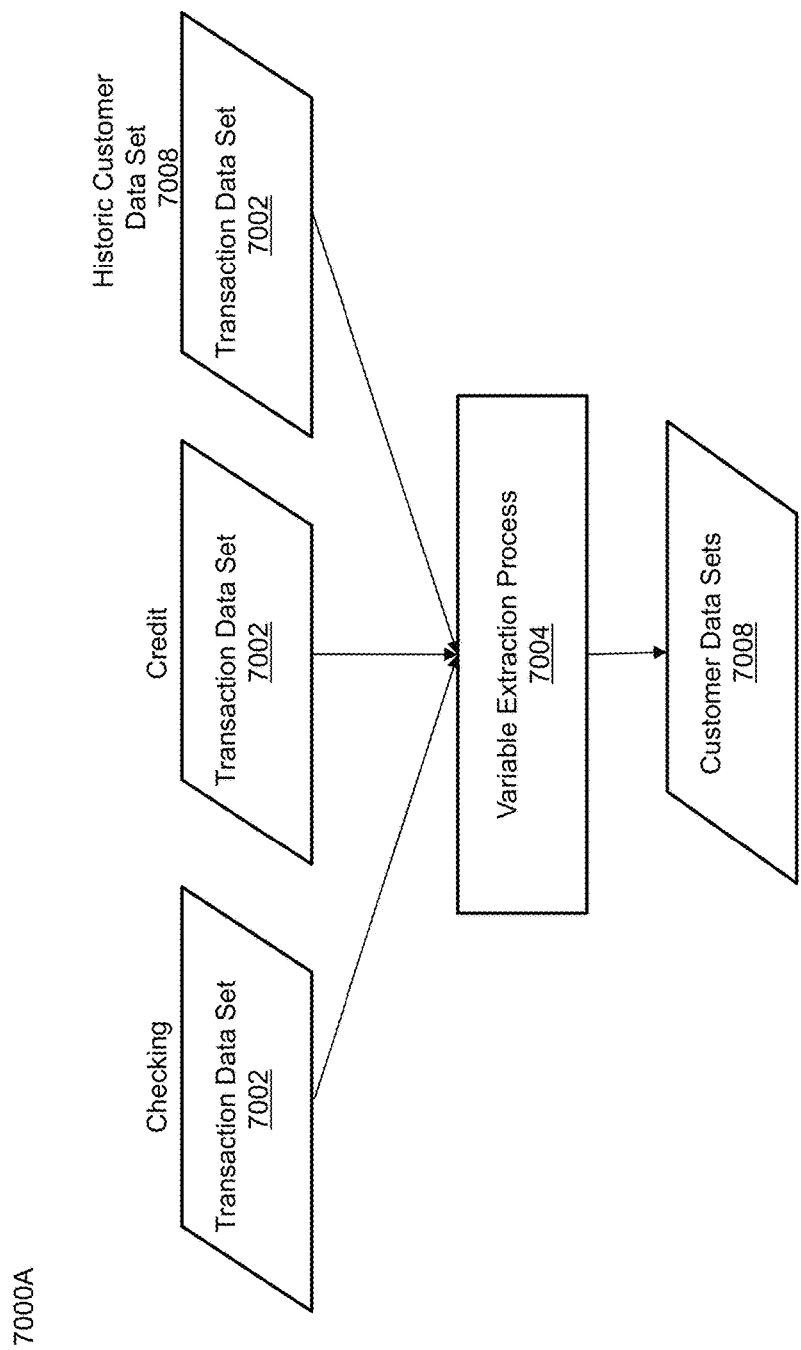
FIG. 70A depicts an example process for collecting financial transactional data from multiple sources.

As shown in FIG. 70, customer data sets 7008 may be derived from a plurality of one or more financial transaction data sets 7002 including checking transactions, credit card transactions, prepaid card transactions, bill pay transactions, and the like. Mining financial transaction data from multiple sources enables improved offer selection by providing a more complete view of customer spending including trends across financial instruments, trends in customer purchases including seasonal variety, changes in geography, most recent merchant and category preferences, and the like. The plurality of financial transaction data sets 7002 may be input into the variable extraction process 7004 which extracts and consolidates customer data sets 7008. FIG. 70A illustrates another embodiment, wherein the plurality of financial transaction data sets 7002 also includes historic customer data sets 7008, information on historic customer response to offers and the like.

Figure 71:
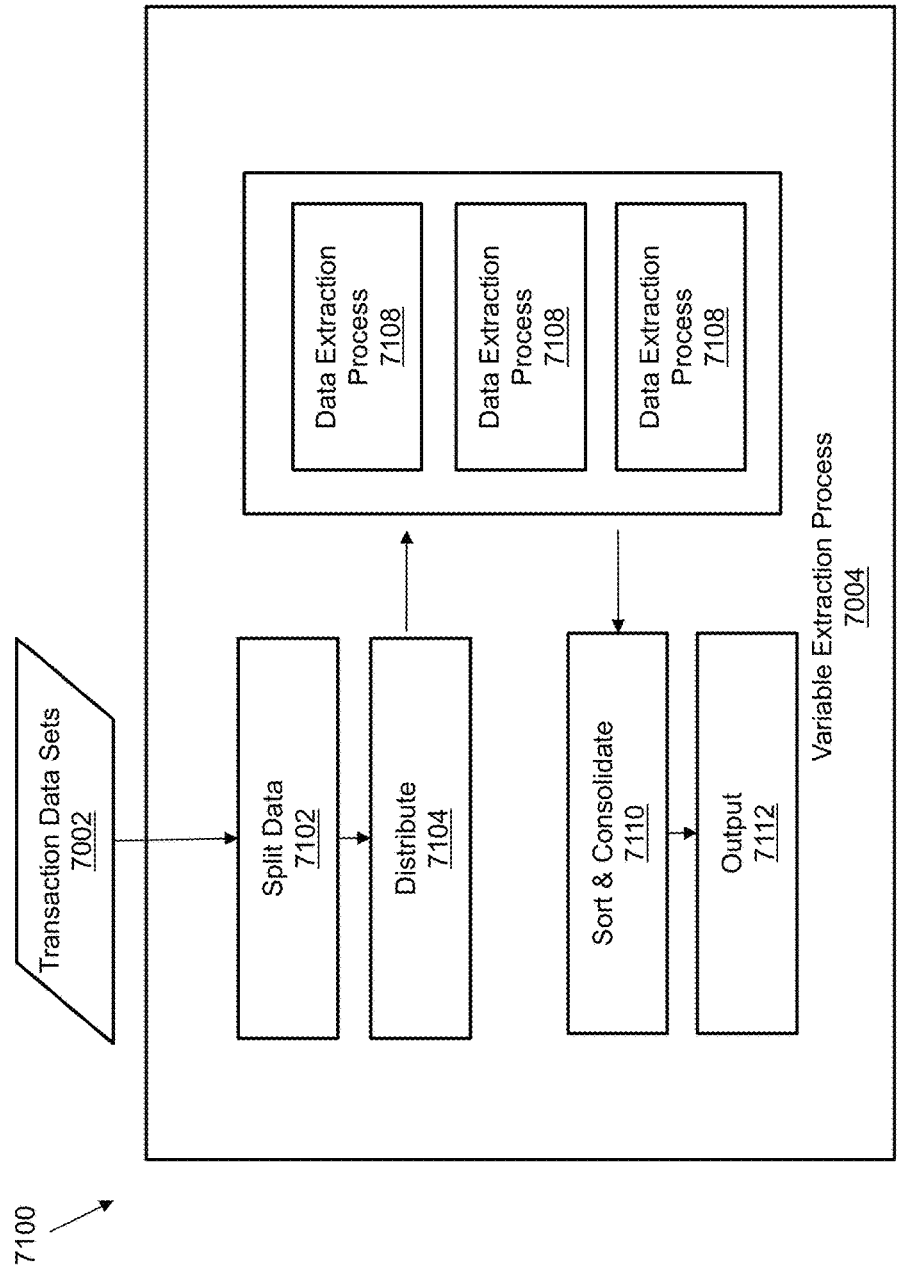
FIG. 71 depicts a method for processing large amounts of transactional data.

FIG. 71 depicts a variable extraction process 7004 for efficiently mining large amounts of data including those generated by multiple financial transaction data sets 7002, ongoing data collection, and the like wherein this process includes splitting the data 7102 where the combined input of multiple financial transaction data sets 7002 may be separated into smaller data sets of possibly similar size, distributing the smaller data sets 7104, to one or more data extraction processes 7108, sorting and consolidating 7110 the output generated by the data extraction processes 7108 and outputting the processed data 7112. Distributing the data processing across a plurality of data extraction processes 7108 enables a variety of distributed processing schemes including utilizing multiple cores within a single computer, utilizing a group of computers, processing in the cloud, and the like. The potential for widely distributed processing has the potential to significantly reduce the elapsed processing time and capabilities required of individual machines. Sorting and consolidating 7110 consolidates the data output from the plurality of data extraction processes 7108. Sorting of the data may be on the basis of a variety of criteria including user, geographic location, location characteristics, merchant, merchant sales strength during period, category, day of the week, week of the year, periodic purchases by customer, and the like. Consolidation may include the removal of duplicate transactions and the like. The results of sort and consolidate 7110 are then output 7112. Output 7112 may include storing the resulting customer data sets 7008 in a file, database or the like, or passing the customer data sets 7008 to the input of another process. Although the variable extraction method 7004 described herein is representative of a hadoop reduce map, alternative processing methods such as relational databases, elastic map reduce and the like are contemplated.

Figure 71A:
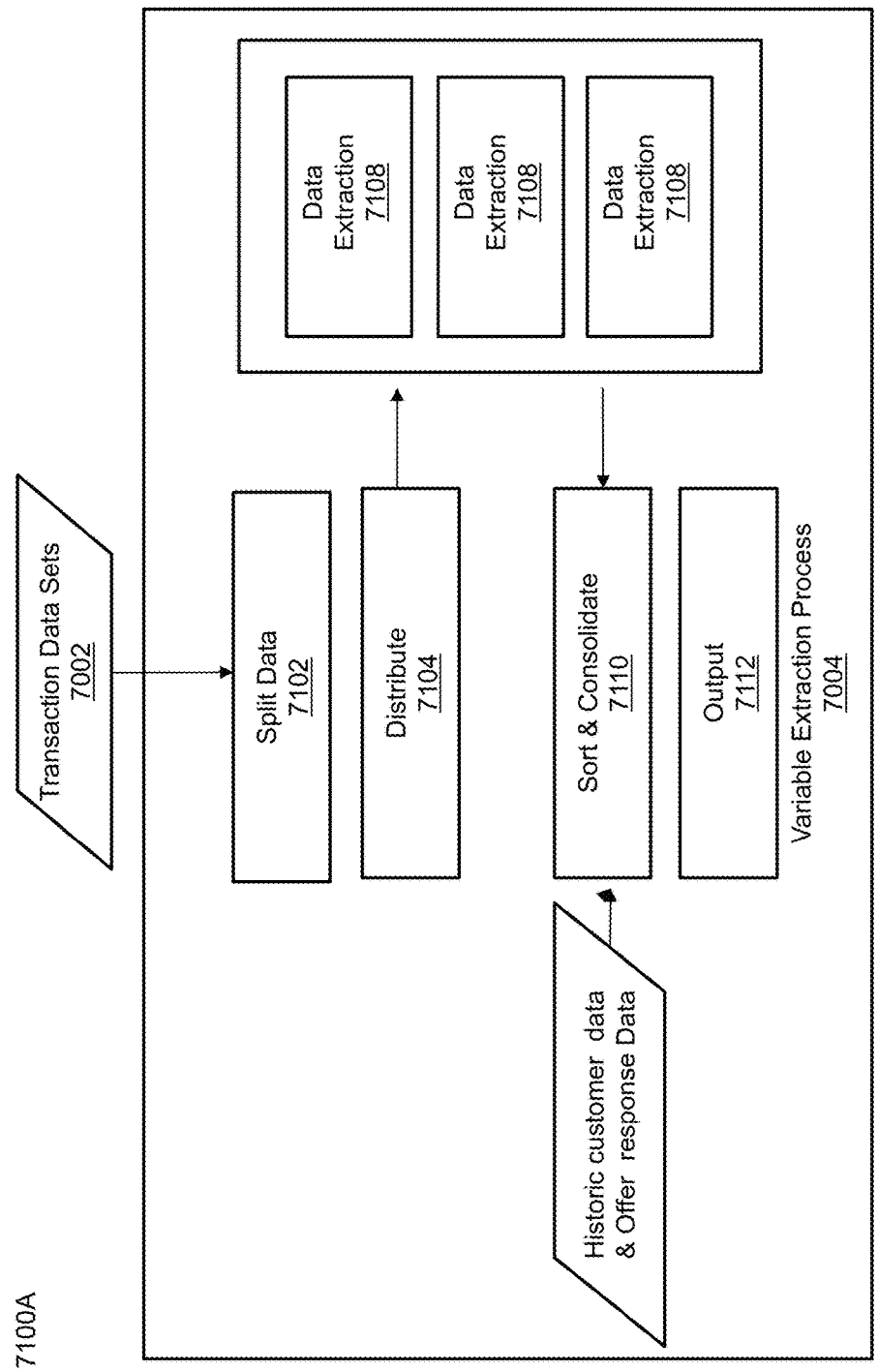
FIG. 71A depicts a method for processing large amounts of transactional data.

FIG. 71A illustrates an alternate embodiment of a variable extraction process 7004, wherein previous customer data sets and offer response data may be merged with the results from the data extraction processes 7108 during or following the sorting and reducing process 7110 rather than entering into the data split process 7102 as an additional financial transaction data set 7002 together with new financial transaction data 7002. This may reduce the elapsed processing time as the previous customer data sets 7108 and offer response data are not being reprocessed through the data extraction process 7108.

Figure 72:
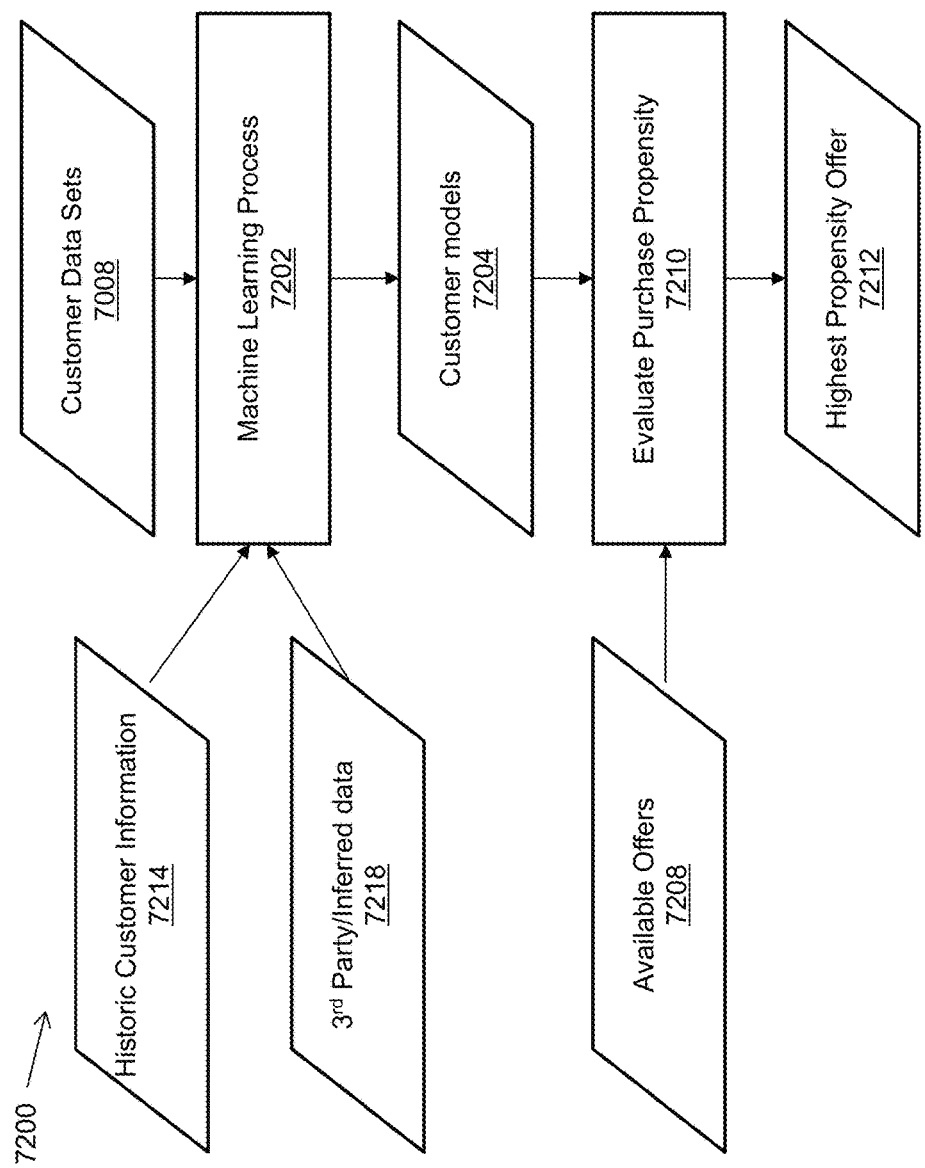
FIG. 72 depicts an example process for selecting a highest propensity customer offer.

FIG. 72 illustrates a platform wherein the customer data sets 7008 resulting from the variable extraction 7004 are input into a machine learning process 7202. Additionally, historic customer information 7214, including previous customer models 7204, responses to previous offers, previous customer data sets 7008, and the like may be provided as input to the machine learning process 7202. Additionally, public or inferred data 7218 including customer's location, census data for the location, such as ethnic makeup, population educational level, income levels, and the like, may be used to provide a substitute demographic profile for the user and may be provided as input to the machine learning process 7202. In another embodiment, merchant data may be accessed using a third party data source and used to improve targeting to the user. For example, a restaurant may be searched on YELP.COM by a user to obtain information about the type of cuisine offered, type of atmosphere, price range and the like. These data may be used as factors in the machine learning process.

The machine learning process 7202 develops a model of customer spending habits including category preferences, geographic locations, seasonal variety, periodic purchases, recent changes from historic spending patterns and the like. The machine learning process 7202 may also develop weighting criteria relative to influence on customers spend behavior including a heavier weighting on recent transactions, extended changes in geography, and the like.

Figure 72B:
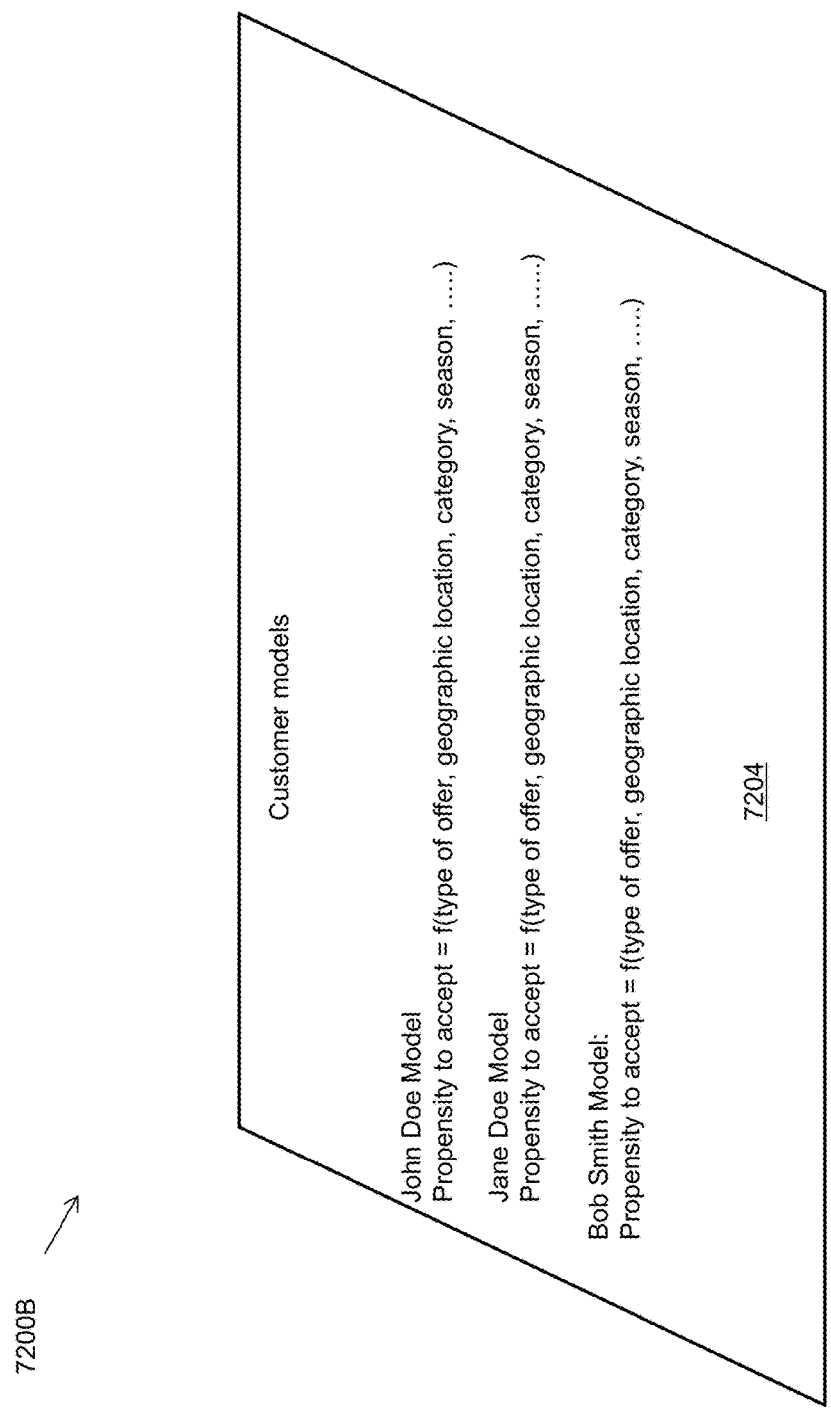
FIG. 72B depicts customer models
Figure 72C:
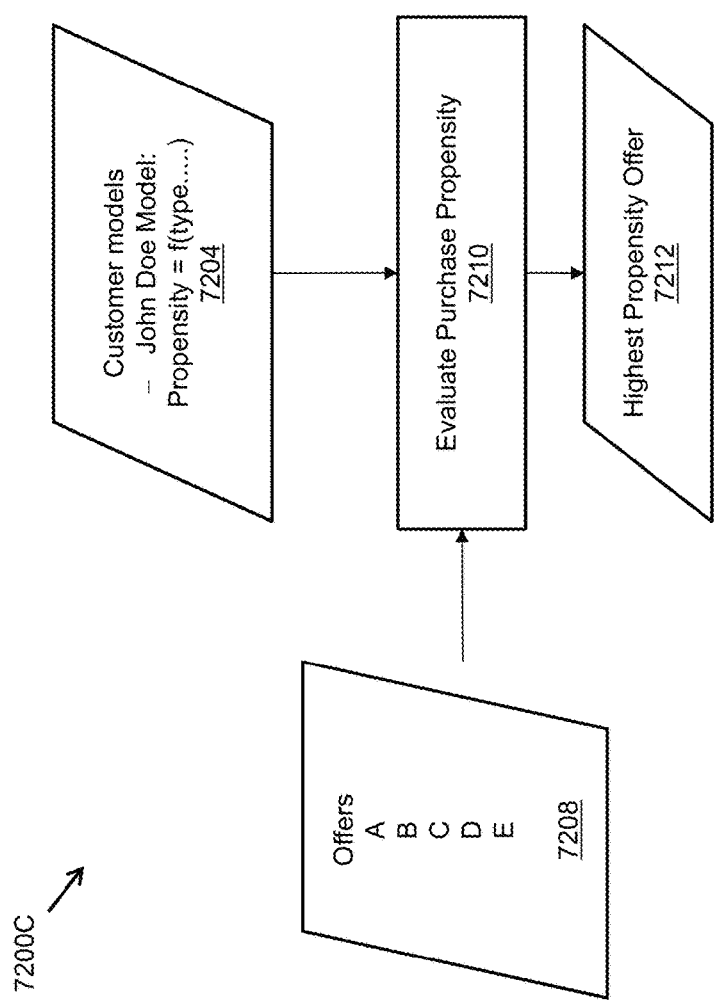
FIG. 72C depicts evaluating purchase propensity

The machine learning process may be a form of predictive modeling including techniques such as logistic regression, neural nets, algorithms such as lasso, elastic-net regularized generalized linear and non-linear models, support vector machines (SVM), ensembles of decision trees, "random forests", and the like. As illustrated in FIG. 72B the customer model 7204 results in a personalized function for each customer that predicts propensity to purchase as a function of a number of variables including type of offer, geographic location, category, merchant, season, and the like. By understanding influences on a particular customer spending behavior the system is better able to accurately predict the relative likelihood or propensity of a customer to act upon a particular offer. The customer model 7204 developed is then used to evaluate purchase propensity 7210 for a number of different available offers 7208 as shown in FIG. 72C. Evaluating purchase propensity results in identification of the offer with the highest purchase propensity for presentation to the customer in any of a variety of manners including on a customers online statement, an online graphical user interface associated with the user's financial account, an online bill pay area, a dialog box associated with the user's financial account, an ATM receipt, a teller receipt, a mobile statement, a paper statement, an email and the like.

Figure 73:
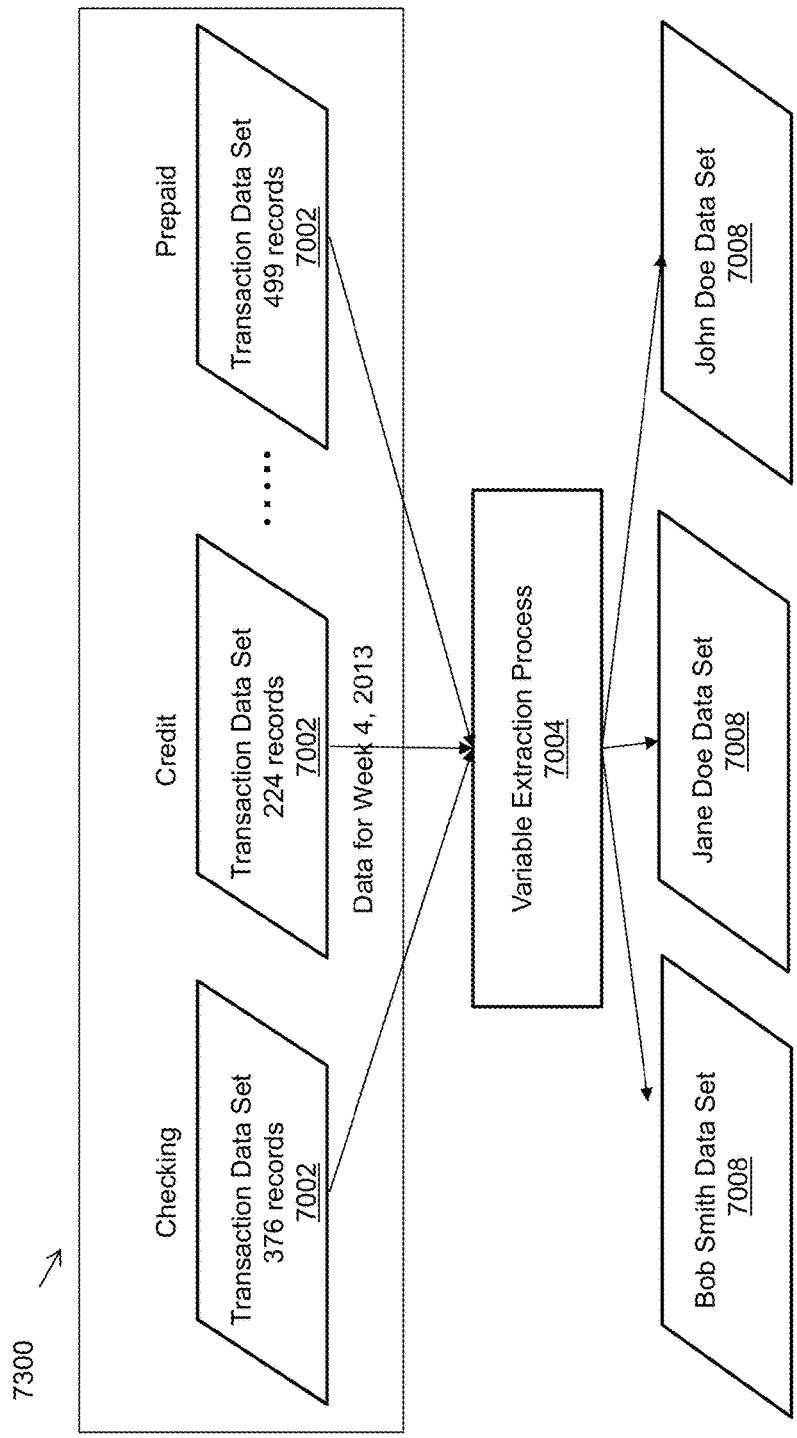
FIG. 73 depicts a demonstrative example of collecting financial transactional data

FIG. 73 provides an illustrated example of how such a system might work. The system receives a plurality of financial transaction data 7002 which encompasses some time period. In this example, the time period is a single week although it is clear that there is wide latitude in the selection of a time interval. The financial transaction data sets 7002 contain a varying number of records encompassing data on a number of individuals. In this example, there are 999 records between the 3 financial transaction data sets 7002 containing financial transactions including those made by Bob Smith, Jane Doe, John Doe, and others. These financial transactional data sets 7002 are sent to the variable extraction process 7004.

Figure 74:
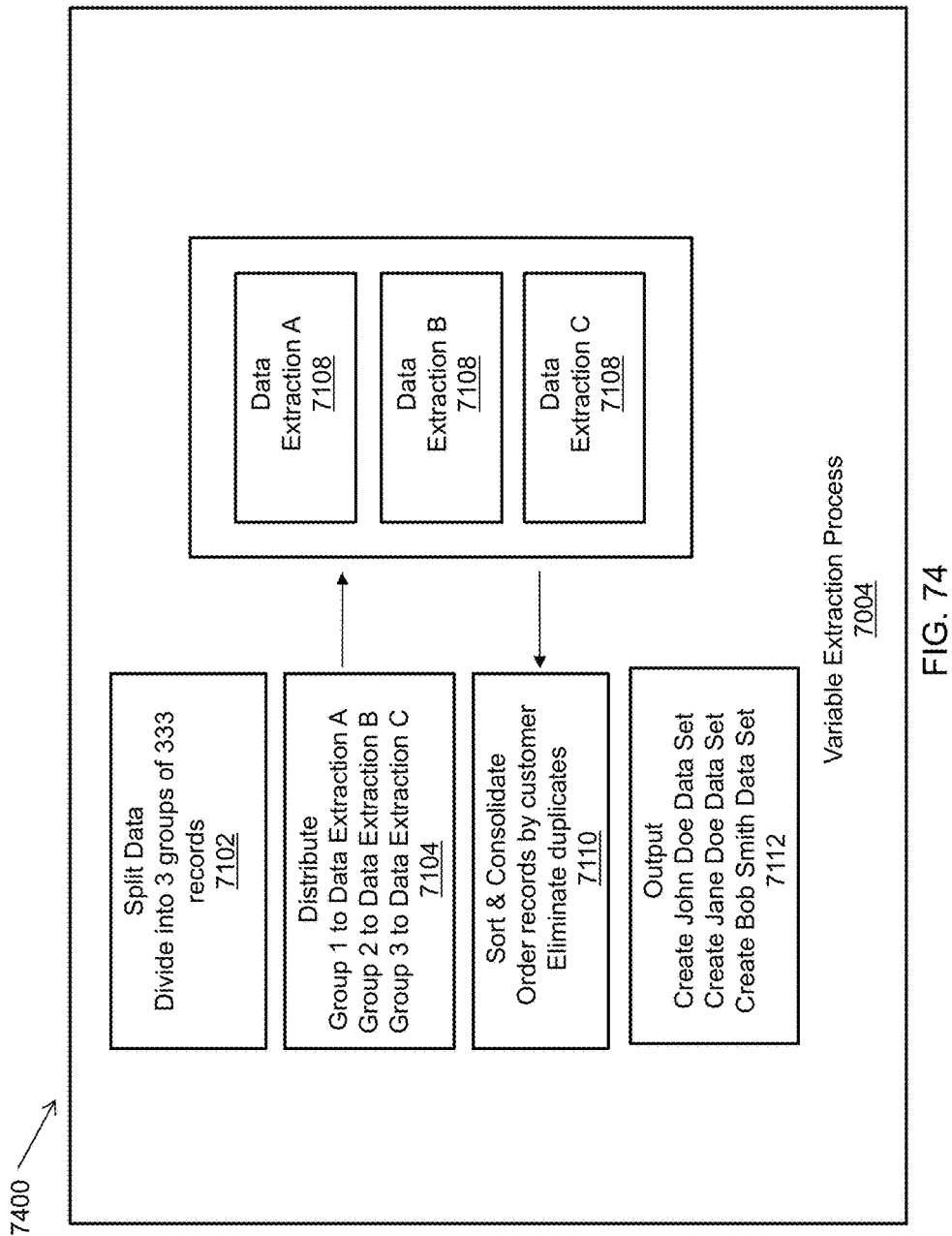
FIG. 74 depicts a demonstrative example of a variable extraction process

FIG. 74 provides an illustrated example of how the variable extraction process 7004 might flow. In the data split process 7102, the financial transaction data records are split from 999 records to a number of smaller groups. In this example the 999 records are split into 3 groups of 333 records each. In data distribute 7104 each of the groups is sent to a different instance of the data extraction process 7108. Each data extraction process 7108 returns the process output to the sort and consolidate 7110 process. Here the output is sorted into a number of data sets including a data set of transactions by John Doe, a data set of transactions by Jane Doe, a data of transactions by Bob Smith, and the like. The set of data concerning John Doe is processed to consolidate the data further, remove duplications and the like. The processed data sets are then output 7112 into a file system, database or the like.

Figure 75:
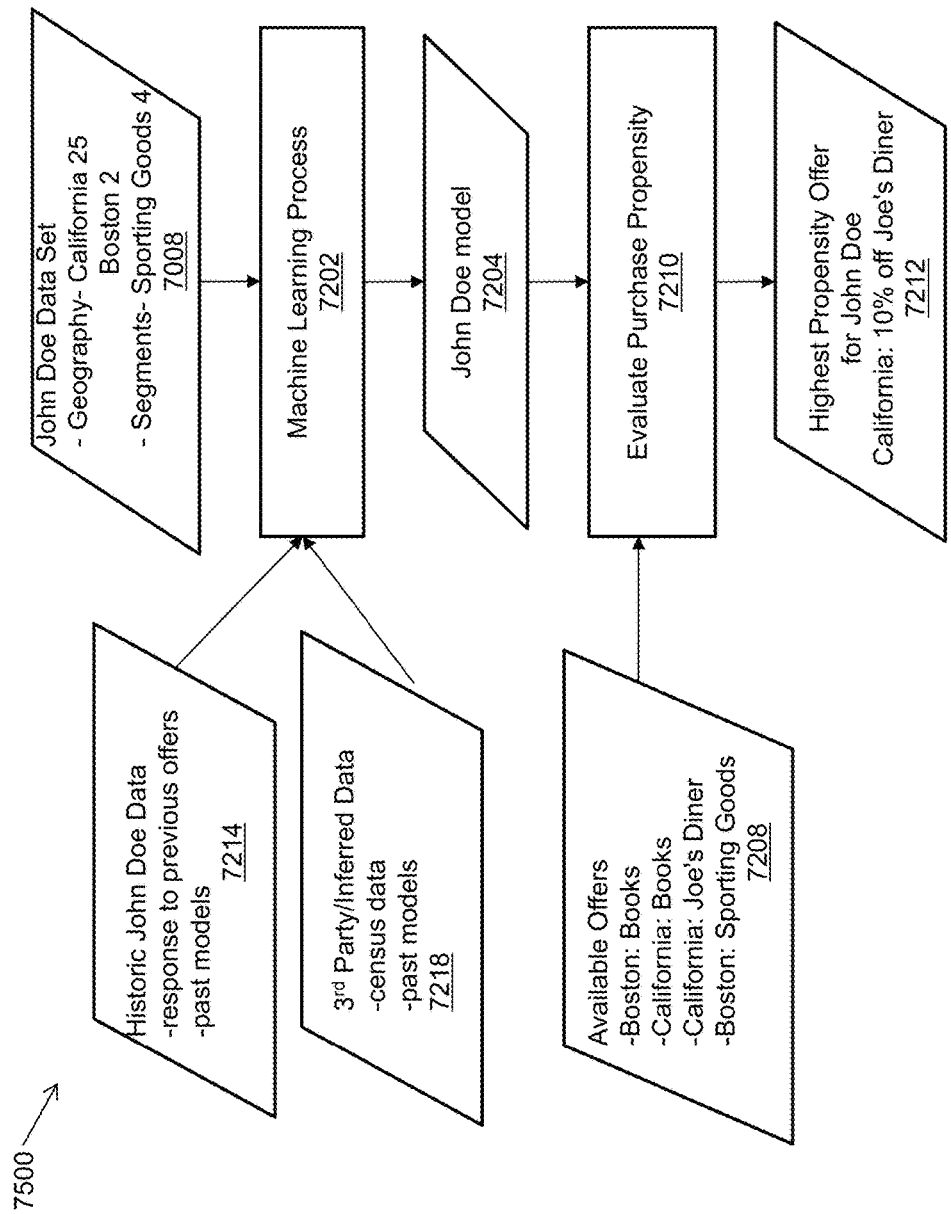
FIG. 75 depicts a demonstrative example of selecting the highest propensity offer for a specific customer.

FIG. 75 illustrates the offer scoring process based on the learned customer models 7204. In this example, the machine learning process creates a propensity to accept model for John Doe based on a variety of inputs including the most recent John Doe data set 7008, historic data on John Doe 7204 including response to previous offers, past models for John Doe and the like, $3^{rd}$ party and inferred data including substitute demographic profile based on census data, typical preferences for customers in specific geography, and the like. A set of available offers 7208 is evaluated for relative purchase propensity 7210 and then the offer with the highest propensity or likelihood of being accepted is selected and presented to the customer in any of a variety of manners including on a customers online statement, an online graphical user interface associated with the user's financial account, an online bill pay area, a dialog box associated with the user's financial account, an ATM receipt, a teller receipt, a mobile statement, a paper statement, an email and the like.

In another embodiment the financial transaction data 7002 associated with a particular customer may be gathered in real time to update the relative purchase propensity 7210 model for that particular customer. Additionally, if the customer is accessing the system using a device which provides geographic location that information may also be used to update the purchase propensity model 7204. In this way the purchase propensity model is kept current.

The data extract process 7108 may involve extracting meta data from a customer transaction record such as merchant, category, geographic location, transaction type, spend type, spend profile, and the like. However, the meta data available may not be constant due to truncation by intermediate transaction processors, limits in reporting capabilities of various financial institutions, and the like. Meta data definitions may vary geographically and by category type. It is an object of this disclosure to describe a tool that may enable the viewing, modifying, and reviewing of meta data definitions and rules. The definitions and rules may vary across the plurality of providers of financial transaction data sets. The tool would enable an operator to define rules for the meaning and characteristics of the transaction data to be segmented including what meta data is represented in the transaction, how it may be parsed, and the like. As additional data becomes available in a transaction record it may be possible to define additional meta data types, rules, definitions and the like for search and extraction.

It is an object of this disclosure to provide the customer with a plurality of value adding offers and services. These offers and services may be made available by a plurality of merchants, service providers, and the like to increase customer base, reward loyal customers, increase brand recognition, and the like. Sales teams associated with suppliers of customer analytics, financial applications, and the like, may have the job of approaching different merchants, service providers and the like to solicit deals which may be offered to the customer. Sales teams may be rewarded based on meeting sales targets such as revenue, profitability, number of sales and the like. It is an object of this disclosure to provide a tool to enable the sales team to better achieve such goals. The disclosure enables the sales team to access information about different merchants, categories of merchants and the like to understand individual offer-campaign performances as well as which merchants are currently generating higher levels of offer acceptance and/or spend and the profitability of various merchants and merchant categories across seasons, geography, merchant/merchant category popularity, sales channel, such as online vs. in store, and the like. The sales team may utilize such information to focus their efforts on those merchants, service providers and the like who are most likely to enable the sales team to meet their goals. In another feature of this tool, the performance of a sales person might be evaluated by comparing their recent achievements relative to the analytic data regarding merchant profitability and the like. This functionality may be provided by a sales dashboard, website, application or similar means.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference.

What is claimed is:

1. A method for providing a geo-enhanced savings opportunity to a mobile device, comprising:
   obtaining, with a central server, a request for sales information for one or more merchants;
   accessing, with the central server, transaction data of multiple customers including sales information from multiple financial institutions;
   generating, with the central server, processed transaction data by executing a variable extraction process on the transaction data including:
      generating sorted transaction data by sorting the transaction data based on criteria,
      generating consolidated transaction data by consolidating the sorted transaction data after removing duplicate entries therein, and
      generating merged transaction data by merging previous customer data after the step of sorting or consolidating;
   generating, with the central server, a customer model for each of the multiple customers by executing a machine learning process on the processed transaction data, the customer model identifying a relative likelihood of a customer to act upon a plurality of offers;
   identifying, with the central server, deals offered by the one or more merchants to the customer based on the customer model, the deals including a geo-enhanced savings opportunity;
   determining, with the central server, whether the customer has used an initial savings opportunity presented to the customer;
   receiving, with a customer interface of the central server, location data from a mobile device of the customer, the location data indicating that the customer has entered a geographic location set by a merchant offering the geo-enhanced savings opportunity; and
   transmitting, with the central server, the geo-enhanced savings opportunity to the mobile device in response to determining that the customer has not used the initial savings opportunity presented to the customer and in response to receiving the location data.

2. The method of claim 1, further comprising:
   extracting, with the one or more processors, metadata associated with the transaction data in accordance with at least one rule;
   analyzing, with the central server, the metadata to identify transaction data associated with one or more merchants;
   correcting, with the central server, the metadata concerning the one or more merchants using the at least one rule via a Radix tree to correctly identify each of the one or more merchants over multiple transactions; and
   providing the corrected metadata to a sales team via a sales dashboard associated with the central server.

3. The method of claim 2, further comprising analyzing the metadata using one or more of a constant-time data structure, a Radix tree, a Lucene tree or fuzzy logic.

4. The method of claim 3, further comprising creating the constant-time data structure by using segmented transaction data related to the one or more merchants as an input during creation of the constant-time data structure.

5. The method of claim 4, wherein the transaction data is segmented by at least one of a merchant and a location.

6. The method of claim 4, further comprising assigning a unique ID to at least one of a merchant and a location found in the segmented transaction data.

7. The method of claim 6, further comprising adding the unique ID to a constant-time database for future searching.

8. The method of claim 3, wherein the constant-time data structure comprises a search of the Lucene tree.

9. The method of claim 8, wherein the constant-time data structure comprises a fuzzy logic method after the Lucene tree.

10. The method of claim 2, wherein the at least one rule is a processing rule for conversion among letters, numbers and characters in extracting and correcting the metadata.

11. The method of claim 2, further comprising analyzing the corrected metadata and the transaction data associated with the one or more merchants to determine sales trends over a period of time, wherein the sales trends comprise at least one of revenue, profitability, number of sales, seasonal sales, sales by location, and sales during an offer campaign.

12. The method of claim 2, further comprising determining a geographic location of the one or more merchants over multiple transactions via a Radix tree.

13. The method of claim 2, wherein the metadata is extracted using a description splitter.

14. The method of claim 13, further comprising generating by the description splitter a sequence of tokens relating to a location of each of the one or more merchants for searching for the location of each of the one or more merchants in each of the transaction data.

15. The method of claim 13, further comprising generating by the description splitter a sequence of tokens relating to a name of each of the one or more merchants for searching for the name of the merchant in each of the transaction data.

16. The method of claim 13, wherein the description splitter is adapted to include a location tokenizer and a merchant tokenizer, the location tokenizer for generating tokens relating to a location of each of the one or more merchants and the merchant tokenizer for generating tokens relating to a similar name for each of the one or more merchants.

17. The method of claim 1, the variable extraction process including one or more of a hadoop reduce map, a relational database, and an elastic map reduce.

18. The method of claim 1, the machine learning process including one or more of logistic regression, neural nets, algorithms such as lasso, elastic-net regularized generalized linear and non-linear models, support vector machines (SVM), ensembles of decision trees, and random forests processes.

19. The method of claim 1, the previous customer data including tracked responses of the customer to previously presented savings opportunities.

20. The method of claim 1, the previous customer data including tracked responses of a first customer to a shared savings opportunity, and tracked response of a second customer to the shared savings opportunity received by the second customer from the first customer.

21. The method of claim 1, further comprising:
provide the one or more merchants and the deals to a sales team via a sales dashboard associated with the central server.

* * * * *